US011811334B2

(12) United States Patent
Reed et al.

(10) Patent No.: US 11,811,334 B2
(45) Date of Patent: Nov. 7, 2023

(54) ELECTROSTATIC MOTOR

(71) Applicant: C-Motive Technologies, Inc., Madison, WI (US)

(72) Inventors: Justin Kyle Reed, Madison, WI (US); Baoyun Ge, Madison, WI (US); Daniel Colin Ludois, Middleton, WI (US); Aditya Nandakumar Ghule, Madison, WI (US)

(73) Assignee: C-Motive Technologies, Inc., Middleton, WI (US)

( * ) Notice: Subject to any disclaimer, the term of this patent is extended or adjusted under 35 U.S.C. 154(b) by 254 days.

(21) Appl. No.: 17/234,560

(22) Filed: Apr. 19, 2021

(65) Prior Publication Data
US 2021/0242806 A1 Aug. 5, 2021

Related U.S. Application Data

(63) Continuation of application No. 17/141,145, filed on Jan. 4, 2021.
(Continued)

(51) Int. Cl.
*H02N 2/14* (2006.01)
*H02N 1/00* (2006.01)
*H02N 2/12* (2006.01)

(52) U.S. Cl.
CPC ............ *H02N 1/006* (2013.01); *H02N 1/002* (2013.01); *H02N 1/004* (2013.01); *H02N 2/12* (2013.01); *H02N 2/14* (2013.01)

(58) Field of Classification Search
CPC .......... H02N 1/00; H02N 1/002; H02N 1/004; H02N 2/14; H02N 1/006
(Continued)

(56) References Cited

U.S. PATENT DOCUMENTS

| 2,417,850 A | 3/1947 | Winslow |
| 3,094,653 A | 6/1963 | Le May et al. |

(Continued)

FOREIGN PATENT DOCUMENTS

| CN | 1674428 A | 9/2005 |
| JP | H04183793 A | 6/1992 |

(Continued)

OTHER PUBLICATIONS

D. C. Ludois, et al., "Macroscale Electrostatic Rotating Machines and Drives: A Review and Multiplicative Gain Performance Strategy," in IEEE Journal of Emerging and Selected Topics in Power Electronics, vol. 10, No. 1, pp. 14-34, Feb. 2022. doi: 10.1109/JESTPE.2020.3023118. (Year: 2022).*
(Continued)

*Primary Examiner* — Burton S Mullins
(74) *Attorney, Agent, or Firm* — GTC Law Group PC & Affiliates

(57) ABSTRACT

An electrostatic machine including a rotor plate comprising a plurality of rotor electrodes, and rotatably fixed to a shaft; a stator plate comprising a plurality of stator electrodes; an excitation circuit electrically coupled to at least one of the rotor plate or the stator plate at a first end, and electrically couplable to exchange power at a second end with a selected one of an electrical power source or an electrical load; wherein the excitation circuit is configured to: in a first motoring mode, provide excitation power to at least one of the rotor plate or the stator plate, wherein the shaft provides positive torque to the load; and in a second generating mode, wherein the shaft receives negative torque from the load, operably couple at least one of the rotor plate or the stator plate to the electrical power source.

16 Claims, 53 Drawing Sheets

Related U.S. Application Data

(60) Provisional application No. 62/956,821, filed on Jan. 3, 2020, provisional application No. 62/956,830, filed on Jan. 3, 2020.

(58) Field of Classification Search
USPC .................. 322/2 A; 318/116; 310/308–309
See application file for complete search history.

(56) References Cited

U.S. PATENT DOCUMENTS

| | | | |
|---|---|---|---|
| 3,400,282 A | 9/1968 | Felici | |
| 3,433,981 A | 3/1969 | Bollee | |
| 3,455,954 A | 7/1969 | Prager | |
| 3,569,651 A | 3/1971 | Gratzmuller | |
| 3,696,258 A | 10/1972 | Anderson et al. | |
| 3,948,788 A | 4/1976 | Munch | |
| 4,672,250 A | 6/1987 | Seitz | |
| 4,754,185 A | 6/1988 | Gabriel et al. | |
| 4,814,657 A | 3/1989 | Yano et al. | |
| 4,825,899 A | 5/1989 | Niggemann | |
| 5,334,923 A | 8/1994 | Lorenz et al. | |
| 5,437,775 A | 8/1995 | Dittrich et al. | |
| 5,763,965 A | 6/1998 | Bader | |
| 5,773,782 A | 6/1998 | Storr et al. | |
| 6,221,970 B1 | 4/2001 | Morken et al. | |
| 6,353,276 B1 | 3/2002 | Gendron | |
| 6,936,994 B1* | 8/2005 | Gimlan | B60L 8/006 |
| | | | 320/101 |
| 7,239,065 B2 | 7/2007 | Horst | |
| 8,174,163 B2 | 5/2012 | Despesse | |
| 8,283,834 B2 | 10/2012 | Matsubara et al. | |
| 8,779,647 B2 | 7/2014 | Sashida | |
| 9,184,676 B2 | 11/2015 | Ludois | |
| 9,479,085 B1 | 10/2016 | Ludois et al. | |
| 9,571,010 B2 | 2/2017 | Ludois | |
| 9,748,867 B2 | 8/2017 | Hawes et al. | |
| 9,866,148 B2* | 1/2018 | Petrowsky | H02N 1/004 |
| 9,899,937 B2 | 2/2018 | Ge et al. | |
| 9,979,323 B1* | 5/2018 | Ghule | H02N 1/008 |
| 10,461,592 B2 | 10/2019 | Klassen et al. | |
| 2002/0163281 A1 | 11/2002 | Rafaelof | |
| 2004/0120637 A1 | 6/2004 | Valette et al. | |
| 2005/0006980 A1 | 1/2005 | Horst | |
| 2005/0212382 A1 | 9/2005 | Odaka et al. | |
| 2006/0214535 A1* | 9/2006 | Salmon | B60K 7/0007 |
| | | | 318/116 |
| 2008/0099483 A1 | 5/2008 | Anderson et al. | |
| 2008/0100162 A1 | 5/2008 | Garvey | |
| 2009/0115285 A1 | 5/2009 | Najafi et al. | |
| 2010/0166582 A1 | 7/2010 | Racicot et al. | |
| 2010/0237629 A1* | 9/2010 | Gray | H02K 7/025 |
| | | | 318/116 |
| 2011/0232940 A1 | 9/2011 | Hwang et al. | |
| 2012/0051893 A1 | 3/2012 | Schofield et al. | |
| 2012/0282120 A1 | 11/2012 | Krahn et al. | |
| 2013/0106317 A1 | 5/2013 | Ludois | |
| 2013/0154269 A1* | 6/2013 | Baldwin | F03B 17/063 |
| | | | 415/220 |
| 2013/0300252 A1 | 11/2013 | Johnson | |
| 2014/0175941 A1 | 6/2014 | Johnson | |
| 2015/0048716 A1 | 2/2015 | Johnson | |
| 2015/0134109 A1 | 5/2015 | Zhou et al. | |
| 2015/0191607 A1 | 7/2015 | Mcdaniel | |
| 2016/0099663 A1 | 4/2016 | Petrowsky et al. | |
| 2016/0211775 A1 | 7/2016 | Ge et al. | |
| 2016/0329780 A1 | 11/2016 | Reed et al. | |
| 2016/0344306 A1 | 11/2016 | Ge et al. | |
| 2017/0040910 A1 | 2/2017 | Hawes et al. | |
| 2018/0013331 A1 | 1/2018 | Post | |
| 2019/0081577 A1 | 3/2019 | Goodson et al. | |
| 2019/0253000 A1 | 8/2019 | Kratchman et al. | |
| 2019/0296659 A1 | 9/2019 | Reitz et al. | |
| 2021/0211069 A1 | 7/2021 | Reed et al. | |
| 2021/0234476 A1 | 7/2021 | Reed et al. | |
| 2021/0242802 A1 | 8/2021 | Reed et al. | |
| 2021/0242803 A1 | 8/2021 | Butrymowicz et al. | |
| 2021/0242804 A1 | 8/2021 | Reed et al. | |
| 2021/0242805 A1 | 8/2021 | Knippel et al. | |
| 2021/0257929 A1 | 8/2021 | Knippel et al. | |
| 2021/0257930 A1 | 8/2021 | Reed et al. | |
| 2021/0281193 A1 | 9/2021 | Reed et al. | |

FOREIGN PATENT DOCUMENTS

| | | |
|---|---|---|
| JP | H0866058 A | 3/1996 |
| JP | 2002083602 A | 3/2002 |
| JP | 2004183793 A | 7/2004 |
| JP | 2004207981 A | 7/2004 |
| JP | 2005278324 A | 10/2005 |
| JP | 2007298647 A | 11/2007 |
| JP | 2008098563 A | 4/2008 |
| JP | 2008214560 A | 9/2008 |
| JP | 2009509355 A | 3/2009 |
| JP | 2009115978 A | 5/2009 |
| JP | 2009272354 A | 11/2009 |
| JP | 2010156626 A | 7/2010 |
| JP | 2010192326 A | 9/2010 |
| JP | 2010198858 A | 9/2010 |
| JP | 2011150958 A | 8/2011 |
| JP | 2012200029 A | 10/2012 |
| RU | 73761 U1 | 5/2008 |
| RU | 2414043 C1 | 3/2011 |
| RU | 2471283 C1 | 12/2012 |
| SU | 01069106 | 1/1984 |
| WO | 2006102444 A1 | 9/2006 |
| WO | 2016057333 A1 | 4/2016 |
| WO | 2020101796 A1 | 5/2020 |
| WO | 2021138690 A1 | 7/2021 |
| WO | 2021138693 A1 | 7/2021 |

OTHER PUBLICATIONS

N. Zhao et al., "Development of a Dielectric-Gas-Based Single-Phase Electrostatic Motor," in IEEE Transactions on Industry Applications, vol. 55, No. 3, pp. 2592-2600, May-Jun. 2019, doi: 10.1109/TIA.2019.2895194. (Year: 2019).*

G. Reitz, B. Butrymowicz, J. Reed, B. Ge and D. C. Ludois, "Aswitched elastance electrostatic machine constructed from sustainable elements for rotational actuators," 2017 IEEE Energy Conversion Congress and Exposition (ECCE), Cincinnati, OH, USA, 2017, pp. 2389-2395, doi: 10.1109/ECCE.2017.8096462. (Year: 2017).*

B. Ge, D. C. Ludois and A. N. Ghule, "A 3D printed fluid filled variable elastance electrostatic machine optimized with conformal mapping," 2016 IEEE Energy Conversion Congress and Exposition (ECCE), Milwaukee, WI, USA, 2016, pp. 1-8, doi: 10.1109/ECCE.2016.7854646. (Year: 2016).*

"Practical Dielectrics, Reading—Shen and Kong", MIT OpenCourseWare, Spring 2011, 6.007 Electromagnetic Energy From Motors to Lasers.

"Roland Albers Ph D Thesis", Technical University—Munich, Dissertation on Jan. 29, 2001, English translation provided for relevant pp. 100-102, 155 pages.

15849571.3, "European Application Serial No. 15849571.3, Extended European Search Report dated Sep. 26, 2018", C-Motive Technologies, Inc., 11 pages.

Buysch , "Ullman's Encyclopedia Of Industrial Chemistry", vol. 7, 2012, pp. 45-71.

Cargill , "Fr3 Fluid Technical Details Webpage", 2021, 17 Pages.

Coddington , et al., "Operation of a dielectric motor with a low conductivity liquid", J. Phys. D: Appl. Phys., revised Feb. 1970, vol. 3, pp. 1212-1218.

Crossland , et al., "Mechanical to electrical energy conversion in a hybrid liquid-solid dielectric electrostatic generator", Journal of Applied Physics 106, published online, Aug. 31, 2009, 4 Pages.

Dittrich , et al., "Abatement of High-Field Conduction in Liquid Dielectrics by Electrode Conditioning with Non-ionic Cage-Forming Polymers: A Novel Avenue to High-Power Engineering", 2000 Lyonel Baum, 5 Pages.

(56) References Cited

OTHER PUBLICATIONS

Dittrich, et al., "Abatement of injection currents in propylene carbonate", taken from IEEE Periodical 1990, pp. 166-170.
Felici, N., "High-Field Conduction in Dielectric Liquids Revisited", IEEE Transactions on Electrical Insulation vol. E1-20, No. 2, Apr. 1985, pp. 233-238.
Ge, et al., "Evaluation of Dielectric Fluids for Macro-Scale Electrostatic Actuators and Machinery", 2014 IEEE, pp. 1457-1464.
Gung, et al., "Preliminary Kerr Electro-Optic Field Mapping Measurements in Propylene Carbonate Using Point-Plane Electrodes", Journal of Electrostatics 46,1999, pp. 79-89.
Jefimenko, Oleg D., "Electrostatic Motors, Their History, Types and Principles of Operation", Copyright 1973 by Electret Scientific Company, 149 Pages.
PCT/US2021/012120, "International Application Serial No. PCT/US2021/012120, International Preliminary Report on Patentability dated Jul. 14, 2022", C-Motive Technologies, Inc., 14 pages.
PCT/US2021/012120, "International Application Serial No. PCT/US2021/012120, International Search Report and Written Opinion dated May 26, 2021", C-Motive Technologies, Inc., 16 pages.
PCT/US2021/012120, "International Application Serial No. PCT/US2021/012120, Invitation to Pay Additional Fees and, Where Applicable, Protest Fee dated Apr. 1, 2021", C-Motive Technologies, Inc., 2 pages.
PCT/US2021/012123, "International Application Serial No. PCT/US2021/012123, International Preliminary Report on Patentability dated Jul. 14, 2022", C-Motive Technologies, Inc., 13 pages.
PCT/US2021/012123, "International Application Serial No. PCT/US2021/012123, International Search Report and Written Opinion dated Apr. 14, 2021", C-Motive Technologies, Inc., 13 pages.
Secker, et al., "A Simple Liquid Immersed Dielectric Motor", Journal of Applied Physics, 39, 1968, pp. 2957-2961.
Shenkman, et al., "A New Type of Capacitive Machine", Energy and Power Engineering, 2015, published online Feb. 2015, Scientific Research Publishing, pp. 31-40.

* cited by examiner

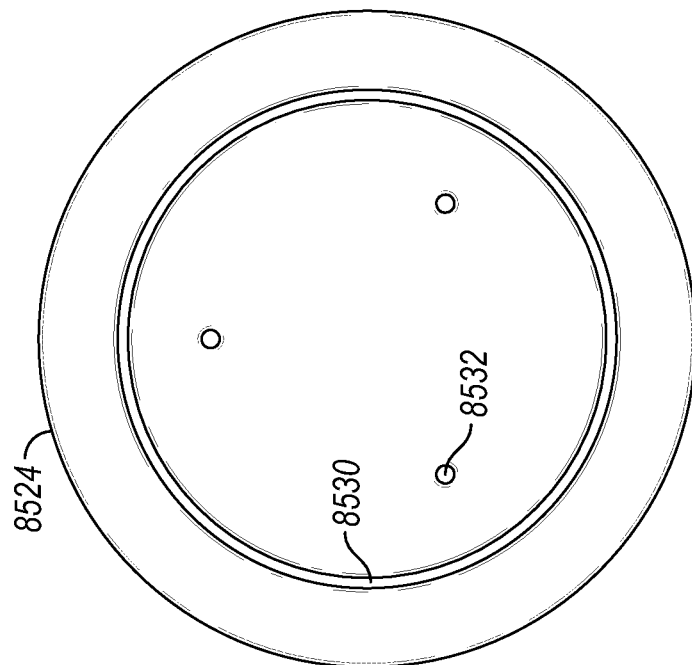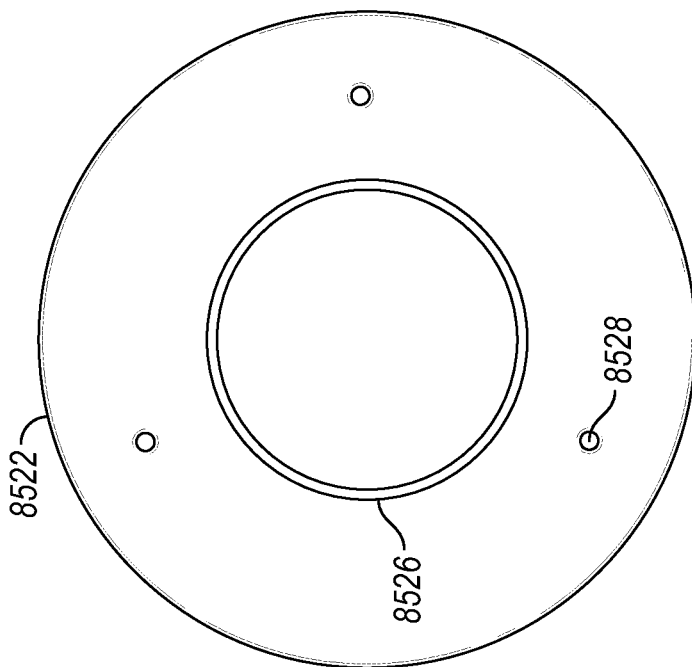
FIG. 88

ELECTROSTATIC MOTOR

CLAIM OF PRIORITY

This application is a continuation of and claims priority to U.S. patent application Ser. No. 17/141,145, filed Jan. 4, 2021 and entitled "ELECTROSTATIC MOTOR".

U.S. patent application Ser. No. 17/141,145 claims priority to U.S. Provisional Patent Application Ser. No. 62/956,821, filed Jan. 3, 2020 and entitled "HYBRID ELECTRIC DRIVE MACHINE", and U.S. Provisional Patent Application Ser. No. 62/956,830, filed Jan. 3, 2020 and entitled "PLATE COMPONENTS FOR AN ELECTRIC DRIVE MACHINE".

Each of the foregoing applications is incorporated herein in the entirety, for all purposes.

BACKGROUND

Electrostatic machines operate on capacitive principles rather than inductive principles. Electrostatic machines have some advantages over inductive machines, including the ability to generate low loss torque at zero or low speeds, operation at generally higher inherent voltages than inductive machines, and lower cost of materials such as magnets and windings. However, presently known electrostatic machines suffer from a number of drawbacks, including low power density, and complexity of managing capacitive interfaces.

SUMMARY

An example system includes an electrostatic machine including a rotor plate and an adjacent stator plate; where a first one of the rotor plate or stator plate includes a coupled bearing; and where the other one of the rotor plate or stator plate includes a race radially aligned with the coupled bearing.

Certain further aspects of the example system are described following, any one or more of which may be present in certain embodiments. The coupled bearing on the first one of the rotor plate or stator plate is radially located greater than or equal to 50% the distance from the shaft to the outer most extent of the first one of the rotor plate or stator plate. The coupled bearing on the first one of the rotor plate or stator plate is radially located greater than or equal to 90% the distance from the shaft to the outer most extent of the first one of the rotor plate or stator plate. The coupled bearing on the first one of the rotor plate or stator plate is located a radial distance from the shaft such that at least half the collective mass of the first one of the rotor plate or stator plate is radially interposed between the shaft and the coupled bearing. The coupled bearing on the first one of the rotor plate or stator plate is radially located greater than or equal to 70% the distance from the shaft to the outer most extent of the first one of the rotor plate or stator plate. The coupled bearing is one of a plurality of azimuthally distributed bearings radially aligned with the race. The plurality of azimuthally distributed bearings is less than or equal to three. The plurality of azimuthally distributed bearings is greater than three but less than or equal to six. The number of the plurality of azimuthally distributed bearings is greater than six. The coupled bearing has a width with a first contact point on the first one of the rotor plate or stator plate and a second contact point on the race on the other one of the rotor plate or stator plate, where the coupled bearing is sized to maintain a minimum separation distance between the rotor plate and the stator plate. The minimum separation distance includes a value between 0.1 mm and a distance including 1% of a stator plate radial extent, inclusive. The minimum separation distance includes a value not greater than 3 cm. The coupled bearing is a ball bearing coupled to the first one of the rotor plate or stator plate. The coupled bearing is a cylindrical bearing attached to the first one of the rotor plate or stator plate. The coupled bearing is thrust bearing. The coupled bearing includes one of a conical bearing or a tapered bearing. The coupled bearing is sized to maintain a minimum separation distance between the rotor plate and the stator plate. The coupled bearing, a number of electrodes on each of the rotor plate and the stator plate, and a radial extent of electrodes of at least one of the rotor plate or the stator plate are configured according to the relationship $0 < R/(P*G) \leq 5$, wherein R is a radial extent of the electrodes of at least one of the rotor plate or the stator plate, P is a number of electrodes present on each of the rotor plate and the stator plate, and G is the minimum separation distance. The coupled bearing, a number of electrodes on each of the rotor plate and the stator plate, and a radial extent of electrodes of at least one of the rotor plate or the stator plate are configured according to the relationship $0.1 \leq R/(P*G) \leq 3$, wherein R is a radial extent of the electrodes of at least one of the rotor plate or the stator plate, P is a number of electrodes present on each of the rotor plate and the stator plate, and G is the minimum separation distance. The race is detented within the other one of the rotor plate or the stator plate. The race extends axially beyond the other one of the rotor plate or the stator plate. The coupled bearing, a number of electrodes on each of the rotor plate and the stator plate, and a radial position of the race of the other one of the rotor plate or the stator plate are configured according to the relationship $0 < R/(P*G) \leq 5$, wherein R is a radial position of the race from a fixing location on the one of the rotor plate or the stator plate, P is a number of electrodes present on each of the rotor plate and the stator plate, and G is the minimum separation distance. The coupled bearing, a number of electrodes on each of the rotor plate and the stator plate, and a radial position of the race of the other one of the rotor plate or the stator plate are configured according to the relationship $0.1 \leq R/(P*G) \leq 3$, wherein R is a radial distance of the race from a fixing location on the one of the rotor plate or the stator plate, P is a number of electrodes present on each of the rotor plate and the stator plate, and G is the minimum separation distance. The other one of the rotor plate or the stator plate includes the stator plate, and wherein the fixing location includes an outer radial extent of the stator plate. The other one of the rotor plate or the stator plate includes the rotor plate, and wherein the fixing location includes an outer radial extent of the rotor plate. The minimum separation distance includes a value between 0.5 mm and 3 mm, inclusive.

BRIEF DESCRIPTION OF THE DRAWINGS

FIG. 88 is a schematic depiction of a multiple bearing track configuration on a stator-rotor assembly for an electrostatic motor.

FIG. 118 is a schematic depiction of a system for an electrostatic motor.

DETAILED DESCRIPTION

Figure 1:
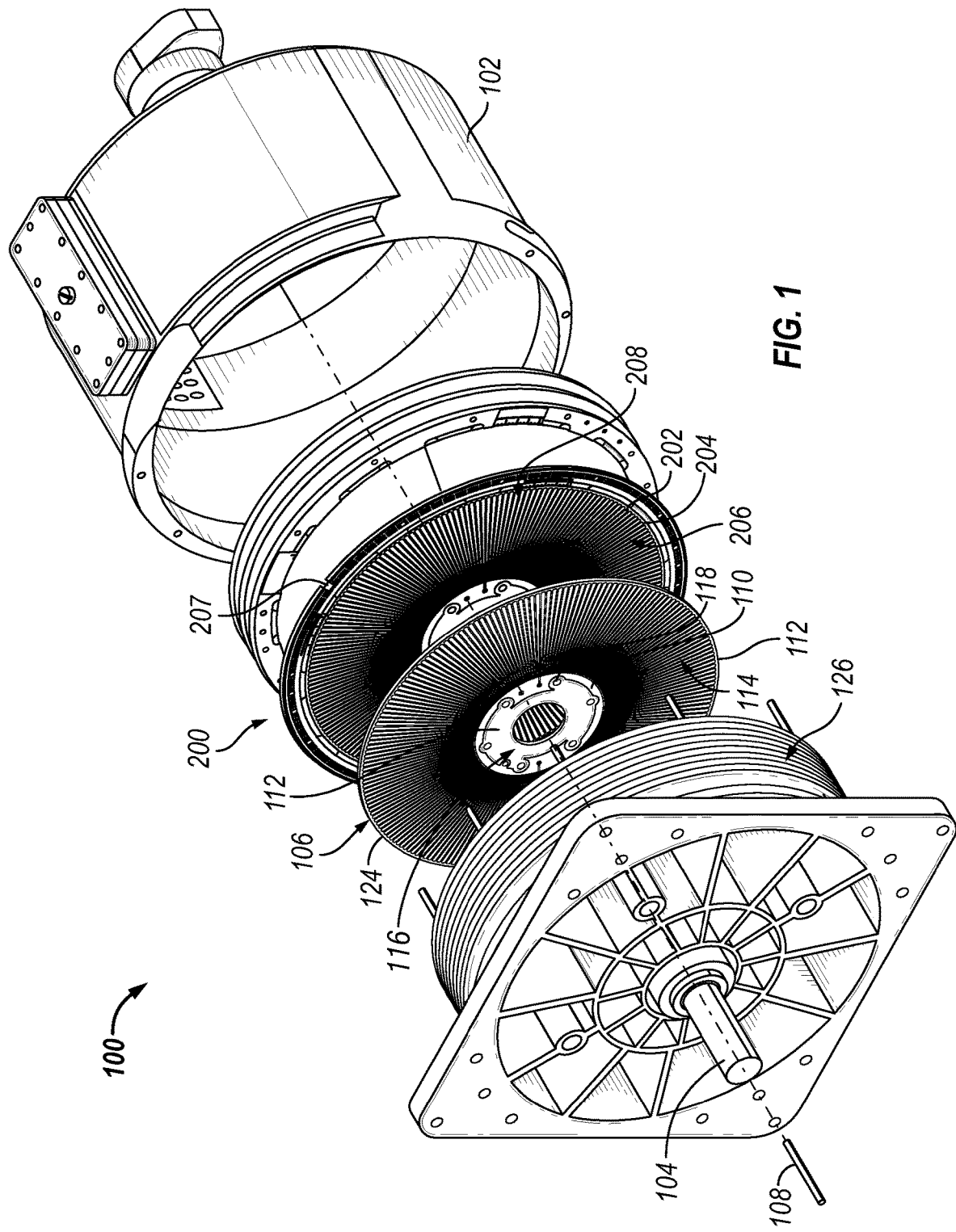
FIG. 1 is a schematic depiction of a system for an electrostatic motor.

Electrostatic machinery includes electric motors, generators and actuators that convert power between mechanical (e.g., kinetic) and electrical forms using electric field torque mechanisms. Electrostatic machines may be divided into six categories: electrostatic induction machines, variable capacitance/elastance machines, synchronous electrostatic machines, direct current (DC) electrostatic machines, electrostatic hysteresis synchronous machines, and corona machines. In some instances, a particular machine may fall into one or more of the categories. Such categories are not exclusive, and additional categories may exist. The use of such categories is used for explanatory purposes only, and is not meant to be limiting. Examples of electrostatic machines may be found in U.S. Pat. No. 9,866,148, which is incorporated by reference herein in its entirety for all purposes.

In general, electrostatic machines use capacitive principles (as opposed to the magnetostatic or quasi-magnetostatic principles used in electromagnetic induction, permanent magnet, wound field, reluctance, and other machines). In some embodiments, electrostatic machines can use circular plates located in close proximity to one another to create a capacitance between the plates. In some embodiments, the plates can alternate between rotor plates and stator plates, for example increasing the available torque and/or power density of the electrostatic machine (ESM). Rotor plates can be plates that rotate with a shaft of the motor, generator, and/or actuator and can be analogous to an armature of an induction, wound field, or reluctance motor. Stator plates can remain stationary with respect to a housing or enclosure of the motor and/or generator.

An illustrative ESM includes a rotor electrode and a stator electrode. The rotor electrode and the stator electrode are separated by a gap and form a capacitor. The rotor electrode is configured to move with respect to the stator electrode. The electrostatic machine further includes a housing configured to enclose the rotor electrode and the stator electrode. The stator electrode is fixed to the housing. An example ESM includes a fluid filling a void defined by the housing and between the rotor electrode and the stator electrode. The "gap", as referenced herein, should be understood broadly, where the gap may reference a minimum distance between electrodes, a maximum distance between electrodes, a distance defined according to an electrical characteristic, a distance defined according to the geometric characteristic, a mechanical gap between electrodes, or the like. The gap varies in magnitude, orientation, and/or geometry during operations of the ESM, due to rotation of the rotor stack, axial movement of the capacitive stack elements, variations of the applied electric field (and/or excitation), and changes to the fluid characteristics, and further varies in different ways between electrodes of the various components of the capacitive stack (e.g., stator electrodes of an end stator plate have a different variation environment than stator electrodes of a stator plate in the middle of the stator stack). The gap is referenced herein for purposes of illustration, and to demonstrate some of the principles of operation and design, but the description herein is not limiting to any particular conceptualization of the gap and/or any particular operating principle. The structures, operations, configurations, components, and the like as set forth herein may be configured as described for any reason, without limitation to the illustrative concepts set forth herein.

In general, energy storage systems (e.g., capacitors) can naturally store energy based on the arrangement of surfaces and electric potential between them. In the case of variable capacitance machines (and other electrostatic machines), surfaces affixed to a shaft (e.g., rotor plates) can form a capacitance with surfaces affixed to a housing (e.g., stator plates). When voltage is applied to the stator plates and/or rotor plates, the resulting electric field in the gap between them develops shear stress between the rotor plates and the stator plates and can exert a rotational force (e.g., torque) on the surfaces of the rotor plates and the stator plates. The electric field can also exert an attractive force on the surfaces of the rotor plates and the stator plates in a direction normal to the surfaces of the plates (e.g., toward one another, in an axial direction along the shaft). The attractive force can cause the rotor and stator plates to bend or otherwise collapse toward one another, particularly near the unsupported ends of the rotor plates and the stator plates (e.g., near an outer perimeter of the rotor plates away from the shaft and near an inner perimeter of the stator plates away from a location where the stator plates are secured to the housing). In certain embodiments, plates may additionally be loaded asymmetrically, for example terminating plates of a capacitive stack which may have electrodes on only one side, and/or electrodes that face an opposing plate on only one side, resulting in asymmetrical axial loading of the terminating plates during operations of the ESM. In certain embodiments, the terminating plates of the capacitive stack 702 may be axially secured (e.g., on the shaft, and/or to the housing), where other plates of the capacitive stack may be axially secured or have an axial degree of freedom.

The variation in the spacing between rotor plates and the stator plates, alters the capacitance and can impact the performance (e.g., electrical, mechanical, and/or torque generating) of the ESM. The attractive force can also cause the rotor plates and the stator plates to contact one another, resulting in a reduction in performance and, in extreme cases, damage to the plates and potentially other components of the electrostatic machine. The available energy storage, which determines available torque and other performance characteristics of the ESM, correlates with the capacitance of the stator/rotor electrode system, and a decreased gap distance between the stator electrode and the rotor electrode increases the capacitance. Accordingly, embodiments herein include aspects configured to allow for a small gap between the electrodes, without allowing the electrodes to touch.

In some cases, a machine producing high levels of torque (e.g., 1 N-m or greater) is desired for use in a variety of products and systems. It is commonly desired also for such a machine to have low capital and operating costs, low volume, low mass, and high performance. Therefore, a suitable machine may have high torque, low losses, and require minimal auxiliary systems such as cooling or clutches. Some electrostatic machines can produce a large electric field across a pair of electrodes (e.g., stator plates and rotor plates) to generate sufficient torque for practical applications. Air has a low breakdown voltage (e.g., is prone to arcing). Thus, in some embodiments, a high permittivity fluid, an electrode separation fluid (e.g., providing electrical separation between electrodes), and/or a dielectric fluid, can be located between the electrodes (e.g., stator plates and rotor plates) and a high electric field can be maintained without arcing between the electrodes. The available energy storage, which determines available torque and other performance characteristics of the ESM, also correlates with the field strength between the electrodes. A field strength, as utilized herein, may indicate a field strength determined based on a stator voltage and a rotor voltage, defining the field inside the gap. In another example, a field strength may indicate a rotor field (V/m) resulting from rotor voltage and geometry of the plates of a capacitive stack, a stator field resulting from stator voltage and the geometry of the plates, and a gap field resulting from the rotor and stator fields within the gap.

A combination of a high electric field and a minimally sized gap can lead to arcing between the electrodes, including at certain operating conditions (e.g., when a gap distance is momentarily reduced during axial flexing of the rotor and/or stator plates). Additionally, variability in the system, such as the presence of entrained and/or dissolved gases in the fluid, including gases generated from electrical and/or chemical activity during operations of the ESM, can reduce the effective permittivity of the fluid positioned within the gap (including the local fluid environment relative to the bulk fluid in a housing of the ESM). Further, the available torque of an ESM is related to the exposed electrode area forming the capacitive elements, and accordingly the performance of the ESM can be improved using a stack of alternating rotor and stator plates. The utilization of a stack of plates introduces challenges, as plates flex axially, causing capacitance variations to dynamically ripple through the stack, and/or causing a more complex mechanical separation environment between plates. Additionally or alternatively, the stack of plates provides a challenge with tolerance stack-ups between the plates of the capacitive stack.

The present description recites an illustrative arrangement with rotor plates that are rotationally fixed to a shaft, having a number of electrodes thereon that form a capacitive stack through interaction with alternating stator electrodes. The stator electrodes are on stator plates that are rotationally fixed to a housing, and are positioned alternately with the rotor plates. In certain embodiments, the stator electrodes are excited using an AC input, for example using a current source inverter (CSI), and/or further utilizing a voltage regulator. Any type of inverter to provide an AC input is contemplated herein, such as a voltage source inverter, and any type of inverter may include regulating components and/or control operations to provide the desired voltage profile on the stator electrodes during operations. In certain embodiments, the rotor electrodes are excited using a DC input, for example using a voltage source, field supply, and/or current source with voltage control. The described aspects are provided for clarity of the present description, but the illustrative arrangement set forth is not limiting to the present disclosure. Without limitation to any other aspect of the present disclosure, certain variances to the illustrative arrangement are set forth herein, where a given embodiment may include one or more of the variances. The described variances, as well as any other variances understood by one of skill in the art having the benefit of the present disclosure, are specifically contemplated herein.

An example variance includes providing the capacitive stack in a varying configuration, for example: in a first arrangement R-S-R-S-R-S (e.g., alternating, with a terminating rotor plate at one end of a capacitive stack and a terminating stator plate at the other end of the capacitive stack); in a second arrangement S-R-S-R-S (e.g., alternating, with a stator plate terminating each end of the capacitive stack); a third arrangement R-S-R-S-R-S-R (e.g., alternating, with a rotor plate terminating each end of the capacitive stack); a fourth arrangement R-S-S-R-R-S-S-R-R-S (e.g., pairs of each type of plate, with a terminating rotor plate at one end of the capacitive stack and a terminating stator plate at the other end of the capacitive stack); a fifth arrangement R-S-S-R-S-S-R-S-S-R-S (e.g., pairs of stator plates alternated with a single rotor plate, for example where electrodes are provided on both sides of rotor plates but only on a single side of the stator plates); and/or combinations of these. The available stored energy of the ESM, and accordingly the available torque output and/or power output, is related to the exposed surface areas of the rotor electrodes and stator electrodes. Accordingly, an alternating arrangement such as R-S-R-S-R-S, with each rotor plate and stator plate having electrodes on both sides (except, possibly, the terminating rotor plate(s) and/or stator plate(s)) maximizes the exposed electrode area within a given housing volume of the ESM, and thus maximizes the torque density and/or power density for a given arrangement (if all other parameters, such as applied voltages, gap distances, etc., are equal). However, other arrangements may be desirable in certain embodiments, for example manufacturing, assembly, electrical coupling within the ESM, and/or part uniformity considerations may make it desirable to include electrodes on only a single side of the rotor plate(s) and/or stator plate(s). In certain embodiments, electrical coupling of the rotor stack and/or stator stack to an excitation circuit may make it desirable to include a terminating plate of each type (e.g., a rotor plate terminating one end, and a stator plate terminating the other end of the capacitive stack), and/or to terminate each end of the capacitive stack with a same plate type (e.g., a rotor plate and/or a stator plate). In another example, varying power and/or torque densities and/or ratings (PTDR—or the combined concept of a power and/or torque rating and/or density, and can include concepts such as: a power rating, a torque rating, a power density, a torque density, and/or a combination of one or more of these) may provide for a variance in the capacitive stack construction, for example to provide highly distinct PTDR (e.g., to support different power and/or torque ratings) within a same housing utilizing a same number of plates by adjusting the arrangement of plates in the capacitive stack.

Another example variance includes the rotor stack (and/or stator stack, for example depending on the nomenclature utilized for the particular ESM) rotationally fixed to an outrunner, for example a rotating component within the housing that is positioned at a radially outward extent of the rotor plates. In the example, the stator stack may be rotationally fixed to the housing, for example engaging an end plate of the housing, and/or fixed to a non-rotating component such as a sleeve and/or partial sleeve of the shaft that does not rotate. In the example, depending upon the selected nomenclature of the system, an outrunner configuration may include the "stator" plates rotating relative to the housing (e.g., coupled to a sleeve, frame, or other rotating feature coupled at a radially outward position of the stator plates), with the "rotor" plates stationary and fixed to the shaft. The description utilizing a rotor plate or a stator plate is non-limiting, and depends upon whether the rotor and stator nomenclature reference physical action (e.g., rotor plates rotating, and stator plates stationary), physical arrangement (e.g., stator plates physically coupled at a radially outward position, and rotor plates coupled at a radially inward position such as the shaft), or electrical action (e.g., plates having DC excitation and/or applied field, which may be referenced as the "rotor plates" or the "stator plates", and which may be rotating or stationary, and plates having AC excitation, which may be referenced as the "stator plates" or the "rotor plates", and which may be rotating or stationary). The illustrative nomenclature herein is not limiting, and the excitation description (e.g., AC and/or DC excitation) is also illustrative. An example arrangement includes stator plates having electrodes that are excited by an AC electrical source, and which are rotationally coupled to the housing, and rotor plates having electrodes that are excited (and/or have an applied field voltage) by a DC electrical source, and which are rotationally coupled to a rotating shaft.

Another example variance includes a number of phases distributed across the rotor stack, for example where electrodes of a given rotor plate may be separated and excited with distinct phase profiles, and/or where electrodes of different rotor plates are excited with distinct phase profiles. Another example variance includes a number of phases distributed across the stator stack, for example where electrodes of a given stator plate may be separated and excited with distinct phase profiles, and/or where electrodes of different stator plates are excited with distinct phase profiles. A still further example variance includes more than one excitation component (e.g., a power supply) providing excitation for a given stack (e.g., two CSIs providing excitation for stator plates, for example to support scaling of a power requirement that may be limited by the performance of a single CSI). A still further example variance includes a controller 6200 capable to support redundancy operations, for example where electrode(s) and/or plate(s) of the capacitive stack have experienced a failure, fault value, or the like, where the controller 6200 responds to the failure or fault value by utilizing other plates of the stack to provide power/torque output, by utilizing an alternate power supply to excite selected plates, or the like.

Another example variance includes coupling of an excitation circuit to the rotor stack through a rotor power distribution board (e.g., reference FIGS. 32, 34), for example simplifying the circuit transition from the exciter (or electrical exciter) to the rotor stack, while incurring additional cost and/or footprint to accommodate the rotor power distribution board. In certain embodiments, the rotor power distribution board may be omitted, with the excitation circuit for the rotor stack directly coupling to rotor plate (e.g., a rotor plate at one end of the rotor stack, although coupling may be provided to an intermediate rotor plate, and/or to more than one rotor plate). Another example variance may include one or more additional rotor power distribution boards, for example to provide coupling to more than one excitation circuit, and/or to provide desired circuit characteristics (e.g., impedance, capacitance, dynamic response, etc.) for the rotor stack and/or excitation circuit(s) of the rotor stack.

Another example variance includes coupling of an excitation circuit to the stator stack through a stator power distribution board (e.g., reference FIG. 30), for example simplifying the circuit transition from the exciter to the stator stack, while incurring additional cost and/or footprint to accommodate the stator power distribution board. In certain embodiments, the stator power distribution board may be omitted, with the excitation circuit for the stator stack directly coupling to the stator plate (e.g., a stator plate at one end of the stator stack, although coupling may be provided to an intermediate stator plate, and/or to more than one stator plate). Another example variance may include one or more additional stator power distribution boards, for example to provide coupling to more than one excitation circuit, and/or to provide desired circuit characteristics (e.g., impedance, capacitance, dynamic response, etc.) of the stator stack and/or excitation circuit(s) of the stator stack.

It can be seen that numerous aspects of an ESM provide a coordinated challenge to make a high torque, high density, or high performance. Increased field strengths increase the axial forces between plates, impose a higher requirement for gap permittivity management, and increase the likelihood that side effects such as gas generation and/or material breakdown, will affect the integrity of the dielectric fluid in the gap. Increased plate counts of the stack create a more complex mechanical integrity, plate movement, and torque generating environment. Increased plate diameters allow for a greater capacitive area, but increase the cantilever distance of the plates, as well as adding greater electrode facing area (for rotor plates) away from the anchoring position of the plates, which combine to increase an axial flexing force to the plates. Numerous aspects of the present disclosure address these and other challenges, allowing for embodiments of an ESM having higher power/torque density, greater reliability and performance consistency, and reducing capital and/or operating costs for an ESM.

Steady state operation, as utilized herein, should be understood broadly. Without limitation to any other aspect of the present disclosure, example and non-limiting steady state operations include: operations having a target rate of change (e.g., $dT/dt$; $dP/dt$; $dS/dt$; $d\theta/dt$; where $dT$ is differential torque, $dP$ is differential power, $dS$ is differential speed, $d\theta$ is differential angular position such as a position of the shaft, rotor, and/or a rotating load component, and $dt$ is differential time) below a threshold value; operations having a target rate of change based on a distinct parameter other than time (e.g., $dX/d\theta$, where $dX$ is a differential control parameter, and where $d\theta$ is a differential angular position such as a position of the shaft, the rotor, and/or a rotating load component; and/or $dX/d\omega$, where $d\omega$ is a differential angular velocity, such as of the shaft, the rotor, and/or a rotating load component) below a threshold value; operations near a saturation limit (e.g., where response against the saturation limit may have limited dynamic capability; where operations may be considered steady state allowing for simplification of control as steady state control, and/or where operations may be considered transient, providing for more aggressive response in view of the saturation limit, such as switching an excitation mode, adjusting the field with the other one of the rotor and/or stator, etc.); and/or operations categorized as a steady state operation (e.g., according to a state parameter determined based on operating parameters of the ESM 1002, such as duty cycle tracking, filtered torque requests, etc.; and/or according to a state parameter supplied by an external controller—not shown). In certain embodiments, operational changes having a time constant that is slower than a field change time constant of the excitation circuit modulating fields on the stator and/or rotor electrodes are considered to be a steady state operation. In certain embodiments, operational changes having a time constant that is much slower (e.g., 3×, 5×, 10×, etc.) than a field change time constant is considered to be a steady state operation. It will be understood that the field change time constant may be distinct values for each circuit (e.g., rotor versus stator; and/or for separate phases and/or otherwise separately excited circuits), and/or may change depending upon the operating condition of the ESM 1002 (e.g., rotational speed, voltage on the circuit, relative phase positions of the rotor(s) vs. stator(s), temperature of the dielectric fluid, etc.). One of skill in the art, having the benefit of the present disclosure, and information ordinarily available when considering a system having an ESM 1002, can readily determine whether operations of the system are considered to be steady state operations.

Transient operations, as utilized herein, should be understood broadly. Without limitation to any other aspect of the present disclosure, example and non-limiting steady state operations include: operations having a target rate of change (e.g., $dT/dt$; $dP/dt$; $dS/dt$; $d\theta/dt$; where $dT$ is differential torque, $dP$ is differential power, $dS$ is differential speed, $d\theta$ is differential angular position such as a position of the shaft, rotor, and/or a rotating load component, and $dt$ is differential time) above a threshold value; operations having a target rate of change based on a distinct parameter other than time (e.g., $dX/d\theta$, where $dX$ is a differential control parameter, and where $d\theta$ is a differential angular position such as a position of the shaft, the rotor, and/or a rotating load component; and/or $dX/d\omega$, where $d\omega$ is a differential angular velocity, such as of the shaft, the rotor, and/or a rotating load component) above a threshold value; operations near a saturation limit (e.g., where response against the saturation limit may have limited dynamic capability; where operations may be considered steady state allowing for simplification of control as steady state control, and/or where operations may be considered transient, providing for more aggressive response in view of the saturation limit, such as switching an excitation mode, adjusting the field with the other one of the rotor and/or stator, etc.); and/or operations categorized as a transient operation (e.g., according to a state parameter determined based on operating parameters of the ESM 1002, such as duty cycle tracking, filtered torque requests, etc.; and/or according to a state parameter supplied by an external controller—not shown). In certain embodiments, operational changes having a time constant that is faster than a field change time constant of the excitation circuit modulating fields on the stator and/or rotor electrodes are considered to be a transient operation. In certain embodiments, operational changes having a time constant that is similar to or even slower than a field change time constant (e.g., where F<3*T, F<5*T, F<10*T, etc., where F is the field change time constant, and where T is the operational change time constant) is considered to be a transient operation. It will be understood that the field change time constant may be distinct values for each circuit (e.g., rotor versus stator; and/or for separate phases and/or otherwise separately excited circuits), and/or may change depending upon the operating condition of the ESM 1002 (e.g., rotational speed, voltage on the circuit, relative phase positions of the rotor(s) vs. stator(s), temperature of the dielectric fluid, etc.). One of skill in the art, having the benefit of the present disclosure, and information ordinarily available when considering a system having an ESM 1002, can readily determine whether operations of the system are considered to be transient operations.

It can be seen that separate control schemes may be utilized for steady state operation (e.g., targeting efficiency, component life, etc.) versus transient operation (e.g., targeting dynamic response time, reduction of offset operation, correction of torque ripple in another component, etc.). In certain embodiments, control operations may be inherent to develop the desired behavior (e.g., torque response, speed, field strength, frequency components of these, etc.) for transient and/or dynamic response versus steady state and/or slow changing response without an explicit determination of whether operations are performed as steady state or transient operations. Additionally or alternatively, transient and/or steady state response characteristics may utilize stabilizing control features such as: mixing control schemes (e.g., interpolating between transient control schemes and steady state schemes); have responses smoothed during transitions (e.g., from a steady state scheme to a transient scheme, such as by filtering target values and/or excitation command values, utilizing a slew limit to target values and/or excitation command values, using a sliding weighted average between control schemes during transitions, etc.); have an applied hysteresis to transitions (e.g., to prevent or reduce dithering between control schemes); and/or have an applied deadband to transitions (e.g., smoothing, filtering, and/or applying a hysteresis for target values, excitation command values, or other system parameters that change direction, such as switching from increasing to decreasing, switching from a positive to negative, etc.). In certain embodiments, stabilizing control features, including without limitation any stabilizing control features described in relation to transient and/or steady state response characteristics, may be applied to any control parameter, including without limitation parameters such as: any target value (e.g., torque, voltage, charge, speed, etc.); any control gain change (e.g., a proportional, integral, and/or derivative gain); any feedback value (e.g., a voltage value, a field value, a charge value, a speed value, a torque value, etc.); any reset and/or limitation with regard to a control operation (e.g., an integrator reset and/or saturation value) and/or a command (e.g., an excitation command value 6216, field strength value 6908, voltage command value 7308, and/or charge command value 7906); and/or a discrete control scheme (e.g., switching between PWM mode 11502 and a discrete stepped mode 11504, etc.).

Certain considerations for determining operating conditions that are steady state operations (and/or transient operations) include: excitation circuit parameters (e.g., impedance and/or capacitance of the rotor and/or stator excitation circuits); excitation component performance values (e.g., current source inverter, voltage source, voltage regulation, etc.); system responsiveness characteristics (e.g., expected duty cycle, rate of load changes, rate of requested torque and/or power changes, expected performance of the ESM 1002 against these, etc.); the availability of efficiency gains and/or loss management for the ESM 1002 configuration through field management (e.g., the available back mmf loss management for the particular ESM 1002 through transient power management in the expected power/torque output regimes for the system); the sensitivity of capital costs versus operational costs (e.g., cost of a higher capability CSI, voltage source, etc.; cost of an improved excitation circuit—e.g. having an improved impedance/capacitance profile, and/or an adjustable impedance/capacitance profile; versus the efficiency savings available with those higher capability components) for the given system, application, and/or operator; the sensitivity of capital costs versus operational capability (e.g., the costs as before, compared to performance enhancement available with higher capability components) for the given system, application, and/or operator; and/or the availability of computing resources (e.g., processor cycles; memory storage for algorithms, supporting data such as look-up tables, operating diagrams 6700, etc., and/or intermediate memory storage used in determining steady state/transient operation and/or supporting control schemes, calculated values, buffered values, etc.; support for the cost of computing resources and development to implement steady state/transient control operations; and/or available space, weight, integration resources, etc. to support computing resources), including the costs of increasing computing resources, the benefits of using an existing computing resource set, etc., for the given system and/or application having the ESM 1002. The examples described herein are non-limiting illustrative examples to demonstrate aspects of the present disclosure. The utilization of steady state and transient terminology to reference control operations is provided for clarity of the present description, and operations set forth herein may be performed for any reason, and may utilize any terminology or no terminology to describe distinct control scheme operations.

Embodiments of the present disclosure relate generally to methods and devices for maintaining separation between the rotor plates and the stator plates of electrostatic machines. In particular, embodiments described herein relate generally to a separation assembly configured to prevent the rotor plates and the stator plates from moving toward one another (e.g., collapsing the gap), both near the unsupported radial ends of the rotor plates and the stator plates and in between the radial ends of the rotor and stator plates to protect against plate deflection during shock and vibration. In some embodiments, the separation assembly may be disposed at least partially within the gap between the rotor plates and the stator plates and engage adjacent surfaces of the rotor plates and the stator plates. For example, the separation assembly may include rolling elements configured to facilitate relative rotation between the rotor plates and the stator plates by rolling and/or sliding along grooves formed into opposing surfaces of the rotor plates and/or the stator plates. In other embodiments, the separation assembly may include a ball bearing assembly that is fixed to one of the rotor plate and the stator plate. In other embodiments, the separation assembly may include non-rolling element bearing types. For example, the separation assembly may include bumpers, thrust washers, or another mechanical separator. In another example, the separation assembly may include magnets (e.g., permanent magnets, electromagnets, electrets, etc.) fixed to the rotor plates and/or stator plates and configured to apply a force that opposes the attractive force between plates, and/or to apply a force that enforces a minimum separation distance of the gap between the rotor electrodes and the stator electrodes. In yet other embodiments, the separation assembly includes a hydrostatic bearing configured to maintain separation between the rotor plates and the stator plates via the application of fluid pressure between the rotor plates and the stator plates.

Referring to FIG. 1, an exploded view of a motor 100 of an electrostatic machine (ESM) is shown, according to an illustrative embodiment. The motor 100 includes a housing 102 and/or frame, a shaft 104, a rotor plate assembly 106, and a stator plate assembly 200. The housing 102 defines an enclosed volume (e.g., space, cavity, etc.) sized to receive the shaft 104, the rotor plate assembly 106, and the stator plate assembly 200 at least partially therein. In certain embodiments, multiple stator plates are included as a stator stack, and multiple rotor plates are included as a rotor stack. An example arrangement includes alternating rotor and stator plates, maximizing exposed surface area between rotor electrodes and stator electrodes. The combined rotor stack and stator stack may be referenced together as a capacitive stack 702 (e.g., reference FIG. 7).

The shaft 104 is rotatably coupled to the housing 102 at opposing ends of the shaft 104. As shown in FIG. 1, the motor 100 includes a plurality of rotor plate assemblies 106 and stator plate assemblies 200 that are stacked on top of one another in alternating arrangement in an axial direction 108 along the length of the shaft 104. The rotor plate assemblies 106 are "sandwiched" or otherwise disposed between adjacent ones of the stator plate assemblies 200. In some embodiments, the number of rotor plate assemblies 106 and stator plate assemblies 200 may be different. The number of rotor plate assemblies 106 and corresponding stator plate assemblies 200 can determine, at least in part, the amount of torque and/or power produced by the motor 100.

The description herein references directional terms, such as axial, radial, and azimuthal, for clarity of the present description. As used herein, axial references a direction aligned, at least generally, down the length of the shaft 104. As used herein, radial references a direction perpendicular to the shaft 104, for example from an inner portion of a plate toward an outer edge of the plate. As used herein, an azimuthal direction (or a circumferential direction) references an angular position around a plate, for example parallel to a rotational direction of the shaft 104. The directional terms utilized herein are provided for clarity of referencing components, movement, and the like, relative to the motor 100, and are not limiting to the description, and do not imply a particular arrangement of the motor 100 and/or components thereof.

As shown in FIG. 1, each rotor plate assembly 106 includes a rotor plate 110 and a plurality of rotor electrodes 112 disposed on stator facing surfaces 114 (e.g., opposing surfaces) of the rotor plate 110. The rotor plate 110 is shaped as a cylindrical disk. The rotor plate 110 includes a shaft opening 116 disposed at a central position along the rotor plate 110 and sized to receive the shaft 104 therein. The rotor plate 110 additionally includes a plurality of hub mounting openings 118 disposed proximate to the shaft opening 116. The hub mounting openings 118 are configured to rotatably couple (e.g., rotationally fix) the rotor plate 110 to the shaft 104 (e.g., to a shaft coupling, engaging a spline of the shaft, etc.). An example coupling arrangement between each rotor plate 110 and the shaft 104 includes ridges on each rotor plate 110 that engages a splined outer surface of the shaft 104, allowing for axial movement along the shaft 104 of the rotor plates 110 during assembly and operation of the motor. In certain embodiments, the axial freedom of movement for the rotor plates 110 and/or stator plates 202 provides for convenient assembly of the capacitive stack 702, for example allowing one end plate of the housing to be placed in a convenient position (e.g., with the shaft extending vertically upward, horizontally, or an intermediate position), the plates 110, 202 to be arranged over the shaft 104 to form the capacitive stack 702, and the housing to be placed over the capacitive stack 702, completing the assembly of the housing and capacitive stack 702. In certain embodiments, one or both terminating plates of the capacitive stack (e.g., stator plates 202) may be fixed to the housing and/or end plate of the housing, allowing for the other plates to be arranged over the shaft 104, where the placement of the housing over the capacitive stack 702 thereby positions the final terminating plate, completing the capacitive stack 702.

Any coupling arrangement to rotationally secure the rotor plates 110 to the shaft 104 is contemplated herein. An example embodiment includes rotor plates 110 having rotor electrodes 112 positioned on both sides, and stator plates 202 having stator electrodes 204 positioned on both sides. It can be seen that a terminating plate may have only one gap surface (e.g., a terminating stator plate 202 that faces a rotor plate 110 on a first side, but faces the housing 102 and/or a power distribution board on a second side). The terminating plates may be a stator plate 202 at each end (e.g., 5 stator plates alternating with 4 rotor plates 110), a rotor plate 110 at each end (e.g., 10 rotor plates 110 alternating with 9 stator plates 202), and/or a mix (e.g., a rotor plate 110 terminating one end of the capacitor stack, and a stator plate 202 terminating the other end of the capacitor stack). A terminating plate may have electrodes on both sides (e.g., to support part consistency and/or simplification of assembly), and/or only have electrodes on an active gap facing side (e.g., reducing material costs, simplification of interfaces with a power distribution board, etc.).

As shown in FIG. 1, the rotor electrodes 112 are electrical traces that are deposited or otherwise formed onto the stator facing surfaces 114 of the rotor plate 110 (e.g., surfaces of the rotor plate 110 that face toward the stator plate assembly 200, opposing surfaces of the rotor plate 110, etc.). The electrical traces may be arranged in strips that extend in a substantially radial direction from an inner perimeter edge 122 of the rotor plate 110 toward an outer perimeter edge 124 of the rotor plate 110. The electrical traces are spaced apart from one another along a circumferential direction at approximately equal intervals about the inner and outer perimeter of the rotor plate 110 to form an alternating arrangement of conducting sections and insulating sections. In other embodiments, the shape, arrangement, and/or number of rotor electrodes 112 may be different.

Similar to the rotor plate assemblies 106, each stator plate assembly 200 includes a stator plate 202 and a plurality of stator electrodes 204 disposed on rotor facing surfaces 206 (e.g., surfaces of the stator plate 202 that face toward the rotor plate assembly 106, opposing surfaces of the stator plate 202, etc.) of the stator plate 202. The stator plate 202 is shaped as a cylindrical disk spaced apart from the rotor plate 110 and arranged in substantially parallel orientation relative to the rotor plate 110. It will be understood that the stator plates 202 do not need to have a circular shape, as the stator plates 202 do not rotate. The stator plates 202 have electrodes configured to interact with the rotor electrodes, which may include the stator electrodes forming a circular cross-sectioned shape on the stator plate 202. It can be seen that certain considerations, such as ease of manufacture, assembly, and/or standardization of stator plate 202 components, the stator plates 202 may be circular, substantially circular, and/or having an outer edge shape matching the housing 102 (e.g., around at least a portion of the outer edge). An example motor 100 includes the stator plates 202 having ridges, tabs, mounting openings 207, holes, and/or cutouts that engage the housing 102 and/or an end wall coupled to the housing to secure the stator plates 202, and which may additionally provide an axial degree of freedom for movement of the stator plates 202 within the housing 102.

The separation between the stator plate 202 and the rotor plate 110 defines a gap, as will be further described. The size (e.g., width) of the gap between the stator plate 202 and the rotor plate 110, in a direction normal to opposing surfaces of the stator plate 202 and the rotor plate 110 (e.g., axially), is a part of determining the torque generated by the motor 100. In the motor 100 of FIG. 1, the size of the gap is less than approximately 3 centimeters, or less than approximately 1 centimeter in other embodiments. In other embodiments, the size of the gap may be different. In certain embodiments, gap sizes of less than 5 mm, less than 3 mm, between 0.5 mm and 3 mm, between 0.1 mm and 10 mm, and/or less than 1 mm. Aspects throughout the present disclosure allow for the provision of a small gap, even in view of axial flexing of rotor and/or stator plates during operation, as disclosed throughout the present disclosure.

An example system includes the coupled bearing sized to maintain a minimum separation distance between the rotor plate and the stator plate. In certain embodiments, sizing of the minimum separation distance, the radial extent of the electrodes (e.g., the inner radial extent to outer radial extent of electrodes positioned on the stator plates and/or rotor plates), the number of electrodes positioned on each plate, and/or the position of rolling elements, races, and/or other active separation enforcement devices (e.g., mechanical projections, bumpers, and/or magnetic separation devices) are determined according to example design parameters set forth following. In certain embodiments, the sizes and ratios described herein may be sized according to requirements of the ESM (e.g., torque rating, power rating, etc.).

An example system includes selecting the minimum separation distance (G), the number of electrodes on each plate (or "poles", P), and the radial extent of the electrodes (e.g., a distance R that the electrodes progress in the radial direction), is determined according to a design relationship such as: $0 < R/(P*G) \leq 5$. For example and without limitation, a separation distance (G) of 1 mm, and 25 poles (electrodes, P) on each plate, would provide for a range of radial extent (R) that is up to 125 mm (e.g., 125 mm from a radially innermost position to a radially outermost position). The radial extent of the electrodes may be an outer plate radius (e.g., a distance from an outer plate edge to a beginning of the electrodes), and/or an inner plate radius (e.g., a distance from the outer plate edge to the innermost extent of the electrodes), where the value $R/P*G$ is provided within selected bounds for either the outer plate radius, the inner plate radius, or both.

Where the separating assembly includes a feature positioned in the gap (e.g., a coupled bearing, rolling element, mechanical extension or bumper, etc.), the separation feature would typically (e.g., unless electrodes were to be divided into more than one radial portion, and/or where the separation feature traverses over the electrodes, for example with electrodes embedded within a glass substrate, but such an arrangement may nevertheless be undesirable due to potential disruption of the field) be positioned radially inside the electrode radial span, and/or positioned radially outside the electrode radial span. Accordingly, in certain embodiments, the R parameter may be utilized to determine a position of separation features of the ESM, and/or the position of the separation features may be utilized in lieu of the radial extent of the electrodes. The example design relationship is non-limiting. It will be seen that higher values of the $R/(P*G)$ parameter may tend to provide a stronger field (e.g., a smaller gap and/or greater radial extent may tend to increase the capacitive field strength), although other parameters such as the dielectric strength of the fluid, electrical characteristic of the exciter circuit, may degrade the ability to fully achieve an ideal field strength, and/or manufacturing and/or control constraints may limit the ability to properly operate an ESM having extreme values of the $R/(P*G)$ parameter. In certain embodiments, an example design relationship such as $0.1 \leq R/(P*G) \leq 3$, $0.5 \leq R/(P*G) \leq 1.5$, $0.3 \leq R/(P*G) \leq 6$; $1.5 \leq R/(P*G) \leq 5$, $0.01 \leq R/(P*G) \leq 8$ may be for an ESM. In certain embodiments, sizing of the parameters of the capacitive stack may be based on other parameters, and not utilize a design relationship such as depicted.

The stator plate 202 is configured to be fixed to the housing 102. An example arrangement includes the stator plates 202 having a plurality of stator mounting openings 207 sized to receive support pegs 126 (and/or fins, spline elements, or the like) that are fixed to the housing 102 (e.g., to an end wall of the housing 102 as shown in FIG. 1, and/or which may be formed as a part of the housing). In certain embodiments, support pegs 126 and/or other aspects of the housing and/or shaft coupling for stator plates 102 and/or rotor plates 110 may additionally enforce arrangement of the plates—for example ensuring that the plates have a proper radial alignment and/or orientation (e.g., which axial face of a plate faces which end of a housing of the ESM). The arrangement of the stator electrodes 204 along the stator plate 202 is similar to the arrangement of rotor electrodes 112 along the rotor plate 110. In other embodiments, the shape, arrangement, and/or number of stator electrodes 204 may be different. The example arrangement of FIG. 1 provides for ready assembly of an ESM 100, for example by building the capacitor stack 702 onto the shaft 104 and/or end wall of the housing 102, and then placing the housing 102 over the capacitor stack 702.

In operation, the rotor plate assemblies 106 rotate relative to the stator plate assemblies 200 about a central axis 108 of the shaft 104 (e.g., in a clockwise or counterclockwise direction). A capacitance is formed between the stator electrodes 204 and the rotor electrodes 112. The stator electrodes 204 can be negatively charged and the rotor electrodes 112 can be positively charged. In other embodiments, the stator electrodes 204 can be positively charged and the rotor electrodes 112 can be negatively charged. In yet other embodiments, a DC voltage is applied to the rotor electrodes 112 and an AC voltage is applied to the stator electrodes 204 (i.e., alternating polarity). In yet other embodiments, the stator electrodes 204 and the rotor electrodes 112 can alternate polarities over time. In certain embodiments, at least one of the stator electrodes 204 and/or the rotor electrodes 112 can utilize polyphase voltages.

As shown in FIG. 1, the stator plate assembly 200 additionally includes a plurality of separation assemblies 208 configured to maintain separation between the rotor plate 110 and the stator plate 202 during motor operation (e.g., to prevent the gap between the rotor plate 110 and the stator plate 202 from collapsing in the presence of a bias voltage between the rotor electrodes 112 and the stator electrodes 204). The separation assemblies 208, and/or other separation enforcement aspects herein, may be associated with the stator plates 202, rotor plates 110, and/or a combination of both. Certain advantages in utilizing the stator plates 202 include: reduction of rotating inertia by including mass carrying elements of the separation assemblies 208 on the stator plates 202, reduction of balancing requirements by including mass carrying elements of the separation assemblies 208 on the stator plates 202 (e.g., reducing a symmetry requirement for separation features such as bearings and/or rotating elements), balancing forces exerted on plates by sharing elements of separation assemblies 208 between the rotor and/or stator plates, and/or simplifying manufacturing processes, reducing part counts, and/or simplifying assembly, for example by keeping each rotor plate 110 consistent and similar, and/or by keeping each stator plate 202 consistent and similar.

Figure 2:
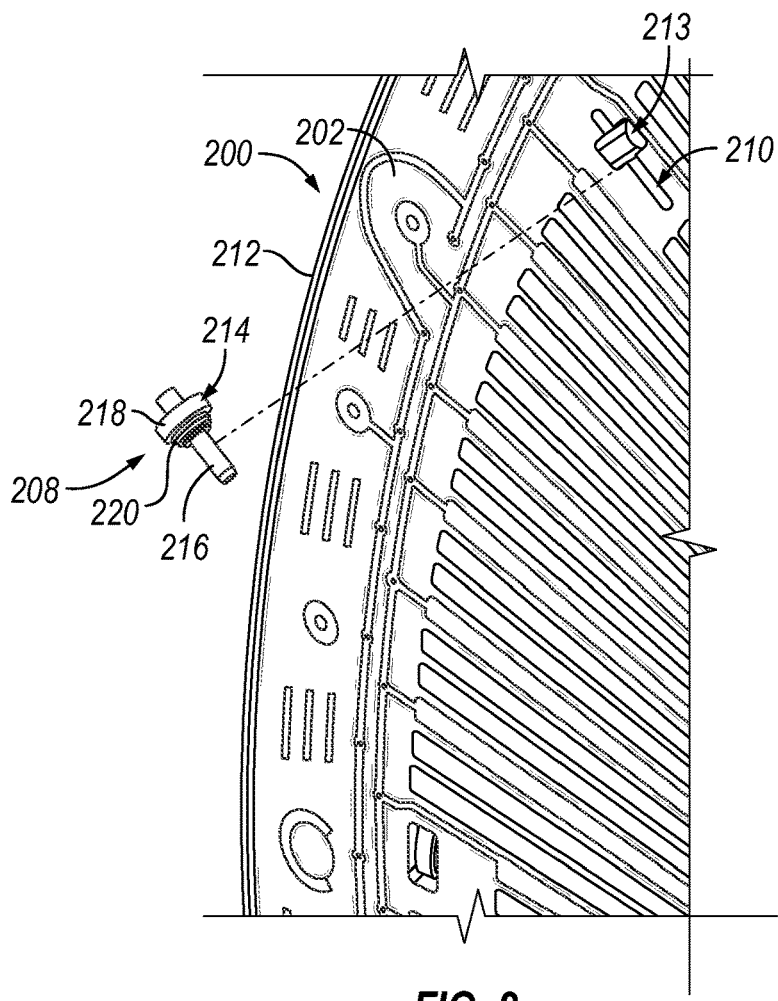
FIG. 2 is a schematic depiction of a system for an electrostatic motor.

Referencing FIG. 2, an exploded view of a portion of an example stator plate assembly 200 is depicted. The stator plate 202 defines a plurality of recessed areas 210 sized to at least partially receive a respective one of the separation assemblies 208 therein. The plurality of recessed areas 210 are disposed on distributed sides of the stator plate 202 (in the example) along an azimuthal direction, such that the separation assemblies 208 maintain the separation between the stator plate 202 and the rotor plate 110 on the rotor facing surfaces 206 of the stator plate 202 (see also FIG. 1).

Figure 3:
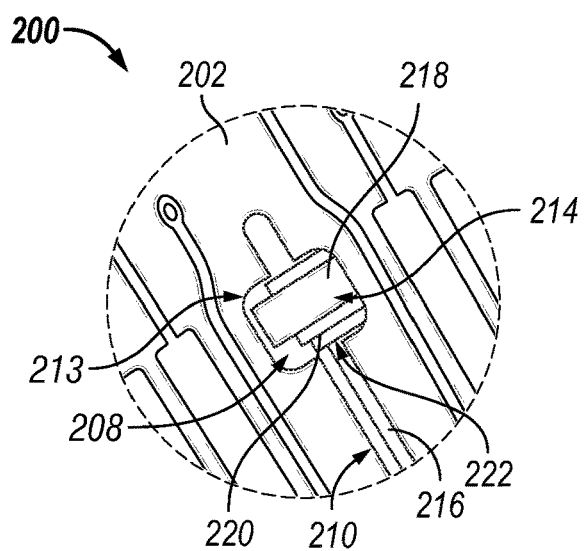
FIG. 3 is a schematic depiction of a system for an electrostatic motor.

Referencing FIG. 3, the example recessed areas 210 are disposed proximate to an outer perimeter 212 of the stator plate 202, at a location near an unsupported outer end of the stator plate 202 (adjacent an outer radial end of the stator electrodes 204 along the stator plate 202, etc.), but within a matching outer perimeter of an adjacent rotor plate 110, allowing the separation assembly 208 to engage the rotor plate 110 at a selected feature (e.g., along a track configured to engage a rolling element 214 of the separation assembly 208). In other embodiments, the separation assemblies 208 may be disposed at other radial locations along the stator plate 202 (e.g., near an inner perimeter of the stator plate 202 and/or between the inner perimeter and the outer perimeter). Example separation assemblies 208 are spaced at approximately equal intervals along the circumference of the stator plate 202. The radial positioning and/or azimuthal distribution of separator assemblies are provided according to expected axial forces experienced by the rotor plate 110 and/or stator plate 202, and the lever arm of the plates relative to secured locations (e.g., at the shaft 104 or inner perimeter for rotor plates 110, and housing 102 or outer perimeter for stator plates 202).

In the example of FIG. 3, each of the recessed areas 210 is shaped as an elongated groove that extends in a substantially radial direction. In other embodiments, the shape and/or direction of each of the recessed areas 210 may be different. The stator plate 202 additionally defines a plurality of passages 213 extending through the stator plate 202. Each of the passages 213 passes through a respective one of the recessed areas 210 in between opposing ends of the recessed area 210. The passages 213 allow fluid to pass through the stator plate 202 and at least a portion of the separation assembly 208, which, advantageously, provides cooling to the separation assembly 208 during operation. Additionally or alternatively, the passages 213 allow a single separation assembly 208 to perform separating operations for both adjacent plates—for example, a single separation assembly 208 may be capable to engage (at least during certain operating conditions) either rotor plate 110 on each side of a stator plate 202, and/or engage either stator plate 202 (at least during certain operating conditions) on each side of a rotor plate 110. In certain embodiments, for example where a single separation assembly 208 is configured to engage both adjacent plates, additional features such as two separate rolling elements included in the single separation assembly 208 (e.g., one for each side, to ensure proper rotational engagement with each of the adjacent plates), and/or distinct engagement configurations (e.g., the rolling element is configured to rotationally engage an adjacent plate on a first side, and to slidingly engage an adjacent plate on the second side (e.g., using a race having a low friction material surface, such as polytetrafluoroethylene).

In certain embodiments, a separation assembly 208 is positioned on a single side of a plate, and engages a single adjacent plate on that side of the plate having the separation assembly 208 mounted thereon. Example considerations for determining how the separation assemblies 208 are sized, mounted, and/or positioned include: sizing and/or positioning of separator assembly elements (e.g., rolling elements, retaining elements, and/or engaging elements on an adjacent rotor and/or stator plate); rotational speed ranges and/or duty cycle of the rotor plate(s) 110; assembly considerations for the ESM (e.g., whether all corresponding plates are identical, whether plate orientation is a consideration, and/or whether terminating plates are distinct in configuration, separation mechanisms, etc.); an enforced separation distance between adjacent plates; axial forces exerted on the plate, including a radial and/or azimuthal profile of such forces, and a dynamic (e.g., time progression of forces, and/or a frequency component of such forces) and/or static description of these; and/or a thickness of the stator plate assembly 200 and/or rotor plate assembly 106.

In other embodiments, the shape, number, and arrangement of the recessed areas 210 and the passages 213 may be different. While the embodiment of FIG. 3 includes passages 213 for each of the recessed areas 210, it will be appreciated that the present disclosure also contemplates embodiments in which the recessed areas 210 do not include passages 213.

In the example of FIGS. 2-3, the separation assembly 208 includes a bearing assembly 214 and a retainer 216. The bearing assembly 214 may be similar to a typical ball/roller bearing. For example, the bearing assembly 214 may be a deep-groove ball bearing, a spherical roller bearing, a cylindrical roller bearing, a needle roller bearing, or another ball/roller bearing type. An example bearing assembly 214 includes a simple bearing, for example a roller engaging a bushing. An example separation assembly includes a mechanical extension, stub, or pad, a bumper, and/or a thrust bearing associated with, coupled to, and/or integral with, one of a rotor plate and/or a stator plate, and configured to engage an adjacent plate to enforce a minimum separation distance between electrodes of the rotor plate and/or stator plate, and the adjacent plate. In certain embodiments, the mechanical extension, stub, or pad, is configured to slidably engage and adjacent plate, for example at a race, track, and/or landing of the adjacent plate.

As shown in FIG. 2, the bearing assembly 214 includes a plurality of cylindrical races including an outer race 218 (e.g., raceway, ring, etc.) and an inner race 220 disposed substantially within the outer race 218 in a substantially concentric arrangement with respect to the outer race 218. The bearing assembly 214 also includes a plurality of rolling elements (not shown) supported by the outer race 218 and the inner race 220 within a radial gap formed between the outer race 218 and the inner race 220 (e.g., along an outer surface of the inner race 220 and an inner surface of the outer race 218, etc.).

In some embodiments, at least one of the outer race 218 or the inner race 220 (e.g., one or a combination of the outer race 218 and the inner race 220) defines a groove that forms a pathway to guide movement of the rolling elements. The rolling elements separate the outer race 218 from the inner race 220 and permit the outer race 218 to move relative to the inner race 220. In some embodiments, the bearing assembly further includes a cage (e.g., retainer) that separates the rolling elements and supports the rolling elements in position along the outer race 218 and the inner race 220 (e.g., that prevents the rolling elements from becoming dislodged from the outer race 218 and the inner race 220). In other embodiments, the bearing assembly may additionally include seals and/or shields to protect the rolling elements and races from particulate contamination and improve bearing service life. In yet other embodiments, the bearing assembly may include devices such as bushings, simple bearings, magnetics (e.g. permanent magnets, electromagnets and/or back-iron) or electrostatics (e.g. electrets and/or capacitor plates) to attract and remove particulate contaminants. The magnetics/magnetic devices may also be separate from the bearing assembly and may also pull metal particles out of the dielectric liquid, which may be beneficial to extend the service life of the dielectric liquid and minimize wear on other components of the assembly.

Figure 27:
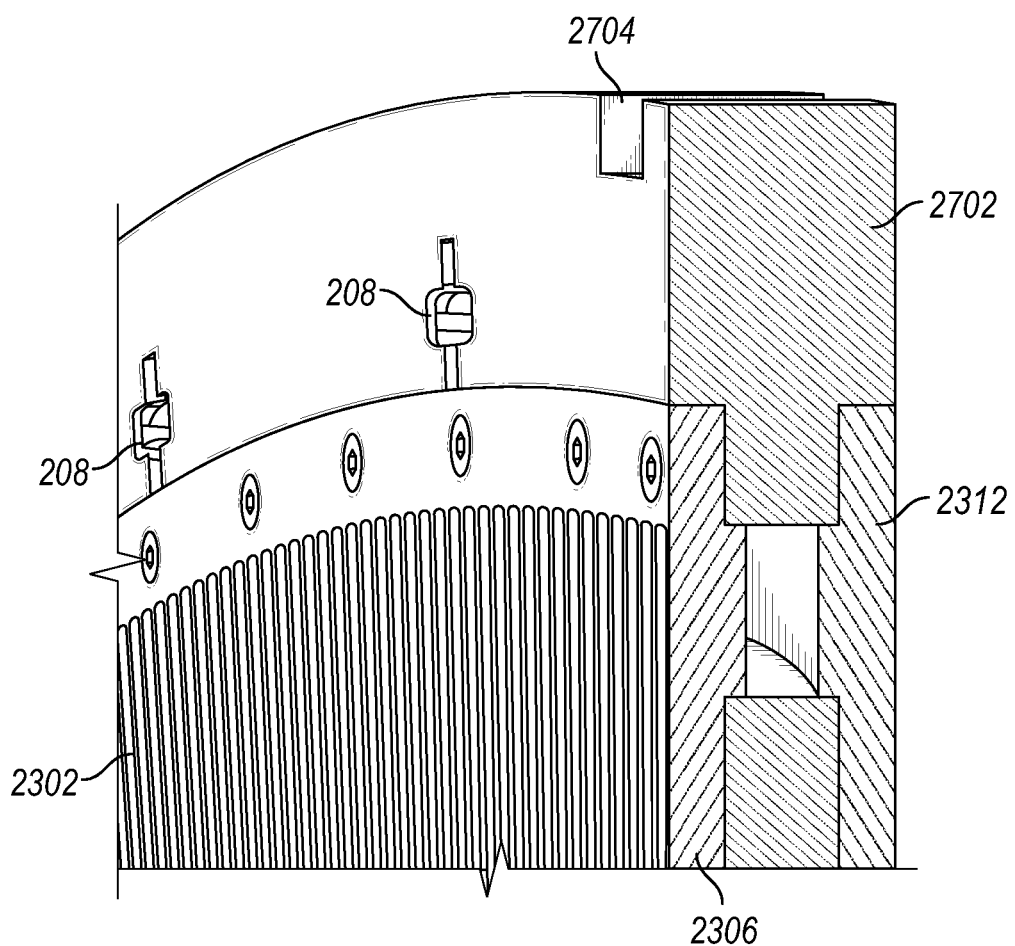
FIG. 27 is a schematic depiction of a system for an electrostatic motor.

An example separation assembly includes a rotor magnetic element disposed within the rotor plate (e.g., forming all or a portion of a spacer within the plate, and/or a securing substrate 2702—reference FIG. 27) and/or otherwise positioned between opposing surfaces of the respective rotor plate, and a stator magnetic element disposed within the stator plate. The magnetic elements are arranged such that poles of the rotor magnetic element and stator magnetic element are positioned in a repelling arrangement (e.g., N-N or S-S). It can be seen that, in certain embodiments, magnetic elements of each rotor plate may be aligned in a same direction (e.g., all N poles facing a first end plate of the ESM), and magnetic elements of each stator plate may be aligned in a same (opposite to the rotor alignment) direction (e.g., all S poles facing the first end plate of the ESM). Accordingly, in certain embodiments, and depending upon the size, strength, and positioning of the magnetic elements (including, e.g., where magnetic elements are provided as permanent magnets), and the conductive environment of the ESM (including the local environment of the plate, for example plate substrate, surface, and/or PCB materials), a single magnetic element within each plate may serve to provide gap enforcement operations for both sides of a given plate. Additionally or alternatively, utilization of common magnetic elements (e.g., within each respective one of the rotor stack and/or stator stack) can facilitate utilization of common parts (e.g., rotor plates having common elements of a configuration, and/or an identical configuration). In certain embodiments, for example depending upon a rating of the ESM, a field strength and/or excitation parameters for the capacitive stack 702, etc., magnetic elements for the capacitive stack 702 of a first ESM may vary from magnetic elements for the capacitive stack 702 of a second ESM, but maintain certain common aspects such as a physical size of the magnetic elements, an arrangement (e.g., orientation, position, etc.), and/or an assembly element (e.g., securing features, installation and/or replacement procedures, etc.). In certain embodiments, the rotor plate and/or stator plate include a conductive material between the magnetic element and the dielectric fluid (and/or gap between the rotor plate and/or the stator plate), for example facilitating magnetic coupling between adjacent plates (where, in the example, magnetic coupling indicates availability of repulsive magnetic action). In certain embodiments, one or more magnetic elements may be an electromagnet, for example powered from the excitation circuit, and/or a separate circuit, which may facilitate adjusting the enforced gap during operations, adjusting the repulsion forces available (e.g., allowing for a change in ESM rating, gap configuration, etc. through a control update, rather than, or in addition to a hardware update). For example, the utilization of an electromagnet magnetic element, potentially combined with a permanent magnet, allows for adjustment within a range (e.g., during operations and/or to accommodate a different rating for the ESM). In certain embodiments, a magnetic separation assembly includes a distinct configuration for a terminating plate (whether a stator plate or a rotor plate), including for example utilizing a smaller magnetic element, a magnetic field attenuator on a side of the terminating plate that faces away from the rest of the capacitive stack, and/or utilization of a non-magnetic housing (which may be already provided apart from consideration for a magnetic separation assembly), the magnetic separation assembly may be omitted for one or more terminating plates (e.g., where the terminating plate utilizes a different gap enforcement such as a bearing, mechanical extension, and/or bumper, and/or where the terminating plate does not utilize gap enforcement, for example where a fixed axial position of the terminating plate is sufficient for operations without separate gap enforcement), and/or a spacer, insulator, or other feature may be positioned between the terminating plate and the housing, and/or included on the housing (e.g., on an inner surface of the housing).

As shown in FIG. 3, the inner race 220 defines a central opening 222 configured to receive the retainer 216 therein such that the bearing assembly is disposed between opposing ends of the retainer 216. As shown in FIG. 3, the retainer 216 is a cylindrical pin (e.g., rod, shaft, etc.). In other embodiments, the retainer 216 may be another suitable support structure configured to engage with the recessed areas 210. The inner race 220 is engaged with the retainer 216 in a friction fit arrangement, which substantially prevents movement of the inner race 220 with respect to the retainer 216.

The retainer 216 supports the bearing assembly 214 within a respective one of the recessed areas 210 in the stator plate 202 such that the bearing assembly 214 at least partially protrudes beyond (e.g., extends beyond, extends outwardly from, etc.)) the surface of the stator plate 202. As shown in FIG. 3, the recessed area 210 is sized to receive the retainer 216 therein in a press-fit and/or friction-fit arrangement. In some embodiments, the recessed area 210 is larger than the retainer 216 such that the entire retainer 216 is disposed below the surface of the stator plate 202. In other embodiments, a portion of the retainer 216 protrudes from the surface of the stator plate 202. As shown in FIG. 2, the retainer 216 supports the bearing assembly 214 in a direction that is substantially parallel to the rotational direction of the rotor plate 110 and shaft 104 (see also FIG. 1) (e.g., along a reference line tangent to the circumferential direction).

In the embodiment of FIGS. 2-3, the outer race 218 of the bearing assembly 214 protrudes from the surface (e.g., a rotor facing surface) of the stator plate 202 past (e.g., beyond) the stator electrodes 204. A height of the bearing assembly 214 above the surface of the stator plate 202 is determined, at least in part, by the design of the retainer 216 and the depth of recessed area 210. In various illustrative embodiments, the height of the bearing assembly 214 above the surface of the stator plate 202 is approximately equal to the size of the gap (e.g., a separation distance between the stator plate 202 and the rotor plate 110 as shown in FIG. 1), and/or a size of a minimum gap to be enforced as the various plates move and/or flex in the axial direction.

In various illustrative embodiments, the height of the bearing assembly 214 above the surface of the stator plate 202 is adjustable. For example, the bearing assembly 214 may additionally include at least one shim that is "sandwiched" or otherwise disposed between the retainer 216 and the recessed area 210. In other embodiments, the bearing assembly includes an adjustment mechanism (e.g., a screw, etc.) that engages with the stator plate 202 (e.g., the recessed area 210, etc.) to set the height of the bearing assembly 214 above the surface of the stator plate 202. The adjustment mechanism may be coupled to the retainer 216 and/or the stator plate 202 (e.g., through a hole that extends through a portion of the recessed area 210). Among other benefits, incorporating an adjustment mechanism into the bearing assembly allows the same bearing assembly to be used in motors having different gap sizes between the rotor plates 110 and the stator plates 202, and/or allows for adjustments responsive to various tolerances to components of the capacitor stack of the ESM.

Figure 4:
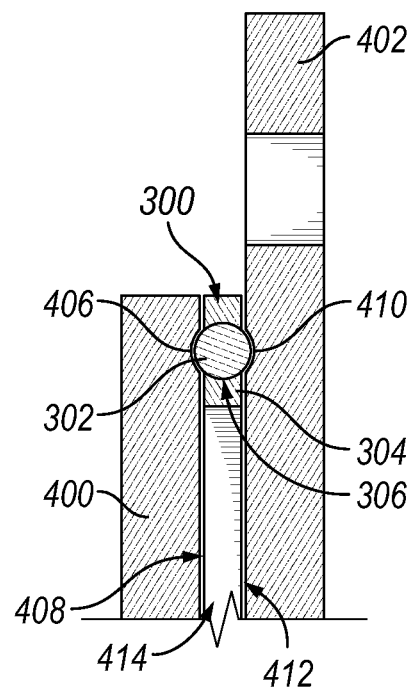
FIG. 4 is a schematic depiction of a system for an electrostatic motor.
Figure 5:
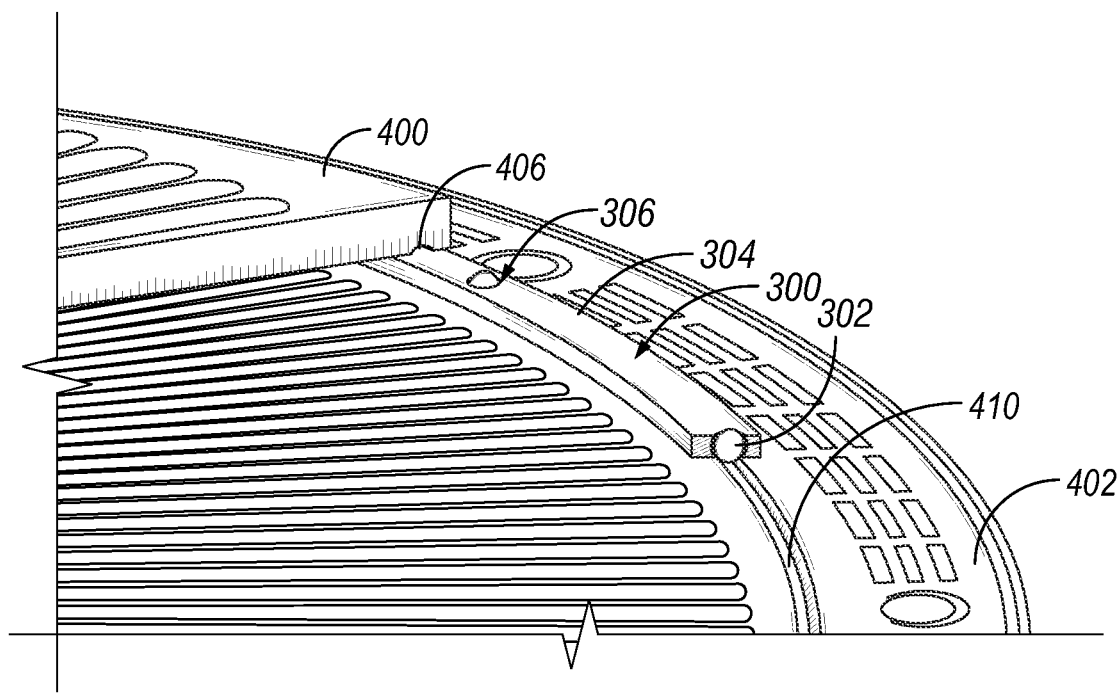
FIG. 5 is a schematic depiction of a system for an electrostatic motor.

The design of the separation assembly 208 described with reference to FIGS. 1-3 should not be considered limiting. Various alternatives and combinations are possible without departing from the inventive concepts disclosed herein. For example, FIGS. 4-5 are cross-sectional views of a separation assembly 300 of an electrostatic motor in which the rotor plate 400 and stator plate 402 form part of the separation assembly 300. In particular, the rotor plate 400 and the stator plate 402 function as an upper and lower bearing race for the separation assembly 300. The rotor plate 400 defines a rotor groove 406 (e.g., a "U" shaped channel, a "V" shaped channel, etc.) disposed in a stator facing surface 408 of the rotor plate 400 and extending in a circumferential direction along an outer perimeter of the rotor plate 400. The stator plate 402 defines a stator groove 410 in a rotor facing surface 412 of the stator plate 402 that mirrors the rotor groove 406 (e.g., that has a similar shape as the rotor groove 406).

As shown in FIG. 4-5, the separation assembly 300 is "sandwiched" or otherwise disposed between the rotor plate 400 and the stator plate 402, within a gap 414 formed between the rotor plate 400 and the stator plate 402. As with the separation assembly 208 of FIGS. 1-3, the separation assembly 300 of FIGS. 4-5 is positioned near an outer perimeter of the rotor plate 400 and the stator plate 402. The separation assembly 300 includes a plurality of rolling elements 302 and a retainer 304. The rolling elements 302 are spherical balls with a smooth outer surface. In other embodiments, the rolling elements 302 may be cylindrical, conical, tapered, or another suitable shape. The rolling elements 302 may be made from stainless steel, ceramic, a high strength thermoplastic, an acetal thermoplastic (e.g., Delrin®, available from DuPont), and/or another heat and chemical resistant material (e.g., materials compatible with the dielectric fluid used in the electrostatic machine).

The retainer 304 is slidably engaged with the rolling elements 302 and supports the rolling elements 302 in position along the rotor groove 406 and the stator groove 410. The retainer 304 also separates the rolling elements 302 in approximately equal intervals along the length of the rotor groove 406 and the stator groove 410. As shown in FIGS. 4-5, the retainer 304 is a curved plate (e.g., an annular plate, a ring-shaped plate, a cylindrical plate, etc.) having an axial thickness that is less than a size of the gap 414 (e.g., a width of the gap 414 along a direction parallel to a rotational axis of the rotor plate 400). The retainer 304 defines a plurality of curved (e.g., circular) openings 306 configured to receive the rolling elements 302 therein.

The size, shape, and arrangement of the retainer 304 and the rolling elements 302 may differ in various illustrative embodiments. In some embodiments, the separation assembly may include a thrust bearing of a construction that is different from that shown in FIGS. 4-5. In other embodiments, the separation assembly may include a different type of mechanical separator. For example, the separation assembly may include a thrust washer (e.g., rotary thrust washers, etc.) that is made from a material with a low friction coefficient such as steel, bronze, plastic, or another suitable material. The thickness of the thrust washer may be less than a nominal size of the gap to prevent contact between the moving surfaces during normal operation (e.g., in the absence of a large attractive force between the rotor plate 400 and the stator plate 402). The thrust washer may be affixed directly to the surface of one of the stator plate 402 and the rotor plate 400. In other embodiments, the thrust washer may be replaced with at least one bumper (e.g., a small protrusion mounted on the surface of the rotor plate 400 or stator plate 402), a thrust plate, or another mechanical spacer.

In yet other embodiments, the separation assembly is configured to apply a magnetic force to counteract the attractive force between the rotor plates and the stator plates. For example, the separation assembly may include at least one rotor magnet (e.g., a piece of neodymium iron boron (NdFeB), samarium cobalt (SmCo), alnico, ceramic, ferrite, or another permanently magnetic material) fixed to the rotor plate and a corresponding stator magnet fixed to the stator plate in alignment with the rotor magnet (e.g., located at substantially the same radial position as the rotor magnet, etc.). In other embodiments, the rotor plate and/or stator plate includes at least one electromagnet. In yet other embodiments, the separation assembly may include a magnetic circuit which provides magnetic coupling between at least one stator plate and at least one rotor plate with at least one permanent magnet and/or at least one electromagnet, such that a magnetic force counteracts the attractive force between the rotor plates and stator plates, without requiring close relative radial positioning of the magnets or electromagnets themselves.

Figure 6:
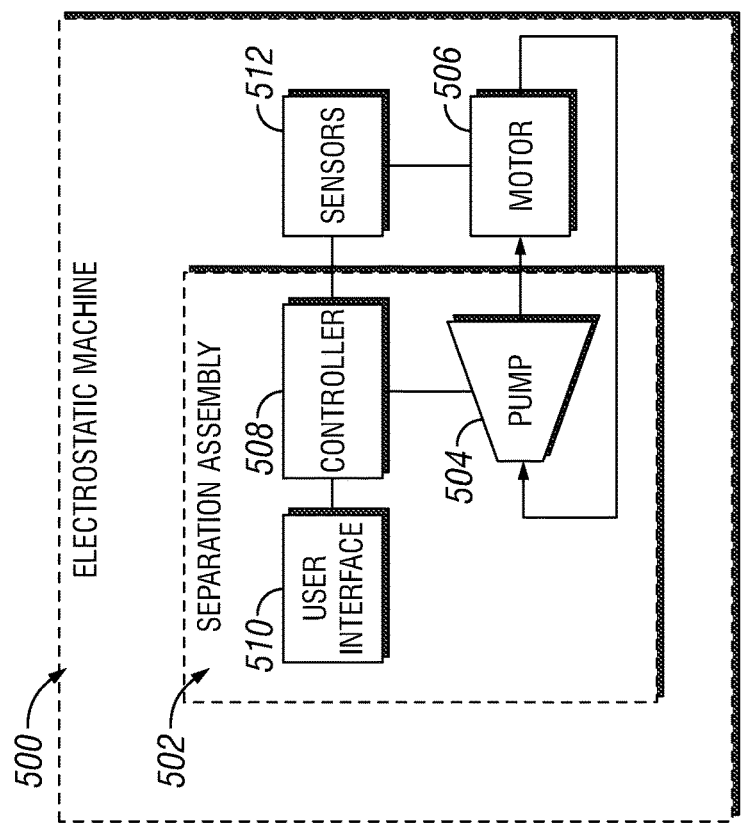
FIG. 6 is a schematic depiction of a system for an electrostatic motor.

FIG. 6 is a block diagram of an electrostatic machine 500 that includes a fluid-driven separation assembly 502. The separation assembly 502 includes a pump 504 or other fluid driver that is fluidly coupled to an electrostatic motor 506. The pump 504 is configured to circulate dielectric fluid through the motor 506. In certain embodiments, circulation of the dielectric fluid promotes separation of the plates, for example by circulating through gaps (e.g., spaces) formed between the stator plates (e.g., stator plate 202 of FIG. 1) and rotor plates (e.g., rotor plate 110 of FIG. 1) of the motor 506. Additionally or alternatively, circulation of the dielectric fluid promotes heat transfer to (e.g., from electrodes, and/or from the shaft) and/or from (e.g., to the housing) the dielectric fluid. Additionally or alternatively, circulation of the dielectric fluid promotes uniformity of composition of the dielectric fluid, for example promoting dispersal of additives, entrained or dissolved gases, or the like, which may support performance of the dielectric fluid, such as ensuring the composition in gaps is within designed values. Additionally or alternatively, circulation of the dielectric fluid promotes selected fluid flow regimes (e.g., laminar, turbulent, and/or an intermediate regime) within the ESM, for example to promote fluid characteristics (e.g., heat transfer, mixing, mass transfer), and/or friction loss characteristics.

Circulation of the dielectric fluid may be promoted by a flow feature within the ESM, for example a baffle of a housing and/or on a stator plate, a fin or other active flow feature provided on a rotor plate, and/or flow channels provided within rotor plates, stator plates, the shaft, and/or the housing. In certain embodiments, flow features within the ESM coordinate with a pump 504 to provide selected flow characteristics. In certain embodiments, flow features provide selected flow characteristics, responsive to general fluid circulation within the housing as provided by the movement of the rotor plates and the shaft.

Figure 7:
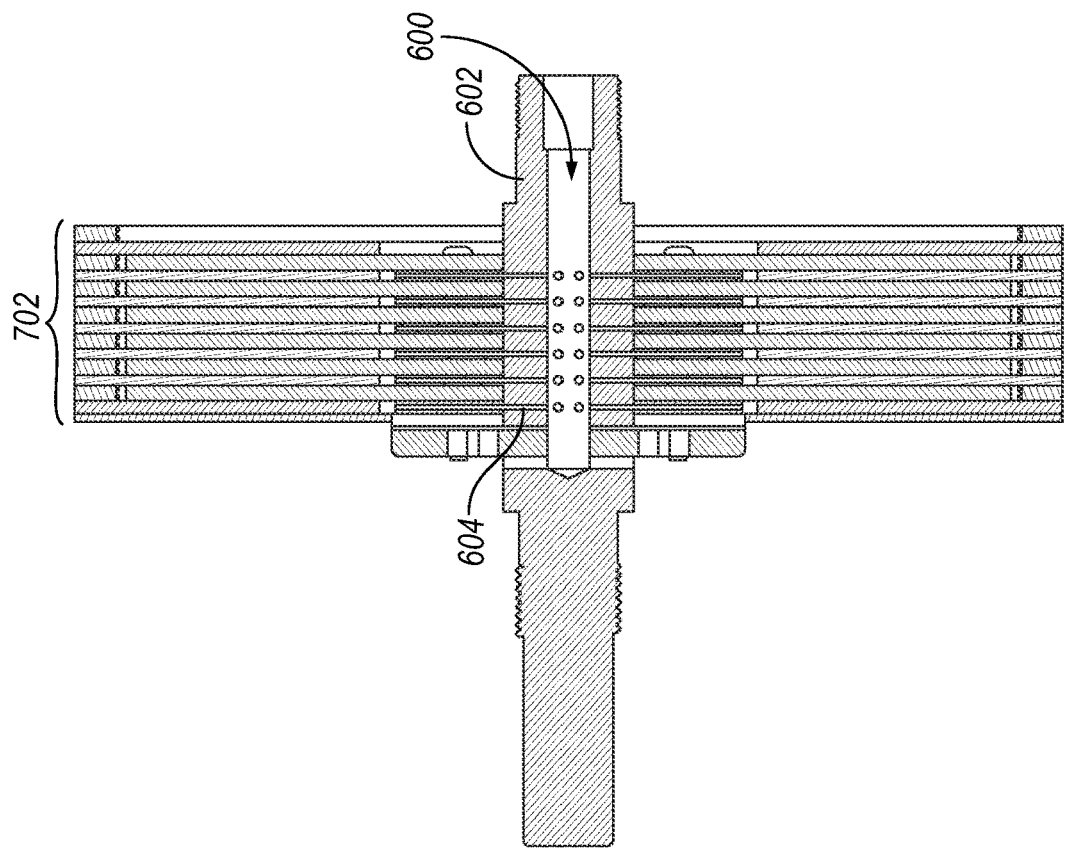
FIG. 7 is a schematic block diagram of a separation assembly controller for an electrostatic motor.

Referring to FIG. 7, the pump 504 may be fluidly coupled to flow channels (e.g., passages, etc.) 600 defined by a shaft 602 (e.g., similar to the shaft 104 of FIG. 1) of the motor 506. As shown in FIG. 7, the flow channels 600 extend along the length of the shaft 602, in a direction that is substantially parallel to an axis of the shaft 602. Fluid received in the channels 600 is routed through the channels 600 along an axis of the shaft 602 and out through openings 604 disposed along the length of the shaft 602. Fluid leaving through the openings 604 is forced through the gaps between the stator and rotor plates in a substantially radial direction.

Figure 8:
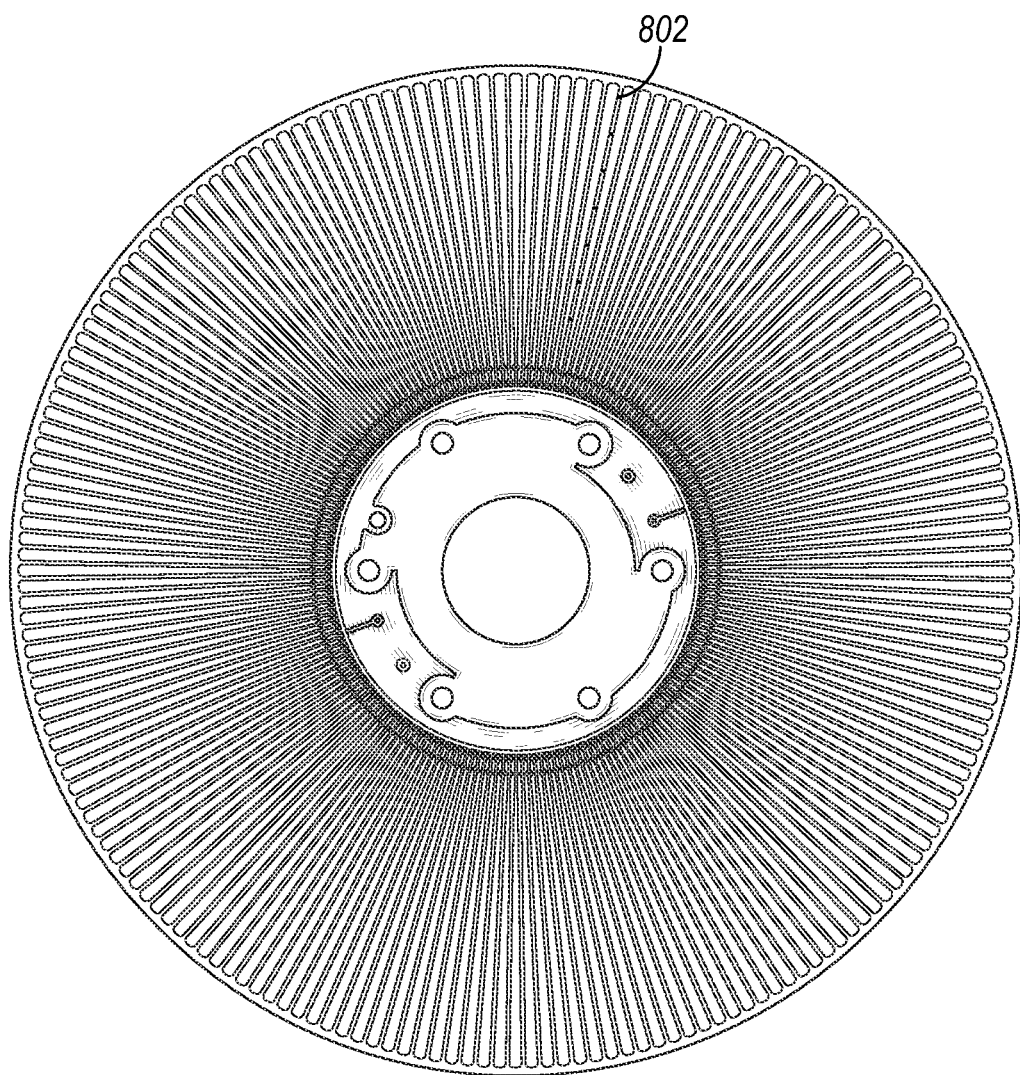
FIG. 8 is a schematic depiction of a system for an electrostatic motor.
Figure 9:
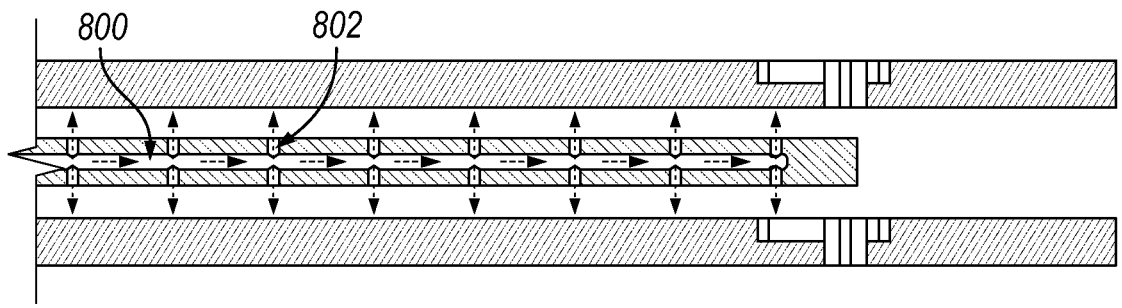
FIG. 9 is a schematic depiction of a system for an electrostatic motor.
Figure 10:
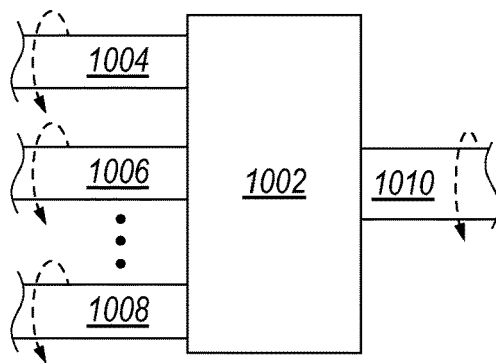
FIG. 10 is a schematic block diagram of a controller for an electrostatic motor.

In other embodiments, the pump 504 may be fluidly coupled to flow lines positioned within the motor housing (e.g., housing 102 of FIG. 1) and configured to direct the flow of dielectric fluid into the gaps between the rotor plates and the stator plates. In yet other embodiments, as shown in FIGS. 8-9, the pump 504 may be fluidly coupled (via the shaft and/or the housing) to channels 700 or voids formed into the rotor and/or stator plates. As shown in FIG. 9, the flow is directed through channels 700 formed into the rotor plate (and/or the stator plate) that extend in a radial direction from the shaft (or from the housing, e.g., where channels are formed in stator plates) toward an outer perimeter of the rotor plate. As shown in FIGS. 8-10, the channels 700 are fluidly coupled to openings 702 (e.g., holes, perforations, etc.) that extend through the surface of the rotor plate. The openings 702 are configured to distribute flow into the gaps between the rotor and stator plates. The number, size, and arrangement of openings 702 may differ in various illustrative embodiments.

The flow of fluid between the rotor and stator plates forms a hydrostatic bearing that substantially prevents the plates from moving toward one another. The flow rate of fluid through the gap is a function of the size of the gap and the characteristics of the pump 504. As the size (e.g., width) of the gap decreases (e.g., due to the attractive force between the rotor electrodes and the stator electrodes), the fluid pressure between the rotor and stator plates increases. The increase in fluid pressure counteracts the attractive force between the rotor and stator plates.

As shown in FIG. 6, an example separation assembly 502 additionally includes a controller 508 and a user interface 510. The controller 508 is communicably coupled to the pump 504 and is configured to control the pump 504 to achieve a desired flow rate of dielectric fluid through the motor 506. In some embodiments, the controller 508 is a variable frequency drive (e.g., AC drive, inverter drive, etc.) configured to control the speed of the pump 504 by varying motor input frequency and voltage. In other embodiments, the controller 508 is another motor speed controller. In some embodiments, the controller 508 is communicably coupled to at least one sensor 512 and configured to control the pump 504 (e.g., the flow rate of fluid) based on information received from the sensor 512. The information may be a voltage across the stator electrodes and the rotor electrodes of the electrostatic motor 506. Voltage determinations herein may be performed using a differential voltage determination, and/or a single ended voltage determination. In other embodiments, the sensor data may be a dielectric fluid temperature, a fluid pressure, a current, torque, acceleration, velocity, position, or other sensor data indicative of the operational performance of the motor 506 and/or pump 504. In some embodiments, the controller 508 further includes a power source (e.g., an alternating power source such as available line voltage, a transformer, rectifier, etc. configured to convert electrical power into power useable by the one or more elements of the controller 508, a battery, etc.). In yet other embodiments, the pump 504 is separately driven by an external motor or other device (e.g., via a power take-off (PTO), accessory belt, pulley, etc.).

As shown in FIG. 6, the controller 508 is communicably coupled to the user interface 510. The controller 508 is configured to receive and interpret user data, information, and/or instructions from the user interface 510 to control the pump 504. The user interface 510 may include a monitor (e.g., indicator, etc.) configured to display information from the sensors 512 and/or operational data from the pump 504 (e.g., operating speed, voltage, etc.). The user interface 510 may also include a control panel (e.g., keyboard, touchscreen, etc.) configured to receive user inputs. For example, the user interface 510 may enable a user to designate, select, or otherwise define the desired operating speed of the pump 504 to vary the fluid pressure applied to separate the rotor and stator plates.

Some embodiments of a hybrid electric drive machine may include actuators including those for rotary and linear motion. For example, in one embodiment, a first gearbox shaft may connect to an electromagnetic actuator, a second gearbox shaft may connect to an electrostatic machine, and a third gearbox shaft may connect to a mechanical load. In another embodiment, a first gearbox shaft may connect to a pneumatic actuator, a second gearbox shaft may connect to an electrostatic machine, and a third gearbox shaft may connect to an electromagnetic machine. In another embodiment, a first gearbox shaft may connect to a piezoelectric actuator, a second gearbox shaft may connect to an electrostatic machine, and a third gearbox shaft may connect to mechanical load.

Some embodiments of a hybrid electric drive machine may include the electrostatic machine having a direct mechanical connection to a mechanical load. In one embodiment, the shaft of an electromechanical system such as an electromagnetic machine may be directly connected or shared with the shaft of the electrostatic machine, which is connected to a first gearbox shaft, and a second gearbox shaft is connected to a mechanical load.

Some embodiments of a hybrid electric drive machine may include at least one mechanical energy storage device, which can be rotary and/or linear, attached to a shaft or integrated inside the hybrid electric drive machine. Some types of energy storage devices include methods of converting between kinetic and potential energy across domains including but not limited to fluid, mechanical, electrical, and thermal. Some illustrative examples of energy storage devices may include flywheels, pneumatic pumps with pneumatic accumulators, hydraulic pumps with hydraulic accumulators, and springs. In one embodiment, a first gearbox shaft may be connected to an electrostatic machine, a second gearbox shaft may be connected to an electromagnetic machine, a third gearbox shaft may be connected to a mechanical load, and a fourth gearbox shaft may be connected to a high energy torsion spring. In another embodiment, a first gearbox shaft may be simultaneously connected to both an electrostatic machine and a high energy torsion spring, a second gearbox shaft may be connected to an electromagnetic machine, and a third gearbox shaft may be connected to a mechanical load.

Some embodiments of a hybrid electric drive machine may include an electrical energy storage device which utilizes at least one electromechanical device for converting mechanical energy in the hybrid electric drive machine into electrical energy for storage.

Examples of suitable electromechanical devices include but are not limited to electrostatic, electromagnetic, and piezoelectric machines. Such devices typically utilize a power converter to convert electrical energy into a form usable by the device. Illustrative examples of electrical energy storage devices include capacitors, inductors, batteries, supercapacitors, ultracapacitors and electromechanical flywheels. Illustrative examples of power converters include Voltage Source Inverters (VSIs), Current Source Inverters (CSIs), Z-Source Inverters (ZSIs), and Multilevel Power Converters (MPCs). Energy storage devices may be connected to the power converters or contained within the power converters.

In one embodiment of the hybrid electric drive machine, a first gearbox shaft may be connected to an electrostatic machine, a second gearbox shaft may be connected to an internal combustion engine, a third gearbox shaft may be connected to a mechanical load, and a CSI containing an energy storage inductor may be connected to the electrostatic machine. The hybrid electric drive machine may then store ("sink" and "source") the pulsating power from the internal combustion in the inductor within the CSI, using the electrostatic machine.

In another embodiment of the hybrid electric drive machine, a first gearbox shaft may be connected to an electrostatic machine, a second gearbox shaft may be connected to an electromagnetic machine, a third gearbox may be connected to a mechanical load, and a battery may be used for electrical energy storage. In this system, a CSI may be electrically connected between the electrostatic machine and the battery, and a VSI may be connected between the same battery and the electromagnetic machine.

Various machines and methods for producing positive or negative torque include electromagnetic machines, electrostatic machines, internal combustion engines, piezoelectric machines, water wheels, hydraulic motors, friction brakes, pneumatic machines, and dashpots. Such machines and methods may also include rotary adaptations of linear (i.e., translational) machines, including but not limited to torque arms connected to cylinders (e.g., pneumatic or hydraulic) and reciprocating systems such as crank rods, pistons, and crank shafts. Each machine and method has its own benefits and drawbacks, therefore in some cases it may be beneficial to combine two or more machines or methods to achieve the desired torque, loss, and other performance goals of the overall machine or system. In some cases, multiple machines and methods of producing torque may be combined by selectively engaging and/or disengaging the machines and methods from a larger system. This act of engaging and disengaging may be achieved using additional devices, including but not limited to clutches and fluid coupling, which also have benefits and drawbacks. Common drawbacks include additional cost, maintenance, and points of failure.

A salient benefit of electrostatic machines is their ability to produce torque with very low loss. Electrostatic machines generally have high terminal impedance resulting from their capacitive characteristics and high resistance. Power loss from use of electric field torque is $$P_{loss} = V^2/R$$

where the resistance R is very high, such as in the megaohms or greater, leading to high torque with very low loss. In some cases, these electrostatic torque related losses can be so low as to be negligible.

In comparison, electromagnetic machines cannot produce torque without also producing losses. One source of torque-related losses is the coil resistance, leading to loss following $$P_{loss} = I^2 R$$

where the resistance R is determined by the volume and choice of coil material. The materials of choice are generally copper or aluminum due to cost and manufacturing constraints.

In some cases, high-torque operation of an electromagnetic machine may be advantageous at zero speed, leading to high losses within the machine. Therefore, the electromagnetic machine may be combined with other torque-producing machines and methods including brakes and/or clutches to selectively engage or disengage the electromagnetic machine while limiting power loss. Disadvantages of this approach include added expense and complexity.

Electromagnetic machine coil materials may include superconductors for extraordinarily low losses. Primary drawbacks of superconducting electromagnetic machines include high cost and added volume, mass, and complexity of the cooling system to achieve the low temperatures necessary for achieving superconducting behavior of the coils. A further drawback of superconducting coils is their high ac (alternating current) resistance, which can prevent their use in the armature coils of electromagnetic machines. Electromagnetic machines may exist in a wide variety of forms and topologies and may be brushed or brushless, and may or may not include slots for the coils. Some examples of electromagnetic machines include ac induction, wound field synchronous, dc shunt, dc series (also known as a universal motor), synchronous reluctance, switched reluctance, interior permanent magnet, surface permanent magnet, flux switching, Vernier, and transverse flux. In many cases, at least one of the coils within electromagnetic machines must conduct alternating current (ac) in order to function.

Superconductors generally have very low dc resistance at zero or near-zero frequencies (Hz); however, the resistance of superconductors at integer (or greater) frequencies (Hz) is considerably higher. This behavior severely limits the use of superconductors for the coils of electromagnetic machines. For these reasons, electromagnetic machines remain extremely challenging to design for high torque and low loss.

Salient benefits of piezoelectric machines include an ability to deliver shaft torque with high precision, rapid movement and with low loss. Drawbacks of piezoelectric machines include complex control methodologies and a possibility of wear, which limits their useful lifetime. Piezoelectric machines may be used in rotary and linear (e.g. translational) manners.

Mechanically driven shafts often include performance drawbacks according to their prime mover. Examples of prime movers include: internal combustion engines; diesel engines; turbines including gas, wind, and tidal; ocean wave energy converters; vehicle wheels; propellers; hydraulic systems; and any other general source of mechanical power. Prime movers may or may not be controllable. Prime movers may be capable of sourcing or sinking large quantities of mechanical power. Prime movers may produce torque or power at multiple frequencies, at least some of which may not be desirable by the system in which the prime mover is used.

Fluid powered systems, including pneumatics and hydraulics, may produce torque or force over a range of frequencies, including zero (dc). This is accomplished using fluids, including gases and liquids, at a pressure different from their surroundings. Typically the fluid powered systems utilize higher pressures than atmospheric. Due to the pressure difference, such systems must be sealed to prevent the pressurized fluids from leaking, which causes power loss, and may cause additional undesirable behavior including but not limited to environmental hazards, acoustic noise, or health hazards. Maintaining perfect seals to prevent these or other undesirable behavior is extraordinarily difficult, especially for surfaces which move, including dynamic shaft seals.

Some systems may produce high levels of force or torque which is purely loss and not recoverable. Examples of such systems are friction brakes, hysteresis brakes, and dashpots. The system's force or torque production capability may occur at a variety of frequencies, including low frequencies and zero (e.g., dc current) frequency.

To overcome the undesirable behaviors of a single system, a hybrid electric drive machine may be used to combine the desirable behaviors of one or multiple systems with the desirable behaviors of electrostatic machines. The hybrid electric drive machine may exist in a wide variety of embodiments, a small number of which are given here as illustrative examples.

An illustrative embodiment relates to the combination of an electrostatic machine, a separately driven rotating mechanical shaft, and an output shaft, using a gearbox. In one mode of operation, the electrostatic machine shaft may be locked in place at zero speed using its electrostatic torque, causing the separately driven mechanical shaft to drive the output shaft at non-zero speed through the gearbox gear ratio. This mode of operation eliminates the need for a separate clutch or brake on the electrostatic motor shaft when not in use.

In one embodiment of a hybrid electric drive machine, a 3-shaft gearbox (e.g., a power summation device, etc.) is used, where an electrostatic machine is connected to a first shaft, an electromagnetic machine is connected to a second shaft, and a mechanical load such as an axle for a vehicle is connected to a third shaft. The gear ratios between the shafts may be different or equal. The hybrid electric drive machine may have multiple modes of operation. In one mode, the electromagnetic machine may provide a certain quantity of mechanical power to the axle through the gearbox, and the electrostatic machine may provide sufficient torque to maintain the second shaft in a fixed position, thereby providing zero mechanical power while incurring very low or negligible losses without the use of a brake or clutch. In another mode of operation, the electromagnetic machine may provide a certain quantity of mechanical power to the axle through the gearbox, and the electrostatic machine may provide a certain quantity of mechanical torque and power to the load through the gearbox. Alternative modes of operation may provide for one or both machines operating as a generator. Still further modes of operation may provide for torque and/or power being provided by each machine over specific frequency ranges. By combining the electrostatic and electromagnetic machines with a 3-shaft gearbox, the electromagnetic machine may be designed with a reduced torque rating, the electrostatic machine may be designed with a reduced speed rating, and the total volume, mass and losses of the hybrid electric drive system may be reduced compared to either an electromagnetic or electrostatic machine by itself The total power rating of the hybrid electric drive system may also be increased compared to each machine individually.

Referencing FIG. 10, a generalized hybrid electric drive machine is schematically depicted with one electrostatic machine 1002, n shaft inputs providing mechanical powers $P_1$ 1006 through $P_n$ 1008, and an output shaft 1010. The hybrid electric drive machine 1106 combines the mechanical power (and/or torque) from all shafts, for example using a gearbox, torque converter, and/or other torque combining device.

Figure 11:
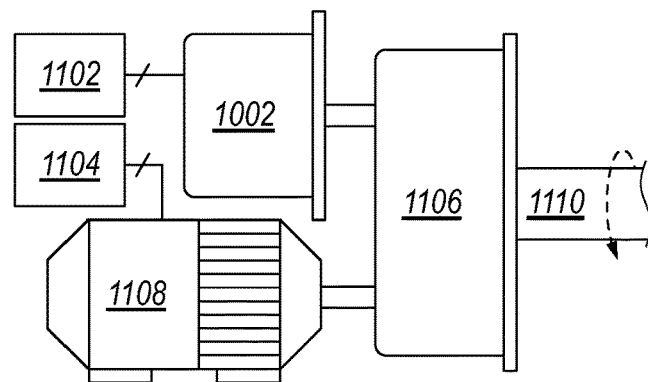
FIG. 11 is a schematic block diagram of a controller for an electrostatic motor.

FIG. 11 shows a hybrid electric drive machine with one electrostatic machine 1002 on an input shaft, one electromagnetic machine 1108 on an input shaft, and a gearbox 1106 combining the mechanical shaft power for use on the output shaft as $P_{out}$ 1110. In this example, a Current Source Inverter (CSI) 1102 drives the electrostatic machine 1002 and a Voltage Source Inverter (VSI) 1104 drives the electromagnetic machine 1108. Either machine may act as a motor or generator, and $P_{out}$ may be positive or negative.

Figure 12:
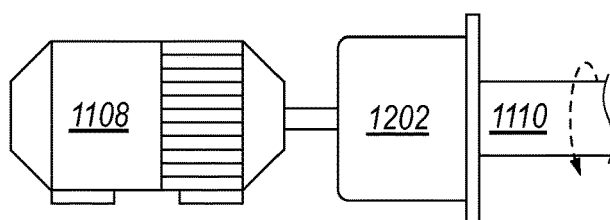
FIG. 12 is a schematic block diagram of a controller for an electrostatic motor.

FIG. 12 shows a hybrid electric drive machine with similar functionality as that of FIG. 11, but with the electrostatic machine and the gearbox integrated into one unit 1202. The CSIs and/or VSIs driving each machine are not specified in FIG. 12, and either one may be used for either machine 1108, 1202.

Figure 13:
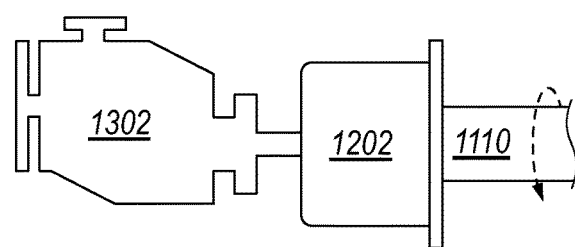
FIG. 13 is a schematic block diagram of a controller for an electrostatic motor.

FIG. 13 shows a hybrid electric drive machine with an Internal Combustion Engine (ICE) 1302 driving a first input shaft, an electrostatic machine driving a second input shaft and integrated into the gearbox 1202. The gearbox combines the mechanical shaft power for use on the output shaft as $P_{out}$. The CSI and/or VSI driving the electrostatic machine is not specified, and either one may be used for the electrostatic machine.

Figure 14:
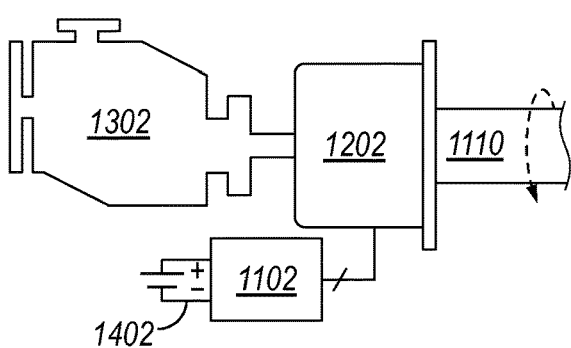
FIG. 14 is a schematic block diagram of a controller for an electrostatic motor.

FIG. 14 shows a variation of the hybrid electric machine of FIG. 13, where the electrostatic machine is driven by a CSI 1102, and the CSI input terminals are connected to an energy storage device, in this case a battery 1302. The electrostatic machine may provide mechanical power to the hybrid electric drive machine at a variety of frequencies within the energy storage (and/or energy delivery) capabilities ("charge") of the battery. If the battery charge is small, the electrostatic machine may operate as an electric motor to provide mechanical power over short durations of time, for example to supplement the various frequencies of power from the ICE 1302 to reduce mechanical torque ripple on the output shaft 1110. If the battery charge is large, the electrostatic machine may provide mechanical power over longer durations of time, for example to increase overall power throughput to the output shaft over seconds, minutes, hours or longer. The electrostatic machine may also behave as an electric generator and charge the battery 1402. The electrostatic machine may also provide zero mechanical power, for example, by remaining in a substantially fixed position.

Figure 15:
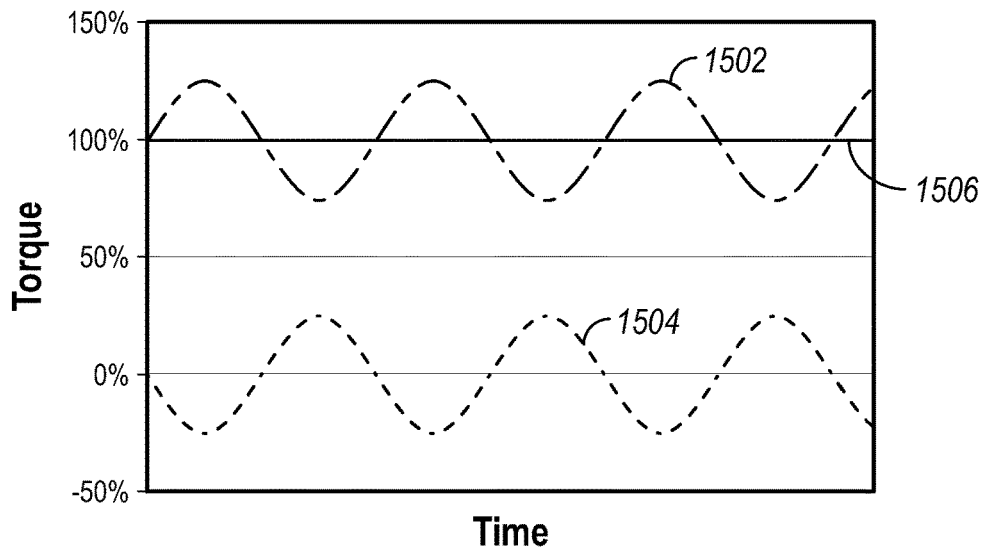
FIG. 15 is an illustration of a torque-time relationship for an electrostatic motor.

FIG. 15 shows how a hybrid electric drive machine may use its electrostatic machine to cancel ("zero out") an undesirable frequency of torque at the output shaft, and/or otherwise configures a final combined torque and/or an ESM torque in a selected manner. The example of FIG. 15 is described in the context of a prime mover (e.g., an ICE, induction motor, hydraulic motor, or the like) for clarity of the present description, but the hybrid electric drive machine may include the ESM selectively contributing a torque component, and any other torque producing device selectively contributing a torque component. The hybrid electric drive machine outputs power (and/or torque) as a combined power output from the prime mover and/or the ESM. During certain operating conditions, the combined power output may be from only one of the prime mover or the ESM, and during certain operating conditions, the combined power output may be from both the prime mover and the ESM. In certain embodiments, the hybrid electric drive machine combines the power utilizing a power summation device (e.g., a gearbox 1202). In certain embodiments, additional torque contributing devices may selectively provide torque to the power summation device, which may combine all of the torque contributions into the combined power output. In certain embodiments, the combined power output may be provided as a selected total torque value of torque components from the torque contributing devices, and/or a selected total torque value may be provided as a torque command, wherein the prime mover, ESM, and/or other torque contributing devices are responsive to the selected total torque value, for example providing the combined power output as the selected total torque value, providing the combined power output in a manner progressing toward the selected total torque value, and/or utilizing the selected total torque value as a control target (e.g., responsive to an error determined from the selected total torque value and the combined power output).

An example prime mover provides a torque response including a steady state torque component and a variable torque component. In certain embodiments, the steady state torque component may additionally or alternatively be a baseline torque component (e.g., an averaged torque output of the prime mover, an intended torque value—for example a torque command provided for the hybrid electric drive machine and/or the prime mover, a torque target selected by a controller of the prime mover based on the capability of the prime mover and/or that progresses acceptably toward the intended torque value, and/or a smoothed and/or filtered version of one or more of these). The steady state torque may be a time varying torque, such as an intended torque output for the hybrid electric drive machine, an intended torque output for the prime mover, or another smoothly transitioning and/or changing torque. In certain embodiments, the steady state torque may be a torque output of the prime mover that achieves a torque command (e.g., for the hybrid electric drive machine, and/or for the prime mover) and/or that progresses acceptably (e.g., according to a mission profile, intended responsiveness of the prime mover, etc.) toward a torque command. In certain embodiments, the variable torque component includes an unintended torque variability of the prime mover, and/or may include one or more of: a noise component (e.g., a variability in a torque output of the prime mover, for example due to one or more of: resultant operations of the prime mover that are not intended as a part of achieving a target torque value; valve opening and/or closing events; combustion events; off-nominal operations; misfire events; variability in ambient conditions, and/or caused by ambient conditions, such as air pressure, temperature, and/or saturation of an actuator or control condition; discrete non-idealities of a real operating prime mover relative to an idealized continuous torque provider; interruptions (including momentary, sustained, and/or intermittent) in a prime mover input such as fuel delivery, air pressure, electrical power, and/or fluid pressure; oscillations, surging, and/or transient torque affects caused by a component of the prime mover such as an air handling device, exhaust disturbance, turbocharger, and/or mode switching of a component such as a waste gate operation, gear shift, control mode change, etc.; and/or a noise caused by a load of the hybrid electric drive machine, such as an oscillation, impediment, binding event, or the like, including noise from the load that affects the combined power output directly and/or that affects the operation of the prime mover itself); a cyclic torque variance (e.g., caused by a rotating and/or oscillating component, load effect, repeating operation of a component, and/or including an off-nominal operation of one of these such as a sticky valve, worn bearing, dead spot in a coil, etc.); a surging torque variance (e.g., any one of the foregoing occurring intermittently in time and/or amplitude); a transient induced torque variance (e.g., due to a rapid and/or discontinuous change in the selected torque value; a control induced variance to a transient, such as from a proportional and/or derivative control error term response; and/or a load induced transient such as a rapid and/or non-linear load change, a transition to a gradient for a motive load, encountering a pressure event for a pumping load, etc.); and/or a lugging torque variance (e.g., due to low speed operations of the prime mover, an inability of the prime mover to rapidly switch into a desired operating mode such as a lower gear, different control mode, and/or distinct powering mode such a different fueling table and/or turbocharger operating regime; and/or a lag of an input response for the prime mover such as an air intake, fueling switch, alternate voltage supply, and/or alternate pressure supply; performance envelope characteristics of the prime mover, and/or high and/or chaotic load variability of the mechanical load).

The example hybrid electric drive machine includes the ESM capable to operate at a zero speed condition, including without a brake or clutch interposed between the ESM and the input of the power summation device (e.g., the gearbox 1202), for example where the ESM holds a zero position with appropriate applied torque. It can be seen that an ESM, using a capacitive torque providing capability with low losses at zero speed can efficiently hold at zero speed with a significant torque capability, allowing for a simplification of the hybrid electric drive machine by omitting a brake or clutch dedicated for the ESM. In certain embodiments, a brake and/or clutch is provided and interposed between the ESM and the power summation device—for example where a gearbox 1202 is not capable to accept a zero speed input at a first torque input (e.g., the ESM input) while accepting a non-zero speed input at a second torque input (e.g., the prime mover input), and/or where a brake and/or clutch for the ESM input is otherwise desired.

The example hybrid electric drive machine operates selectively in a first operating mode, where the ESM is coupled to the power summation device and operating at a zero speed, and a second operating mode where the ESM is coupled to the power summation device and contributing to the combined power output. It will be seen that, during certain operating conditions in the second operating mode, the ESM may nevertheless operate at a zero speed, either as a planned operation (e.g., where the prime mover is matching a selected torque value for the combined power output, and/or is further sufficiently responsive to a transient capability requirement for the combined power output—for example according to a selected transient response of the combined power output), as a transient operation (e.g., when operating at a variable low speed that may transiently be a zero speed, and/or when crossing between a positive speed and a negative speed, or vice versa, and/or when a zero speed with torque output is commanded by the selected torque value (e.g., performing a hill hold for a motive hybrid electric drive machine). In certain embodiments, the second operating mode includes an active torque transfer mode between the ESM and the power summation device, regardless of the operating speed of the ESM, and regardless of whether torque is actually being supplied to the power summation device by the ESM. In certain embodiments, the prime mover operates at a non-zero speed in the first operating mode, wherein the prime mover is a sole provider (e.g., where the torque providers for the hybrid electric drive machine consist of the ESM and the prime mover) of the combined power output in the first operating mode. In certain embodiments, one or more operating modes of the hybrid electric drive machine may include the prime mover operating at a zero speed (e.g., during idle shutdown operations, where the prime mover is capable to function at a zero speed, for example where the prime mover is an induction motor, hydraulic motor, or the like, where additional power producing devices that may provide power without the prime mover in certain operating conditions, and/or where an operating condition includes operations where the ESM provides power without the prime mover).

An example power summation device is capable to accept inputs from power producing devices, such as the ESM and the prime mover, but optionally additional power producing devices, at variable speeds. For example, the power summation device may include a first selected gear ratio (and/or range of gear ratios, and/or selected ones of a number of discrete gear ratios) between a power output of the power summation device and the input exchanging power with the prime mover, and a second selected gear ratio (and/or range of gear ratios, and/or selected ones of a number of discrete gear ratios) between the power output of the power summation device and the input exchanging power with the ESM. Where additional power producing devices are at least selectively coupled to the power summation device, the power summation device may allow distinct gear ratios with each device, and/or may enforce a same gear ratio for some, or all, of the power producing devices.

An example hybrid electric drive machine includes an operation of the ESM, for example in the second operating mode (e.g., where more than one operating mode is available), and/or according to general operations of the hybrid electric drive machine (e.g., where the ESM is continually capable to exchange power with the power summation device), where the ESM provides a second variable torque component configured to offset, wholly or partially, the first variable torque component. In certain embodiments, operations to provide the second variable torque component are provided to offset the first variable torque component, for example as depicted in FIG. 15, providing a varying torque that is equal in magnitude, with an opposite sign (and/or 180 degrees out of phase) with the first variable torque component. Accordingly, in certain embodiments, the ESM levels the torque output of the prime mover, where the combined power output matches the steady state output of the prime mover. The example of FIG. 15 depicts a single frequency periodic component of the variable torque output 1502, with a steady state torque output 1506 that is level and constant. The variable torque output 1502 may additionally or alternatively have multiple frequencies associated therewith (e.g., due to torque variability from other devices, torque variability occurring due to multiple causes, a torque variability having multiple frequency components associated therewith, and/or a torque variability that is not periodic). An example second variable torque component may be determined from a frequency analysis of the first variable torque component (e.g., constructing a "variability model" of the first variable torque component, for example by determining the number, frequency component, phase component, and/or amplitude of the underlying variability components; and/or determining a constructed variability model based on one or more frequency, phase, and/or amplitude components that sufficiently estimate equivalent aspects of the first variable torque component, even if the first variable torque component is not inherently caused by periodic disturbances, and the variability model is not describing fundamental aspects of the first variable torque component), where the ESM utilizes the variability model to provide the second variable torque component. An example second variable torque component may be determined from a high speed feedback and response operation, where the second variable torque component evolves from individual torque actions of the ESM in response to a presently detected variance of the torque output of the prime mover (and/or a variance from a combined torque output including other power producing devices), for example operating in a pure feedback mode to offset the first variable torque component. In certain embodiments, a time constant of detection of the combined torque output and/or prime mover torque response, and of a torque provision response of the ESM, is relatively quick compared to the time constant of the first variable torque component, and accordingly the ESM is capable to respond with direct torque detection and provision of the second variable torque component using the pure feedback mode without the variability model. In certain embodiments, the ESM constructs the variability model, operates to provide a resulting second variable torque component in response to the variability model, and further trims the second variable torque component using a feedback mode (e.g., utilizing the variability model as a feedforward control aspect, and the feedback mode as a feedback control aspect).

In certain embodiments, the provided second variable torque component is provided to adjust the combined power output in response to the first variable torque component 1506, for example as a supplementary torque component, such that the combined power output has a higher or lower value than the steady state torque output 1506. For example, where a selected total torque value indicates a combined power output of 500 ft-lb, a controller (e.g., of the prime mover and/or the hybrid electric drive machine) may attribute 450 ft-lb to the prime mover, and 50 ft-lb to the ESM. In the example, the ESM applies the second variable torque component to offset variability of the prime mover, and additionally provides 50 ft-lb of torque contributing to the combined power output. In certain embodiments, the ESM can absorb torque, for example where the selected total torque value indicates a combined power output of 500 ft-lb, a controller may attribute 550 ft-lb to the prime mover, and the ESM applies the second variable torque component to offset variability of the prime mover, and additionally absorbs 50 ft-lb of torque, reducing the combined power output to 500 ft-lb. The described operations are a non-limiting example. Considerations to attribute a portion of the combined power output to the ESM include, without limitation: a state of charge of an electrical power source powering the ESM, the desirability to charge or discharge the electrical power source, and/or an efficiency of power provision by the prime mover and/or ESM under current operating conditions (and/or conditions that would be present according to a selected power attribution).

In certain embodiments, the provided second variable torque component is provided to adjust the combined power output in response to a selected transient response of the combined power output. For example, where the selected total torque value is a changing value, the ESM may additionally or alternatively adjust the second variable torque component, responsive to the change in the selected total torque value, and/or in response to a difference between a change in the first variable torque component and/or the steady state torque component. For example, the prime mover may adjust its torque output to meet the changing selected total torque value, but the prime mover may not follow the changing selected total torque value in certain operating conditions (e.g., the prime mover may lag in torque response, overshoot a torque response, or both). In certain embodiments, the selected transient response may be an indicated time (e.g., a specified torque rise within a specified time period), a torque slew rate (e.g., an increasing and/or decreasing torque rise per unit time), or the like. In certain embodiments, the ESM assists in achieving a combined power output that is compliant with the selected transient response in a manner similar to determining the second variable torque component to meet the selected total torque value, adjusted accordingly (e.g., using a ramped selected total torque value as a target, or the like). In certain embodiments, the ESM is instructed to meet changes of the selected total torque value, potentially within a range of adjustments to the selected total torque value, for example to allow the prime mover to continue operating at an efficient operating point, to delay substantial response changes (e.g., switching into a different operating mode such as a gear change, distinct control mode, and/or distinct powering mode such as a different fueling table and/or turbocharger operating regime). In certain embodiments, the ESM is instructed to at least partially respond to changes in the selected total torque value, for example allowing the prime mover to make a gradual adjustment to the steady state torque, even where the prime mover may be fully capable to comply with the selected transient response. In certain embodiments, the ESM is instructed to at least partially respond against changes in the selected total torque value, for example allowing the prime mover to make a more sudden change to the steady state torque, which is then trimmed back to a rate of change of the combined power output that is compliant with the selected transient response. Certain considerations for attributing adjustments of the second variable torque to meeting changes in the selected total torque value include similar considerations to attributing a portion of the combined power output to the ESM (e.g., based on battery state of charge, etc.), and may additionally include a determination of the cost or benefit of avoiding an operating change in the prime mover, reducing a rate of change of torque production by the prime mover, and/or allowing for an increased rate of change of torque production by the prime mover.

Operations described herein for compliance with a selected torque value and/or a selected transient response additionally or alternatively include operations that are sufficiently close to compliance, that are incrementally closer to compliance than other operations (e.g., operations performed without the ESM), operations that acceptably progress toward compliance, and/or operations that are incrementally closer to an acceptable progression toward compliance than other operations (e.g., operations performed with the ESM). Operations described herein referencing the prime mover and the ESM may additionally be adjusted to incorporate a number of other power producing devices.

Referencing FIG. 15, an illustrative oscillating torque component (e.g., an ac torque, a time-varying torque component, etc.) of mechanical shaft torque is depicted. A second shaft provides the electrostatic machine torque 1504, which in the example includes a zero steady state torque component and an oscillating torque component which is equal in magnitude and opposite in phase to the Prime Mover's oscillating torque component. When summed at the output shaft, as shown in the Summed Torque Output 1506, only the steady state torque component of the prime mover torque 1502 remains. All torque waveforms are shown referred to the output shaft. The example of FIG. 15 depicts a single transient torque component 1502 for the prime mover, but it will be understood that the transient torque component 1502 may be more complex, where frequency analysis such as a fast Fourier transform (FFT) or the like may be utilized to determine the transient components of the prime mover torque 1502, and a phase locked loop (PLL) or other processing may be performed to determine the phase of frequency components of the prime mover torque 1502, allowing for the ESM torque 1504 to offset torque ripple and/or transient components of the prime mover torque 1502 and provide the steady state summed torque output 1506. In certain embodiments, the ESM torque 1504 may be provided to move the summed torque output 1506 above (e.g., increasing the steady state torque output, and drawing net power from an electrical storage device or other electrical source) or below (e.g., decreasing the steady state torque output, and providing net power to an electrical storage device or other electrical source), and/or providing a controlled rate movement of the summed torque output 1506 from a first level to a second level (e.g., providing for a smoothed torque slew rate from a first level to a second level, either higher or lower than the first level, and in a manner that allows the prime mover to change torque output at a rate that is optimal for the prime mover without having to fully meet a torque transient, and/or without constraint to a desired shape of a torque transient). An example ESM of a hybrid electric drive machine is integrated into a housing of the first power summation device.

Figure 16:
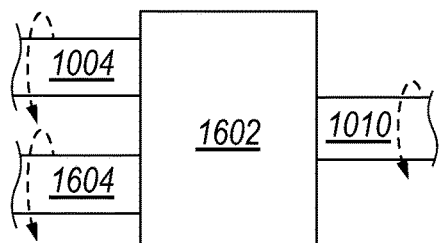
FIG. 16 is a schematic block diagram of a controller for an electrostatic motor.

FIG. 16 depicts a gearbox 1604 receiving a first torque input from an ESM 1002, and a second torque input 1602, for example from a prime mover, electromagnetic machine, or the like. The example gearbox 1604 engages each of the ESM 1002 and second torque input 1602 at selected ratios, and provides an output torque 1010 at a selected speed and ratio between each torque input 1002, 1602. The example of FIG. 16 is utilizable with any systems and/or operations set forth throughout the present disclosure, and allows for torque ripple and/or torque slew rate control, and/or discharge and/or charging of an electric power source and/or electrical storage device.

Figure 17:
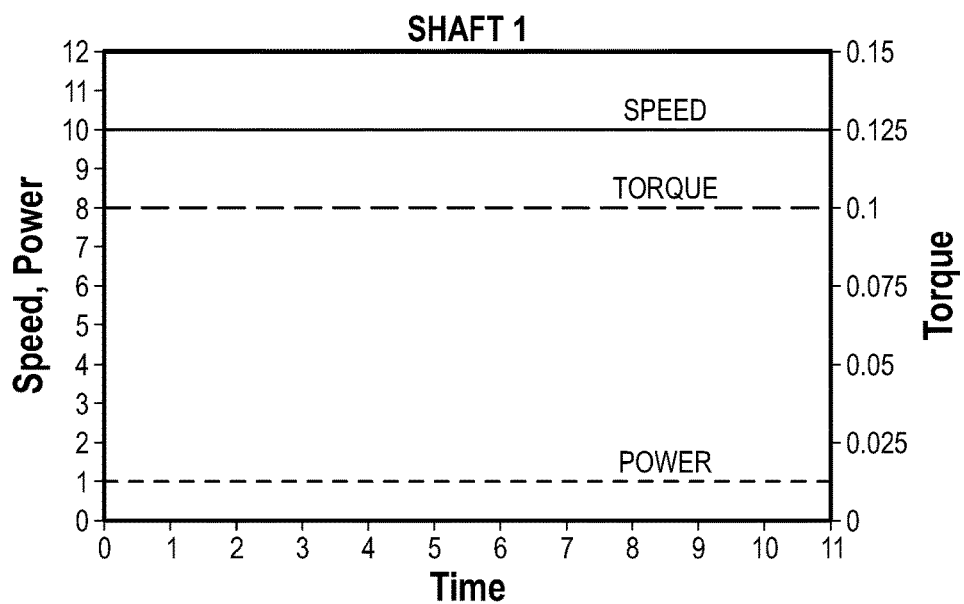
FIG. 17 is an illustration of a speed and power-time relationship for an electrostatic motor.
Figure 18:
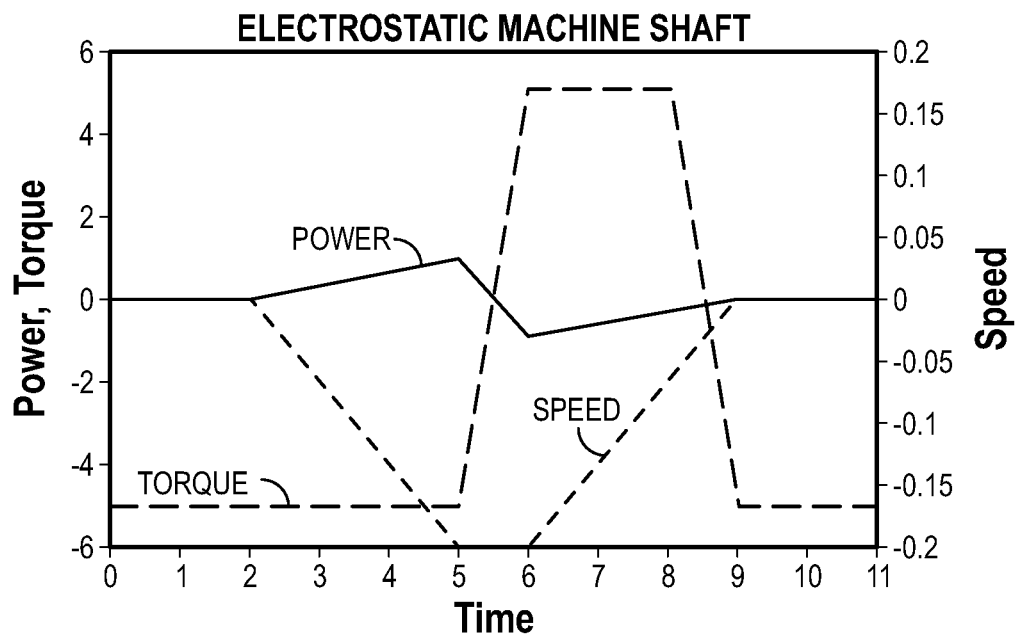
FIG. 18 is an illustration of a torque and power-time relationship for an electrostatic motor shaft.
Figure 19:
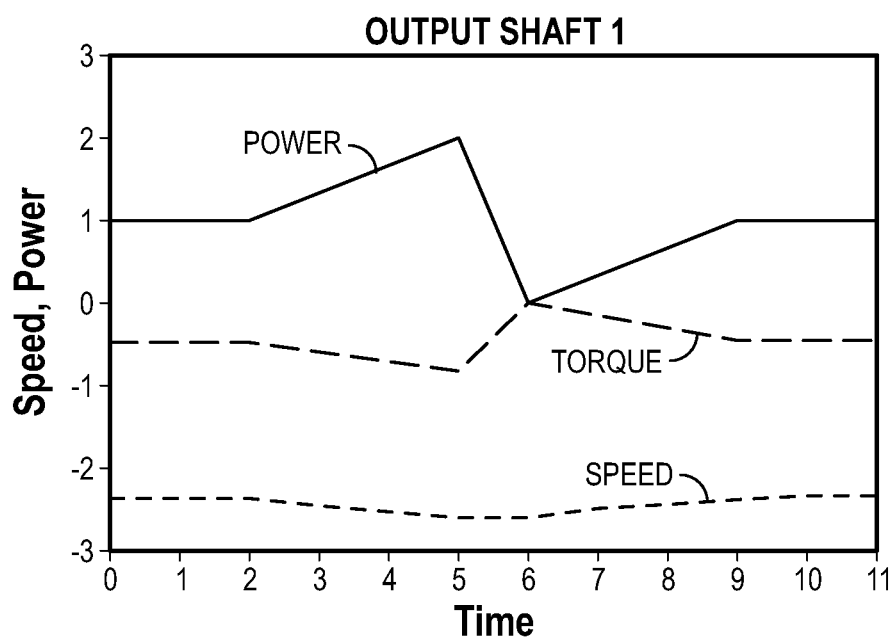
FIG. 19 is an illustration of a torque and power-time relationship for an electrostatic motor shaft.

FIGS. 17-19 further illustrate how a hybrid electric drive machine may use its electrostatic machine to provide mechanical power over one frequency range to supplement mechanical power from another shaft (e.g., Shaft 1) over another frequency range through a gearbox. The illustrative torque-speed-power diagrams of FIGS. 17-19 are utilizable with any hybrid machine depicted herein, including at least the machine depicted in FIG. 16. Quantities shown in FIGS. 17-19 are unitless and intended to illustrate relative magnitude and frequency.

FIG. 17 shows the mechanical power provided at Shaft 1 by an arbitrary mechanical power source, which operates at high speed and low torque to provide one unit of mechanical power. The gearbox provides a gear ratio to "step down" the high speed (e.g., 10 units) to a moderate speed acceptable to an arbitrary mechanical load (2-3) and in the opposite direction (negative). In this illustration, the arbitrary mechanical power source operates in constant or near-constant speed, torque, and power.

FIG. 18 shows the mechanical power provided at a second shaft by the electrostatic machine, which operates at low speed and high torque to provide 1 unit of alternating mechanical power over a short duration for a burst of high deceleration and acceleration of an arbitrary mechanical load. Initially, the electrostatic machine is held stationary using high torque in negative direction (Time=0). Then at Time=2 the load torque conditions change and the electrostatic machine reacts by increasing its speed (in negative direction), providing positive mechanical power to the load. At Time=5 the electrostatic machine controller (not shown) reacts to the new load conditions and causes the electrostatic machine to produce high positive torque at Time=6. This torque causes the electrostatic machine speed to return to zero at Time=9.

FIG. 19 shows the mechanical power provided to the output shaft by the hybrid electric drive machine, consistent with the illustrative operations depicted in FIGS. 17-18. At Time=0, one unit of power is provided to the load. When load conditions change at Time=2, the mechanical power increases to 2 as the torque and speed both increase until Time=5 when the controller causes the electrostatic machine to react, which causes the mechanical output power, speed, and torque to return to their original values. Together, these figures illustrate how a hybrid electric drive system may use multiple shafts to provide mechanical power over multiple frequencies (e.g. dc or bursts) to an output shaft.

In some embodiments, the term "shaft" is meant in its most general definition, referring to the presence of mechanical power flow rather than a physical shaft. One embodiment, for example, may include a planetary gearbox, where any of the ring gear, planet gear carrier, and/or the sun gear may be rigidly connected to the gearbox housing.

In another embodiment, the hybrid electric drive system may include an electrostatic machine, a diesel engine, and a mechanical load such as a propeller. In one mode of operation, the diesel engine may provide the power to the mechanical load through the gearbox gear ratio, and the electrostatic machine may provide zero mechanical power by maintaining a fixed shaft position at low or negligible loss. In another mode of operation, the diesel engine may again provide the power to the mechanical load through the gearbox gear ratio, and the electrostatic machine may provide oscillating power flow to absorb the torque pulsations from the diesel engine shaft, allowing the mechanical load to spin with reduced, or zero, torque pulsations. In yet another mode of operation, the electrostatic machine may provide acceleration torque and power to the mechanical load through the gearbox, supplementing the torque and power flow from the diesel engine to cause the mechanical load to accelerate and/or decelerate at a rate greater than would be possible with the diesel engine alone.

Additional embodiments may contain a gearbox with an arbitrary number of shafts, which may be used for connecting one or more electrostatic machines, one or multiple mechanical loads, and an arbitrary number of additional devices. For example, one embodiment may combine an electrostatic machine, an electromagnetic machine, a mechanical load, and a hydraulic motor with a single 4-shaft gearbox. An additional embodiment may connect an electrostatic machine, an electromagnetic machine, two mechanical loads and a hydraulic motor with a single 5-shaft gearbox.

The hybrid electric drive machine need not be limited to a single gearbox. For example, some embodiments may include multiple gearboxes, each with 2 or more shafts, which together serve a collective purpose of combining the power flow and torque of all sources and loads.

The term "mechanical load" is meant in its most general form and may be represented in a wide number of forms. Examples of mechanical loads include, but are not limited to: wheels, propellers, blades, mixers, tracks, compactors, pumps, compressors, drills, pulleys, fans, grinders, positioners, shredders, linear actuators, rotary actuators, actuation systems, conveyers, cutters, slicers, gimbals, indexing systems, injection molding machines, material handling, robotics, medical equipment, metal machining, packaging equipment, tensioners, presses, printers, robotics, stretchers, winders, drawing machines and mechanisms, and any other load within the domains of mechanics and fluid powered systems. Mechanical loads may also include electromechanical systems, including but not limited to electromagnetic machines, piezoelectric machines, and electrostatic machines. A mechanical load may have continuous, oscillatory, position-and-hold, or other motion profiles. A mechanical load may have one or more shafts.

It will be understood by individuals skilled in the art that the term "load" does not refer exclusively to systems or components which absorb power, but also those systems and components which may source power. Power may refer to real, reactive, or apparent power.

Any device attached to a gearbox shaft may include additional gearing stages. For example, in one embodiment, a hybrid electric drive machine is formed by combining an electrostatic machine, an electromagnetic machine, and a mechanical load with a 3-shaft gearbox. In this embodiment, an additional stage of gearing may exist between the gearbox and the electromagnetic machine, allowing the electromagnetic machine to spin at very high speeds, allowing for a very high power density of the overall hybrid electric drive machine.

It will be understood by a person skilled in the art that the term "gearbox" is meant in its most general form, which is a system that directs power flow between multiple mechanical inputs according to certain fixed or variable speed and/or torque ratios, resulting in a summation of mechanical power and torque. In one embodiment, a 3-shaft gearbox internally contains an arbitrary number of gears, gear meshes and physical shafts to connect an electrostatic machine, an electromagnetic machine, and a mechanical load according to the formula: $T_1\omega_1+T_2\omega_2+T_3\omega_3+P_{loss}=0$, where $T_n$ represents the torque of shaft n, $\omega_n$ represents speed of shaft n, and $P_{loss}$ represents a nominal amount of gearbox power loss, for example due to gear meshing. In another embodiment, a 3-shaft gearbox may resemble a torque converter, wherein 2 or more shafts transfer torque using impellers in a liquid. Other embodiments may include other uses of rigid coupling (e.g. gears or chain drives), semi-rigid coupling (e.g. V-belts, serpentine belts), dynamic ratio coupling (e.g. pneumatics, hydraulics, or differential coupling), or additional methods of coupling. An example 3-shaft gearbox may resemble a differential, wherein an electrostatic machine is connected with two mechanical loads using rigid gearing that causes the mechanical loads to have a variety of behaviors including unlimited and/or limited slip.

A gearbox may utilize a variety of topologies, and may further include a variety of meshing techniques and layouts. Some examples of gearbox topologies include helical, bevel, spur, worm, planetary, cycloidal, and strain wave. Meshing techniques may include straight, spiral, and unconventional designs such as the Galaxie® sliding mesh. Layouts may include right angle, coaxial, and inline. Gearbox meshing techniques may include zero backlash.

It will be understood by those skilled in the art that the terms "input," "output" and "shaft" may be used interchangeably, and do not imply any limitation to direction or quantity of mechanical power flow. It will be further understood by those skilled in the art that electromechanical power conversion is generally a bidirectional process, and therefore terms including but not limited to "motor," "generator," "actuator," and "system" may also be used interchangeably.

Figure 20:
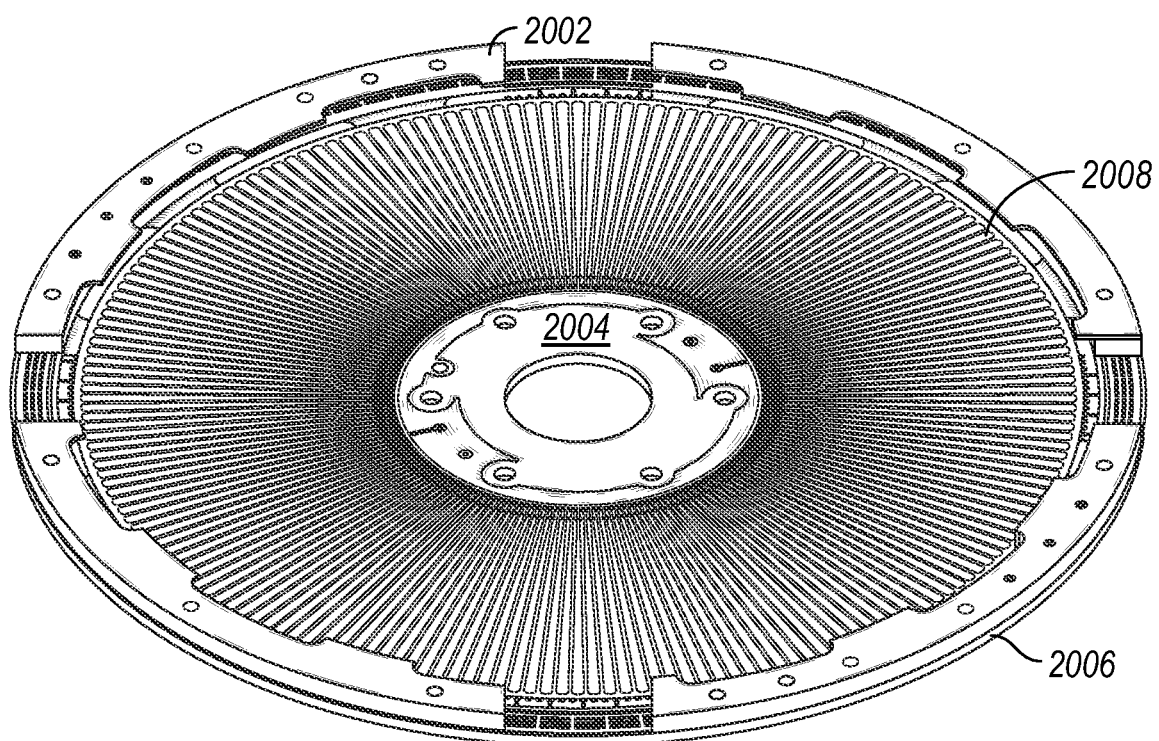
FIG. 20 is a schematic depiction of a system for an electrostatic motor.

Referencing FIG. 20, example aspects of a stator plate and/or a rotor plate are depicted. The example plate includes an inner mechanical pad 2004 and an outer mechanical pad 2002 (or "bumper") configured to enforce a minimum separation distance between electrodes of the plate (e.g., a stator plate or a rotor plate) and electrodes of an adjacent plate (e.g., a rotor plate or a stator plate). The mechanical pads 2002, 2004 are configured of a material compatible with the dielectric fluid at operating temperatures of the ESM, and have a material and configuration allowing the plates to rotationally slip while enforcing axial distancing, when in contact with adjacent plates. Without limitation to any other aspect of the present disclosure, materials described herein for bearings, rolling elements, and/or printed circuit board substrates, are generally appropriate for the mechanical pads 2002, 2004, subject to the mechanical force profiles expected to be experienced by the mechanical pads 2002, 2004 during operations of the ESM.

The mechanical pads 2002, 2004 may be provided in place of a separation assembly 208 and/or in addition to another separation assembly 208. The mechanical pads 2002, 2004 are coupled to, and/or formed integrally with, a substrate 2006 of the plate, where electrodes 2008 are affixed thereon. The substrate 2006 of the plate may be a printed circuit board defining electrical paths between electrodes, and/or the substrate 2006 may be a structural material having electrical paths coupled thereto. The substrate 2006 includes holes ("vias") therethrough, allowing for electrical coupling between electrodes on a second side (not shown) of the rotor and/or stator plate, which may be affixed to the substrate 2006 or affixed to another substrate that is coupled to the substrate 2006, with intermediate circuitry therebetween to couple the electrodes of each side of the plate (e.g., reference FIG. 23 and the related description). Coupling between plates occurs, depending upon the specific arrangement, from stator plate to stator plate at a circumference beyond an outer circumference of the rotor plates, and from rotor plate to rotor plate at a circumference inside an inner circumference of the stator plates.

Figure 21:
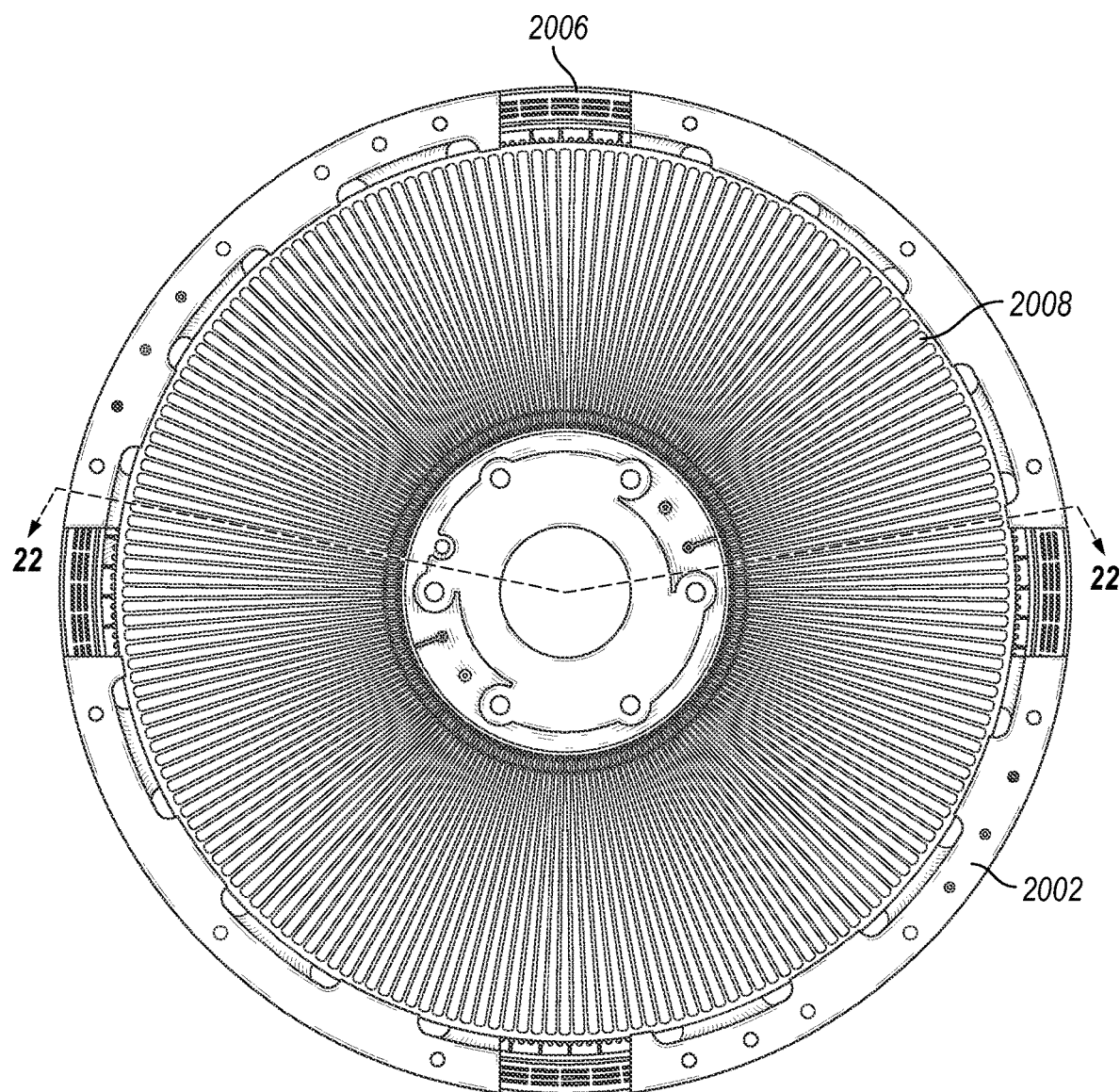
FIG. 21 is a schematic depiction of a system for an electrostatic motor.
Figure 22:
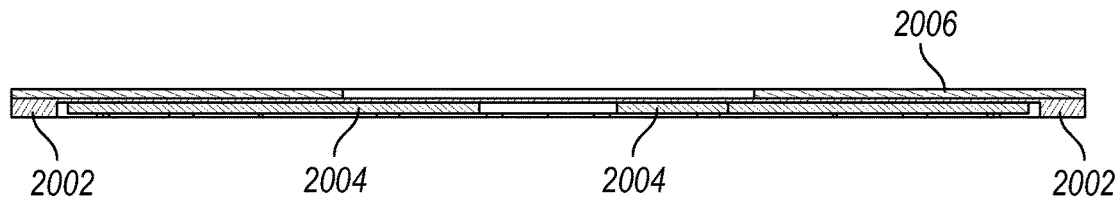
FIG. 22 is a schematic depiction of a system for an electrostatic motor.

Referencing FIG. 21, another view of the example stator plate and/or rotor plate is depicted. Referencing FIG. 22, a cutaway view of the example stator plate and/or rotor plate is depicted, consistent with the A-A cutaway marking of FIG. 21. In the example of FIG. 22, it can be seen that the mechanical pads 2002, 2004 are configured to contact an adjacent plate before contact by the electrodes 2008, allowing for enforcement of a minimum separation distance of the electrodes forming a capacitive element. In certain embodiments, mechanical pads 2002, 2004 may be affixed to both sides of a selected type of plate (e.g., stator plates or rotor plates). In certain embodiments, mechanical pads 2002, 2004 may be affixed to only a single side of the plates, with separation for the second side provided by mechanical pads on the adjacent plates (e.g., both rotor and stator plates include mechanical pads on a selected side of the plates) and/or by a different separation assembly (e.g., a rolling element 208) provided on the other side of the plate. In certain embodiments, adjacent plates may include receiving elements, such as a landing track, configured to slidably engage the mechanical pads 2002, 2004 during contact with the mechanical pads 2002, 2004.

Figure 23:
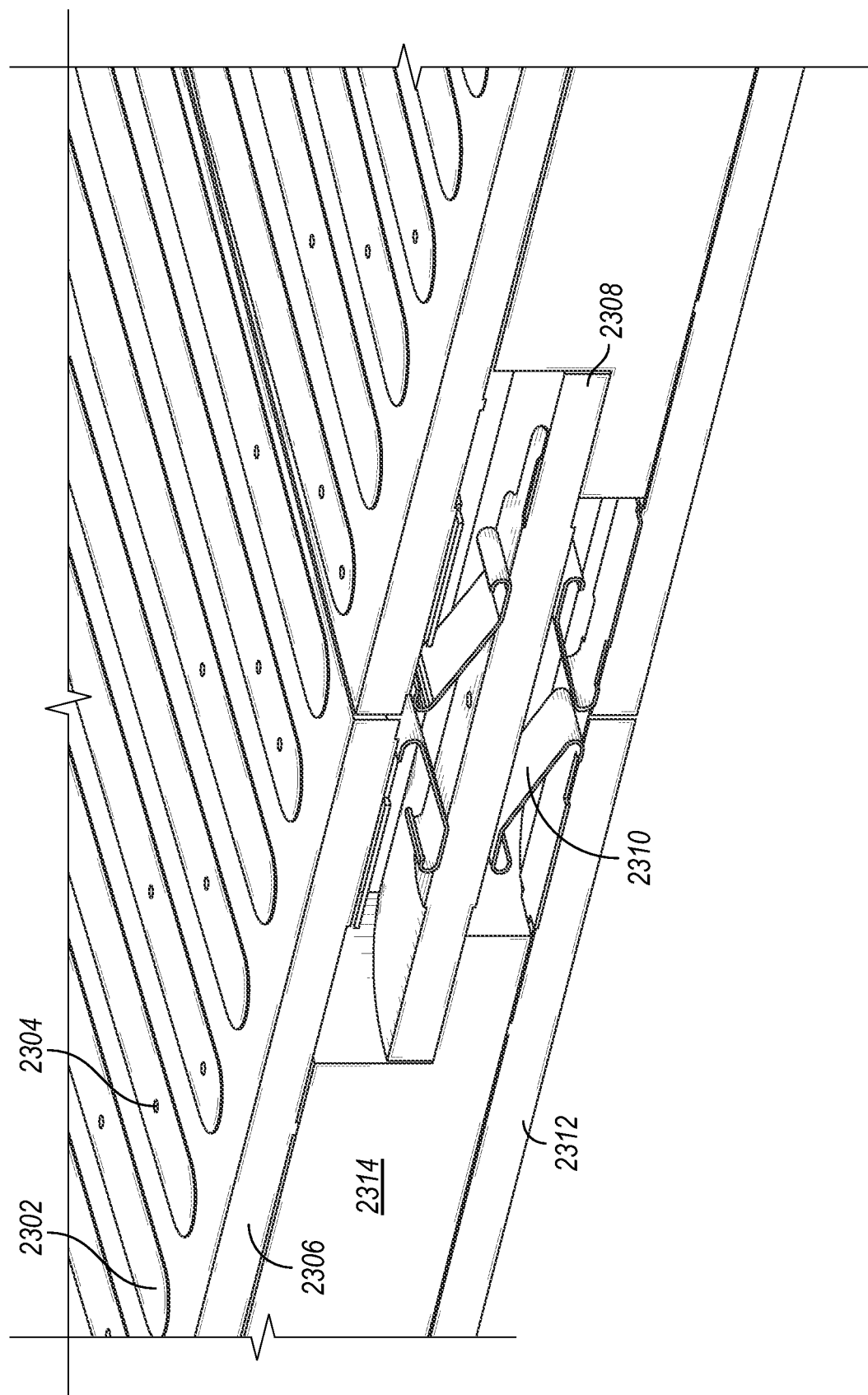
FIG. 23 is a schematic depiction of a system for an electrostatic motor.
Figure 29:
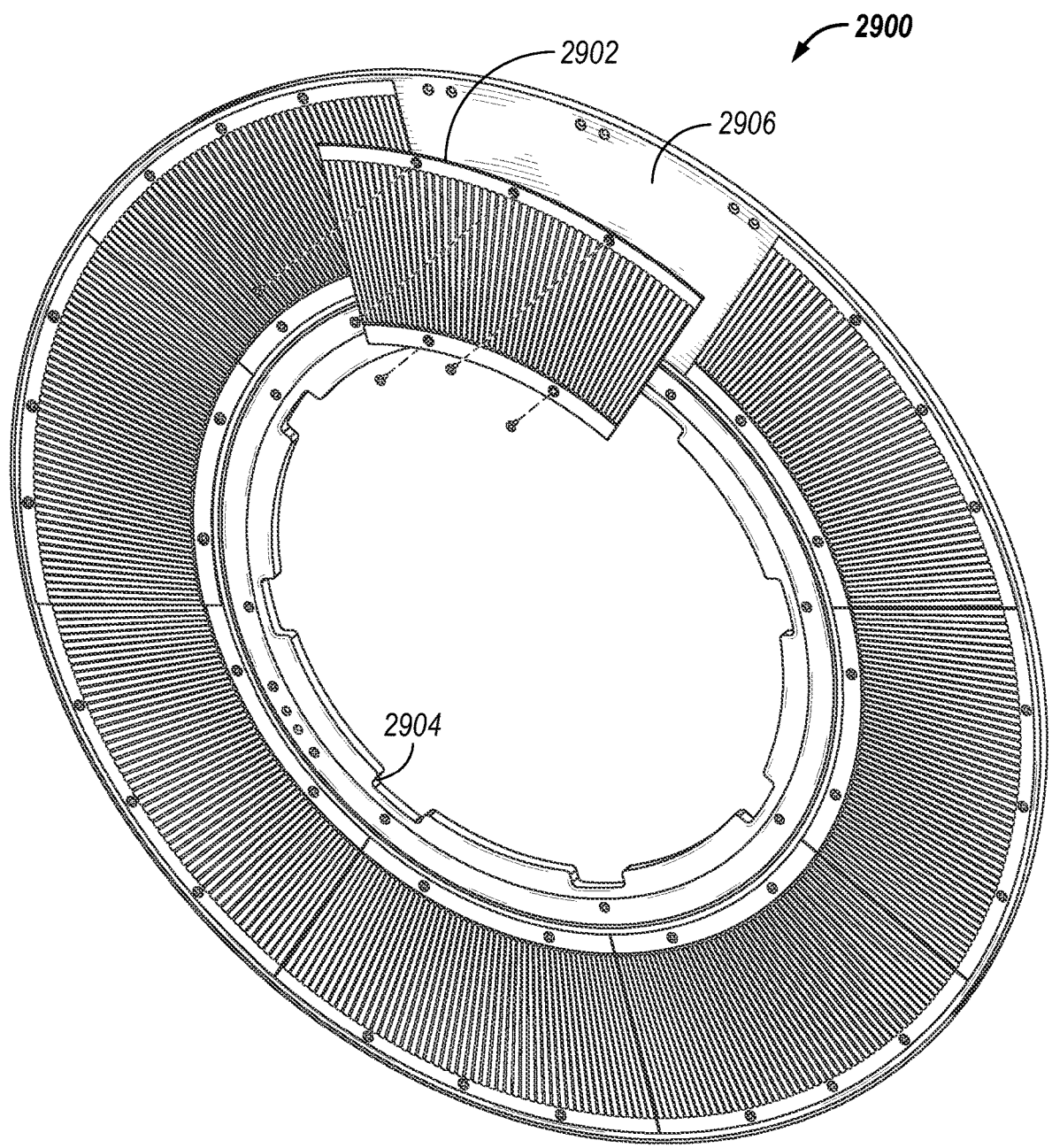
FIG. 29 is a schematic depiction of a system for an electrostatic motor.

Referencing FIG. 23, an example interconnect circuit between sides of a plate (e.g., a stator plate or a rotor plate) is depicted. The example of FIG. 23 depicts a first substrate 2306 having electrodes 2302 coupled thereto, and vias 2304 through the substrate that electrically couple electrodes 2302 to the other side of the substrate. The interconnect circuit includes compliant electrical couplings 2310 (conductive springs, in the example of FIG. 23) that each couple to an intermediate substrate 2308, thereby coupling electrodes from the first side (e.g., associated with substrate 2306) to electrodes from the second side (e.g., associated with substrate 2312). the intermediate substrate 2308 may be a printed circuit board, and/or a structural substrate having circuits coupled thereto. An intermediate structural substrate 2314 is depicted, with substrates 2306, 2312 attached thereto. The intermediate structural substrate 2314 may be provided as a material allowing some axial flexibility of the stator plate and/or rotor plate, allowing compliance for axial forces experienced by the plate. In the example of FIG. 23, the substrates 2306, 2312 are depicted in azimuthally divided sections (e.g., reference FIG. 29 and the related descriptions). The electrodes 2302 may be provided on a single substrate encompassing all of the electrodes 2302 for a given side of the rotor plate and/or the stator plate, and/or may be sectioned as depicted in FIGS. 23, 29.

Figure 24:
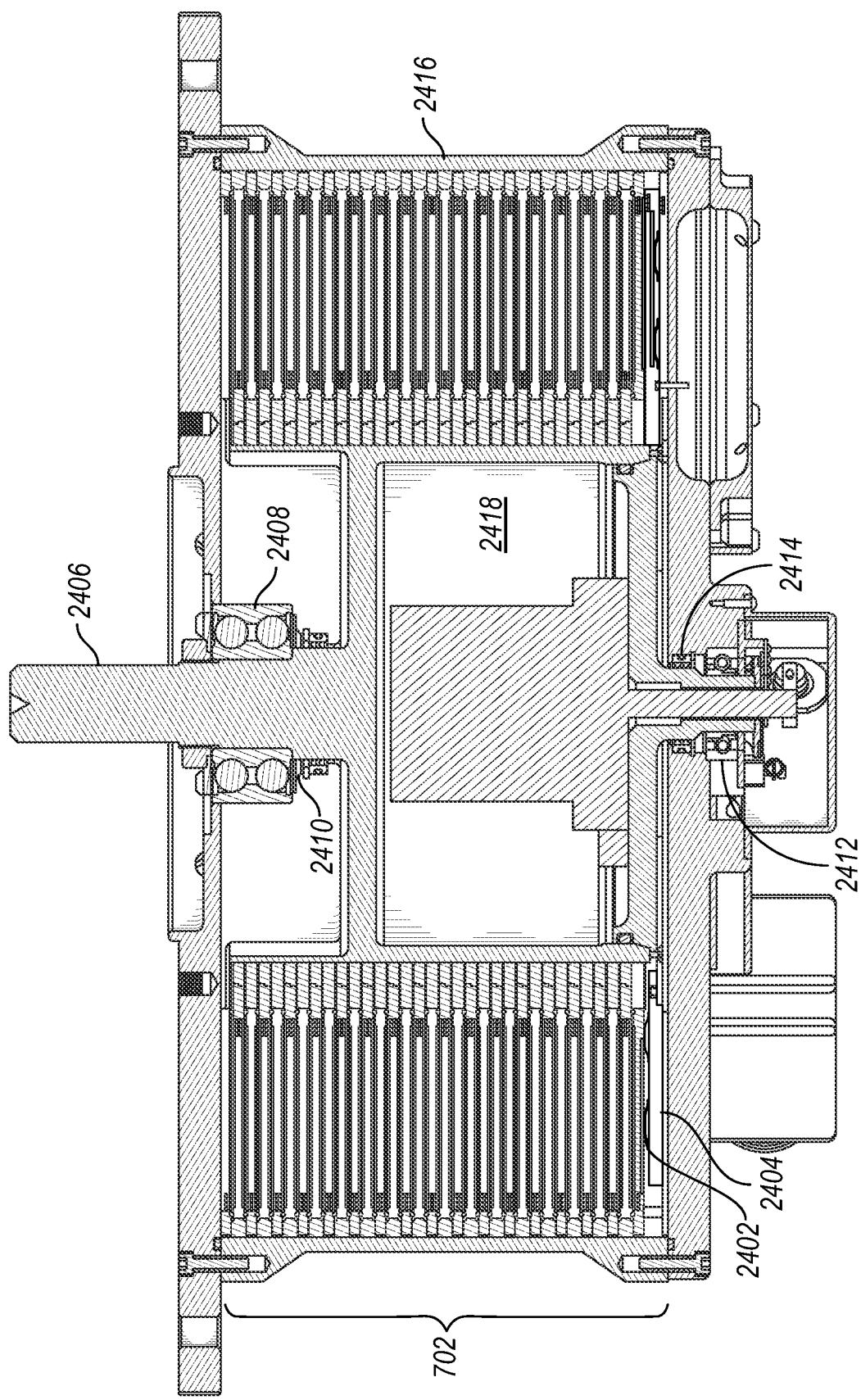
FIG. 24 is a schematic depiction of a system for an electrostatic motor.

Referencing FIG. 24, an example ESM is depicted in cutaway view, illustrating certain aspects of illustrative embodiments. The example ESM includes a shaft 2406 extending through a housing 2416 of the ESM, where the shaft 2406 engages a mechanical load at a first end, and accepts electrical coupling to an electrical source (e.g., a CSI, VSI, electrical storage device, and/or combinations of these) at either a second end or at the first end. In the example of FIG. 24, a hub area 2418 of the shaft is provided, providing room for power electronics (e.g., providing power to rotor plates) and/or providing an electrical coupling location for rotor plates. An example ESM provides electrical coupling to the rotor plates by electrical coupling that passes through the shaft 2406 and engages the rotor stack at a selected end of the capacitive stack 702, for example at a power distribution board for the rotor stack. An example ESM provides electrical coupling to the stator plates from an end plate of the housing, for example at a power distribution board for the stator stack. The coupling to the rotor stack and the stator stack may occur at a same end of the stack 702, or at opposite ends of the stack 702. In certain embodiments, the hub area 2418 includes a splined outer surface, allowing fixed rotational coupling of the rotor plates with a degree of freedom for axial movement of the rotor plates. In certain embodiments, the housing 2416 includes fins, tabs, a splined surface, or other coupling features for the stator plates. In certain embodiments, the housing 2416 provides for a degree of freedom for axial movement of the stator plates. Accordingly, the entire capacitive stack 702, and the individual elements thereof, can move axially during installation and operations of the ESM, allowing elements of the capacitive stack 702 to "settle" into a desired configuration during operations, which has been found to provide improved operations and controllability of the ESM.

The example ESM includes a biasing member 2402 that pre-loads the stack 702 with an axial force, and a wave spring 2404 that maintains a general axial position of the stack 702, with some movement of the stack 702 and of individual plates of the stack 702, during operations of the ESM. The order, positioning, and presence of the biasing members 2402 and wave springs 2404 is non-limiting.

The example ESM includes bearings 2408, 2412 for the shaft 2406, and seals 2410, 2414 associated with the bearings 2408, 2412. The seals retain the dielectric fluid in the housing, and are exposed to the dielectric fluid. Accordingly, seal materials are selected that are compatible with the dielectric fluid at operating temperatures of the ESM.

Figure 25:
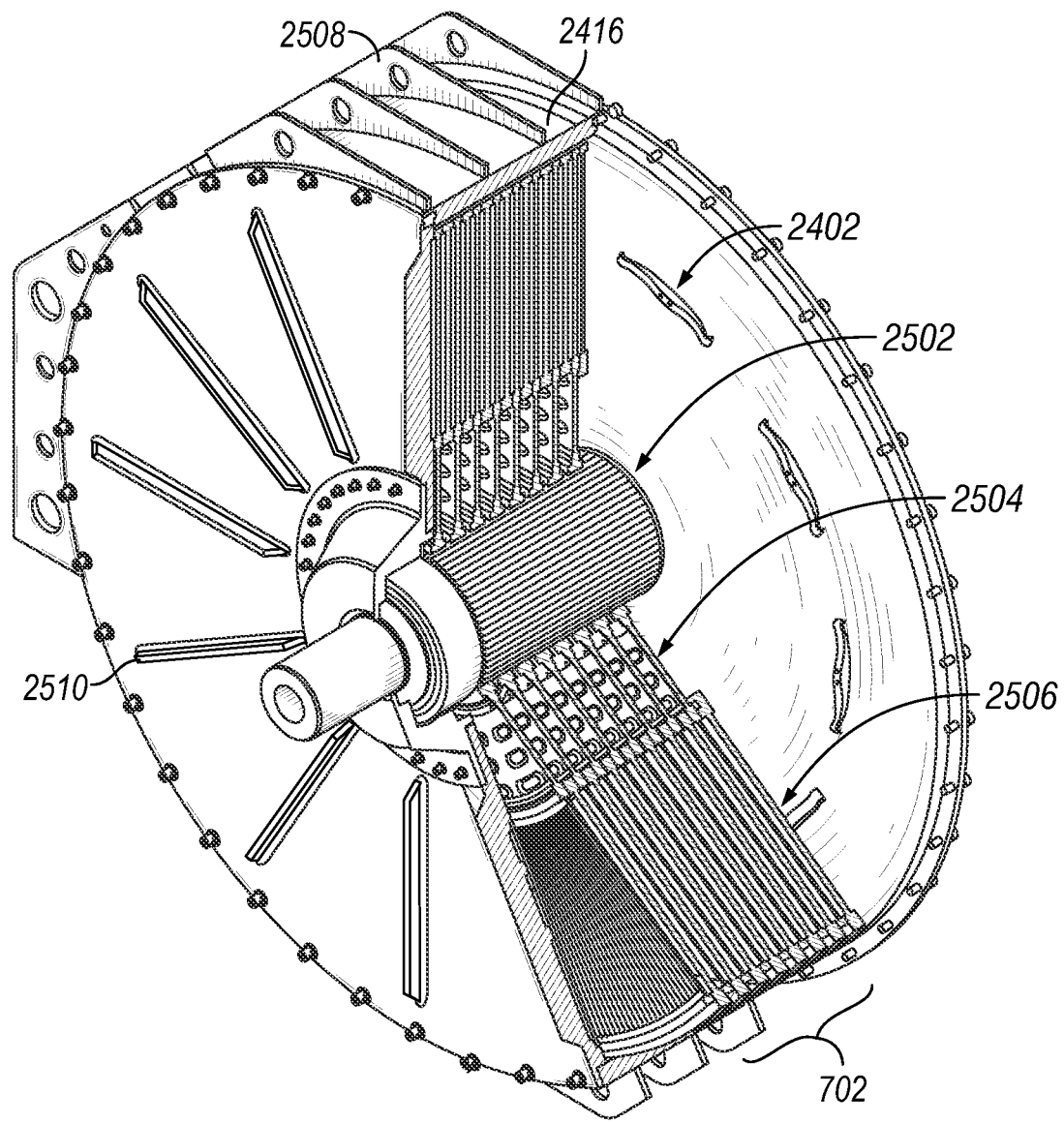
FIG. 25 is a schematic depiction of a system for an electrostatic motor.

Referencing FIG. 25, a cutaway perspective view of an example ESM is depicted, having a capacitive stack 702 positioned therein. The example ESM depicts the pre-load springs 2402, and a spline 2502 on the shaft for rotationally coupling the rotors 2504. The stators 2506 are coupled to the housing 2416. The housing 2416 in the example includes support ribs 2508 that may be included for structural integrity and/or desired heat transfer characteristics of the ESM. The example housing 2416 further includes end plate ribs 2510 that may be provided for stiffness, heat transfer adjustment, and/or to provide room within the housing for electrical coupling between electrical source(s) and/or plates of the capacitive stack 702. The depicted housing elements are a non-limiting example, and housing elements may be provided for structural support against axial, radial, or azimuthal forces, for desired heat transfer characteristics, and/or for desired fluid flow and/or mixing characteristics.

Figure 26:
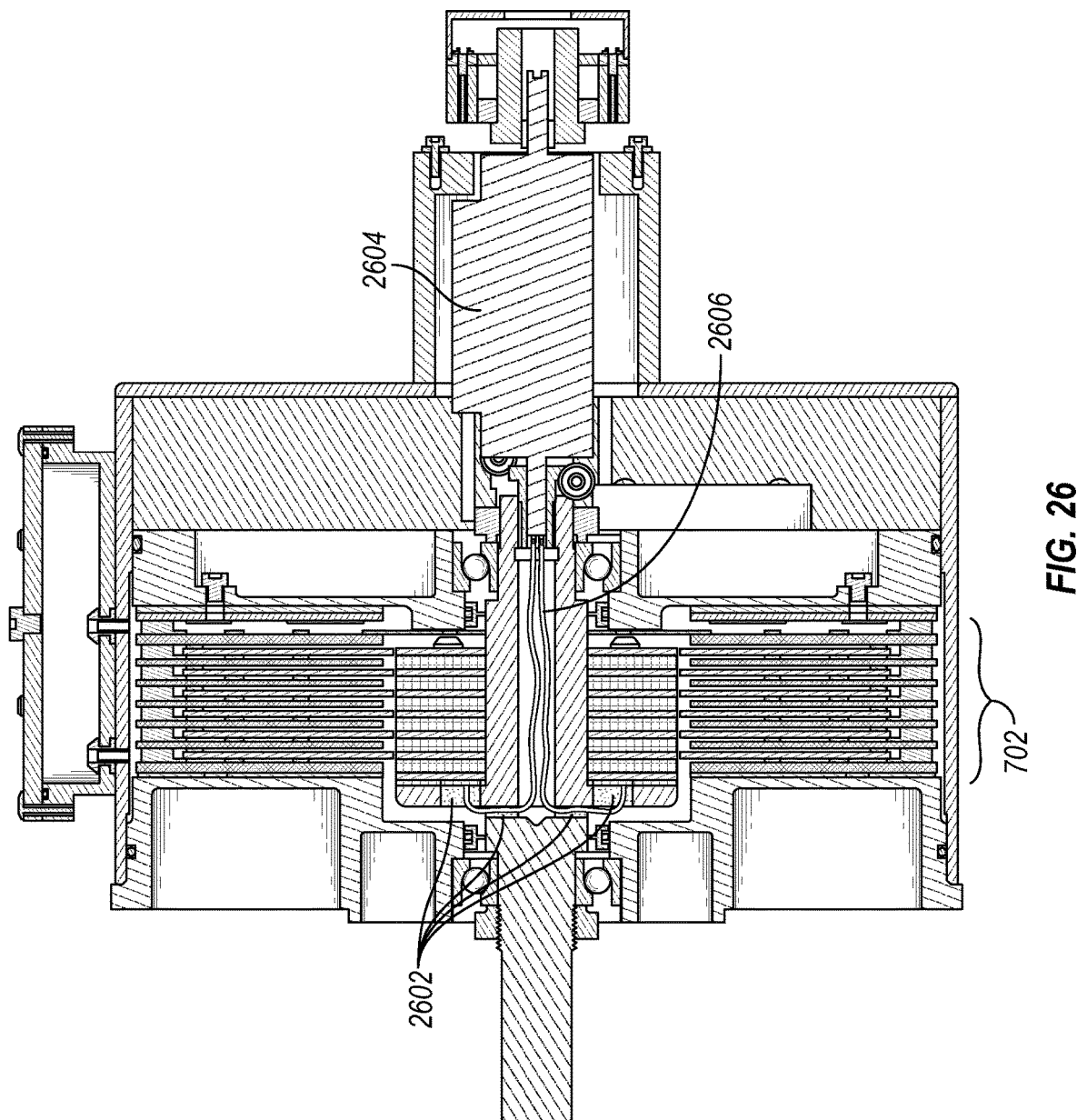
FIG. 26 is a schematic depiction of a system for an electrostatic motor.

Referencing FIG. 26, an example ESM is depicted in a side cutaway view. The example ESM includes high voltage excitation wires 2606 coupling a power source 2606 (e.g., a slip ring or non-contact power transfer component that passes excitation voltage from a non-rotating component to the rotating high voltage excitation wires 2606 powering the rotor electrodes). In the example of FIG. 26, power transfer from within the shaft to the rotor plates is protected by a potted connection 2602, where the potting includes a material (e.g., an epoxy) that is compatible with the dielectric fluid. In the example of FIG. 26, the power transfer is to a power distribution board for the rotor plates, which then distributes power sequentially down the rotor stack. The utilization of through-shaft power transfer 2606 allows for a reduction in the hub area 2418 around the shaft, thereby increasing an active area of the capacitive stack 702 (e.g., an active area where rotor electrodes and facing stator electrodes can add to the capacitive area of the stack 702), and increasing a power density and/or torque density of the ESM (e.g., available torque or power divided by the volume of the ESM).

Referencing FIG. 27, an example cutaway view of a stator plate (and/or a rotor plate) is schematically depicted. The example plate includes opposing substrates 2306, 2312 having electrodes 2302 positioned thereon, forming a part of the capacitive stack 702. The example plate includes an outer securing substrate 2702 having separation elements 208 positioned thereon. The example plate includes a securing notch 2704, for example to rotationally secure a stator plate to the housing. The securing notch 2704 may not be present on a rotor plate, and/or a stator plate may utilize a different securing mechanism. In certain embodiments, a notch 2704 may be present, but for another reason such as mechanical support, providing desired fluid flow characteristics, providing passage for electrical connections, or the like.

Figure 28:
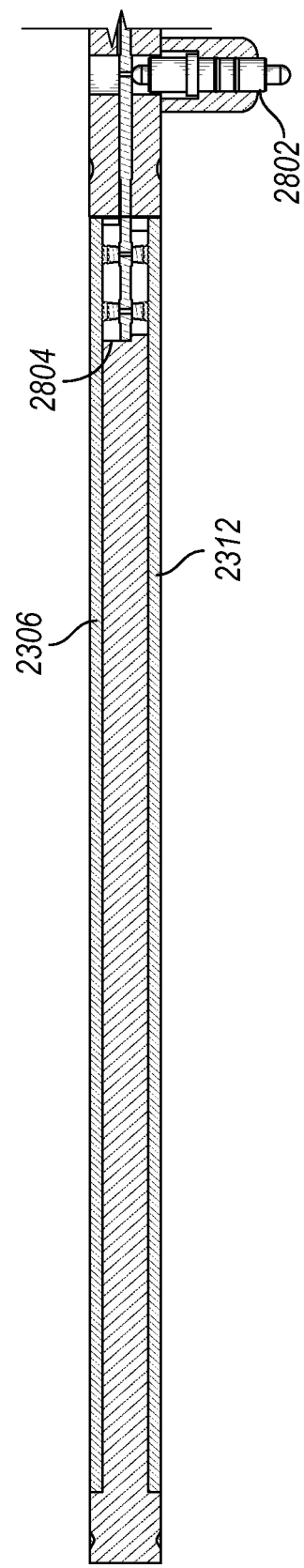
FIG. 28 is a schematic depiction of a system for an electrostatic motor.

Referencing FIG. 28, a schematic side cutaway view of a stator plate or a rotor plate is depicted. The example plate includes a compliant electrical connection 2802 that couples a power distribution board and/or an adjacent plate from the same stack (e.g., a first rotor plate to a second rotor plate, or a first stator plate to a second stator plate) to electrodes of the depicted plate. The compliant electrical connection 2802 is depicted as a pogo pin, but may be a compliant connection of any type. The example of FIG. 28 depicts a compliant connection 2804 within the plate, coupling the inlet power (e.g., through connection 2802) to the electrodes, and coupling the electrodes of each side to each other. The compliant connection 2804 may be provided with pogo pins, spring connections (e.g., reference FIG. 23), a wire ribbon, and/or any other compliant electrical connection.

Referencing FIG. 29, an example plate 2900 is depicted, that may be a rotor plate or a stator plate. The example of FIG. 29 depicts shaft engagement tabs 2904 on an interior circumference, which are consistent with embodiments of a rotor plate. The plate 2900 is divided into a number of azimuthal sections 2902 having electrodes thereon, allowing for the plate to be assembled by attaching selected sections 2902 to the plate substrate. The individual section 2902 are powered by vias through the board, for example to a power bus on a reverse side of the section 2902 and/or to a power bus on the plate substrate 2906, and/or combinations of these (e.g., certain sections 2902 powered through-plate, and other sections 2902 powered by section-section power busses or couplings). Accordingly, electrodes of the ESM can be replaced individually with a section, assembly of ESMs with varying capability can be created by changing a configuration of the sections, and/or sections 2902 of a given plate can have some individual axial compliance relative to each other, improving the operation and controllability of the ESM.

Figure 30:
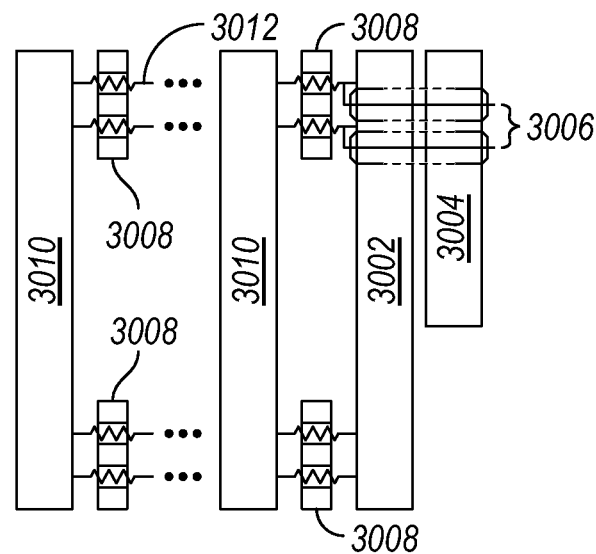
FIG. 30 is a schematic depiction of a system for an electrostatic motor.

Referencing FIG. 30, electrical coupling for a stator stack of an ESM is schematically depicted. The example electrical coupling includes terminals 3006 that are coupled to an electrical power source, such as a CSI and/or a VSI. The terminals 3006 may be provided at a housing end plate (not shown), and pass through an isolator 3004 before coupling with a power distribution board 3002 associated with the stator stack. The power distribution board includes a compliant coupling 3012 to a stator plate 3010 of the stator stack. The compliant coupling 3012 may be any type of compliant coupling, for example a pogo pin. In certain embodiments, the compliant coupling 3012 is protected by an insulating spacer 3008, for example to prevent exposure to the dielectric fluid, and/or to ensure that only desired electrical coupling is made within the ESM. The stator plate 3010 includes a power pass-through of the compliant coupling 3012 to a next stator plate 3010 using another compliant coupling 3012, and/or includes internal power pass-through (e.g., reference FIGS. 23 and/or 28) for coupling of electrodes on both sides of the stator plate 3010 to the inlet power. The example of FIG. 30 depicts coupling of a single power circuit, but a given ESM may use multiple phases for power, and/or parallel connections of one or more phases, according to the desired power profile for the ESM, the current ratings of circuits and/or components, and/or the desired dynamic behavior of the capacitive stack.

Figure 31:
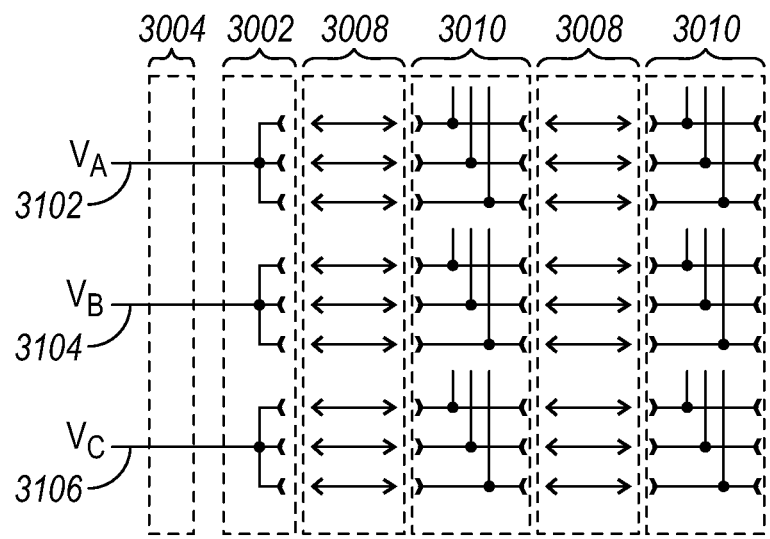
FIG. 31 is a schematic depiction of a system for an electrostatic motor.

Referencing FIG. 31, an example electrical schematic is depicted for a stator stack of an ESM. The example of FIG. 31 includes a coupling for each phase of three phases passing through the isolator 3004 to the power distribution board 3002, with three parallel paths 3102, 3104, 3106 utilized to manage current capacities and dynamic performance of the ESM. The example of FIG. 31 depicts the power distribution board 3002 passing power to a stator plate 3010 through a compliant electrical connection positioned within an insulating spacer 3008, where the electrical connections are distributed by phase and parallel power path to selected electrodes on the stator plate 3010. The power is then passed along to a next stator plate 3010, etc., until power coupling is made to each stator plate 3010 of the stator stack. The utilization of three phases is non-limiting, and any number of phases may be supported. The utilization of three parallel power supply connections is non-limiting, and any number of parallel power supply connections, or a single power supply connection, may be utilized.

Figure 32:
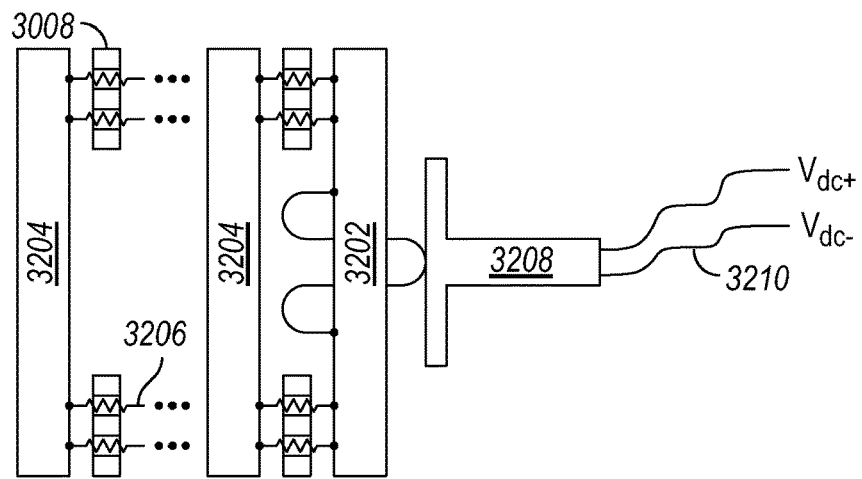
FIG. 32 is a schematic depiction of a system for an electrostatic motor.

Referencing FIG. 32, electrical coupling for a rotor stack of an ESM is schematically depicted. The example of FIG. 32 depicts the distribution of DC power 3210 to the rotor stack, utilizing a power coupling through the shaft 3208 to a power distribution board 3202 of the rotor stack. In the example of FIG. 32, the shaft 3208 and power distribution board 3202 are rotatably fixed, and the power coupling between the shaft 3208 and the power distribution board is therefore fixed. The power supply 3210 may be switched from a fixed circuit to a rotating circuit upstream (not shown) using a brushed (e.g., with a slip ring) or brushless power transfer, or as otherwise described in the present disclosure. An example brushless power transfer is positioned within the shaft, which may reduce the axial footprint of the ESM. The example of FIG. 32 includes compliant electrical connections 3206 from the power distribution board 3202 to a first rotor plate 3204, and then sequentially to each rotor plate 3204 of the rotor stack. As in FIG. 30, compliant electrical connections 3206 may be passed through an insulating spacer 3008, and may include pogo pins or other compliant electrical connections.

Figure 33:
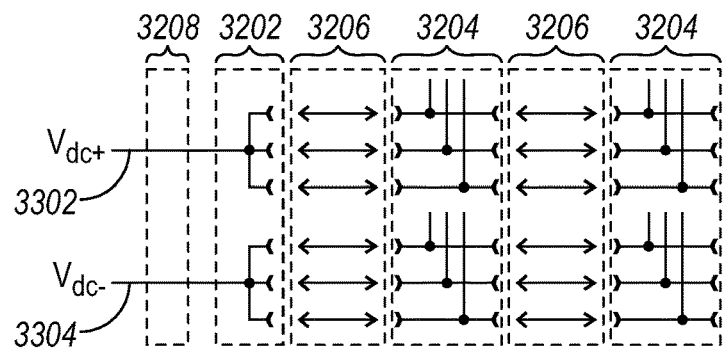
FIG. 33 is a schematic depiction of a system for an electrostatic motor.

Referencing FIG. 33, an example electrical schematic is depicted for a rotor stack of an ESM. The example of FIG. 33 includes a single phase and 3-parallel path high side voltage 3302, and a single phase 3-parallel path low side voltage 3304, that are distributed selectively to electrodes of the rotor stack. A given ESM can utilize any number of phases, and/or any number of parallel paths.

Figure 34:
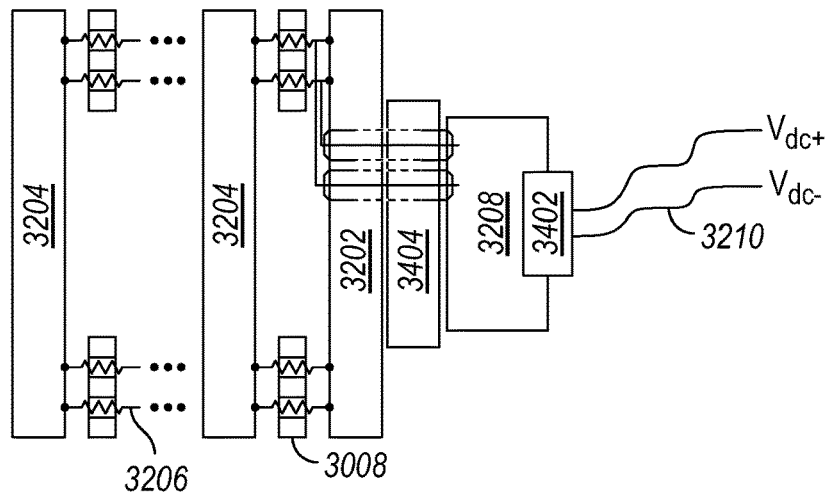
FIG. 34 is a schematic depiction of a system for an electrostatic motor.

Referencing FIG. 34, another embodiment for electrical coupling for a rotor stack of an ESM is schematically depicted. The example of FIG. 34 includes a stationary shaft portion 3402 (relative to the housing) and a rotating shaft portion 3208 that is rotationally coupled to the rotor plates 3204. The embodiment of FIG. 34 includes a power transfer, such as a brushless or brushed transformer, between the stationary shaft portion 3402 and the rotating shaft portion 3208. In the example of FIG. 34, an isolator 3404 defines the electrical connection between the rotating shaft portion 3208 and a power distribution board 3202 for the rotator stack. The isolator 3404 may be a potted connection, or another isolating device. The embodiment of FIG. 34 otherwise progresses to electrically couple the entire rotor stack in a manner similar to that depicted in FIG. 32.

Another example power transfer device includes a rectifier, positioned within the rotating shaft portion 3208, the stationary shaft portion 3402, and/or distributed between both. An example power transfer device includes an electrical transformation component that converts AC electrical power into DC electrical power through a rectification operation, such as with a half wave or full wave rectifier. An example power transfer device includes an electrical transformation component that converts voltages (e.g., stepping up or down) between the rotating shaft portion 3208 and the stationary shaft portion 3402 (and/or between an electrical power source/load and electrically coupled electrodes, through the power transfer device), which may include a voltage multiplier circuit. An example voltage multiplier circuit includes a Cockcraft-Walton circuit. An example voltage multiplier circuit additionally or alternatively includes a ladder of diodes and capacitors configured to perform rectification and/or voltage changes, and/or responsive to commands (e.g., excitation command values 6216) to perform selected rectification and/or voltage change operations.

Figure 35:
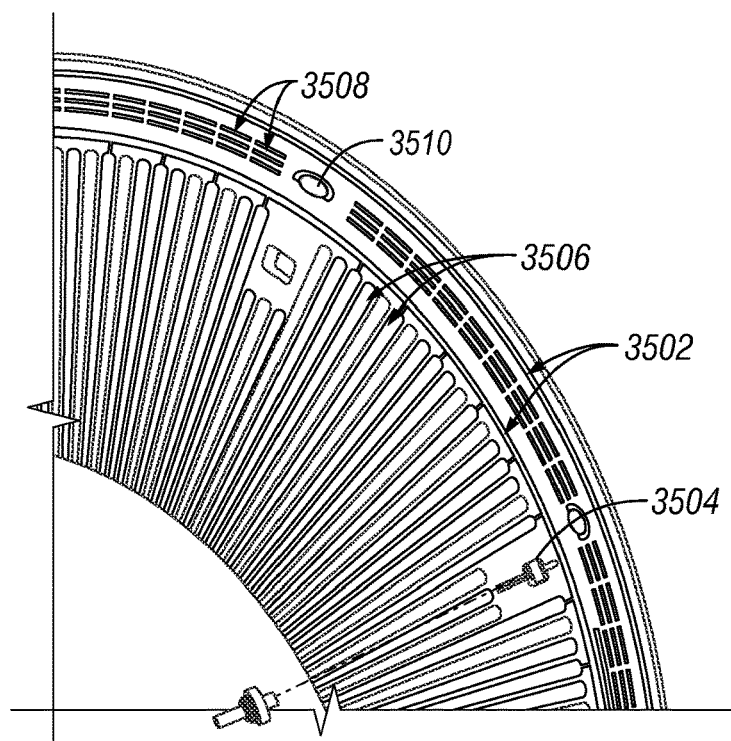
FIG. 35 is a schematic depiction of a system for an electrostatic motor.

Referencing FIG. 35, an example cutaway view of a portion of an example stator plate is depicted. The example stator plate includes number of power buses 3502 providing power from selected phases and/or parallel power paths to selected electrodes of the stator plate. The example stator plate further includes mechanical pads 3508 and rotating elements 3504 that cooperate to enforce a minimum separation distance between electrodes of the stator plate and an adjacent rotor plate. The example of FIG. 35 further depicts a number of vias providing electrical connections between electrodes on a first side of the stator plate and electrodes on the second side of the stator plate. Power connections between stator plates may be provided, for example at a pass through location such as 3510, or as otherwise provided (not shown) on the stator plates.

Figure 36:
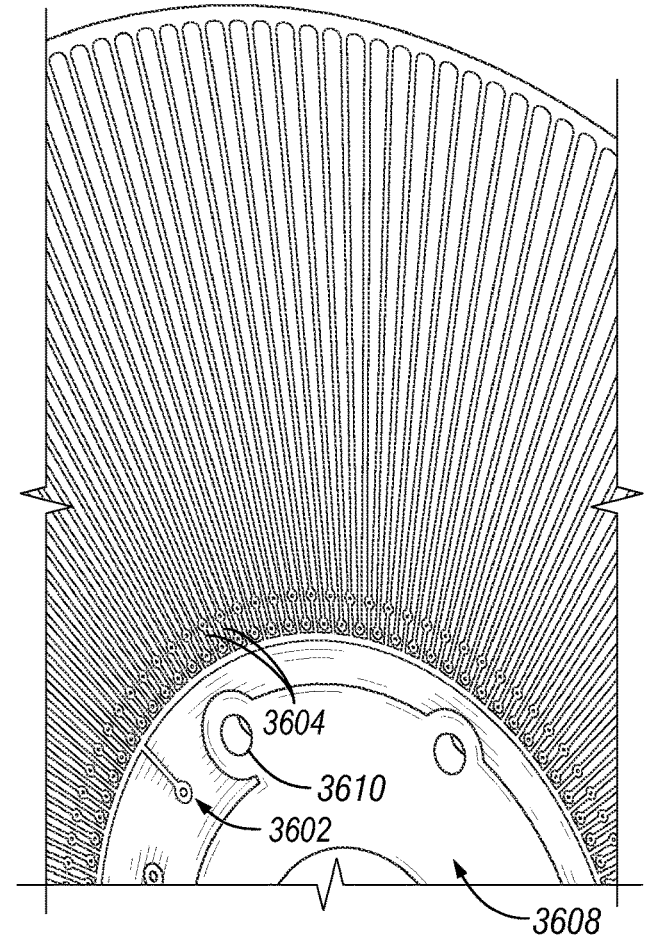
FIG. 36 is a schematic depiction of a system for an electrostatic motor.

Referencing FIG. 36, an example cutaway view of a portion of an example rotor plate is depicted. The example rotor plate includes a number of power buses 3602 providing power from selected phases and/or parallel power paths to selected electrodes of the rotor plate. The example rotor plate further includes a mechanical pad 3608 that enforces a minimum separation distance between electrodes of the rotor plate and an adjacent stator plate. The mechanical pad 3608 of the rotor plate may additionally cooperate with separation features of the stator plate to enforce the minimum separation distance. The example of FIG. 36 further depicts a number of vias providing electrical connections between electrodes on a first side of the rotor plate and electrodes on the second side of the rotor plate. Power connections between rotor plates may be provided, for example at a pass through location such as 3610, or as otherwise provided (not shown) on the rotor plates.

Figure 37:
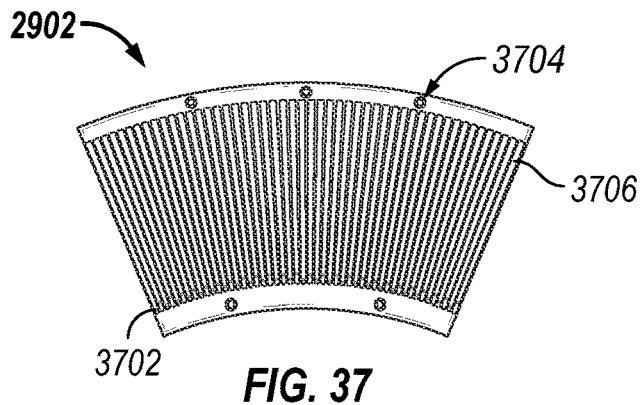
FIG. 37 is a schematic depiction of a system for an electrostatic motor.
Figure 38:
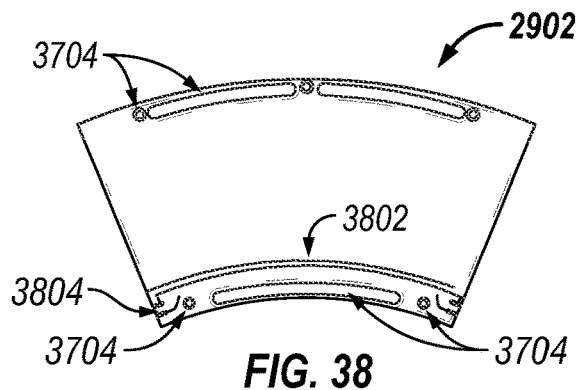
FIG. 38 is a schematic depiction of a system for an electrostatic motor.

Referencing FIG. 37, an example schematic view of an azimuthal portion 2902 of a rotor plate is depicted. The example rotor plate includes a number of electrodes 3706 and vias 3702 for electrical coupling of electrodes to selected electrical phases and/or parallel power paths. The example azimuthal portion 2902 includes mechanical pads 3704 that enforce a minimum separation distance between electrodes of the rotor plate and electrodes of an adjacent stator plate. Referencing FIG. 38, an example schematic view of the azimuthal portion 2902 of the rotor plate is depicted, consistent with aspects of the azimuthal portion 2902 depicted in FIG. 37. The example of FIG. 38 includes mechanical pads 3704 on the second side, for example to enforce separation between rotor electrodes on each side of the rotor plate, and power busses 3804 providing for power progression between sections 2902 of the rotor plate. The example of FIG. 38 further includes a power distribution bus 3802 providing power coupling between phases and/or parallel power paths, between rotor plates, and/or between electrodes alternatively to the busses 3804 between sections.

Figure 39:
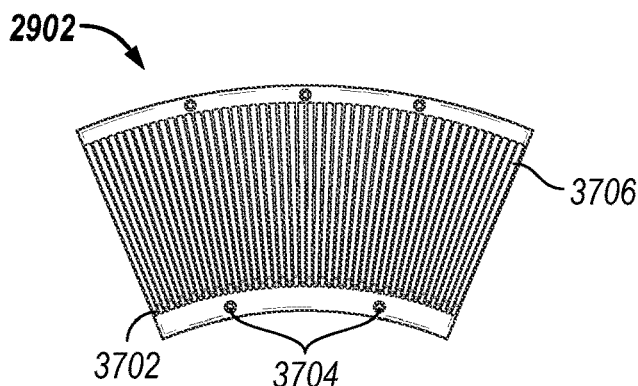
FIG. 39 is a schematic depiction of a system for an electrostatic motor.
Figure 40:
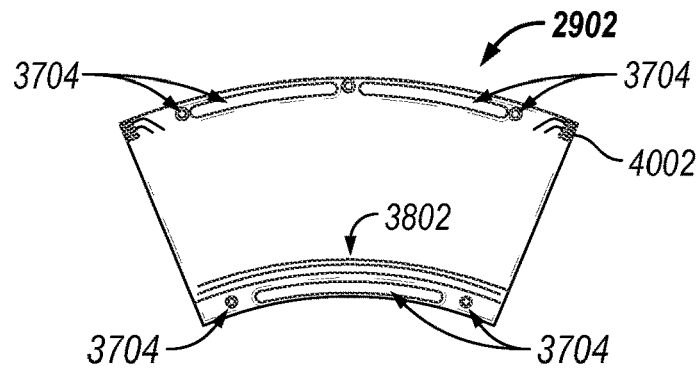
FIG. 40 is a schematic depiction of a system for an electrostatic motor.

Referencing FIG. 39, an example schematic view of an azimuthal portion 2902 of a stator plate is depicted. The example stator plate includes a number of electrodes 3706 and vias 3702 for electrical coupling of electrodes to selected electrical phases and/or parallel power paths. The example azimuthal portion 2902 includes mechanical pads 3704 that enforce a minimum separation distance between electrodes of the stator plate and electrodes of an adjacent rotor plate. Referencing FIG. 40, an example schematic view of the azimuthal portion 2902 of the stator plate is depicted, consistent with aspects of the azimuthal portion 2902 depicted in FIG. 39. The example of FIG. 39 includes mechanical pads 3704 on the second side, for example to enforce separation between stator electrodes on each side of the stator plate, and power busses 4002 providing for power progression between sections 2902 of the stator plate. The example of FIG. 40 further includes a power distribution bus 3802 providing power coupling between phases and/or parallel power paths, between stator plates, and/or between electrodes alternatively to the busses 4002 between sections.

Figure 41:
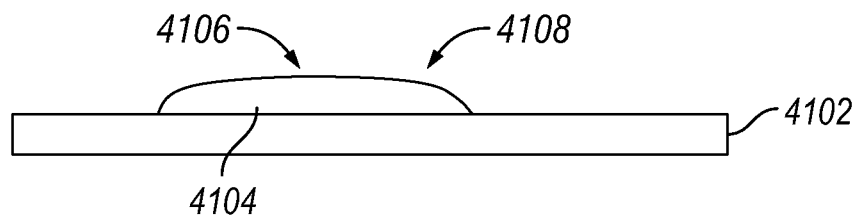
FIG. 41 is a schematic depiction of a system for an electrostatic motor.

Referencing FIG. 41, an example electrode 4104 coupled to a substrate 4102 is depicted schematically. The example electrode 4104 may be an electrode for a rotor plate or a stator plate, and is depicted schematically from a side view to illustrate certain aspects of the present disclosure. The electrode 4104 includes a face 4106 that faces an opposing electrode (not shown), forming a capacitive gap as described herein. In certain embodiments, the gap is filled with a high permittivity fluid, such as a dielectric fluid, promoting the ability to form a high voltage electric field with a small gap distance, thereby providing for a high capacitive energy storage for the ESM. The example face is a polished face, providing for a smooth surface of the facing electrodes. It has been found that a high surface smoothness of the electrodes reduces the tendency of the fluid to experience a localized breakdown, for example due to local charge collection on an electrode, and/or due to variability in the gap distance due to extending imperfections of the electrode surface. In certain embodiments, polishing is performed on a closest facing surface of the electrode, and/or on an entire exposed surface of the electrode.

In certain embodiments, polishing is performed on a surface of the substrate 4102, and/or on a portion of the surface of the substrate 4102 in proximity to the electrode. In certain embodiments, polishing is performed on an inner surface of a housing of the ESM. In certain embodiments, polishing of selected surfaces may be performed to provide a roughness of less than Ra=10 microns. In certain embodiments, polishing of selected surfaces may be performed to a selected ISO roughness grade number, such as N10 or N9. In certain embodiments, polishing of an electrode surface facing the gap (e.g., face 4106) is performed to one roughness standard, and polishing of related surfaces such as other surfaces of the electrode and/or substrate surface near the electrode is performed to another (typically a lower smoothness, or higher roughness) standard. An example polished surface includes a roughness not exceeding an ISO N10 roughness grade, not exceeding an ISO N9 roughness grade, and/or a roughness of less than Ra=30 microns. An example polished surface includes a roughness of less than Ra=1 micron. An example polished surface includes a roughness not exceeding an ISO N11 roughness grade, not exceeding an ISO N6 roughness grade, a roughness grade between an ISO N1 to an ISO N6 roughness grade (inclusive), and/or a roughness grade between an ISO N7 to an ISO N11 roughness grade.

The example electrode 4104 includes a surface progression 4108 between the face 4106 and the electrode 4104 portion engaging the substrate 4102. It has been found that sharp corners of the electrode 4104 promote breakdown of the fluid in the gap, by providing for a charge collection zone, and/or a sharp surface feature to initiate a gap breakdown. In certain embodiments, a curvature of the surface progression 4108 is kept above a threshold value (e.g., a minimum radius of curvature is enforced, or the curvature is not allowed to get too "sharp"), providing for increased resistance to gap breakdown. In certain embodiments, a surface progression 4108 that is rounded and avoids a sharp geometric break between surfaces (e.g., the face 4106 and a side of the electrode) is sufficient to avoid gap breakdown during varying operating conditions. In certain embodiments, a curvature of the surface progression 4108 is limited to be maintained above a threshold curvature value (e.g., a 10 μm radius minimum curvature, and/or a minimum curvature having a radius between 10 μm and 100 μm). In certain embodiments, the curvature of the surface progression 4108 is limited closer to the face 4106, and is allowed to become sharper closer to the substrate 4102 (e.g., as the progression is further displaced from an opposing electrode). In certain embodiments, curvature of an end of the electrodes (e.g., a radially inward most and/or radially outward most extend of the electrode) is similarity limited, for example to prevent gap breakdown in those regions. For example, reference FIG. 21 depicting electrodes having a rounded end geometry at an outer radial extent when viewed axially.

Figure 42:
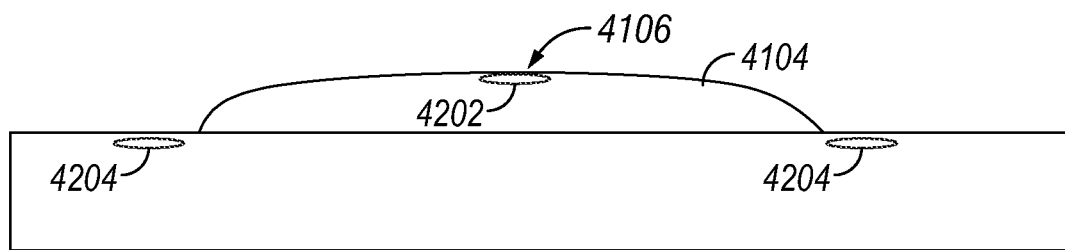
FIG. 42 is a schematic depiction of a system for an electrostatic motor.

Referencing FIG. 42, an example electrode 4104 coupled to a substrate 4102 is depicted schematically. The example electrode may include surface progression 4108 as depicted in FIG. 41, and/or may be a separate device having features as described, without the surface progression 4108 of FIG. 41. In the example of FIG. 42, conductive particles are included on a surface of the electrode (e.g., treated region 4106). A surface treatment may be provided, additionally or alternatively, on other surfaces such as an inner surface of a housing, on material (e.g., a packed bed) in a side flow, eddy region, and/or other designed flow area. The inclusion of a surface treatment, such as conductive particles, may promote a more even distribution of charge across the electrode, and/or adjust (e.g., reduce) a field strength in the vicinity of the electrode, increasing the electric field of the gap that can be applied before a gap breakdown occurs. A surface treatment, and/or a coating, may support the physical integrity of the surface (e.g., protecting from thermal and/or electrochemical breakdown, and/or preserving a smoothness of the surface), inhibiting the injection of charge carriers into the dielectric fluid. A surface treatment, and/or a coating, may preserve a designed field trajectory (which may additionally or alternatively be understood to be an adjustment of the field trajectory) in the presence of injected charge carriers, and/or may beneficially utilize injected charge carriers to promote a designed field trajectory.

The treated region 4106 may include a conductive material and/or a field adjusting material deposited on the electrode (or other surface), and/or formed integrally with the electrode, and may include a material such as Cu, Ag, Au, Rh, Ni, Pt, Pd, Os, W, Pb, Ti, Al, stainless steel, alloys of any of the foregoing, or a semi-conducting polymer. In certain embodiments, any material that is more conductive than a substrate material of the electrode (e.g., fiberglass, plastic, glass, etc.) may be utilized for the treated region 4106, and/or any material that maintains a higher conductivity during use—for example, a material that does not oxidize or degrade as quickly as the substrate material. The amount of treating material, and the arrangement of the treating material, may be selected to prevent charge concentrations on the surface of the electrode, and may include a closest facing portion of the electrode and/or surrounding regions.

In certain embodiments, a substrate 4102 where the electrode 4104 is fixed may additionally or alternatively include a treated region 4204, which may utilize the same or a distinct treating material. For example, a treated region 4202 may utilize a material that is more conductive than the electrode 4104, and treated region 4204 may utilize a material that is more conductive than the substrate 4102, and/or more conductive than the electrode 4104. The utilization of one or more treated regions, alone or combined with a selected surface progression 4108, promotes a higher charge capability for the ESM, increasing torque density and/or power density of the ESM.

A surface treatment, as utilized herein, may be provided by any operations understood in the art, including, for example, depositing material on the selected surface and/or embedding material into an upper layer of the treated surface (e.g., electroplating, vapor phase deposition, diffusion, etc.). An example surface treatment may be provided by configuring constituents of an outer layer of the target surface, for example by overmolding with a material having a selected composition, providing a treated surface as a laminate, composite layer, or the like. In certain embodiments, a surface treatment and a coating may be similar, and/or both may be provided in a given region, where, according to the nomenclature utilized and without limitation to the present disclosure, a surface treatment may be an under layer, and a coating may be provided over the surface treatment. In certain embodiments, a coating is provided utilizing similar operations as recited for providing a surface treatment.

Figure 43:
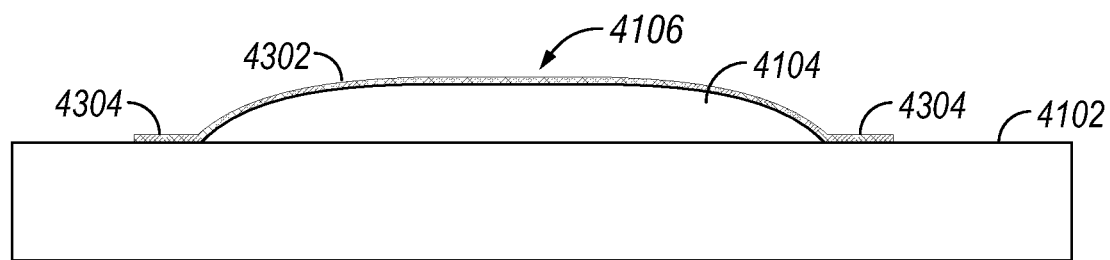
FIG. 43 is a schematic depiction of a system for an electrostatic motor.

Referencing FIG. 43, an example an example electrode 4104 coupled to a substrate 4102 is depicted schematically. The example electrode 4104 includes a surface coating 4302, which may be positioned over the entire electrode, over the face 4106 of the electrode, and/or over specified regions of the electrode (e.g., curved portions, corners, and/or charge collection or gap breakdown risk regions). An example surface coating 4302 includes a dielectric material having both a lower dielectric constant and a lower resistivity than the dielectric fluid. An example surface coating 4302 minimizes or reduces electrochemical reactions, reducing electrical conduction within the dielectric fluid, while attenuating the electric field in the gap. In certain embodiments, the surface coating 4302 may be a field management coating. The utilization of the surface coating 4302, and/or the surface coating 4302 combined with other features (e.g., a treated region 4204, selected surface progression 4108, and/or dielectric material positioned between electrodes on the rotor and/or stator plate) allows for an increase of electrostatic pressure across the gap, thereby increasing the available torque, power density, and/or energy efficiency of the ESM. The surface coating 4302 may be combined with the treated region 4204 and/or the selected surface progression 4108, and/or may be provided alone. An example surface coating, which may be provided as a field management coating, includes a conductive polymer. An example surface treatment and/or coating includes a treatment and/or coating configured to reduce a friction within the housing (e.g., reducing fluid viscosity losses, torsional stresses, wear on electrodes and/or surfaces, etc. for the ESM and/or capacitive stack 702).

The example of FIG. 43 further includes a second surface coating 4304 provided on the substrate 4102 in the region of the electrode 4104. The second surface coating 4304 may be the same material, or a distinct material, from the surface coating 4302. The utilization of the surface progression 4108, the treated region 4204, and/or the surface coating 4106 promote a uniform charge distribution on the electrode 4104, and an increase in the field strength that can be applied before a gap breakdown occurs.

In certain embodiments, the second surface coating 4304 and/or an additional surface coating (not shown) includes a dielectric material and/or an insulating material positioned between electrodes of the rotor and/or stator. The provision of a dielectric material (and/or insulating material) between the electrodes pulls charge away from the corners of the associated electrodes, allowing for an increase in the overall voltage while reducing a likelihood of breakdown (e.g., discharge across the gap). Without limitation, the dielectric material (and/or insulating material) may be provided between specific electrodes, for example electrodes from independently excitable groups of electrodes, and/or electrodes having distinct excitation characteristics (e.g., differing charge signs, phase values, voltages, etc.).

In certain embodiments, the surface coating 4302, treated region(s) 4204, and/or second surface coating(s) 4304 may be selected according to a type of charge and distribution on the electrode. For example, in certain embodiments, certain rotor electrodes may be configured to operate with a negative DC voltage under selected operating conditions, or during all operating conditions, and other rotor electrodes may be configured to operate with a positive DC voltage under selected operating conditions, or during all operating conditions. Accordingly, breakdown management features such as the coatings 4302, 4304, treated regions 4204, and/or surface progression 4108 may be configured specifically for the type of breakdown, space charge injection, electrochemical effects, or the like that are most likely to occur based on the specific type of charge and distribution for those electrodes. Without limitation to any other aspect of the present disclosure, the coatings 4302, 4304, treated regions 4204, and/or surface progression 4108 may vary between electrodes, whether responsive to the type of charge and distribution on those electrodes, or other considerations related to the electrodes (e.g., the physical environment of the rotor and/or stator plate, including operating temperature, fluid shear, rotational forces, etc.; manufacturing considerations for the electrode and/or associated rotor and/or stator plate; gap variance profile for the electrode and/or associated rotor and/or stator plate; and the like).

An example surface coating 4302, 4304, and/or treated region 4204 (e.g., including the treated substrate such as electrode and/or electrode substrate surface, in combination with the surface treatment) is prepared in accordance with a first design equation $(\varepsilon_1 * x_2)/(\varepsilon_2 * x_1) >= 1$, where $\varepsilon_1$ is the complex permittivity of the coating (and/or effective complex permittivity of the treated surface), $\varepsilon_2$ is the complex permittivity of the dielectric liquid, $x_1$ is the coating thickness (and/or treated surface effective thickness), and $x_2$ is the liquid gap distance. Under a DC boundary condition, the first design equation reduces to $(\sigma_1 * x_2)/(\sigma_2 * x_1)$, where $\sigma_1$ is the conductivity of the coating (and/or effective conductivity of the treated surface), $\sigma_2$ is the conductivity of the dielectric liquid, $x_2$ is the coating thickness (and/or treated surface effective thickness), and $x_1$ is the liquid gap distance. Under an AC boundary condition, the first design equation reduces to $(\varepsilon_{r1} * x_2)/(\varepsilon_{r2} * x_1) >= 1$, where $\varepsilon_{r1}$ is the relative permittivity of the coating (and/or effective relative permittivity of the treated surface), and $\varepsilon_{r2}$ is the relative permittivity of the dielectric liquid. The utilization of the coatings 4302, 4304, treated regions 4204, and/or surface progression 4108 can be utilized to provide up to about 4× the specific torque (e.g., per unit area of the capacitive stack) of previously known configurations.

An example field management coating is configured such that $\beta1>\beta2$, where $\beta1$ is a permittivity (e.g., a complex permittivity) of the dielectric material divided by a thickness of the coating ($\varepsilon_1/x_1$), and where $\beta2$ is a permittivity of the dielectric fluid divided by a distance of the gap ($\varepsilon_2/x_2$). In certain embodiments, an ESM includes an excitation circuit that provides AC excitation energy to a stator electrode (and/or another AC excited electrode), and where the field management coating is configured such that $\beta1>\beta2$, where $\beta1$ is a relative permittivity of the dielectric material divided by a thickness of the coating ($\varepsilon_{r1}/x_1$)/and where $\beta2$ is a relative permittivity of the dielectric fluid divided by a distance of the gap ($\varepsilon_{r2}/x_2$). An example ESM includes an excitation circuit that provides DC excitation energy to a rotor electrode (and/or another DC excited electrode), and where the field management coating is configured such that $\beta1>\beta2$, where $\beta1$ is a relative conductivity of the dielectric material divided by a thickness of the coating ($\sigma_1/x_1$)/and where $\beta2$ is a relative permittivity of the dielectric fluid divided by a distance of the gap ($\sigma_2/x_2$). An example field management coating includes the dielectric material having either a higher or lower dielectric constant than the dielectric fluid, and/or a higher or lower conductivity than the dielectric fluid. It can be seen that a favorable or unfavorable permittivity/conductivity profile of the dielectric material can be managed by adjusting a thickness of the field management coating. As with surface coatings generally throughout the present disclosure, the field management coating may vary between electrodes, whether responsive to the type of charge and distribution on those electrodes, or other considerations related to the electrodes (e.g., the physical environment of the rotor and/or stator plate, including operating temperature, fluid shear, rotational forces, etc.; manufacturing considerations for the electrode and/or associated rotor and/or stator plate; gap variance profile for the electrode and/or associated rotor and/or stator plate; and the like). In certain embodiments, the field management coating and/or surface treatment is provided in a non-uniform configuration, including by design (e.g., heterogenous distribution of a treatment or coating for different electrodes, across the surface of a given electrode, areally distributed and/or having a varying depth of penetration for a surface of the electrode and/or substrate in the vicinity of the electrode). Accordingly, in certain embodiments, the parameters for the permittivity ($\varepsilon$), conductivity ($\sigma$), relative permittivity ($\varepsilon_r$), and/or length (x, e.g., a distance of the gap and/or thickness of the coating or treated area) may be determined as bulk parameters, for example averaging values over a selected region, etc.

An example field management coating includes a dialytic coating structured to capture at least one ion contaminant. The dialytic coating may be configured to capture and/or precipitate (e.g., whereby the precipitate is settled, captured, etc.) an ion of interest, and/or a group of ions of interest, for example an ion generated by electrochemical interactions between the dielectric fluid, a constituent of the ESM (e.g., a plate substrate, electrode material, coating material, surface treatment material, bearing material, seal material, potting material (e.g., reference FIG. 26), housing material, etc.) In certain embodiments, a dialytic coating may include a combination of ion capture materials, for example to capture a profile of ions likely to present in the dielectric fluid during the operating life of the ESM. In certain embodiments, the dialytic coating may capture ions through any mechanism, including at least adsorption, electrodialysis, chelation, and/or any other mechanism. In certain embodiments, the dialytic coating may be provided on an electrode and/or in the vicinity of an electrode. In certain embodiments, a dialytic coating may be provided elsewhere in the ESM, for example in a separate flow chamber or path (e.g., an eddy portion of the housing), for example with fluid circulation therethrough (e.g. similar to a packed bed and pumping operation, such as described in the description referencing FIG. 96) and in at least selective fluid communication with a main dielectric fluid chamber including the capacitive stack 702. Utilization of a separate flow chamber, path, or eddy may facilitate removal of consumed dialytic material, precipitates, and the like, away from the main chamber where they may be reintroduced into the dielectric fluid. In certain embodiments, the dialytic coating is provided on the electrodes and/or plates, for example where consumption of dialytic material and/or generation of precipitates has a low enough rate for the dialytic coating to last the life cycle of the ESM, and/or to be reasonably serviced as a maintenance and/or serviceable component of the ESM. Additionally or alternatively, the dialytic coating may treat generated ions that do not accumulate over the operating life of the ESM, for example initially produced constituents that are generated during an early portion of the ESM life cycle (e.g., during a break-in period).

An example surface treatment and/or coating includes a space charge injection manager. Control of space charge injection may be performed by any operations described herein, including promoting a more even distribution of charge across the electrode, adjusting (e.g., reducing) a field strength in the vicinity of the electrode, supporting the physical integrity of the surface (e.g., protecting from thermal and/or electrochemical breakdown, and/or preserving a smoothness of the surface), thereby inhibiting the injection of charge carriers into the dielectric fluid. An example space charge injection manager preserves a designed field trajectory (which may additionally or alternatively be understood to be an adjustment of the field trajectory) in the presence of injected charge carriers, and/or may beneficially utilize injected charge carriers to promote a designed field trajectory. An example space charge injection manager promotes the elimination and/or deactivation of a charge carrier that has been injected into the dielectric fluid. An example space charge injection manager includes boron nitride, for example provided as a surface treatment and/or a coating as described herein. An example space charge injection manager includes one or more materials such as: Cu, Ag, Au, Rh, Ni, Pt, Pd, Os, W, Pb, Ti, Al, stainless steel, alloys of any of the foregoing, or a semi-conducting polymer. An example space charge injection manager includes a first surface treatment (and/or coating) provided on at least a portion of an exposed surface of a first electrode (e.g., a rotor electrode), and a second surface treatment (and/or coating) provided on at least a portion of an exposed surface of a second rotor electrode, where the first rotor electrode is a positive electrode, and where the second rotor electrode is a negative electrode, and the first space charge injection manager is distinct from the second space charge injection manager (e.g., a distinct geometry, thickness, concentration, material, etc.). In certain embodiments, the first space charge injection manager is configured for the characteristics (e.g., electrical environment, electrochemical reactions, failure and/or wear modes, etc.) associated with the positive electrode, and the second space charge injection manager is configured for the characteristics associated with the negative electrode. Similarly, surface treatments, coatings, and/or space charge injection managers provided throughout the capacitive stack may be configured for the environment (e.g., electrical environment, fluid flow, temperature, vibration profile, etc.) specific to plates and/or electrodes throughout the capacitive stack.

Figure 44:
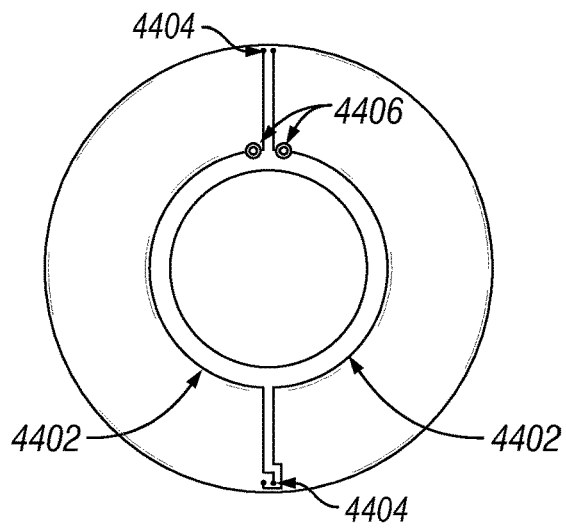
FIG. 44 is a schematic depiction of a system for an electrostatic motor.
Figure 45:
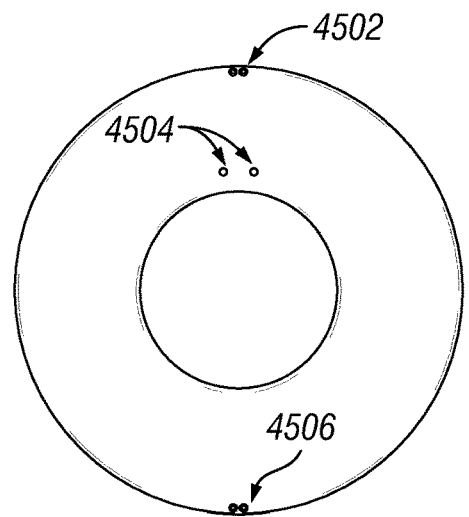
FIG. 45 is a schematic depiction of a system for an electrostatic motor.

Referencing FIG. 44, an example power distribution board (PDB) for a rotor is depicted, consistent with certain embodiments of the present disclosure. The example PDB includes connections 4404 to compliant electric connections (e.g., to a first rotor plate), and power feedthrough connections 4406 (e.g., coupling to an electrical source for excitation voltage), as well as power busses 4402 to provide electrical coupling to selected positions on the PDB. The example of FIG. 44 is a first side of the PDB for the rotor stack. Referencing FIG. 45, an example PDB for a rotor is depicted on a second side, including electrical connections 4502, 4506, for example connected using vias to the first side of the rotor PDB (e.g., as depicted in FIG. 44), and connection 4504 to the excitation voltage. The example rotor PDB may be positioned at a first end of the rotor stack, and provide power distribution to the rotor stack from an excitation voltage source (e.g., a VSI and/or a CSI).

Figure 46:
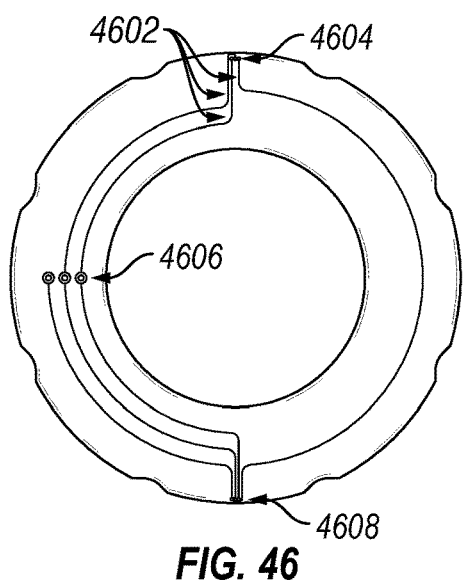
FIG. 46 is a schematic depiction of a system for an electrostatic motor.
Figure 47:
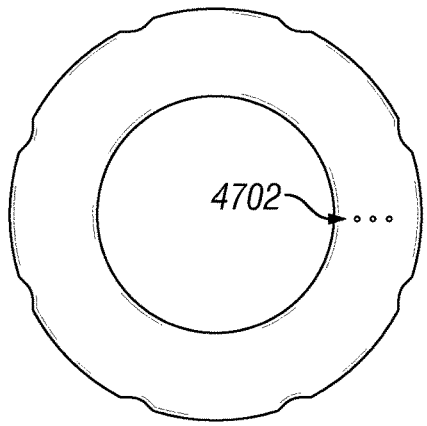
FIG. 47 is a schematic depiction of a system for an electrostatic motor.

Referencing FIG. 46, an example PDB for a stator is depicted, consistent with certain embodiments of the present disclosure. The example PDB includes power busses 4602 that provide electrical coupling to compliant electrical connections 4604 (e.g., to a first stator plate), and power feedthrough connections 4606 (e.g., coupling to an electrical source for excitation voltage). The example PDB for the stator depicts outer perimeter engaging tabs, for example securing the stator PDB to a housing. Referencing FIG. 47, an example PDB for a stator is depicted on a second side, including power feedthrough connections 4702, for example utilized to feed power through to the first side depicted in FIG. 46. The example rotor PDB and stator PDB embodiments depicted in FIGS. 44-47 are non-limiting examples, and are illustrative of electrical connections that may be present on a PDB for the stator and/or rotor PDBs.

Figure 48:
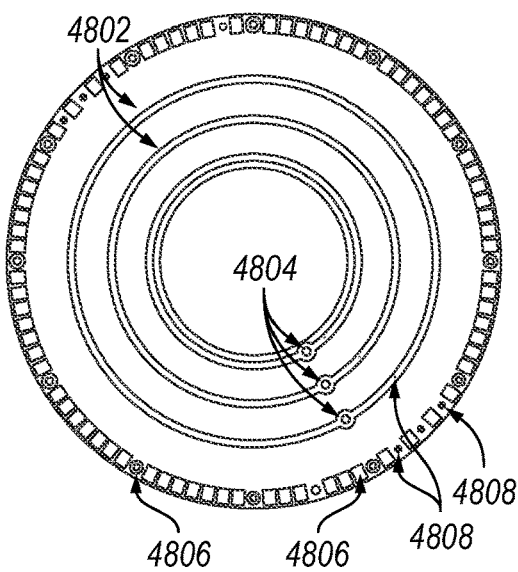
FIG. 48 is a schematic depiction of a system for an electrostatic motor.
Figure 49:
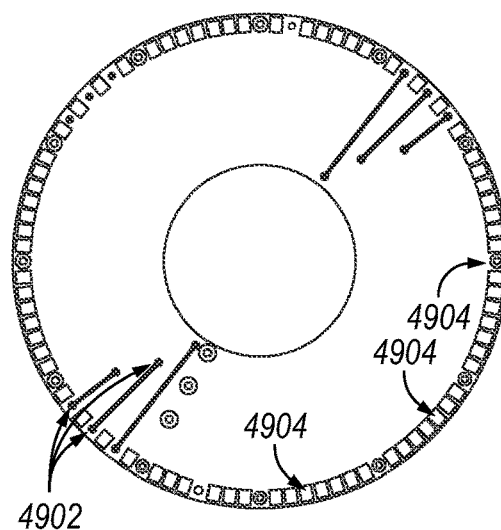
FIG. 49 is a schematic depiction of a system for an electrostatic motor.

Referencing FIG. 48, another example PDB for a stator is depicted, consistent with certain embodiments of the present disclosure. The example of FIG. 48 includes a number of power feedthrough connections 4804, and a number of power bus connections 4802 that distribute power selectively around the stator PDB for provision to stator plates. The example of FIG. 48 includes a number of vias 4808 that allow for power passing through to a second side of the stator PDB, and a number of mechanical pads 4806 that enforce axial positioning of rotor plates and/or stator plates of the ESM. Referencing FIG. 49, another example PDB for a stator is depicted on a second side, consistent with certain embodiments of the present disclosure. The example of FIG. 49 includes a number of vias 4902 connecting to the first side, and a number of mechanical pads 4904 enforcing an axial position of the PDB for the stator with respect to the capacitive stack 702.

Figure 50:
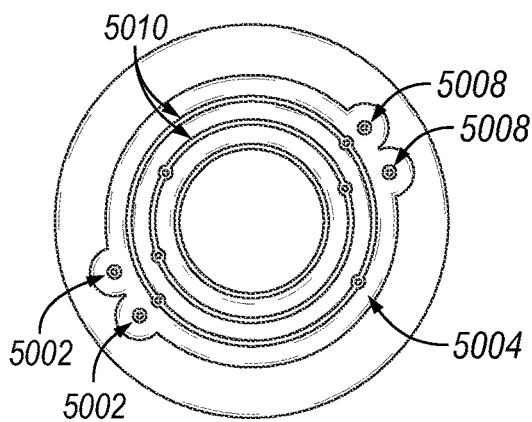
FIG. 50 is a schematic depiction of a system for an electrostatic motor.
Figure 51:
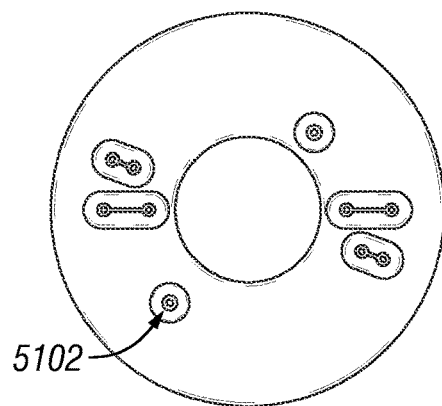
FIG. 51 is a schematic depiction of a system for an electrostatic motor.

Referencing FIG. 50, another example PDB for a rotor is depicted, consistent with certain embodiments of the present disclosure. The example of FIG. 50 includes a number of power busses 5010 for distributing power azimuthally about the rotor PDB, connections 5002, 5008 to compliant electrical connections (e.g., to a first rotor plate of the rotor stack), and vias 5004 to electrically coupe the first side of the rotor PDB (e.g., FIG. 50) to a second side of the rotor PDB (e.g., FIG. 51). Referencing FIG. 51, the rotor PDB is depicted on a second side, consistent with certain embodiments of the present disclosure. The example rotor PDB includes a number of vias 5102 connecting the first side of the rotor PDB to the second side of the rotor PDB, and includes connections allowing selected ones of the power busses of the first side to compliant electrical connections to a next rotor plate, providing selected electrical connectivity to electrodes of the rotor stack.

Figure 52:
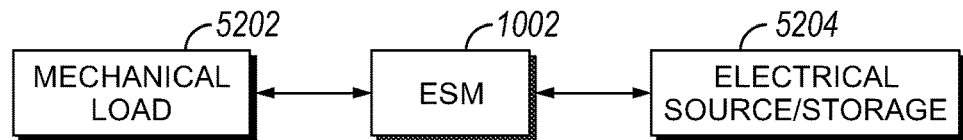
FIG. 52 is a schematic flow diagram of a procedure for an electrical load in an electrostatic motor.

Referencing FIG. 52, an example ESM 1002 is depicted, coupled to a mechanical load 5202 and an electrical source/storage 5204. The ESM 1002 is configured to operate in a first motoring mode, where the ESM 1002 receives electrical energy from the electrical source/storage 5204, and converts the electrical energy to mechanical power at the shaft, powering the mechanical load 5202. An example ESM 1002 includes an operation to adjust a field voltage (e.g., a DC voltage provided to a rotor stack) in response to a torque command value (e.g., reference FIGS. 72-76 and the related description), thereby providing for direct torque control of operations of the ESM 1002.

The operation of the ESM 1002 in the motoring mode may include any systems, components, and/or procedures herein. The ESM 1002 is further configured to operate in a second generating mode, where the ESM 1002 receives mechanical energy from the mechanical load 5202, and converts the mechanical energy to electrical energy, powering the electrical source/storage 5204. In certain embodiments, the electrical source/storage 5204 is a same device in the motoring and generating modes (e.g., a battery, a power grid, etc.), where the ESM 1002 can selectively receive or provide electrical power to the electrical source/storage 5204. In certain embodiments, the electrical source/storage 5204 is a first device in the motoring mode (e.g., a battery), and is a second device in the generating mode (e.g., a different battery, a power gride, etc.). In certain embodiments, the electrical source/storage 5204 is a distinct device depending on operating conditions, for example depending upon a state of charge of a battery, conditions of a power grid, or the like, and accordingly the device represented by the electrical source/storage 5204 may vary depending upon the operating mode (e.g., motoring or generating), a state of charge of a component of a system including the electrical source/storage, an amount of power provided by generating operations (e.g., according to a torque and/or speed of the mechanical load 5202 during generating operations), or the like.

Figure 53:
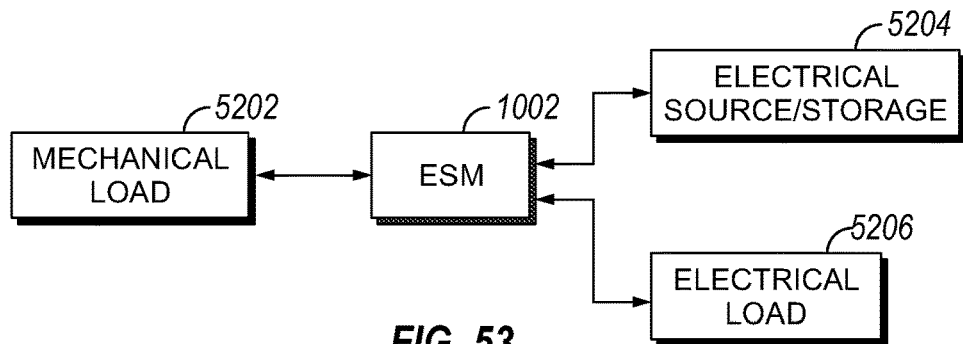
FIG. 53 is a schematic flow diagram of a procedure for an electrical load in an electrostatic motor.

Referencing FIG. 53, an example system includes the ESM 1002 capable to exchange power with a mechanical load 5202 and an electrical system include an electrical source/storage 5204 and an electrical load 5206. The example ESM 1002 is capable to provide power to the mechanical load 5202 in response to an electrical power provided by the electrical source/storage 5204 (e.g., from a battery, power grid, capacitor, or the like), and/or from an electrical load 5206 (e.g., when the electrical load is itself operating in a condition to provide power or "regenerate", such as when the electrical load is in a transient condition where it is decreasing in applied power, winding down, discharging capacitive elements, requires a negative torque to operate, etc.). The example ESM 1002 is capable to return power from the mechanical load 5202 in response to a generating mode, for example where the mechanical load 5202 is winding down, decelerating, requires a negative torque, or otherwise operating in a condition where it returns torque to a shaft of the ESM 1002. The ESM 1002 is configured to return power selectively to the electrical source/storage 5204 and/or the electrical load 5206 in response to the generating mode. For example, the ESM 1002 charges a battery and/or provides power to a power grid of the electrical source/storage 5204 in response to determining that a battery and/or power grid is capable to accept electrical energy from the ESM 1002. In another example, the ESM 1002 is capable to power an active electrical load 5206, for example where an active electrical load 5206 is present, and where a power to be supplied by the ESM 1002 is compatible with the electrical load 5206. In certain embodiments, powering an active electrical load 5206 may be more efficient that charging a battery 5204, for example reducing a round trip of power through the battery 5204 and to the electrical load 5206. In certain embodiments, electrical power from the ESM 1002 is divided between the electrical source/storage 5204 and the electrical load 5206, for example where power provided during a generating mode exceeds one or the other, or both, of the electrical source/storage 5204 and/or electrical load 5206 power acceptance capability. The described operations are non-limiting examples.

Figure 54:
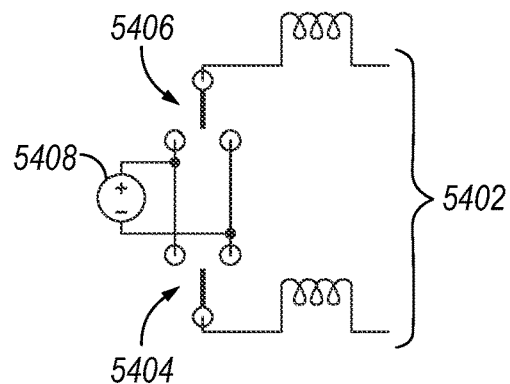
FIG. 54 is a schematic depiction of a system for an electrostatic motor.

Referencing FIG. 54, an example power routing apparatus is depicted for routing power between an ESM 1002 and an electrical source/storage 5408. The example of FIG. 54 includes switches 5404, 5406 operable to couple an ESM electrical interface 5402 (e.g., a DC bus configured to provide excitation power to the capacitive stack) to the electrical source/storage 5408. The example of FIG. 54 allows operation for the DC bus 5402 to power the ESM, and/or for the ESM (e.g., using regenerative mechanical energy) to provide power to the electrical source/storage 5408. The switches 5404, 5406 may be of any type, including mechanical switches and/or solenoids, and allow for power transfer in either direction through the ESM 1002. The ESM electrical interface 5402 is a DC bus providing power to the ESM 1002 (and/or receiving power from the ESM 1002), but the power to or from the DC bus 5402 and the electrodes is further configured (not shown for clarity of the present description), for example using an inverter (e.g., a CSI, VSI, and/or combined with voltage and/or current regulation) for providing power to AC driven electrodes (e.g., stator electrodes), utilized directly for providing power to DC driven electrodes (e.g., rotor electrodes), and/or with a voltage change for providing power to DC driven electrodes at a distinct voltage different than a voltage of the DC bus 5402.

Figure 55:
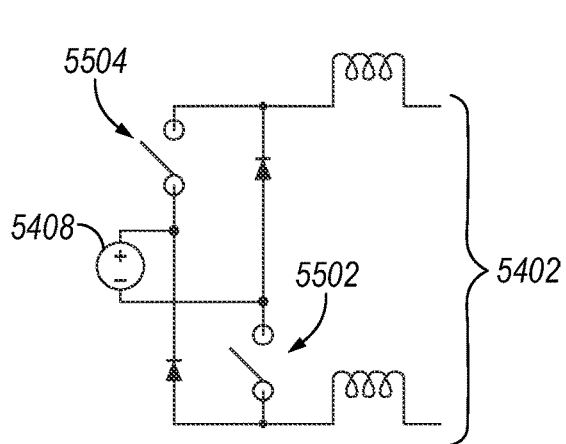
FIG. 55 is a schematic depiction of a system for an electrostatic motor.

Referencing FIG. 55, an example power routing apparatus is depicted for routing power between an ESM 1002 and an electrical source/storage 5408. The example of FIG. 55 includes switches 5502, 5504 operatable to couple an ESM electrical interface 5402 to an electrical source/storage 5408. The example of FIG. 55 includes simpler switching and orientation diodes, bus is otherwise similar to the example of FIG. 54. The example of FIG. 54 depicts power exchange with an electrical source/storage 5408, and the example of FIG. 55 depicts power exchange at a low switching frequency with an electrical source/storage 5408. The examples of FIGS. 54, 55 are non-limiting and illustrative.

Figure 56:
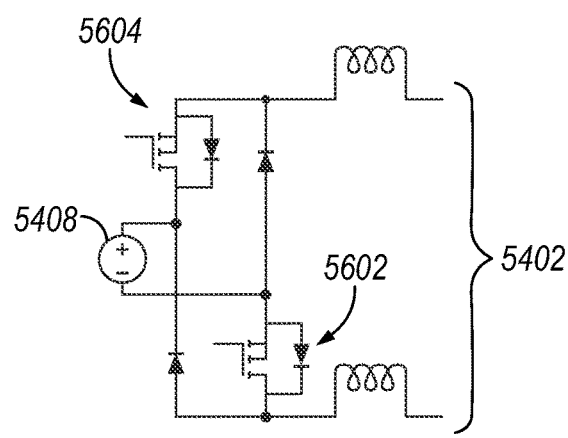
FIG. 56 is a schematic depiction of a system for an electrostatic motor.

Referencing FIG. 56, an example power routing apparatus is depicted for routing power between an ESM 1002 and an electrical source/storage 5804. The example of FIG. 56 includes solid state switches 5602, 5604, but is otherwise similar to the example of FIG. 55. The example of FIG. 56 is compatible with high frequency switching, but otherwise allows for power transfer to or from an electrical source/storage and an ESM. The example of FIG. 56 is compatible with any frequency of switching, including low frequency and/or intermediate frequency switching.

Figure 57:
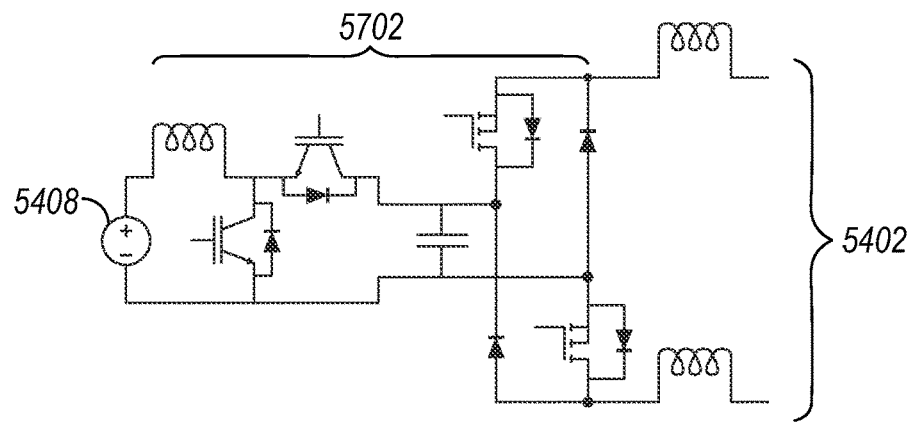
FIG. 57 is a schematic depiction of a system for an electrostatic motor.

Referencing FIG. 57, an example power routing apparatus is depicted for routing power between an ESM 1002 and an electrical source/storage 5408. The example of FIG. 57 includes a boosting stage 5702 capable to adjust the voltage using an AC/DC stage, at a general frequency (e.g., high, low, and/or intermediate). The example of FIG. 57 is capable to provide power to a current-stiff DC bus (e.g., current on the bus 5402 is insensitive to input conditions, and/or the bus 5402 exhibits a high impedance value responsive to inputs from the electrical source/storage 5408 and/or from the ESM 1002). The example of FIG. 57 is compatible with a range of frequencies, and includes solid state switches to perform the power switching operations.

Figure 58:
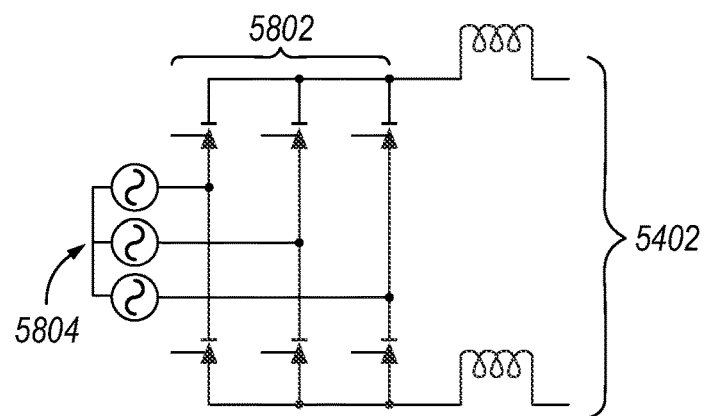
FIG. 58 is a schematic depiction of a system for an electrostatic motor.

Referencing FIG. 58, an example power routing apparatus is depicted for routing power between an ESM 1002 and an electrical source/storage 5804. The example of FIG. 58 is compatible with a general AC bus 5402, for example utilized to excite stator electrodes of the stator stack, although any AC operation of the ESM is contemplated herein. The example of FIG. 58 depicts an electrical source/storage 5804 having 3-phase AC power, but any configuration of the electrical source/storage 5804 is contemplated herein. The switching circuit 5802 includes solid state switches, and is compatible with multiple frequencies associated with the electrical source/storage 5804.

Figure 59:
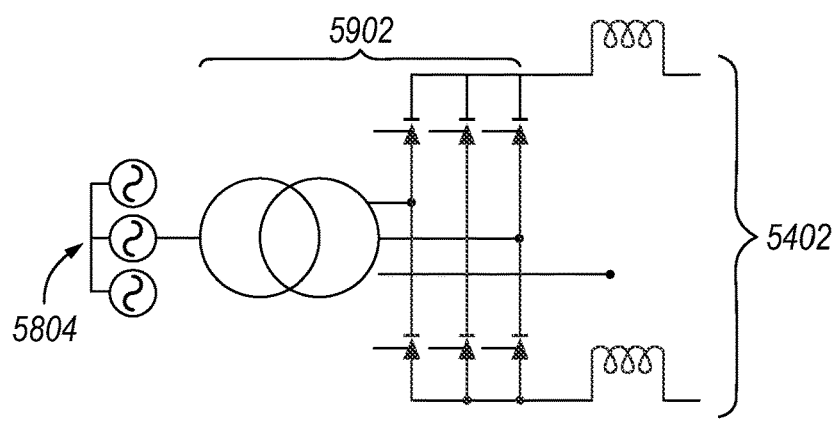
FIG. 59 is a schematic depiction of a system for an electrostatic motor.

Referencing FIG. 59, an example power routing apparatus is depicted for routing power between an ESM 1002 and an electrical source/storage 5804. The example of FIG. 59 includes the switching circuit 5902 including a boosting/bucking transformer, capable to boost the voltage going in either direction, for example to output to a load 5804 having a lower voltage than the ESM 1002, and/or to step down the voltage from the ESM 1002 to the load 5804. The example of FIG. 59 is otherwise similar to the example of FIG. 58. The example of FIG. 59 utilizes solid state switches, and is compatible with a wide range of frequencies.

Figure 60:
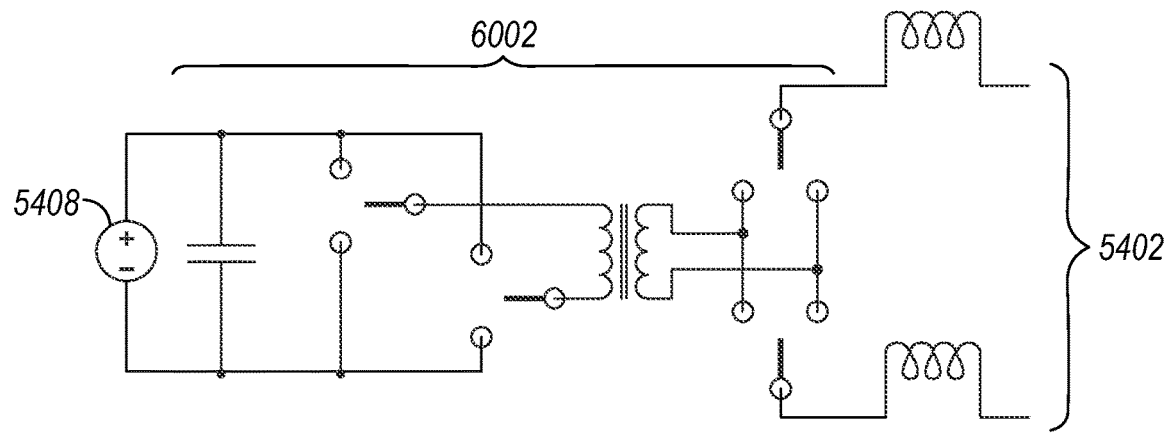
FIG. 60 is a schematic depiction of a system for an electrostatic motor.

Referencing FIG. 60, an example power routing apparatus is depicted for routing power between an ESM 1002 and an electrical source/storage 5408. The example of FIG. 60 includes a boosting/bucking transformer, capable to exchange power between a DC electrical source/storage 5804 and the DC bus 5402, and to step up or down the voltage according to the characteristics of the ESM 1002 and the electrical source/storage 5804. The example of FIG. 60 includes a switching circuit 6002 that may utilize mechanical switches and/or solid state switches, for example depending upon the frequency of switching to support the power routing operations.

Figure 61:
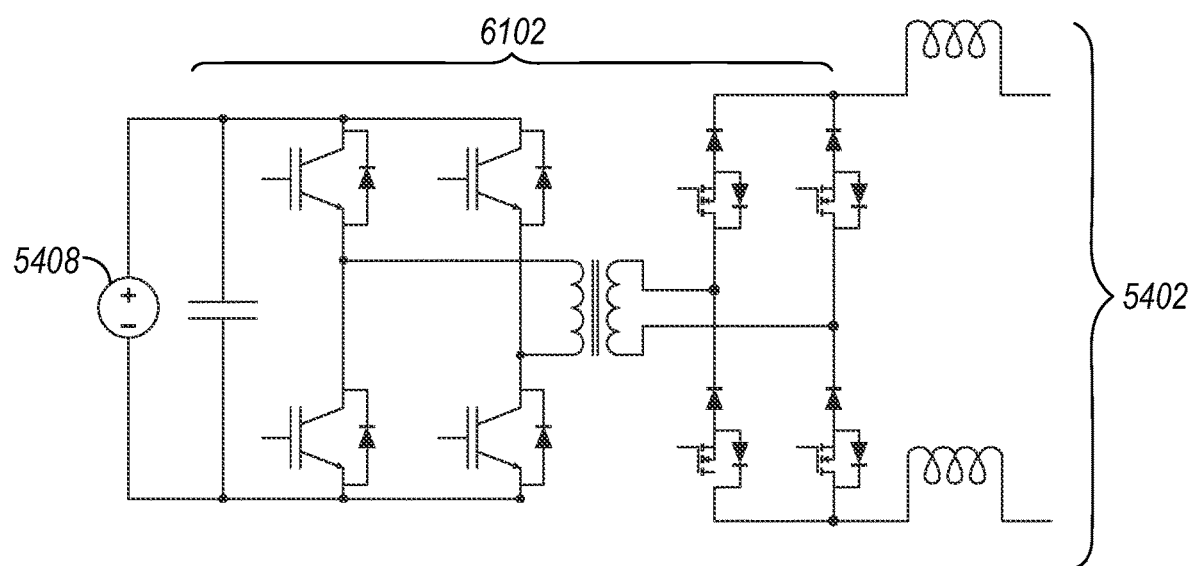
FIG. 61 is a schematic depiction of a system for an electrostatic motor.

Referencing FIG. 61, an example power routing apparatus is depicted for routing power between an ESM 1002 and an electrical source/storage 5408. The example of FIG. 61 includes a switching circuit 6102 utilizing a boosting/bucking transformer, solid state switching, and reverse voltage blocking switches. The example switching circuit 6102 of FIG. 61 is suitable to switch power between a DC source/load 5408 and a current-stiff DC bus 5402, with voltage stepped up or down according to the characteristics of the ESM 1002 and the electrical source/storage 5804.

Without limitation to any other aspect of the present disclosure, switching devices utilized herein should be understood broadly. Switching devices may include any type of mechanical switching device known in the art, including relays, solenoids, any number of independently and/or concurrently operating circuits, and/or throws, and having either normally open logic, normally closed logic, and/or bi-stable logic. Switching devices may include any type of solid state switching device known in the art, including MOSFETs, JFETs, IGCTs, IGBTs, BJTs, and/or thyristors. Solid state switches may be operated in enhancement mode and/or depletion mode, and may include forward-conducting switches, reverse-blocking switches, and/or high speed switches.

Without limitation to any other aspect of the present disclosure, electrical connections depicted herein are shown schematically to depict the logic and connectivity of certain embodiments. Circuits herein may additionally or alternatively include aspects not depicted, and that may be configured for a particular arrangement. Without limitation, aspects include input-side capacitance and/or inductance management, for example to maintain predictable and/or designed frequency response and impedance. In certain embodiments, frequency response and/or impedance are managed to provide a predictable and compatible environment for an excitation device, such as a VSI, CSI, voltage regulator, field voltage regulator, and/or field voltage supply. In certain embodiments, frequency response and/or impedance are managed for response of the capacitive stack. Circuits herein may additionally or alternatively include filtering, current limiting, voltage limiting, current regulation, voltage regulation, or other aspects not shown for clarity of the present description.

Example embodiments of an ESM are described following, which may be included, in whole or part, with any systems, apparatuses, and/or aspects of the present disclosure. The example embodiments, and/or aspects thereof, may be utilized to perform any operations set forth throughout the present disclosure.

An example ESM includes a number of stator plates, each having stator electrode(s), and rotationally fixed to a housing, and a number of rotor plates, each having rotor electrode(s), and rationally fixed to a shaft. The shaft is at least partially positioned within the housing, and is rotationally coupled to the rotor plates. In certain embodiments, the stator plates may have an interior diameter that does not engage the shaft. Additionally or alternatively, the stator plates may engage the shaft with a bearing or other coupling allowing for differential rotation of the stator plates and the shaft. In certain embodiments, the shaft may include a sleeve or other outer component that does not rotate, wherein the stator plates are coupled to the sleeve. In a further example embodiment, the rotor plates may engage an outer feature (e.g., an outrunner), such as a sleeve, rotating cage, or the like, whereby the rotor plates rotate with the shaft but are not fixed to the shaft at an interior diameter of the rotor plates. In certain embodiments, rotor plates and/or stator plates may have a combination of coupling arrangements within a given ESM. An example embodiment includes a stator terminating plate (e.g., a final plate of the capacitive stack at one end of the capacitive stack) engaging an end plate of the housing. In certain embodiments, some or all of the plates of the rotor stack engage the shaft and/or outrunner using a spline or other arrangement allowing for axial movement of the rotor plates. In certain embodiments, some or all of the plates of the stator stack engage the housing and/or a shaft sleeve using a spline or other arrangement allowing for axial movement of the stator plates. In certain embodiments, one or more plates of the capacitive stack are fixed axially, for example the housing, shaft, an outrunner, and/or a sleeve, which may be terminating plates, or other selected plates of the capacitive stack.

An example ESM includes an electrical exciter, which may be referenced by other terms, such as but not limited to, an excitation circuit, an inverter (e.g., a CSI, and/or a VSI), a current source (e.g., AC or DC), a voltage source (e.g., AC or DC), and/or a field voltage supply. The electrical exciter may further include, and/or interface with, electrical components such as a bus (e.g., a DC bus, an AC bus, etc.), power coupling to electrodes of the ESM, selective coupling between one or more electrical power sources (e.g., a battery, a power grid, an electrical system of a device including the ESM, etc.). The electrical exciter may include and/or interface with power transfer components, such as a power coupling between a rotating component (e.g., rotor plates, and/or rotating portions of the shaft) and a non-rotating component (e.g., an electrical power source or load, coupling circuitry between the electrical power source or load and the ESM, electrical configuration circuitry, or the like). An example electrical exciter is configured to provide power in either direction—for example transferring power from an electrical source to electrodes of the ESM, and/or from the ESM (e.g., in response to the ESM being rotated by a mechanical load) to a selected electrical power source, electrical power storage device (e.g., a battery, capacitor, etc.), and/or electrical load (e.g., an electrical device, a vehicle electrical system, a power grid, etc.). An example electrical exciter includes and/or interfaces with electrical configuration circuitry. Example electrical configuration circuitry can selectively configure the electrical power, passing in either direction, for example adjusting a voltage (e.g., stepping up voltage; stepping down voltage; adjusting DC parameters such as a current and/or number of phases; adjusting AC parameters such as a current, a number of phases, an amplitude, a frequency, and/or a phase). An example electrical exciter is configured to provide any number of phases (e.g., a single phase, three phases, six phases, twelve phases, eighteen phases, etc.) for power flow, and/or any number of independent and/or parallel power flows (e.g., independent paths between the electrical power source and the ESM, and/or interfacing with more than one electrical power source), and/or to swap and/or combine power flows. An example operation includes powering one portion of a stator stack with a first power flow at a first time, and powering the portion of the stator stack with a second power flow at a second time, for example to provide redundancy options, to utilize separate power flows in response to an operating condition such as a fault condition of an electrical circuit, of an electrode and/or plate of the capacitive stack, and/or in response to a power requirement and distinct capabilities of the separate power flows. An example operating includes powering one portion of a stator stack with a first power flow at a first time, and powering the portion of the stator stack with both the first power flow and a second power flow at a second time, for example to accommodate a range of power capabilities for the ESM, based on a state of charge for electrical power sources associated with each power flow, etc.

An example electrical exciter provides AC power to the stator stack, which may be referenced as exciting the stator stack. An example electrical exciter provides DC power to the rotor stack, which may be referenced as supplying a field voltage, energizing the field, and/or exciting the rotor stack. Without limitation to any other aspects of the present disclosure, either or both of the stator stack and the rotor stack may be excited utilizing AC power, DC power, and/or combinations of these, for example in distinct portions of the stator stack and/or rotor stack, at distinct times, and/or at distinct operating conditions. An example electrical exciter provides AC power and/or DC power using a pulse-width modulated (PWM) operation, for example providing a selected voltage supply and/or current supply to selected electrodes of the capacitive stack in a rapid on/off succession, where the supplied power is modulated using a duty cycle (e.g., on/off time periods, and/or high/low time periods), adjusting an amplitude of the on periods (e.g., including an on amplitude, an off amplitude, a high amplitude, and/or a low amplitude). In certain embodiments, electrical exciter may include filtering circuitry (e.g., inductance and/or capacitance) to filter the provided power, and/or the electrical exciter may be configured to be responsive to the electrical response (e.g., inherent capacitance, inductance, resistance, baseline voltage, magneto-motive force, etc.) of the ESM, capacitive stack, rotor stack, stator stack, the electrical exciter itself, an electrical power source and/or load, power electronics and/or electrical configuration circuitry, etc. In certain embodiments, the electrical exciter includes a modulated power source (e.g., where the voltage and/or current amplitude or other parameters can be adjusted continuously or in small steps), and/or a discrete power source (or a discrete stepping mode, e.g., where on/off and/or low/high switching is performed in a relatively slow operation compared to a PWM operation, and/or where the voltage and/or current amplitude or other parameter can be adjusted between a number of discrete values), and/or the electrical exciter can be configured to selectively switch between operating modes (e.g., between PWM operation, modulated operation, discrete stepping operation, AC operation, DC operation, a number of phases provided, etc.), for example responsive to operating conditions (e.g., motoring versus powering operations, based on a power throughput, voltage value, current value, rotating speed of the ESM or other component of a system, and/or based on a response of a current operating mode, such as a capability of the current operating mode to meet the current system mission, a fault condition, preserving operating margin, etc.), and/or predetermined thresholds of the operating conditions.

Operations set forth herein reference providing a voltage (e.g., operations of a voltage source, a field supply, and/or a voltage source inverter), and/or providing a current (e.g., operations of a current source, and/or a current based inverter such as a CSI). Operations described herein are illustrative and utilize specified operations to provide a context for clarity of the description. Without limitation to any other aspect of the present disclosure, operations described in the context of a voltage may be performed instead using a current. For example, a voltage value, a voltage feedback value, a field voltage value, and/or a voltage source contemplate, alternatively or additionally, utilizing a current value, a current feedback value, and/or a current source. In another example, a current value, a current feedback value, and/or a current source contemplate, additionally or alternatively, utilizing a voltage value, a voltage feedback value, and/or a voltage source. In another example, a voltage value and/or a current value, and/or related parameters, contemplate, alternatively or additionally, utilizing a combination of these such as a power value, and/or a weighted average between voltage and current (e.g., providing for mixed control utilizing both current and/or voltage values). In certain embodiments, any voltage based component herein (e.g., a field supply voltage, a voltage source, and/or a VSI) may additionally be coupled with, and/or include, a current regulator. In certain embodiments, any current based component herein (e.g., a current source and/or a CSI) may additionally be coupled with, and/or include, a voltage regulator. In another example, any description including a voltage value and/or current value, and related parameters, further contemplates, alternatively or additionally, any related value including abstracted values such as: a field value (e.g., an electrical field strength of the capacitive stack $702$ and/or elements thereof), a torque value (e.g., torque applied by and/or received by the capacitive stack $702$), and/or a charge value (e.g., a charge related to the capacitive stack and/or elements thereof, such as the rotor stack, stator stack, and/or an electrode or group of electrodes). It will be understood that certain parameters herein may be controlled and/or detected directly (e.g., a voltage value), and other parameters may include estimated values, modeled values, and/or values determined using a virtual sensor, where the estimated and/or modeled values may be based on related parameters (e.g., a torque estimated from a charge, field strength, applied voltage, current values provided to and/or received from the capacitive stack, etc.). In certain embodiments, any description including a voltage value, current value, and/or any other described values, further contemplates utilizing different values and/or different combinations of values, for example depending upon one or more operating conditions (e.g., powering mode vs. motoring mode, based on a threshold, power throughput, field strength, requested torque, power, and/or speed of the ESM, etc.), available sensors (e.g., responsive to a fault condition or failure of a sensor), available components (e.g., responsive to a fault condition or failure of an electrical power source or load, electrical circuit, component such as a switch, etc.), and/or a capability of a component of the ESM (e.g., relative to a current operating condition related to the capability).

An example ESM includes the electrical exciter electrically coupled to a driving component such as an electrode of the stator and/or rotor, the stator stack, the rotor stack, specific plates of the capacitive stack $702$, etc. An example ESM includes the electrical coupling circuit coupling the electrical exciter to the driving component, for example utilizing a through-shaft electrical coupling (e.g., coupling to the rotor stack, and/or to the stator stack), a terminal (e.g., provided at an end plate of the housing, for example to couple to the stator stack), and/or a power distribution board (e.g., providing electrical power transfer between the electrical exciter and a component of the capacitive stack $702$, for example including a rotor power distribution board associated with, and/or included with, the rotor stack, and a stator power distribution board associated with, and/or included with, the stator stack). An example ESM includes compliant electrical connections (e.g., allowing for axial movement of plates of the capacitive stack, such as during operations, installation, service, etc.), with one or more compliant electrical connections provided between one or more of: the electrical exciter and a power distribution board; between a terminal and the power distribution board; between plates of the stator stack and/or rotor stack; and/or between a power distribution board and one or more plates of the stator stack and/or rotor stack. Example compliant electrical connections include one or more of: a braided coupling, a pogo pin, and/or a spring based electrical coupling.

An example ESM includes an isolator interposed between the exciter and a power distribution board, between a power distribution board and one or more plates of the rotor stack and/or stator stack, and/or between plates of the rotor stack and/or stator stack. An example ESM further includes one or more insulating spacers, for example associated with, and/or at least partially defining, one or more compliant electrical connections.

An example stator stack includes a number of stator plates each having a number of electrodes disposed thereon, and/or included therewith (e.g., electrodes may be physically positioned on a surface of the associated plate, below a surface of the associated plate but electrically exposed to an adjacent rotor electrode and/or an electrode separation fluid provided in a gap between the rotor electrode and the stator electrode, and/or having a surface treatment and/or coating applied at least partially on the electrode and/or on a surface of the stator plate in proximity to the electrode). One or more of the stator plates may have electrodes disposed on, or electrically exposed to, separate sides of the stator plates. For example, a terminating stator plate may have electrodes on one side of the stator plate, and intermediate stator plates may have electrodes positioned on both side of the stator plate. An example stator plate further includes electrical coupling between electrodes on each side—for example using vias, through-holes, and/or integral electrical coupling to connect each side.

An example rotor stack includes a number of rotor plates each having a number of electrodes disposed thereon, and/or included therewith (e.g., electrodes may be physically positioned on a surface of the associated plate, below a surface of the associated plate but electrically exposed to an adjacent stator electrode and/or an electrode separation fluid provided in a gap between the stator electrode and the rotor electrode, and/or having a surface treatment and/or coating applied at least partially on the electrode and/or on a surface of the rotor plate in proximity to the electrode). One or more of the rotor plates may have electrodes disposed on, or electrically exposed to, separate sides of the rotor plates. For example, a terminating rotor plate may have electrodes on one side of the rotor plate, and intermediate rotor plates may have electrodes positioned on both side of the rotor plate. An example rotor plate further includes electrical coupling between electrodes on each side—for example using vias, through-holes, and/or integral electrical coupling to connect each side.

Electrical power, such as excitation power, may be provided to the rotor electrodes and/or stator electrodes utilizing any number of phases, and/or any number of independent circuits (e.g., a stator plate having 40 electrodes may have separate excitation for each electrode, and/or for each group of electrodes, where the groups may be adjacent and/or distributed around the stator plate). In certain embodiments, distribution of groups of electrodes may be provided across a number of rotor plates and/or stator plates, and/or excitation may be selectively provided to only a portion of the plates and/or electrodes of the capacitive stack 702.

Figure 62:
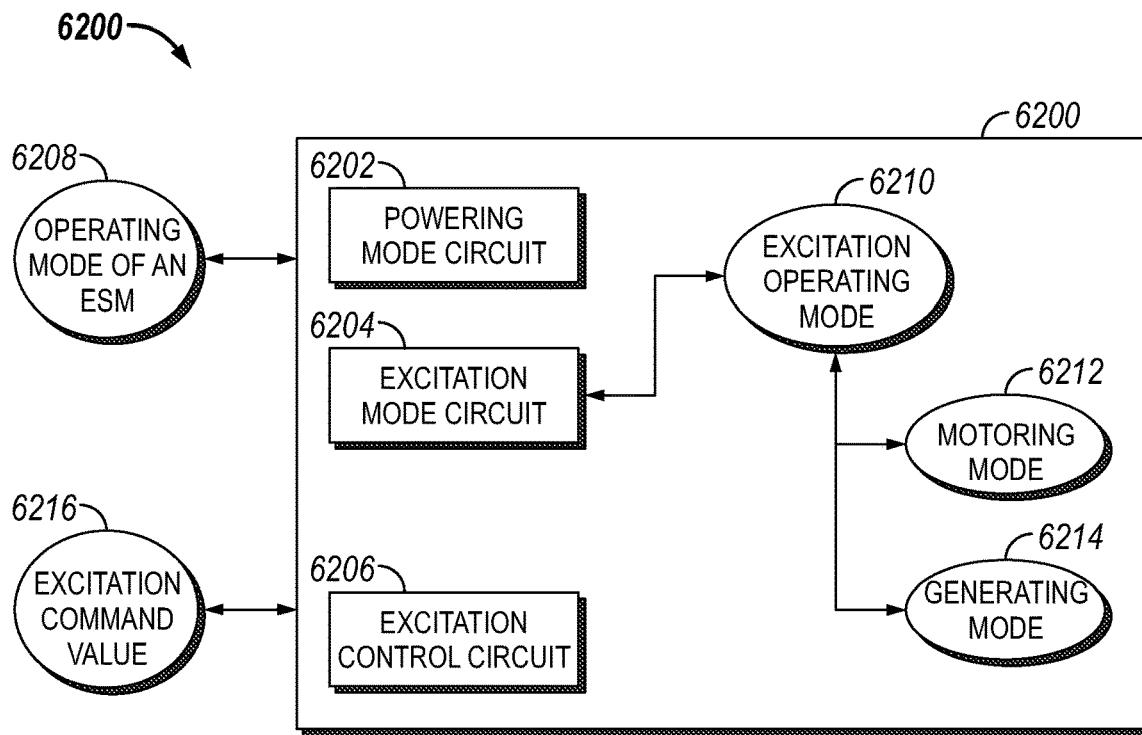
FIG. 62 is a schematic flow diagram of a procedure for a generating mode for an electrostatic motor.

Referencing FIG. 62, an example controller 6200 is schematically depicted. The example controller 6200 includes a number of circuits configured to functionally execute operations of the controller 6200. The controller 6200 is depicted as a single device for clarity of the present description, but a given controller 6200 may be distributed across a number of devices, and/or be combined with another controller in the system. The controller 6200 may be a part of system having any apparatus or component set forth herein, and may be positioned at least partially on, or associated with, an ESM 1002.

Circuits, as set forth herein, should be understood broadly, and may include logic circuits, hardware components configured to perform certain operations of the circuits, and/or instructions stored in a computer readable medium configured to cause a processor to perform one or more operations of the circuit when executing the instructions. Without limitation to any other aspect of the present disclosure, a circuit and/or a controller, as utilized herein, includes one or more of: any sensor present in a system (e.g., a voltage sensor, current sensor, temperature sensor, speed sensor, hall effect sensor, encoder (e.g., incremental, absolute, magnetic, and/or capacitive), and/or a sensor providing an actuator feedback value), any actuator present in a system, a switch, a transistor, a CSI, a VSI, a voltage regulator, a field voltage regulator, a processor, a memory, and/or communication/networking components. In certain embodiments, a circuit and/or controller is in communication with any component of the system, and/or is configured to provide commands to and/or receive a response from any component of the system.

The example controller 6200 includes a powering mode circuit 6202 that interprets an operating mode 6208 of an ESM as one of a motoring mode 6212 or a generating mode 6214, an excitation mode circuit 6204 that determines an excitation operating mode 6204 in response to the operating mode 6208 of the electrostatic machine, and an excitation control circuit 6206 that provides an excitation command value 6216 in response to the excitation operating mode 6210. An example controller 6200 is provided in communication with, and/or as a part of, an ESM 1002 having an excitation circuit (e.g., any circuit of FIGS. 54-61) that is responsive to the excitation command value 6216 to provide operation of the ESM 1002 in a powering mode (e.g., providing power to a mechanical load) and/or a generating mode (e.g., providing power to an electrical source/load). In certain embodiments, the electrical power source and electrical load are a same electrical storage device (e.g., a battery). The electrical power source and/or the electrical load may be DC electrical devices, AC electrical devices, or a combination of these. An example electrical load is a power grid, and/or a 3-phase AC device. In certain embodiments, the excitation circuit includes one or more switches, and operates the switches to implement the motoring mode or the generating mode.

Figure 63:
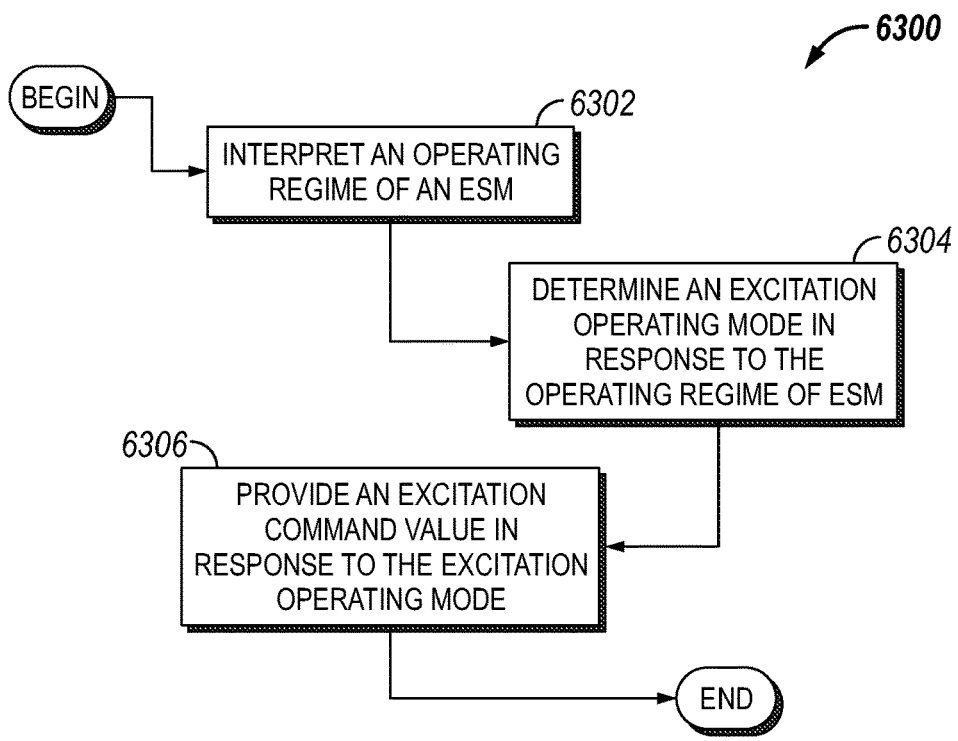
FIG. 63 is a schematic flow diagram of a procedure for a operating mode for an electrostatic motor.

Referencing FIG. 63, an example procedure 6300 for operating an ESM in a selected operating mode is schematically depicted. The example procedure 6300 includes an operation 6302 to interpret an operating mode of an ESM, and an operation 6304 to determine an excitation operating mode in response to the operating mode of the ESM. The example operating mode includes any operating mode as set forth throughout the present disclosure, including at least a powering mode, a motoring mode, a generating mode, a torque ripple management mode, and/or a hybrid power mode (e.g., increasing, decreasing, and/or managing a hybrid power developed by a hybrid torque providing system). The example procedure 6300 further includes an operation 6306 to provide an excitation command value in response to the excitation operating mode.

Figure 64:
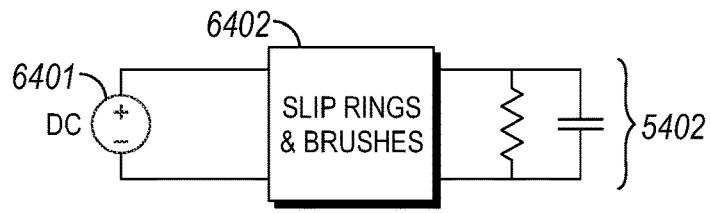
FIG. 64 is a schematic block diagram of a slip rings and brushes circuit for an electrostatic motor.

Referencing FIG. 64, an example power transfer component between an excitation component 6401 (e.g., an electrical power source, current source, voltage source, battery, the DC bus 5402, etc.) and an ESM electrical interface 6403 for a capacitive stack is schematically depicted. The example component includes a component 6402 for transfer between a static component and a rotating component, such as a component using slip rings and brushes.

Figure 65:
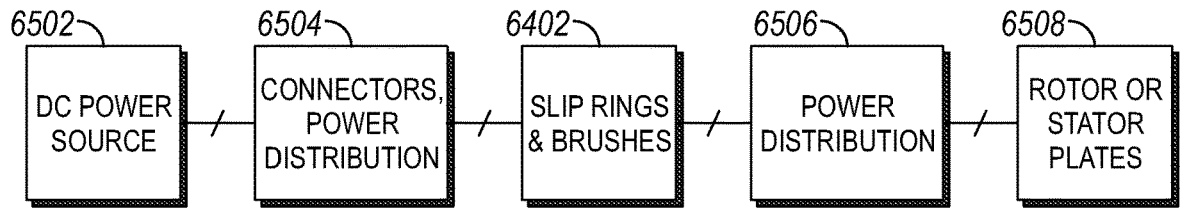
FIG. 65 is a schematic block diagram of a slip rings and brushes circuit for an electrostatic motor.

Referencing FIG. 65, an example system including power transfer between a DC power source 6502 and rotor/stator plates 6508 is schematically depicted. The example system includes connectors and power distribution 6504 providing power from the DC power source 6502 to the ESM, and a component 6402 for transfer between a static component and a rotating component, such as a component 6402 using slip rings and brushes. The example system includes a power distribution component 6506, for example a first PDB associated with a rotor stack, and a second PDB associated with a stator stack. It will be understood that certain connections, for example to the second PDB associated with the stator stack, may bypass and/or omit component 6402.

Figure 66:
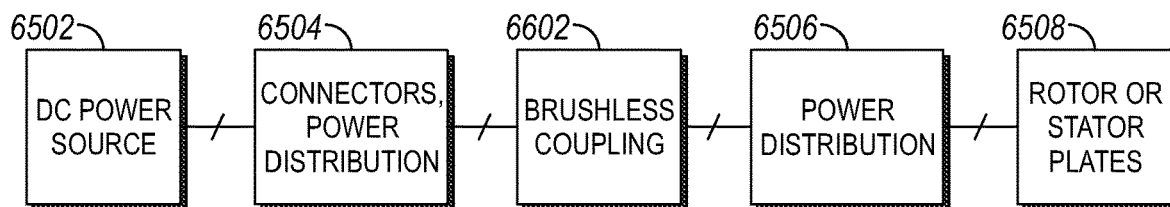
FIG. 66 is a schematic block diagram of a brushless coupling circuit for an electrostatic motor.

Referencing FIG. 66, an example system including power transfer between a DC power source 6502 and rotor/stator plates 6508 is schematically depicted. The system of FIG. 66 is similar to the system of FIG. 65, except the component 6602 for transfer between a static component and a rotating component includes a brushless coupling.

Figure 67:
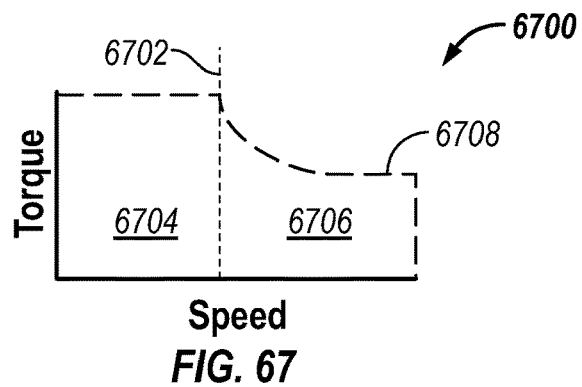
FIG. 67 is a schematic an illustration of a torque-speed relationship for an electrostatic motor.

Referencing FIG. 67, an example torque-speed operating diagram 6700 for an ESM is depicted. The example operating diagram 6700 includes a field weakening region (e.g., operation along the power limit 6708). An example operating diagram 6700 includes a speed threshold 6702, below which the ESM is operated with a full strength field (e.g., allowing maximum torque), such as in region 6704. The example operating diagram 6700 includes a field weakening region 6706, where the maximum torque is derated (e.g., along the power limit 6708) in response to the operating speed of the ESM. The example operating diagram 6700 is a non-limiting illustration of certain embodiments to adjust the field strength within gaps of the capacitive stack, and any operations to adjust the field strength are contemplated herein. Adjustments to the field strength may be characterized as a reduction (e.g., with a field weakening region 6706), an increase, or any other type of adjustment. Adjustments may be made according to any operating condition, including torque and/or speed (e.g., as depicted in FIG. 67), and/or including parameters such as: a current torque request; an error value (e.g., torque and/or power output compared to current torque and/or power response); an operational category (e.g., a category indicating that performance, efficiency, responsiveness, and/or other operational behaviors are to be emphasized); an accumulated value of any of these; and/or a rate of change of any of these. For example, the field strength may be adjusted to improve response time (e.g., increasing a field excitation of the rotor and/or a stator voltage, increasing a rate of torque rise or fall), adjusted to improve efficiency (e.g., adjusting the field excitation on the rotor to reduce DC link losses), and/or achieving an operational condition in response to a limitation (e.g., allowing for achieving a specific field strength and/or torque output in view of a voltage limit, saturation, etc. on the stator and/or rotor, for example by manipulating the energizing of the other one of the stator and/or rotor). In certain embodiments, a controller 6200 includes one or more circuits (e.g., machine operating condition circuit 6902, torque request circuit 7302, and/or powering mode circuit 6202) that determine relevant operating conditions according to a control scheme for the ESM 1002, one or more circuits (e.g., field strength modulation circuit 6904, nominal voltage circuit 7304, excitation mode circuit 6204, voltage regulation circuit 7306, and/or charge regulation circuit 7904) that determine a field strength value (and/or a trajectory of field strength values) that provide the desired field strength (and/or provide an acceptable progression to the desired field strength over a period of time), and an excitation control circuit 6206 that provides excitation command values 6216, where an excitation circuit (e.g., providing power to a stator, such a current source inverter, and/or providing power to a rotor, such as a current source with voltage control and/or a voltage source) provides power to the stator and/or rotor electrodes in response to the excitation command values 6216. It will be understood that the excitation command values 6216 may have distinct values at distinct operating conditions (e.g., according to an operating diagram 6700, and/or as otherwise determined according to the selected control scheme) and/or during certain operating conditions such as transient operation, steady state operation, and/or categorical operating conditions such as start-up, shut-down, a performance enhanced operating condition, an efficiency enhanced operating condition, an enhanced dynamic response operating condition, an off-nominal operating condition, and/or a saturated operating condition (e.g., where a voltage, frequency, field strength, or other limit in the system is reached and/or approached). In certain embodiments, a controller 6200 may have access to a number of operating diagrams 6700, for example enhancing different aspects of the ESM 1002 performance (e.g., capability, efficiency, dynamic response, and/or stability (e.g., speed, torque, power, voltage, progressions of these, etc.)). Operations of the controller 6200 may include selecting an operating diagram 6700 based on operating conditions, utilizing an operating diagram 6700 as a limit for control values, interpolating between two or more operating diagrams 6700, utilizing a weighted combination of two or more operating diagrams 6700, or the like.

An example excitation circuit further includes a CSI and/or a CSI with a voltage regulator. An example excitation circuit includes a DC current source. An example excitation circuit includes a DC voltage source. An example excitation control circuit 6206 includes a direct torque control circuit (not shown) that interprets a torque target value 6918, and provides a charge sourced to the machine (e.g., utilizing an excitation circuit responsive to an excitation command value 6216) in response to the torque target value 6918.

Figure 68:
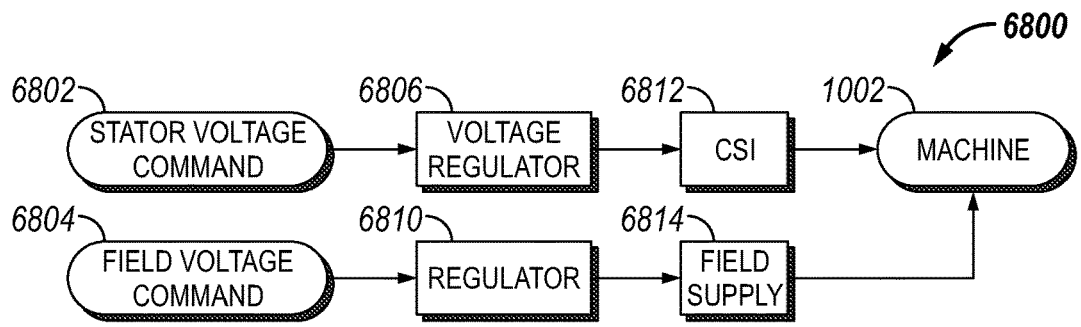
FIG. 68 is a schematic flow diagram of a procedure for electrical regulation for an electrostatic motor.

Referencing FIG. 68, a control operation 6800 for providing a desired output of the ESM 1002 is schematically depicted. Without limitation to any other aspect of the present disclosure, control operations for an electrostatic motor as set forth in U.S. Pat. Nos. 9,960,719 and/or 9,979,323 may be utilized herein. U.S. Pat. Nos. 9,960,719 and 9,979,323 are incorporated herein by reference in the entirety for all purposes. The example control operation 6800 includes a voltage regulator 6806 responsive to a stator voltage command 6802 (e.g., a command determined to provide a desired torque output of the ESM 1002), and a CSI 6812 responsive to the voltage regulator 6806 to provide a selected current to the stator plates, providing a charging current for the stator plates. The example control operation 6800 further includes a regulator 6810 responsive to a field voltage command 6804, and a field supply 6814 responsive to the regulator 6810 to adjust a field voltage of the ESM 1002, including a field provided between stator electrodes and rotor electrodes. An example control operation includes determining a desired d-q voltage vector between d- and q-motor axes (q—is the quadrature axis, and d—is the direct axis, which is perpendicular to the quadrature axis). An example desired d-q voltage vector maximizes the torque produced per unit voltage. The example control operation determines a measured value for the d-q voltage vector, and adjusts the excitation in response to the difference between the measured value and the desired value for the d-q axis. For example, reference U.S. Pat. No. 9,960,719.

Figure 69:
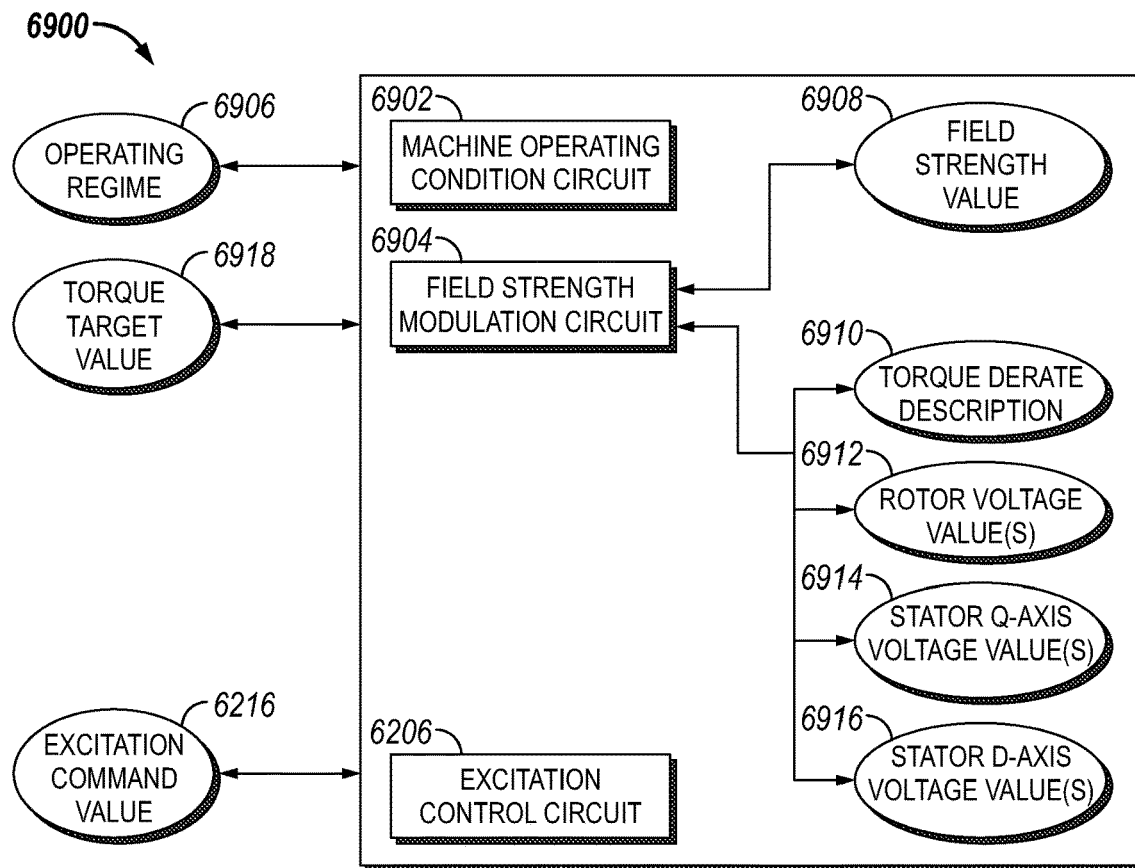
FIG. 69 is a schematic flow diagram of a procedure for a control circuit for an electrostatic motor.

Referencing FIG. 69, an example controller 6200 for providing an excitation command value 6216 is schematically depicted. The example controller 6200 includes a machine operating condition circuit 6902 that interprets an operating regime 6906 of an ESM, a field strength modulation circuit 6904 that determines a field strength value 6908 in response to the operating regime 6906, and an excitation control circuit 6206 that provides an excitation command value 6216 in response to the field strength value 6908. In certain embodiments, the field strength modulation circuit 6904 references an operating diagram (e.g., reference FIG. 67) to determine the field strength value 6908 in response to the operating regime 6906.

An example operating regime 6906 includes an operating condition within a torque-speed space, where the field strength modulation circuit 6904 determines the field strength value 6908 as a reduced field strength value in response to a speed value of the ESM exceeding a threshold value (e.g., 6702). An example field strength modulation circuit 6904 determines the field strength value 6908 as a value to apply an increasing torque derate in response to an increasing speed value of the ESM above the threshold value (e.g., operation along curve 6708, which provides an example torque derate description 6910). An example field strength modulation circuit 6904 determines an adjusted rotor voltage value 6912 in response to the operating regime, for example to adjust a back magneto motive force (mmf) by reducing a rotor voltage. An example field strength modulation circuit 6904 determines an adjusted stator q-axis voltage 6914 magnitude in response to the operating regime, for example to adjust a $2\pi f V_q C$ value, wherein f is the frequency, $V_q$ is the q-axis voltage, and C is the magnitude of the fundamental of the coupling capacitance between a stator terminal and a rotor terminal. An example field strength modulation circuit 6904 determines a stator d-axis voltage injection value 6914 in response to the operating regime, for example to cancel a back-mmf current for the present operating conditions. An example excitation circuit includes a direct torque control circuit (e.g., reference FIG. 71 and the related description), where the direct control circuit interprets a torque target value 6918, and provides a charge sourced to the machine (e.g., as an output of an inverter 7106 and/or a field voltage supply 6814, reference FIGS. 71 and 72 for non-limiting examples) in response to the torque target value 6918. An example excitation circuit includes a current source inverter and a voltage regulator (e.g., reference FIG. 68). An example excitation circuit includes a voltage source inverter (e.g., reference FIG. 71).

Figure 70:
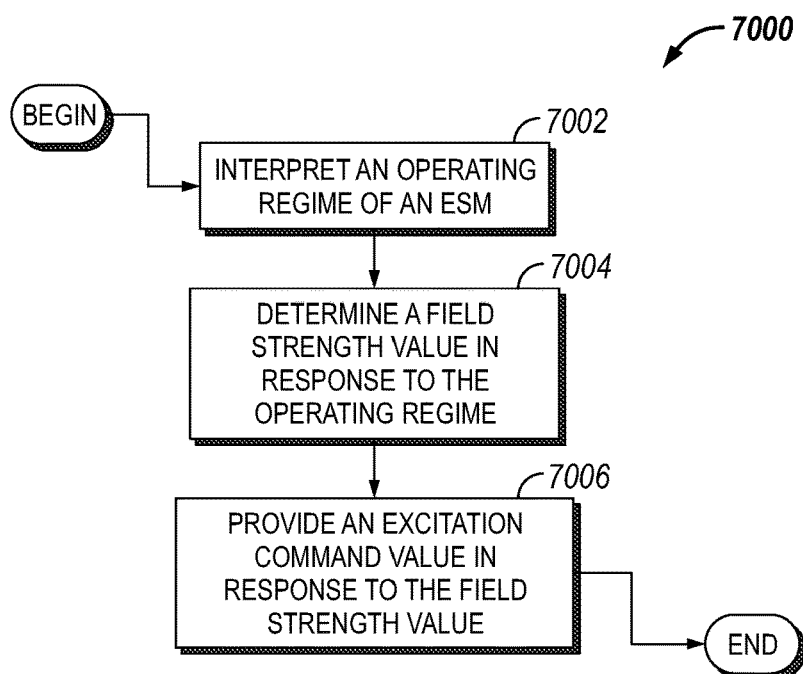
FIG. 70 is a schematic flow diagram of a procedure for providing an excitation command circuit for an electrostatic motor.

Referencing FIG. 70, an example procedure 7000 for providing an excitation command value to an excitation circuit is schematically depicted. The example procedure 7000 includes an operation 7002 to interpret an operating regime of an ESM, and an operation 7004 to determine a field strength value in response to the operating regime. The example procedure 7000 further includes an operation 7006 to provide an excitation command value in response to the field strength value.

Figure 71:
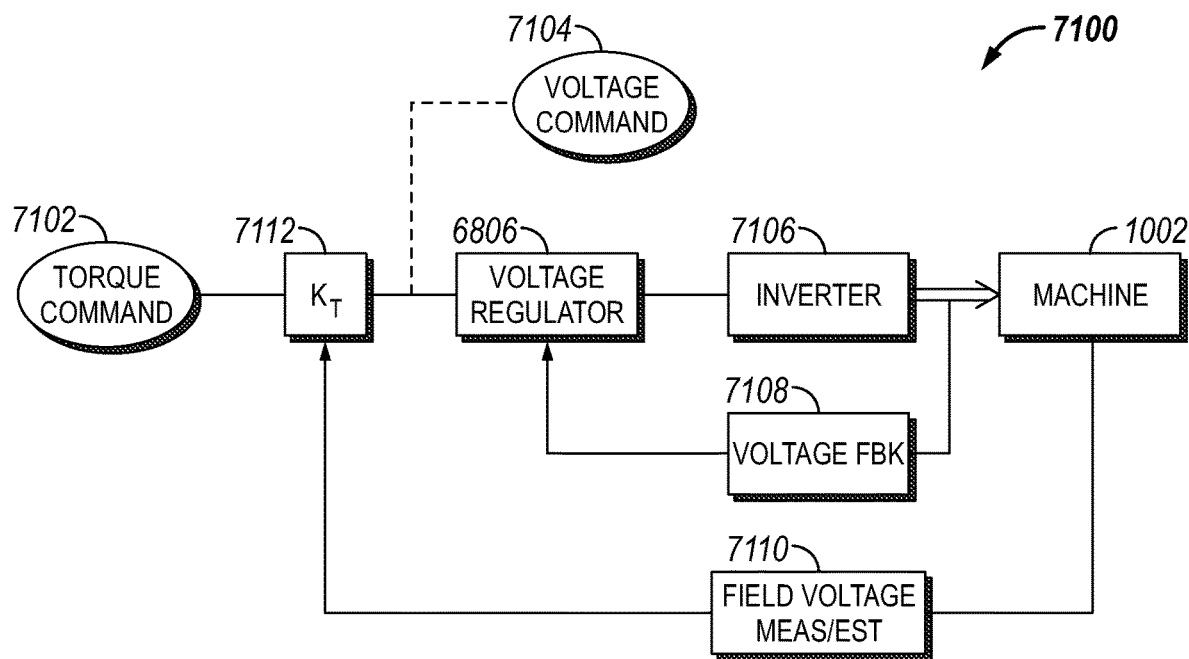
FIG. 71 is a schematic block diagram of a voltage controller for an electrostatic motor.

Referencing FIG. 71, an example control operation 7100 for providing a desired output of an ESM 1002 is schematically depicted. The example control operation 7100 receives a torque command 7102, for example a desired torque output of the ESM 1002. The example control operation 7100 includes a voltage regulator 6806 that provides a voltage command to an inverter (e.g., a VSI) in response to the torque command 7102. The example voltage regulator 6806 applies a gain 7112 to the torque command 7102 to determine a corresponding voltage command 7104. The example control operation 7100 includes the inverter 7106 providing a desired voltage to rotor and/or stator plates of the ESM 1002, thereby generating the desired torque for the ESM 1002. In certain embodiments, the control operation 7100 includes a field voltage feedback component 7110 that determines a field voltage of the ESM 1002, for example by measuring the field voltage, and/or estimating the field voltage based other parameters (e.g., observed current and/or voltage outputs of the excitation circuit, a model of electrodes, observed speed and/or position of rotors, etc.). The control operation 7100 utilizes the field voltage feedback value 7110 to determine an error parameter, including either a torque error parameter and/or a voltage error parameter, and where the voltage regulator 6806 adjusts a voltage command 7104 to the inverter 7106 in response to the determined error parameter. In certain embodiments, the voltage regulator 6806 operates a proportional (P) control operation, an integral (I) control operation, a derivative (D) control operation, combinations of these, and/or responsive to the determined error parameter. An example control operation 7100 further includes a voltage feedback component 7108 that determines an output voltage of the inverter 7106, and provides the output voltage to the voltage regulator 6806. In the example, the voltage regulator 6806 determines an error parameter for the output voltage in response to the determined output voltage of the inverter, and further adjusts the voltage command 7104 in response to the error parameter. In certain embodiments, the voltage regulator 6806 operates a proportional (P) control operation, integral (I) control operation, derivative (D) control operation, and/or combinations of these in response to the error determined from the voltage feedback 7108. In certain embodiments, control response to the final output (e.g., the field voltage 7110) is operated as an outer loop control operation, and control response to the inverter 7106 voltage is operated as an inner loop control operation.

Figure 72:
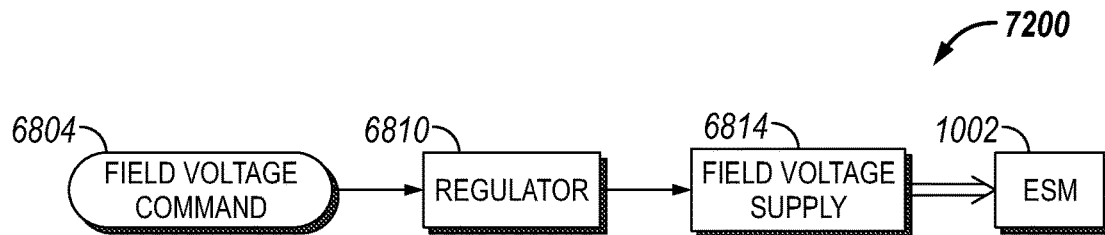
FIG. 72 is a schematic block diagram of a voltage controller for an electrostatic motor.

Referencing FIG. 72, an example control operation 7200 for providing a desired output of an ESM 1002 is schematically depicted. The example control operation 7200 includes receiving a field voltage command 6804, and a regulator 6810 responsive to the field voltage command 6804 to provide a command to a field voltage supply 6814. The field voltage supply 6814 is configured to charge the stator electrodes and/or rotor electrodes, thereby providing a field voltage of the capacitive stack in response to the field voltage command 6804.

Figure 73:
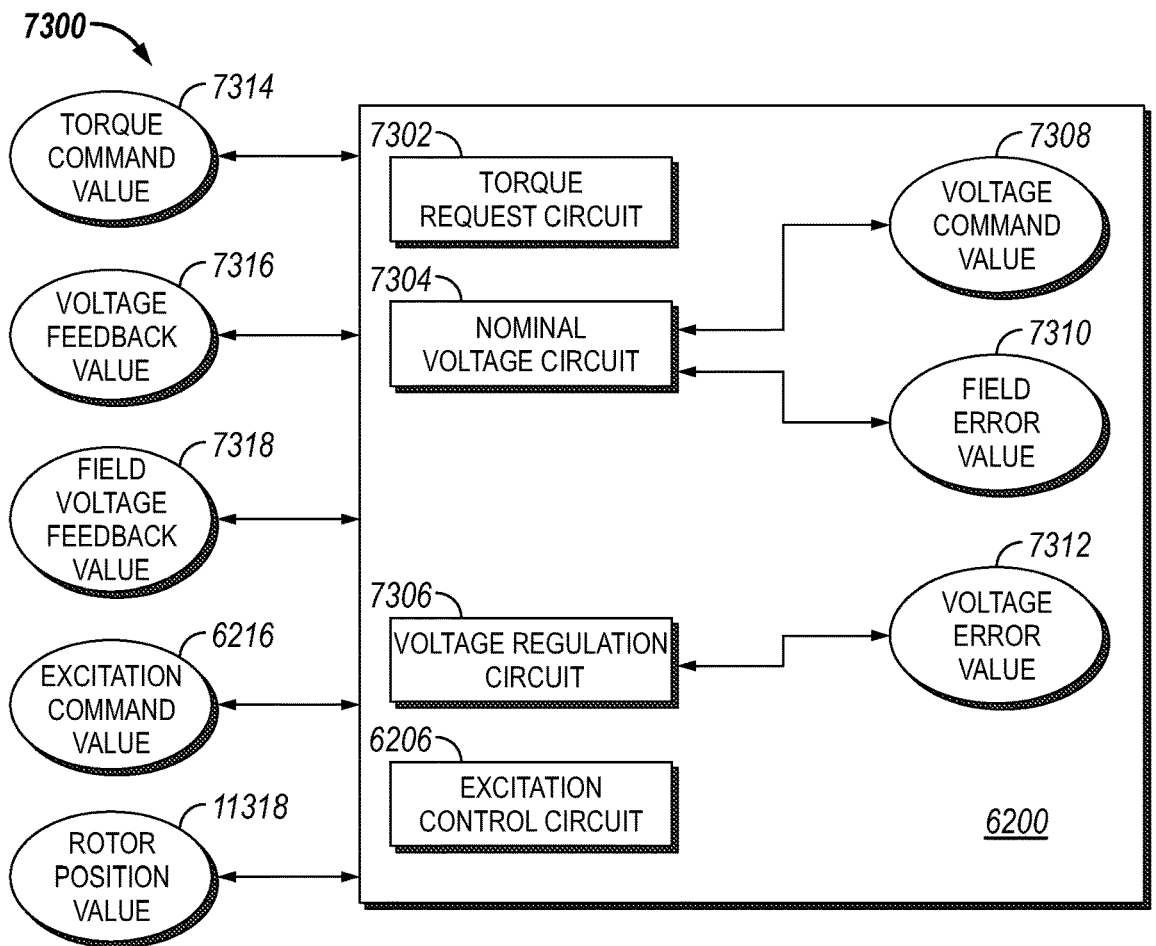
FIG. 73 is a schematic flow diagram of a procedure for a control circuit for an electrostatic motor.

Referencing FIG. 73, an example controller 6200 for providing an excitation command value 6216 is schematically depicted. The example controller 6200 includes a torque request circuit 7302 that interprets a torque command value 7314, a nominal voltage circuit 7304 that determines a voltage command value 7308 in response to the torque command value 7314, and an excitation control circuit 6206 that provides an excitation command value 6216 in response to the voltage command value 7308. An example system includes an excitation circuit responsive to the excitation command value 6216, which may include an inverter, a VSI, and/or a CSI.

An example nominal voltage circuit 7304 determines the voltage command value 7308 as a function of the torque command value 7314—for example, a voltage command value 7308 that provides the requested torque, and/or as a value that progresses acceptably toward the requested torque. In certain embodiments, the nominal voltage circuit 7304 further determines the voltage command value 7308 in response to a rotor position value 11318, for example accounting for the electrical position of the electrodes and the varying torque of the capacitive stack as the rotor stack progresses. The rotor position value 11318 may be determined from an encoder or other feedback operation, and may further include utilization of a calibrated rotor position value 11312 and/or encoder offset value 11316 (e.g., reference FIG. 113 and the related description). An example nominal voltage circuit 7304 determines the voltage command value 7308 by applying a gain to the torque command value 7314.

An example controller 6200 further includes a voltage regulation circuit 7306 that interprets a voltage feedback value 7316 including a voltage response of the excitation circuit (e.g., a CSI), and adjusts the excitation command value 6216 in response to the voltage feedback value 7316. An example voltage regulation circuit 7306 determines a voltage error value 7312 in response to the voltage command value 7308 and the voltage feedback value 7316, applies a proportional, integral, and/or derivative gain to the voltage error value 7312, and adjusts the excitation command value 6216 in response to the applied gain(s).

An example controller 6200 includes the nominal voltage circuit 7304 interpreting a field voltage feedback value 7318 that includes a field voltage between the rotor plate and the stator plate, determines a field error value 7310 in response to the field voltage feedback value 7318 and the torque command value 7314, and adjusts the voltage command value 7308 in response to the field error value. An example adjusted voltage command value 7308 includes a rotor voltage value (e.g., a voltage to be applied to the rotor stack). An example field voltage feedback value 7318 includes a measured parameter representative of the field voltage, and/or an estimated field voltage value. An example nominal voltage circuit 7304 further applies a proportional, integral, and/or derivate gain to the field error value 7310, and adjusts the voltage command value 7308 further in response to the applied gain(s).

An example controller 6200 includes the voltage regulation circuit 7306 operating an inner loop control operation of a voltage output of the excitation control circuit, and an outer loop control operation of a field voltage of a capacitive field between the rotor plate and the stator plate. An example excitation circuit includes one or more of: a voltage source, a voltage source inverter, and/or a current source.

Figure 74:
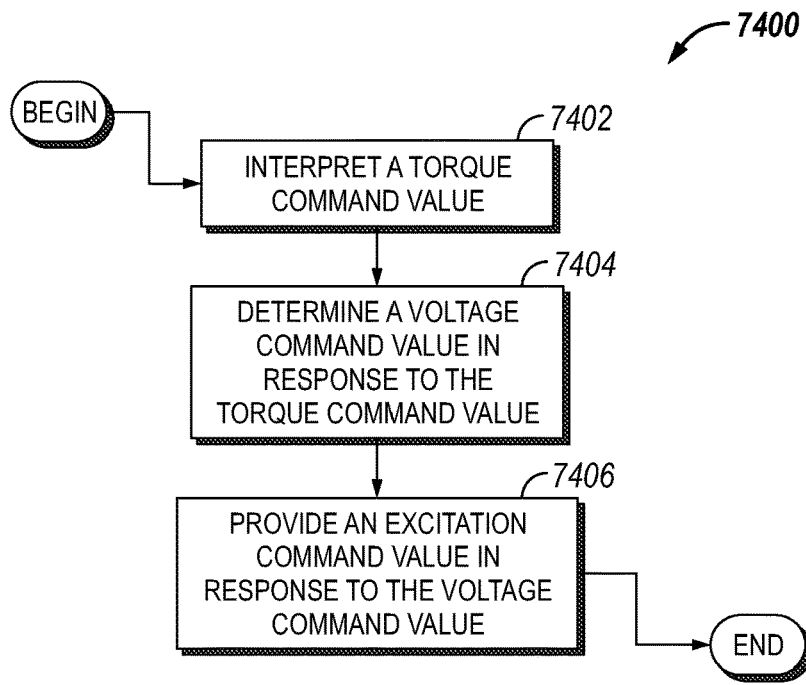
FIG. 74 is a schematic flow diagram of a procedure for providing an excitation command circuit for an electrostatic motor.
Figure 75:
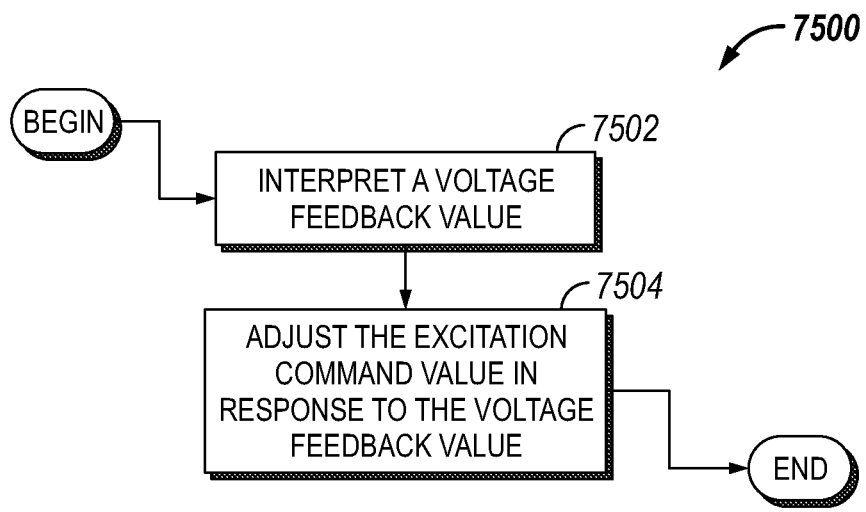
FIG. 75 is a schematic flow diagram of a procedure for providing an excitation command circuit for an electrostatic motor.
Figure 76:
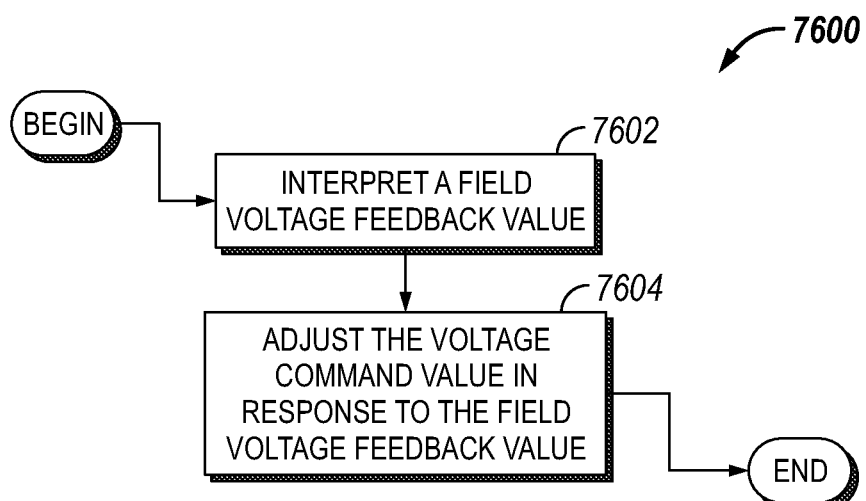
FIG. 76 is a schematic flow diagram of a procedure for providing a voltage command circuit for an electrostatic motor.
Figure 77:
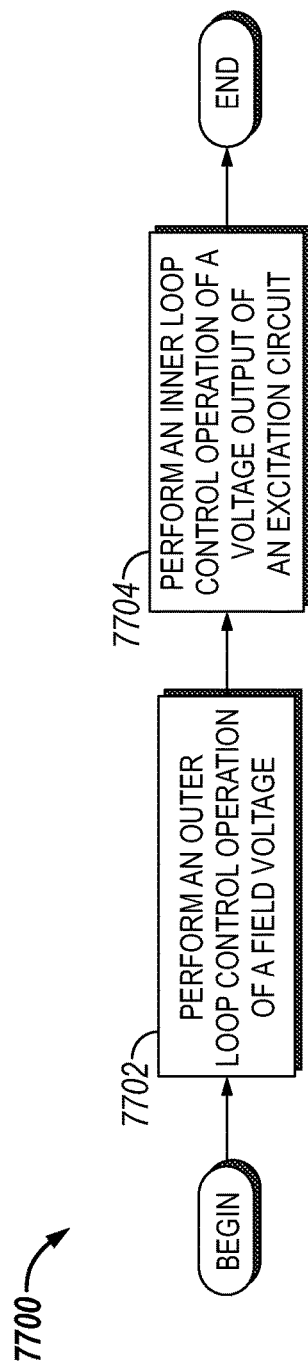
FIG. 77 is a schematic flow diagram of a procedure for an electrical control circuit for an electrostatic motor.

Referencing FIG. 74, an example procedure 7400 for providing an excitation command value to an excitation circuit is schematically depicted. The example procedure 7400 includes an operation 7402 to interpret a torque command value, an operation 7404 to determine a voltage command value in response to the torque command value, and an operation 7406 to provide an excitation command value in response to the voltage command value. Referencing FIG. 75, an example procedure 7500 for adjusting an excitation command value is depicted. Example procedure 7500 may be performed, without limitation, as an addition to procedure 7400. The example procedure 7500 includes an operation 7502 to interpret a voltage feedback value (e.g., from an inverter output), and an operation 7504 to adjust the excitation command value in response to the voltage feedback value. Referencing FIG. 76, an example procedure 7600 for adjusting a voltage command value for an excitation circuit is depicted. Example procedure 7600 may be performed, without limitation, as an addition to procedure 7400. The example procedure 7600 includes an operation 7602 to interpret a field voltage feedback value and determine a field error value in response to the field voltage feedback value, and an operation 7604 to adjust the voltage command value in response to the field error value. Referencing FIG. 77, an example procedure 7700 for controlling an excitation circuit of an ESM is schematically depicted. Example procedure 7700 may be performed, without limitation, in conjunction with any one or more of procedures 7400, 7500, 7600. The example procedure 7700 includes an operation 7702 to perform an outer loop control operation of a field voltage, and an operation 7704 to perform an inner loop control operation of a voltage output of an excitation circuit.

Figure 78:
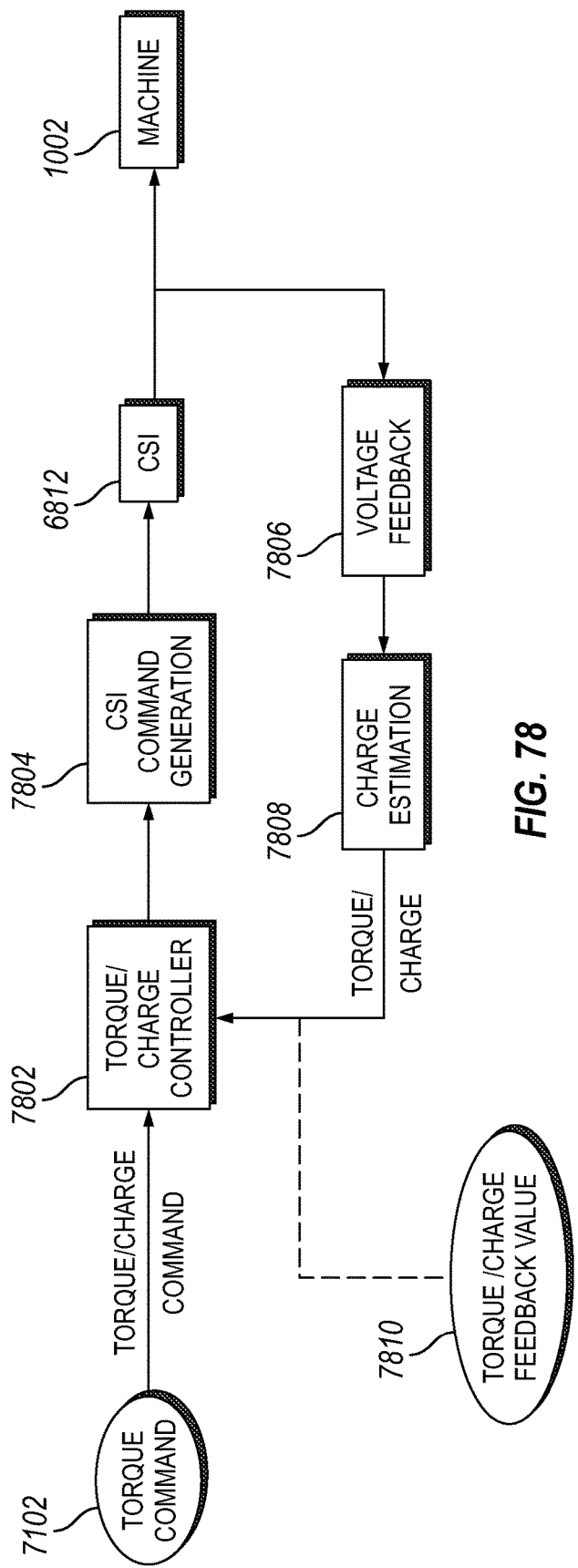
FIG. 78 is a schematic block diagram of a torque controller for an electrostatic motor.

Referencing FIG. 78, an example control operation 7800 to perform direct torque control of an ESM is schematically depicted. The example control operation 7800 includes a torque/charge controller 7802 that interprets a torque command 7102, and provides the torque command 7102 to a CSI command generation component 7804 that translates the torque command 7102 to a command for a CSI. The torque command 7102 may additionally or alternatively include a charge command (e.g., a charge value for the capacitive stack that would produce a selected torque). The example control operation 7800 includes the CSI 6812 responsive to the CSI command, thereby providing excitation to stator plates and/or rotor plates of the ESM. In certain embodiments, the control operation 7800 includes a voltage feedback component 7806 to determine a voltage provided by the excitation component, and a charge estimation component 7808 that determines one of a torque feedback and/or charge feedback value 7810, representative of the performance of the ESM relative to the torque command 7102. The example torque/charge controller 7802 utilizes the torque/charge feedback value 7810, for example to determine an error value relative to the torque command 7102, adjusting the torque/charge command 7102 and/or the CSI command responsive to the feedback value 7810. In certain embodiments, the charge estimation component 7808 utilizes voltage feedback and/or current feedback from stator electrodes, rotor electrodes, and/or power couplings (e.g., a bus circuit, CSI, field voltage supply, etc.), and/or a rotor position value 11318 to determine the estimate of the charge. Without limitation to any other aspect of the present disclosure, any operations to determine the charge feedback value 7910 (e.g., reference FIG. 79) may be utilized by the charge estimation component 7808. In certain embodiments, the torque/charge controller 7802 and/or CSI command generation component 7804 operate a proportional, integral, and/or derivative controller based on the error value.

Figure 79:
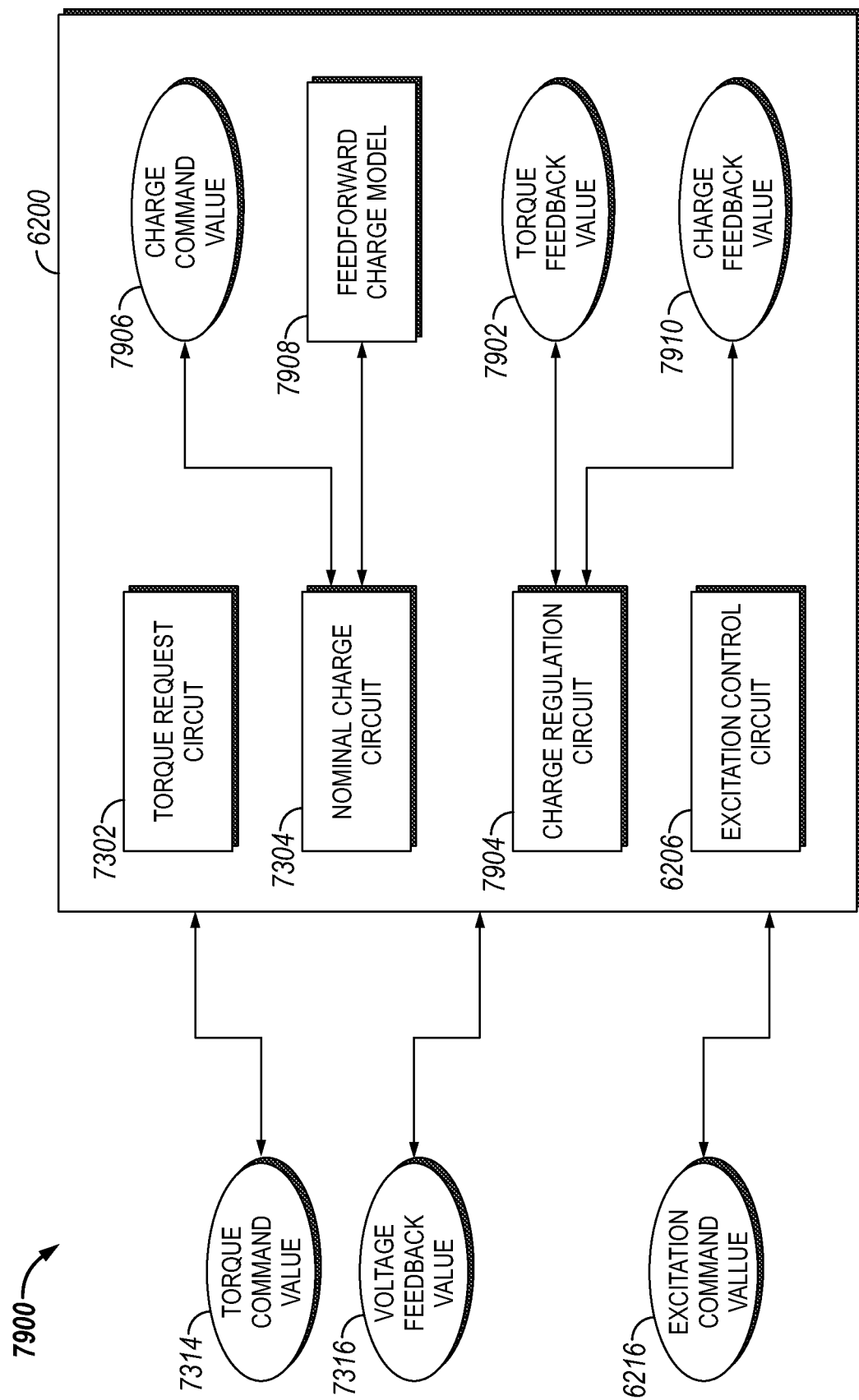
FIG. 79 is a schematic flow diagram of a procedure for providing an excitation command circuit for an electrostatic motor.

Referencing FIG. 79, an example controller 6200 for providing an excitation command value 6216 is schematically depicted. The example controller 6200 includes a torque request circuit 7302 that interprets a torque command value 7314, and a nominal charge circuit that determines a charge command value 7906 in response to the torque command value 7314. In certain embodiments, the torque command value 7314 may be a charge command value. The example controller 6200 includes an excitation control circuit 6206 that provides an excitation command value 6216 in response to the charge command value 7906.

An example controller 6200 includes a charge regulation circuit 7904 that interprets a current feedback value, for example a current response of a current source, CSI, and/or other excitation circuit and/or component thereof. An example nominal charge circuit 7304 adjusts a charge command value 7906 in response to the current feedback value, for example to perform closed loop control operations of the excitation circuit to provide a charge value responsive to the charge command value 7906. An example charge regulation circuit 7904 operates a charge estimation model (e.g., such as charge estimation component 7808) on the current feedback value to adjust the charge command value.

An example controller 6200 further includes the nominal charge circuit 7304 operating a feedforward charge model 7908 to determine the charge command value 7906 in response to the torque command value 7314. For example, the feedforward charge model 7908 may account for dynamic response of the excitation circuit, the stator stack, the rotor stack, a current speed of the ESM, and/or field weakening operations (e.g., reference FIG. 67), to determine a charge command value 7906 that is responsive to the torque command value 7314 (and/or charge command value). An example nominal charge circuit 7304 determines at least one of a stator excitation current and/or a rotor excitation current, and operates the feedforward charge model 7908 in response to the determined stator excitation current and/or a rotor excitation current. Accordingly, an example nominal charge circuit 7304 utilizes one or more current values to determine the charge command value 7906 in response to the torque command value 7314. Additionally or alternatively, an example nominal charge circuit 7304 utilizes one or more current values to determine a torque feedback value 7902, a torque error value, a charge feedback value 7910, a charge error value, a voltage feedback value 7316, and/or a voltage error value 7312.

An example controller 6200 includes a charge regulation circuit 7904 that interprets a voltage feedback value 7316 including a voltage response of the excitation circuit (e.g., a CSI), where the nominal charge circuit 7304 adjusts the charge command value 7906 in response to the voltage feedback value 7316. An example controller 6200 includes a charge regulation circuit 7904 that converts the voltage feedback value 7316 into a torque feedback value 7902 (e.g., estimating a torque generated under the current field conditions and rotor position), and adjusts the charge command value 7906 in response to the torque feedback value 7902. An example controller 6200 includes the nominal charge circuit 7304 determining a torque error value in response to the torque feedback value 7902 and the torque command value 7314 and adjusting the charge command value 7906 in response to the torque error value. An example controller 6200 includes the nominal charge circuit 7304 applying a proportional gain, an integral gain, and/or a derivative gain to the torque error value, and adjusting the charge command value 7906 in response to the applied gain(s). An example nominal charge circuit 7304 applies a dead-bead control operation to adjust the charge command value 7906. An example nominal charge circuit 7304 adjusts the charge command value 7906 by performing a control stabilization operation. Example and non-limiting control stabilization operations include one or more of: applying a hysteresis to the response to the torque error value; applying a deadband in response to the torque error value (e.g., reducing sign switching and/or toggling behavior); and/or applying a slew limit for change to a control gain parameter, the torque error value, and/or a feedforward model parameter.

An example controller 6200 includes the charge regulation circuit 7904 further converting the voltage feedback value 7316 into a charge feedback value 7910, and the nominal charge circuit 7304 further adjusting the charge command value 7906 in response to the charge feedback value 7910. The charge feedback value 7910 may be estimated and/or modeled, for example utilizing measured voltage and/or current, and/or utilizing provided voltage and/or current values to the electrodes, to determine the charge value on the electrodes and/or the resulting electric field. An example charge regulation circuit 7904 further determines the charge feedback value 7910 in response to a rotor position value 11318 (e.g., reference FIGS. 73, 113 and the related description). An example nominal charge circuit 7304 further determines a charge error value in response to the charge feedback value 7910, and adjusts the charge command value 7906 in response to the charge feedback value 7910. An example nominal charge circuit 7304 further applies a proportional, integral, and/or derivative gain to the charge error value, and adjusts the charge command value 7906 in response to the applied gain(s). An example nominal charge circuit 7304 applies a dead-beat control operation to adjust the charge command value 7906. An example nominal charge circuit 7304 adjusts the charge command value 7906 by performing a control stabilization operation. Example and non-limiting control stabilization operations include one or more of: applying a hysteresis to the response to the torque error value; applying a deadband in response to the torque error value (e.g., reducing sign switching and/or toggling behavior); and/or applying a slew limit for change to a control gain parameter, the torque error value, and/or a feedforward model parameter.

With further reference to FIG. 79, an example controller 6200 includes a torque request circuit 7302 that interprets a torque command value 7314, a nominal charge circuit 7304 that determines a charge command value 7906 in response to the torque command value 7314, and an excitation control circuit 6206 that provides an excitation command value 6216 in response to the charge command value.

Figure 80:
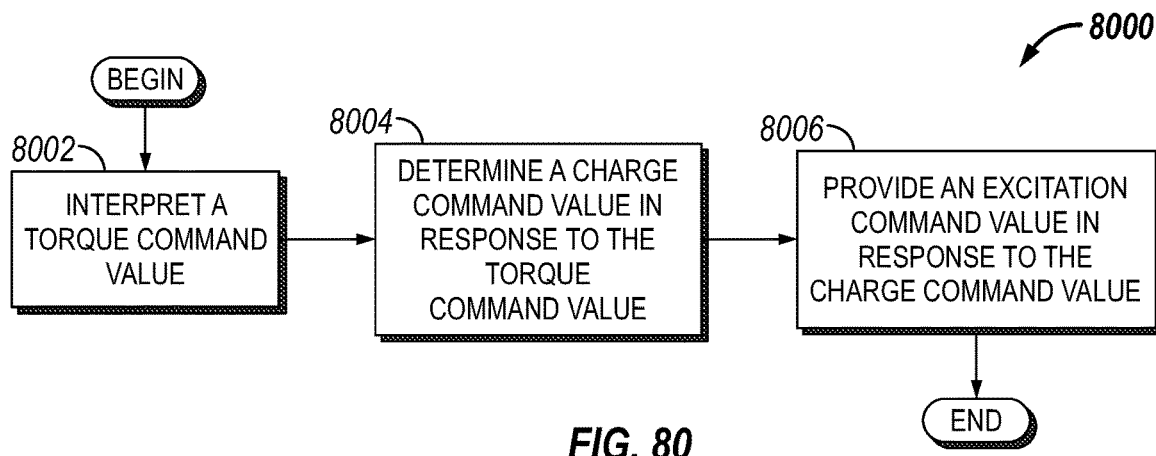
FIG. 80 is a schematic flow diagram of a procedure for providing an excitation command circuit for an electrostatic motor.
Figure 81:
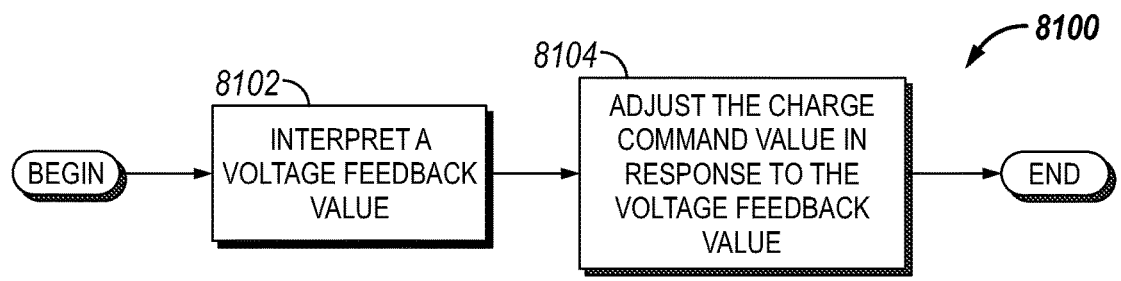
FIG. 81 is a schematic providing a voltage feedback command circuit for an electrostatic motor.
Figure 82:
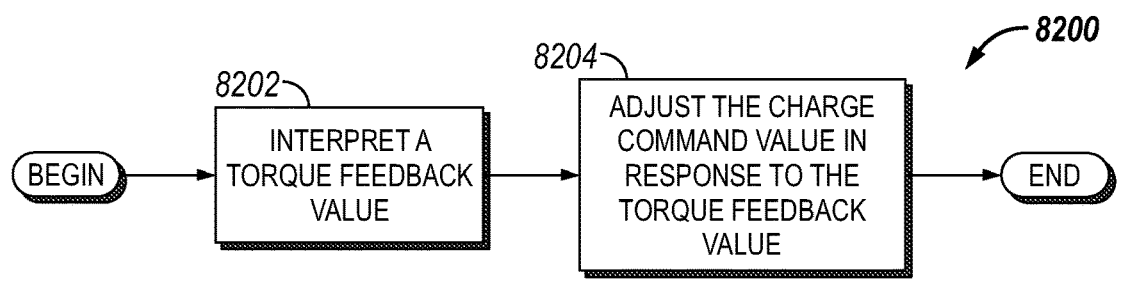
FIG. 82 is a schematic providing a torque feedback command circuit for an electrostatic motor.
Figure 83:
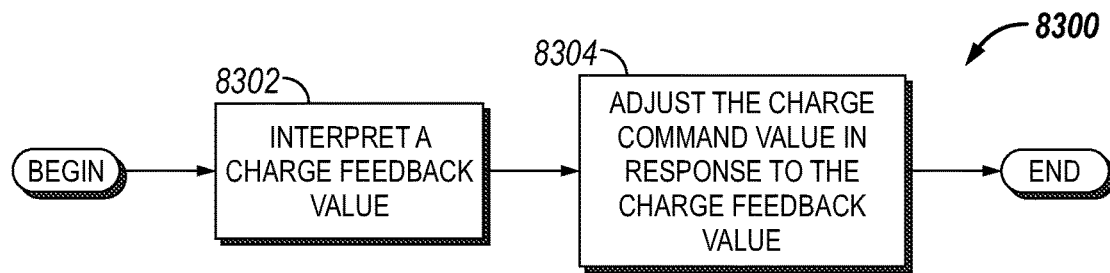
FIG. 83 is a schematic providing a charge feedback command circuit for an electrostatic motor.

Referencing FIG. 80, an example procedure 8000 for providing an excitation command value 6216 is depicted. The example procedure 8000 includes an operation 8002 to interpret a torque command value (and/or a charge command value), and an operation 8004 to determine a charge command value in response to the torque command value. The example procedure 8000 further includes an operation 8006 to provide an excitation command value in response to the charge command value. Referencing FIG. 81, an example procedure 8100 for adjusting a charge command value is schematically depicted. The example procedure 8100 may be performed, without limitation, as an addition to procedure 8000. The example procedure 8100 includes an operation 8102 to interpret a voltage feedback value, and an operation 8104 to adjust the charge command value in response to the voltage feedback value. Referencing FIG. 82, an example procedure 8200 for adjusting a charge command value is schematically depicted. The example procedure 8200 may be performed, without limitation, as an addition to procedure 8000. The example procedure 8200 includes an operation 8202 to interpret a torque feedback value, and an operation 8204 to adjust the charge command value in response to the torque feedback value. Referencing FIG. 83, an example procedure 8300 for adjusting a charge command value is schematically depicted. The example procedure 8300 may be performed, without limitation, as an addition to procedure 8000. The example procedure 8300 includes an operation 8402 to interpret a charge feedback value, and an operation 8304 to adjust the charge command value in response to the charge feedback value.

Figure 84:
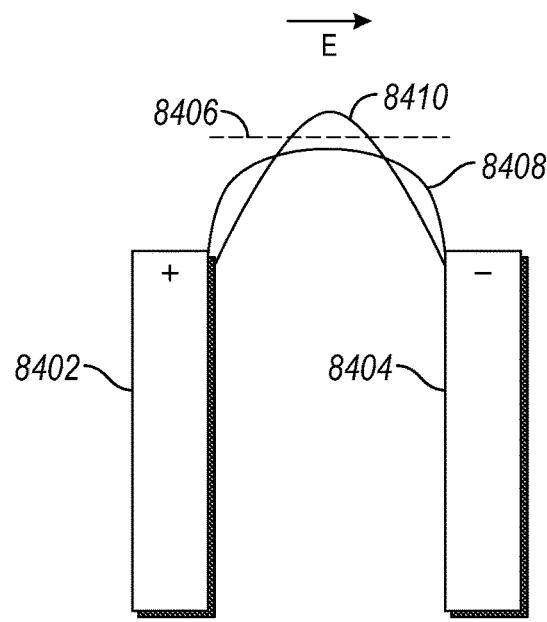
FIG. 84 is a schematic depiction of an electrical field distribution for an electrostatic motor.

Referencing FIG. 84, two example field strength trajectories 8408, 8410 in a gap between electrodes 8402, 8404 are schematically depicted. In the example of FIG. 84, an example breakdown field strength 8406 threshold is depicted. The breakdown field strength 8406 is depicted as a single value, but may depend upon the dynamic situation in the gap, for example depending upon charge concentrations on the electrodes 8402, 8404, physical structure of the surface of the electrodes 8402, 8404; and/or the compositions of the dielectric fluid in the gap (e.g., entrained gases; additives; and/or a space charge effect constituents such as from ions, migrating particulates, free electrons, etc.). The breakdown field strength 8406 depends generally upon the dielectric strength of the dielectric fluid and the geometric arrangement (e.g., distance between electrodes 8402, 8404) of the gap. Without limitation to any other aspect of the present disclosure, or a particular theory of operation, numerous aspects of the present disclosure contribute to increasing an area under an electric field-distance curve (e.g., an area under a curve 8408 between the electrodes 8402, 8404). The area under the electric field-distance curve is related to the stored energy in the capacitive stack, and therefore related to the torque and/or power that can be generated by the ESM 1002. Numerous aspects of the present disclosure cooperate to increase the breakdown field strength 8406, and/or adjust (e.g., flatten) the field strength trajectory such as: the permittivity of the dielectric fluid; a selection of fluid constituents to maintain a permittivity profile related to operating temperatures; protection of the dielectric fluid from impurities, presence of water, and/or presence of gases; providing a surface smoothness of the electrodes 8402, 8404 (or portions thereof), related surfaces, and/or a housing inner surface; rinsing/removal of particles and/or impurities (e.g., from manufacturing residue, etc.); provision of a surface treatment on at least a portion of an electrode, and/or on a surface adjacent to the electrode, including varying surface treatments for different electrodes; provision of a coating on at least a portion of an electrode and/or on a surface adjacent to the electrode, including varying the coating for different electrodes; provision of a surface treatment and/or coating on a component at least selectively contacting the dielectric fluid (e.g., a housing inner surface, a packed bed, a side chamber, flow path, and/or eddy region); protection of composition integrity of the dielectric fluid (e.g., managing materials of bearings, seals, plates, etc. to avoid material breakdown and/or introduction of degradation constituents that negatively affect the performance of the dielectric fluid); introduction of a field disrupting additive into the dielectric fluid (e.g., a coated metal oxide, a nano-particle, and/or a conductive particle having a conductor that isolate the conductive particle from physical contact with the dielectric fluid); introduction of an ion scavenging additive into the dielectric fluid (e.g., BHT, antioxidants, etc.); management of gap distance (e.g., using bearings, magnetic separation, a separation assembly, etc.); and/or selected field weakening at certain operating conditions. The utilization of various field management aspects of the present disclosure allows for an increased average field strength in the gap, while maintaining a peak field strength below a breakdown threshold 8406, thereby increasing capacitive energy storage and consequent performance of the ESM 1002.

In certain embodiments, one or more aspects of the present disclosure, such as: the utilization of polished surfaces; smooth surfaces (e.g., a glass surfaced rotor plate and/or stator plate); a coating at least partially on and/or associated with an electrode and/or plate surface near the electrode; provision of an insulating and/or dielectric material between electrodes (e.g., on a same plate); a surface treatment of at least a portion of an electrode and/or plate surface near the electrode; additives for the dielectric fluid; excitation parameter management for the capacitive stack and/or portions thereof; fluid conditioning; fluid dewatering; fluid gas management; enforcement of a minimum separation distance; provision for axial freedom of movement for at least a portion of the capacitive stack; reduction, mitigation, and/or utilization of charge carriers in the dielectric fluid (e.g., fluid treatment and/or filling operations, removal and/or mitigation of contaminants, hardening and/or surface treatment of exposed surfaces within the ESM, and/or management of compatibility of exposed surfaces with the fluid); and/or temperature management of the dielectric fluid, provide for a field strength trajectory in the gap that enhances the torque density and/or power density of the ESM. In certain embodiments, aspects of the present disclosure reduce the field strength near the electrodes, and enhance the field strength in the gap away from the electrodes, allowing for an overall increase in the field strength without causing a breakdown of the dielectric fluid. Additionally or alternatively, the field consistency introduced by various embodiments (e.g., surface smoothing, coatings, uniform charge distribution, and/or dielectric fluid management) allows for a design to be operated closer to design limitations (e.g., the breakdown field strength 8406) while maintaining reliability of the ESM 1002 and confidence that a breakdown will not occur during operations.

Figure 85A:
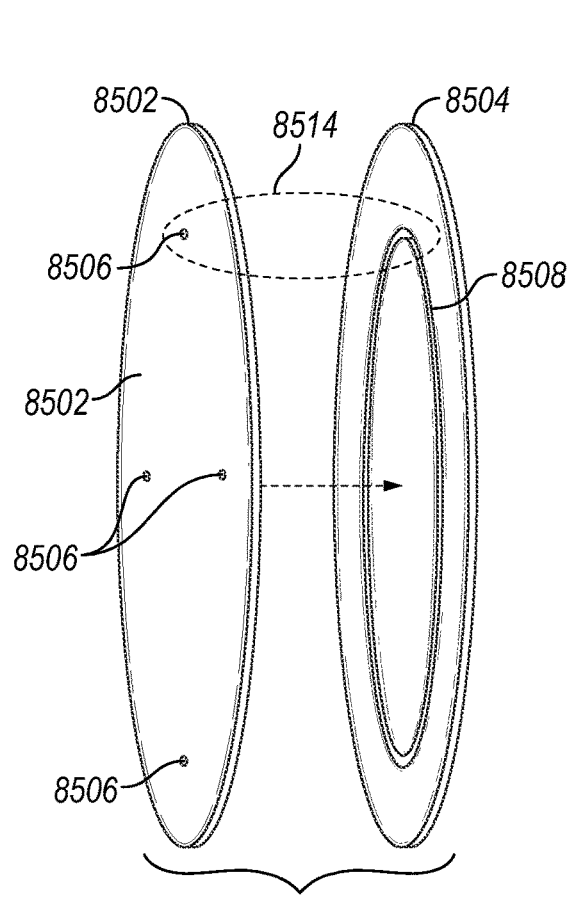
FIG. 85A is a schematic depiction of a bearing-track system on a stator-rotor pair for an electrostatic motor.
Figure 85B:
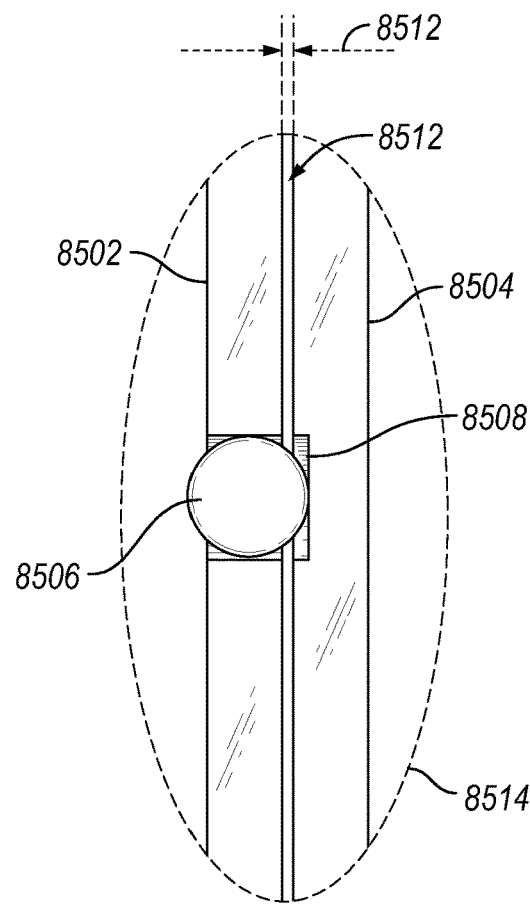
FIG. 85B is a schematic depiction of a bearing-track system detail on a stator-rotor pair for an electrostatic motor.

With reference to FIGS. 85A and 85B, an example electrostatic motor includes a rotor plate and an adjacent stator plate, where a first one 8502 of the rotor plate or stator plate includes at least one coupled bearing 8506 (and/or a rolling element), and where the other one 8504 of the rotor plate or stator plate includes a race 8508 radially aligned with the coupled bearing 8506. The coupled bearing may have a width with a first contact point on the first one of the rotor plate or stator plate and a second contact point on the race on the other one of the rotor plate or stator plate to maintain a minimum separation distance 8512 between the rotor plate and the stator plate, enforced by engagement of the bearing 8506, coupled to the first plate 8502, and engaging the second plate 8504. The enforced minimum separation distance 8512 may be any value according to the design of the capacitive stack for the ESM, and will depend upon, for example, the strength of the electric field, the amount of axial movement and flexing experienced by the rotor and/or stator plates, tolerance stack up values for components of the capacitive stack 702, and/or the permittivity of the electrode separation fluid (e.g., dielectric fluid) disposed in the gap. The minimum separation distance 8512 may be small (e.g., 1 mm or lower) for a small ESM having a low field strength, and small (and therefore less flexible) rotor and/or stator plates. The minimum separation distance 8512 may be large (e.g., 1 cm or greater) for a large ESM having a high field strength, and large (and therefore more flexible) rotor and/or stator plates. An example minimum separation distance includes a value of at least 0.1 mm, and/or a value of up to about 3 cm. An example minimum separation distance may be determined based upon another aspect of the ESM, for example a value of about 0.1%, 1%, 2%, and/or 5% of a radial extent (which may be measured from the shaft and/or a rotational center of the capacitive stack and/or ESM) of one of the rotor plates, stator plates, nominal diameter of the capacitive stack 702, or a selected fraction of another aspect of the ESM. The described examples of a minimum separation distance are non-limiting examples.

Further in reference to FIGS. 85A and 85B, an example separation assembly includes a bearing 8506 extending axially from a first plate 8502 at a distance such that engagement with a race 8508 or other contacting surface of a second plate 8504 maintains the minimum separation distance 8512 between electrodes of the respective plates. An example system includes a fluid present in the intervening space 8512 between the rotor plate and the stator plate. In embodiments, the coupled bearing 8506 may be a ball bearing, cylindrical bearing, thrust bearing, conical bearing, tapered bearing, and the like, coupled to the first one of the rotor plate or stator plate.

Figure 86:
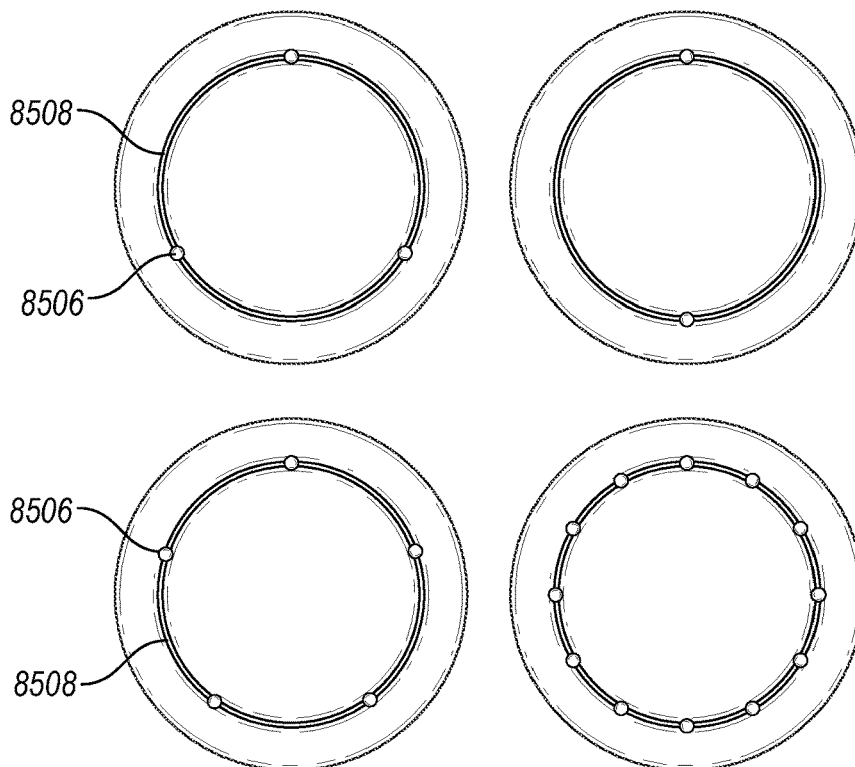
FIG. 86 is a schematic depiction of a bearing configuration on a stator-rotor assembly for an electrostatic motor.
Figure 87:
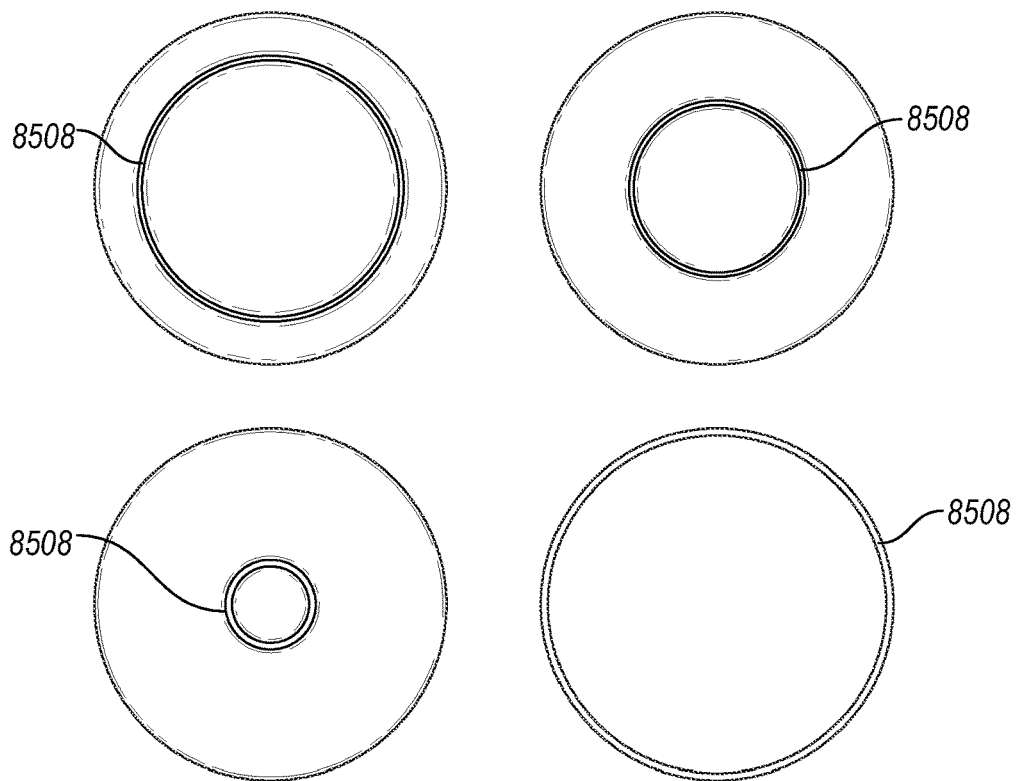
FIG. 87 is a schematic depiction of a bearing track configuration on a stator-rotor assembly for an electrostatic motor.

The coupled bearing and race may be located a radial distance from a rotational center of the stator-rotor system, such as represented in FIGS. 86 and 87. For instance, the coupled bearing on the first one of the rotor plate or stator plate and the race on the other one of the rotor plate or stator plate may be located greater than or equal to 35%, 50%, 90%, and the like the distance from the rotational center of the system to the outer most extent of the rotor plate and stator plate. The selection of the radial distance of the bearings may consider the rotating mass of the plates relative to the bearing engagement location, the extended "cantilevered" remainder of the plate radially outside of the bearing engagement position (e.g., for a shaft-coupled plate) and/or radially inside of the bearing engagement position (e.g., for a housing-coupled plate), the expected force between the plates, and the axial movement of the plates during operation of the ESM.

The coupled bearing 8506 on the first one of the rotor plate or stator plate and the race 8508 on the other one of the rotor plate or stator plate may be located a radial distance from the rotational center of the system to the outer most extent of the rotor plate and stator plate such that half the collective mass of the rotor plate and the adjacent rotor plate lies between the rotational center of the system (e.g., about 70% of the radial distance from the center to the outside, depending upon the specific geometry and configuration of the plates, including components such as substrates, electrodes, mechanical features, and/or circuitry) and the location of the coupled bearing and race. In embodiments, the coupled bearing may be one of a plurality of azimuthally distributed bearings radially aligned with the race, such as represented in FIGS. 85A, 85B, and 86. The selection of azimuthal positions and the number of bearing elements to include will depend, similar to the radial position, on the dynamic forces and flexing of the plates that occur during operations of the ESM. For instance, the number of the plurality of azimuthally distributed bearings 8506 may be less than or equal to three, greater than three but less than or equal to six, greater than six, and the like. The bearings 8506 may be distributed equally (e.g., three bearings at 120 degree spacing) or unequally (e.g., four bearings, with 60/120 spacing). Equal spacing provides the greatest separating support with the fewest number of bearing elements. Unequal spacing may be desirable for other reasons, for example to balance the rotational inertia of a plate, to provide for convenient manufacturing of a component, and/or to utilize a same plate template for bearing receptacles, for example where a given configuration (e.g., 6 bearing receptacles at 60-degree spacing) can support multiple configurations (e.g., utilizing 6 bearings or 4 bearings, for example depending upon the rating of the ESM, etc.).

With reference to FIG. 88 the electrostatic motor may include a rotor plate 8522 and an adjacent stator plate 8524, where the rotor plate 8522 includes a first coupled bearing 8528 and the stator plate includes a first race 8530 radially aligned with the first coupled bearing 8528. The example of FIG. 88 depicts a stator plate 8524 having a second coupled bearing 8532 engaging a second race 8526 on the rotor plate 8522. The distribution of bearing elements 8528, 8532 between the plates may be utilized, for example, to provide a selected weight distribution, provide space on plates for selected elements (e.g., circuit connections, electrodes, etc.). In certain embodiments, only the rotor plates or the stator plates may include the bearing elements. In certain embodiments, the bearing elements are distributed between rotor plates and stator plates. The example stator plate 8524 includes a second coupled bearing 8532 and the rotor plate 8522 includes a second race 8526 radially aligned with the second coupled bearing 8526. In embodiments, at least one of the first coupled bearing on the rotor plate and the race on the stator plate, and the second coupled bearing on the stator plate and the race on the rotor plate, may be located greater than or equal to 35%, 50%, 90%, and the like the distance from the rotational center of the stator-rotor system to the outer most extent of the rotor plate and stator plate.

At least one of the first coupled bearing on the rotor plate and the race on the stator plate, and the second coupled bearing on the stator plate and the race on the rotor plate, may be located a radial distance from the rotational center of the system to the outer most extent of the rotor plate and stator plate such that half the collective mass of the rotor plate and the adjacent rotor plate lies between the rotational center of the system and the location of the coupled bearing and race, where, for example, at least one of the first coupled bearing on the rotor plate and the race on the stator plate, and the second coupled bearing on the stator plate and the race on the rotor plate, are located greater than or equal to 70% the distance from the rotational center of the system to the outer most extent of the rotor plate and stator plate. At least one of the first coupled bearing and the second coupled bearing may be one of a plurality of azimuthally distributed bearings. For instance, the number of the plurality of azimuthally distributed bearings may be less than or equal to three, greater than three but less than or equal to six, greater than six, and the like. At least one of the first coupled bearing or the second coupled bearing may have a width with a first contact point on the rotor plate and a second contact point on the first race on the stator plate to maintain a minimum separation distance between the rotor plate and the stator plate corresponding to at least the width of the coupled bearing at an engagement point between the first coupled bearing and the first race.

Figure 89:
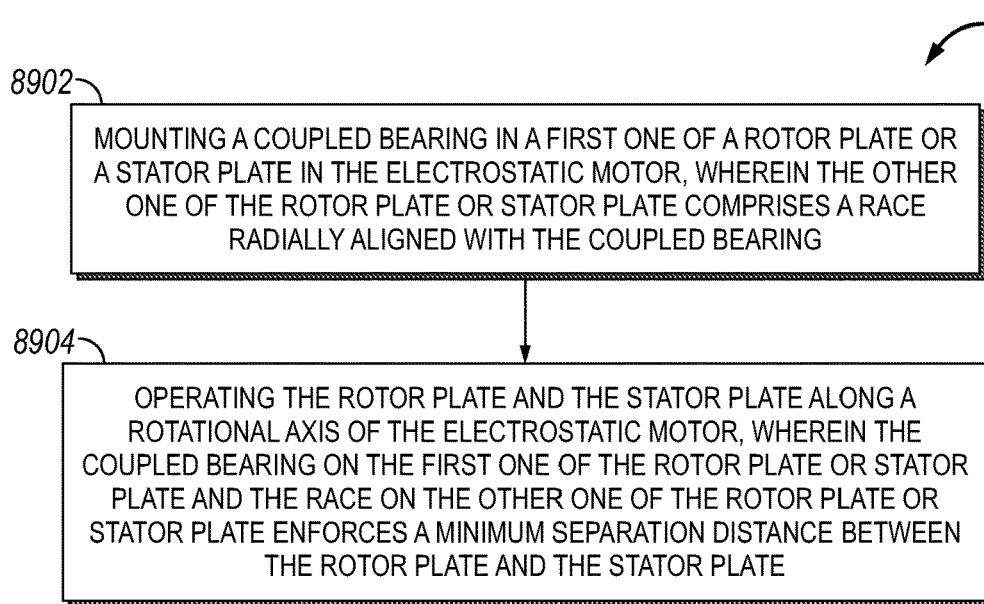
FIG. 89 is a schematic flow diagram of a procedure for operating a stator-rotor assembly for an electrostatic motor.

With reference to FIG. 89, an example procedure 8900 to operate an ESM is schematically depicted. The example procedure 8900 includes an operation 8902 to mount a coupled bearing in a first one of a rotor plate or a stator plate in the ESM, where the other one of the rotor plate or stator plate includes a race (or other sliding engagement feature for the bearing) radially aligned with the coupled bearing. The example procedure 8900 includes an operation 8904 to operate the rotor plate and the stator plate (e.g., by operating the ESM to generate torque from electrical power, and/or to generate electrical power from a mechanical load) along a rotational axis of the ESM, where the coupled bearing engages the race to enforce a minimum separation distance between the rotor plate and the stator plate. The coupled bearing, in certain operating conditions, may not touch the race (e.g., where the settled plate positions are not close enough to engage the coupled bearing with the race), while in other operating conditions the coupled bearing may engage the race and enforce the minimum separation distance.

Figure 90:
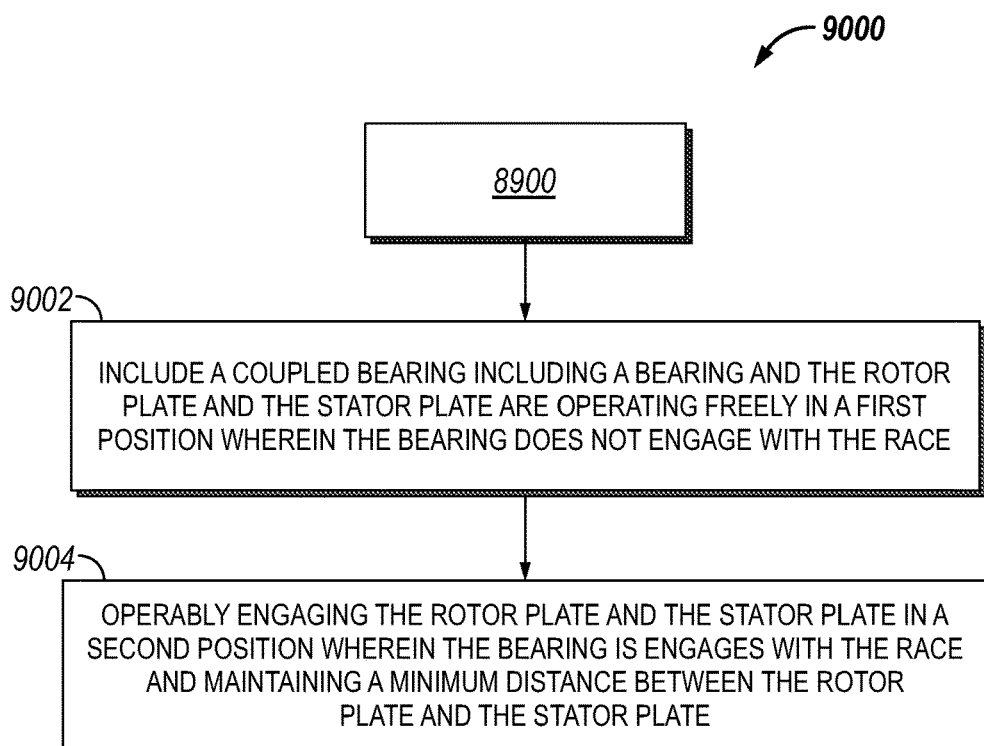
FIG. 90 is a schematic flow diagram of a procedure for engaging a stator-rotor assembly for an electrostatic motor.

In embodiments, and referring to FIG. 90, an example procedure 9000 to operate an ESM is schematically depicted. The example procedure 9000 may be performed additionally to operation 8900 as depicted in the example of FIG. 90. The example procedure 9000 includes an operation 9002 to operate the rotor plate and the stator plate, with the coupled bearing, in a first position where the bearing does not engage the race, for example when the rotor plate and stator plate are operating freely in an axial position at a distance greater than a bearing engagement distance. The example procedure 9000 further includes an operation 9004 to operably engage the rotor plate and the stator plate in a second position where the bearing engages the race, and enforces the minimum separation distance between the rotor plate and the stator plate (and thereby between electrodes of the rotor and electrodes of the stator).

Figure 91:
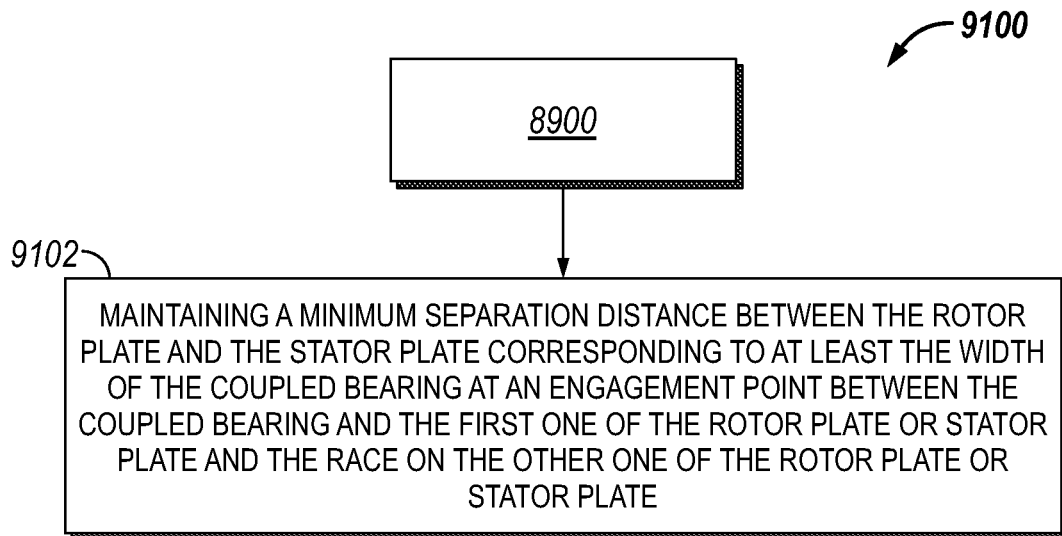
FIG. 91 is a schematic flow diagram of a procedure for maintaining separation distance in a stator-rotor assembly for an electrostatic motor.

In embodiments, and referring to FIG. 91, an example procedure 9100 to operate an ESM is schematically depicted. The example procedure 9100 may be performed additionally to operation 8900 as depicted in the example of FIG. 91. The example procedure 9100 includes an operation 9102 to maintain a minimum separation distance between the rotor plate and the stator plate corresponding to an axially extended portion of the bearing beyond the coupled plate, and to the race engaged by the bearing. In certain embodiments, the race may be detented (e.g., reference FIG. 85) thereby decreasing the separation distance during engagement (e.g., with the bearing sized accordingly). An example detented race may be referenced as having an axially retracted distance—for example, a distance beyond a plate face that the bearing (and/or rolling element) traverses axially before engaging the race. In certain embodiments, the race may extend axially above (or beyond) the associated plate, thereby extending the separation distance during engagement (e.g., with the bearing also sized accordingly). An example extended race may be referenced as having an axial extension distance—for example, a distance before the plate face where the bearing (and/or rolling element) traversing axially will engage the race. In certain embodiments, the race configuration can be utilized with the bearing size, for example to support multiple minimum separation distance values with a given plate configuration (e.g., utilizing a same race configuration and sizing the bearing), and/or with a given bearing size (e.g., utilizing the race configuration to adjust the minimum separation distance).

Figure 108:
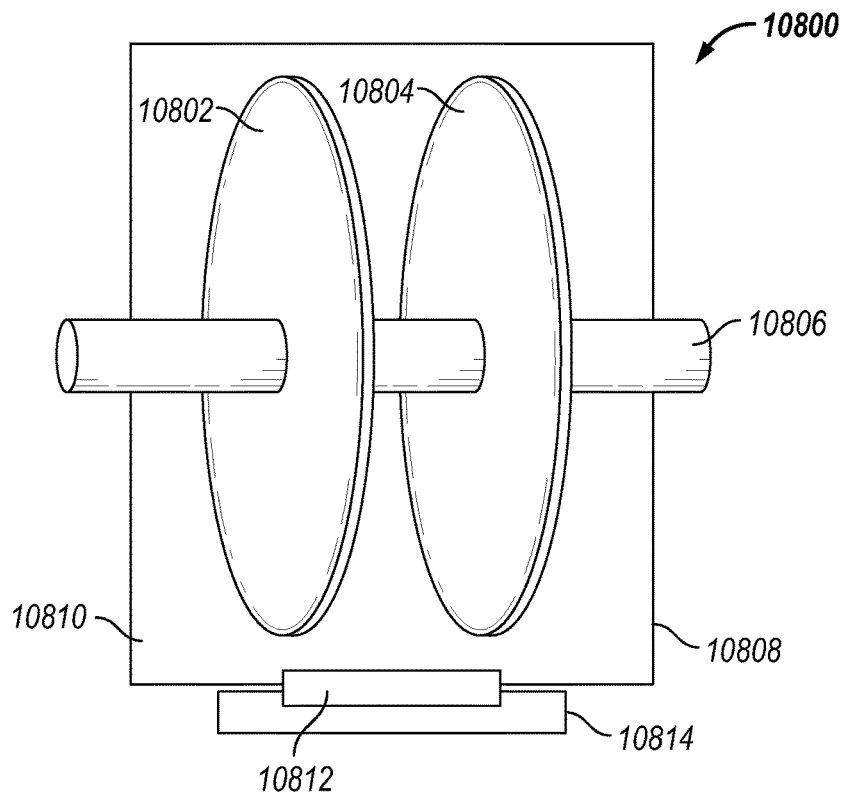
FIG. 108 is a schematic depiction of a housing support system for an electrostatic motor.

With reference to FIG. 108, the electrostatic motor 10800 may include a rotor plate 10802 rotationally coupled to a shaft 10806 extending through a housing 10808 of the electrostatic motor 10800, a stator plate 10804 rotationally fixed relative the housing 10808 of the electrostatic motor, and the housing 10808 defining the rotor plate 10802 and the stator plate 10804. An example housing 10808 is constructed to impart stiffness to oppose at least one powering force of the electrostatic motor, such as an axial force, radial force, and/or a torsional force (e.g., azimuthal). Example structures include a stiffness support configured to oppose at least one powering force (e.g., a rotational force, an axial force, and the like) of the electrostatic motor 10800, for example utilizing ribbing, fins, or other structures on the housing (e.g., reference FIG. 109 and the related description). In embodiments, a fluid 10810 may be dispersed within the housing 10808 and in contact with the rotor plate 10802, the stator plate 10804, and an inner surface of the housing 10808. The fluid 10810 in contact with the rotor plate 10802, the stator plate 10804, and the inner surface of the housing 10808 may provide for a thermal management pathway between the stator plate 10804 and the rotor plate 10802, and an environment outside the electrostatic motor 10800. An example housing 10808 includes a thermal heat transfer feature 10812 (e.g., a fin) to increase thermal transfer between the stator plate 10804, the rotor plate 10802, and the environment outside the electrostatic motor 10800. An example fin to increase thermal transfer may be positioned inside the housing 10808, outside the housing 10808, or both. Further example and non-limiting thermal heat transfer features 10812 include one or more of: a pump circulating the fluid (e.g., reference FIG. 6 and the related description), a thermally conductive coating and/or feature inside the housing (e.g., adjusting conductive or convective heat transfer inside the housing), a thermally conductive coating and/or feature outside the housing (e.g., adjusting conductive, convective, and/or radiative heat transfer outside the housing), a thermally conductive path through the housing 10808 (e.g., a thermally conductive material passing through a less thermally conductive housing, such as metal feature passing through a plastic housing, and/or formed at least partially within the housing such as utilizing an overmolded housing, an additively manufactured housing, a laminated housing, etc.), and/or a thermal jacket and/or heat exchanger component (e.g., to interface with an active thermal management system 10814).

An example system includes an active thermal management system 10814 (e.g., a thermal fluid jacket, for example allowing circulation of an active thermal carrier (e.g., water, propylene glycol, oil, etc.) through the housing and in thermal contact with the fluid, or in thermal contact with the fluid through the housing. The active thermal management system 10814 may be utilized to reject heat during operations of the ESM, to warm up the fluid before or during operations of the ESM, and/or to cool down the fluid before or during operations of the ESM. Example operations to warm up the fluid include circulating an active thermal carrier through the thermal fluid jacket to cause a phase change in the fluid (e.g., where the fluid may be a solid and/or a wax at ambient temperature conditions), and/or to warm up the fluid to a desired operating temperature, and/or a minimum operating temperature, prior to operations of the ESM (e.g., to provide the fluid having selected properties at temperature, and/or a selected viscosity during operations), and/or during selected operations of the ESM (e.g., during a warm-up period, to adjust properties of the fluid during operations, etc.). Example operations to cool down the fluid include circulating an active thermal carrier through the thermal fluid jacket to bring the fluid down to a desired operating temperature, such as when the fluid is heated from a high ambient temperature, a heat soak (e.g., after a shutdown operation, from the ESM and/or another component of a system including the ESM), and/or to adjust the temperature during operations (e.g., during an initial operating period, to adjust the fluid temperature before a shutdown, to adjust properties of the fluid during operations, etc.). In certain embodiments, the active thermal carrier may be utilized to reduce a warm-up time, for example where the ESM is operated before the desired operating temperature is reached.

An example active thermal management system 10814 includes a heat exchanger (e.g., 10812) positioned in thermal contact with the fluid, which may be a jacket (e.g., positioned within the housing, integral with the housing, and/or outside the housing with conductive thermal contact to the interior of the housing). An example active thermal management system 10814 may pass the active thermal carrier to the heat exchanger through the housing wall (e.g., with ports or openings provided in the housing). An example active thermal management system 10814 may include fluid passages for the active thermal carrier formed within the housing—for example as a part of the housing design. In a further example, the fluid passages formed within the housing may be lined (e.g., with an insert positioned within the fluid passages such that the active thermal carrier contacts the insert material rather than the housing material), coated (e.g., with a coating material deposited on the fluid passages within the housing), and/or the housing material may directly form at least a portion of the contact surface the fluid passages (e.g., where the active thermal carrier directly contacts a portion of the housing). Fluid passages formed within the housing may be provided for pass-through of the thermal carrier fluid, and/or forming at least a part of a thermal jacket within the housing and/or integral with the housing. Fluid passages formed within the housing may be provided by any operations, including at least: casting of the housing to provide fluid passages as voids in the casting; casting of the housing to provide fluid passages defined by a removable material, which is removed after the casting operation; creation of at least a portion of the fluid passages with a machining operation; creation of at least a portion of the fluid passages by overmolding the housing (or a portion of the housing) onto formed passage members, which may remain in place as a part of the fluid passages for the active thermal carrier, or which may be removed after the housing is formed; manufacture of the housing, or relevant portions thereof, utilizing an additive manufacturing operation; and/or combinations of these.

Figure 92:
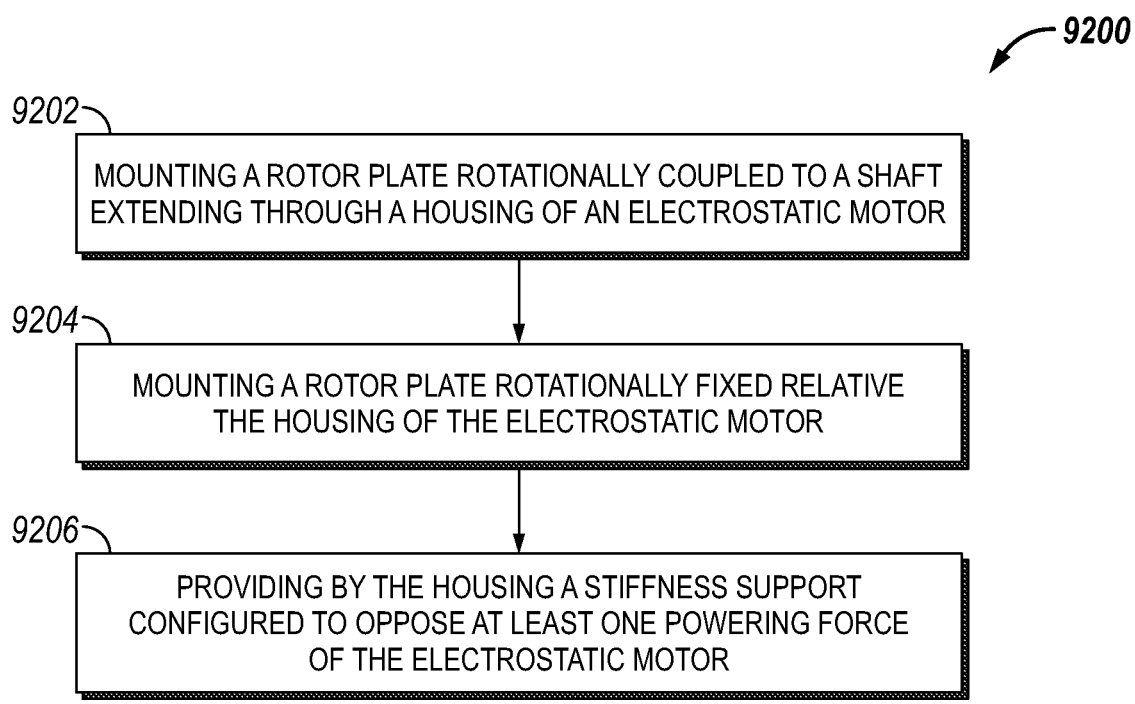
FIG. 92 is a schematic flow diagram of a procedure for providing housing stiffness support in a stator-rotor assembly for an electrostatic motor.
Figure 93:
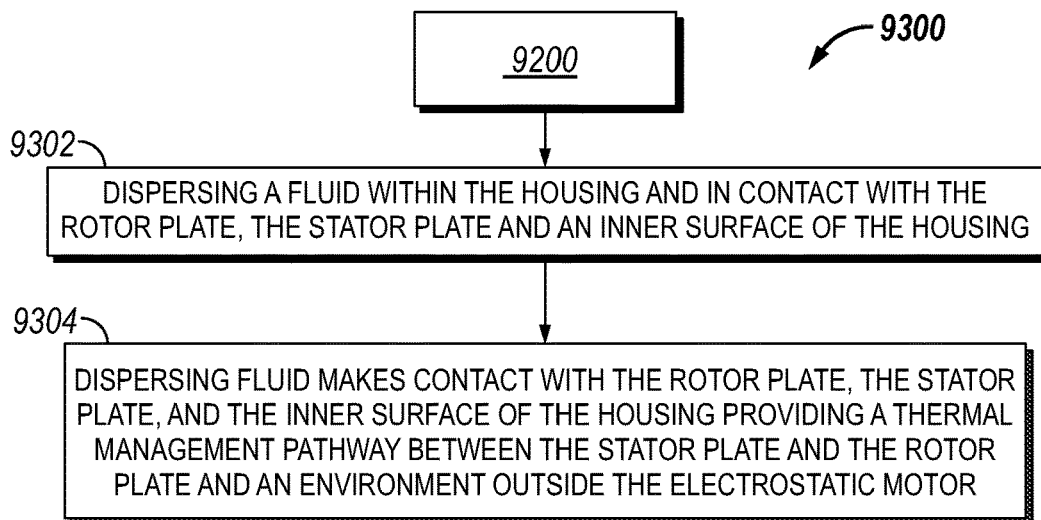
FIG. 93 is a schematic flow diagram of a dispersing fluid within a housing assembly for an electrostatic motor.
Figure 94:
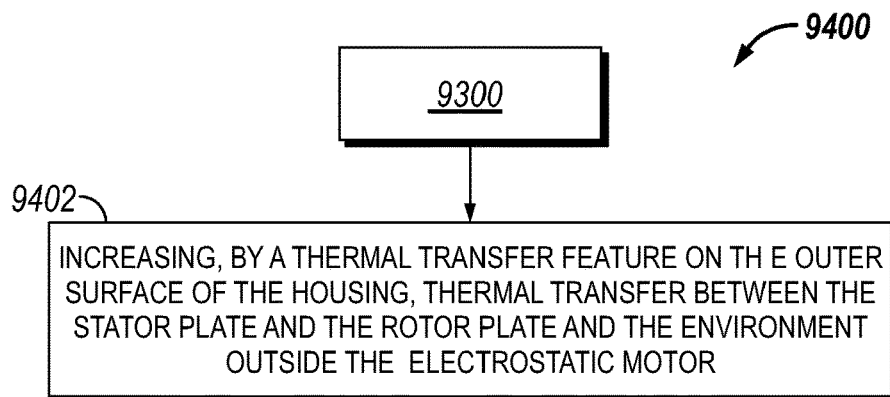
FIG. 94 is a schematic flow diagram of a procedure for thermal transfer for an electrostatic motor.
Figure 95:
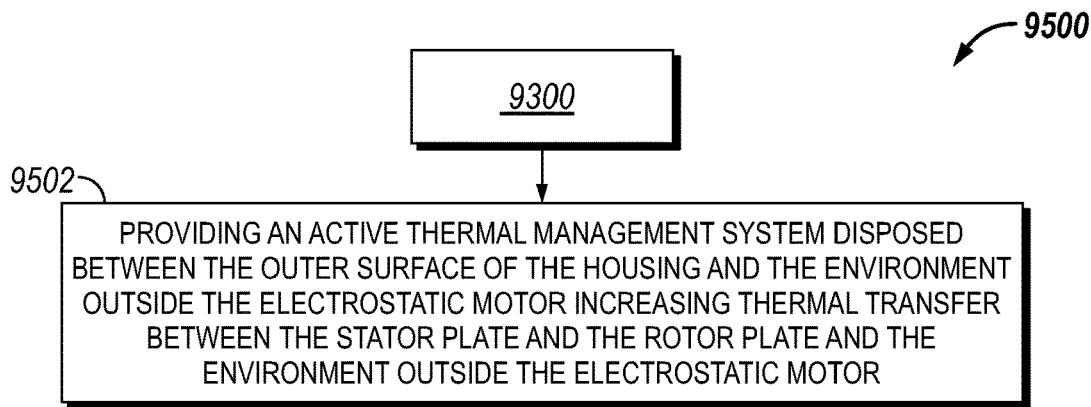
FIG. 95 is a schematic flow diagram of a procedure for thermal transfer for an electrostatic motor.

Referencing FIG. 92, an example procedure 9200 to operate an ESM is schematically depicted. The example procedure 9200 includes an operation 9202 to mount a rotor plate rationally coupled to a shaft extending through a housing of an ESM, an operation 9204 to mount a stator plate rotationally coupled to a housing the ESM, and an operation 9206 to provide, for example as a part of the housing, a stiffness support configured to oppose at least one powering force of the ESM. Referencing FIG. 93, an example procedure 9300 to operate an ESM is schematically depicted. The example procedure 9300 may be performed additionally to operation 9200 as depicted in the example of FIG. 93. The example procedure 9300 includes an operation 9302 to disperse a fluid within the housing and in contact with the rotor plate, the stator plate, and an inner surface of the housing. The example procedure 9300 further includes an operation 9304 to contact the dispersed fluid with the rotor plate, the stator plate, and the inner surface of the housing, providing a thermal management pathway between the stator plate, the rotor plate, and an environment outside the ESM. Referencing FIG. 94, an example procedure 9400 to operate an ESM is schematically depicted, which may be performed additionally to operation 9300 as depicted in the example of FIG. 94. The example procedure 9400 includes an operation 9402 to increase, utilizing a thermal management feature of the housing (e.g., inside, outside, and/or integral with the housing), thermal transfer between the stator plate, the rotor plate, and the environment outside the ESM. Operations described herein to adjust the thermal transfer between the stator plate, the rotor plate, and the environment, may additionally or alternatively be performed to adjust the thermal transfer between the fluid in the housing and the environment outside the ESM. Referencing FIG. 95, an example procedure 9500 to operate an ESM is schematically depicted, which may be performed additionally to operation 9300 as depicted in the example of FIG. 95. The example procedure 9500 includes an operation 9502 to provide an active thermal management system, for example disposed within the housing, through the housing, and/or thermally coupled to an outside of the housing, and to operate the active thermal management system to increase thermal transfer between the stator plate, the rotor plate, the fluid, and/or the environment outside the ESM.

Figure 96:
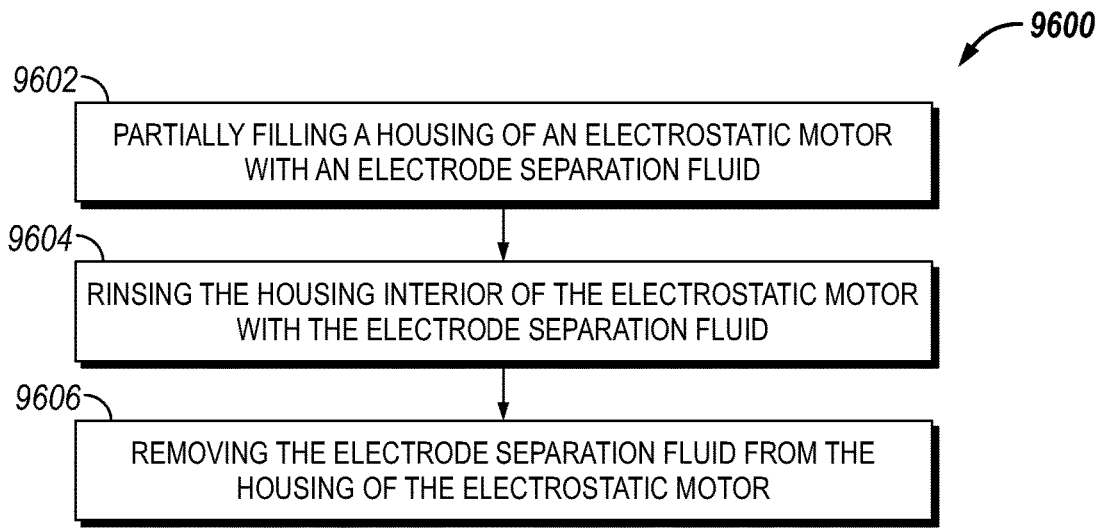
FIG. 96 is a schematic flow diagram of a procedure for removing electrode separation fluid for an electrostatic motor.

Referencing FIG. 96, an example procedure 9600 to perform a rinse of an ESM is schematically depicted. The example procedure 9600 includes an operation 9602 to at least partially fill a housing of an ESM with an electrode separation fluid. The example electrode separation fluid may be a high permittivity fluid, and/or a dielectric fluid, providing for a high capacitive energy storage in gaps between electrodes of the ESM. In certain embodiments, the electrode separation fluid is an operating fluid for the ESM (e.g., a fluid utilized during run-time operations of the ESM), and/or the electrode separation fluid is compatible with an operating fluid for the ESM (e.g., where residual amounts of the electrode separation fluid after operations 9600, and during run-time operations of the ESM, will not materially affect the performance of the ESM). An example electrode separation fluid includes a base fluid composition, for example a fluid composition consistent with an operating fluid, and/or compatible with the operating fluid, but potentially lacking one or more additives that might normally be included in the operating fluid.

Example and non-limiting base fluid compositions include one or more of: a ketone, an ester, a carbonate, a malonate, a lactone, a propylene carbonate-based fluid composition; an oxalate; an amide; an imide; and/or a lactam. An example base fluid composition includes one or more of: isoamyl isovalerate, hexyl isobutyrate, diethyl ethyl malonate, and/or delta-nonalactone.

In certain embodiments, the electrode separation fluid includes one or more additives. Without limitation to any other aspect of the present disclosure, an additive herein may be provided in an amount between 1 ppm and 1%, by weight. In certain embodiments, additives of the electrode separation fluid are at least partially consistent with additives of an operating fluid—for example due to convenience and/or availability of the operating fluid for rinsing operations 9600. In certain embodiments, additives of the electrode separation fluid are provided for a benefit to the rinsing process, which additives may be similar to, the same as, or distinct from one or more additives to be utilized in the operating fluid. In certain embodiments, an additive may be provided within the base fluid, and/or may be provided in contact with the base fluid, for example a water scavenger provided in contact with the operating fluid before inclusion into the ESM and/or utilization during operations such as rinsing operation, and/or provided in contact with the operating fluid during operations of the ESM (e.g., the additive provided in a pill, container fluidly exposed to the operating fluid, in a contact arrangement such as a packed bed, where operating fluid is pumped and/or circulated through the additive component, etc.). An additive may be included during any operations such as fluid preparation, rinsing, fluid recovery, fluid recycle operations, and/or during operations of the ESM. In certain embodiments, the additives package may vary in constituents and/or concentrations according to the operations being performed. In certain embodiments, an additive may be included in fluid contact with the operating fluid, and positioned in a region of the ESM (e.g., within the housing, accumulator, or the like) having a selected environment, such as a temperature, fluid flow regime, and/or electric field environment (e.g., a position within the ESM positioned away from a strong electric field, positioned outside of a conductive sleeve at least partially defining the capacitive stack, etc.).

Example and non-limiting additives include a free radical scavenger, a contamination scavenger, and/or a water scavenger. Example free radical scavengers include, without limitation, butylated hydroxytoluene, butylated hydroxyanisole, tertiary-butylhydroquinone, gallate, and/or a phenolic antioxidant. The type and amount of free radical scavenger present may be determined according to expected contaminants, side reactions, degradation constituents, or the like from components of the ESM (e.g., rotor and/or stator plates or electrodes, bearings, seals, surfaces, etc.), and/or further according to an expected life span, service life, operating life, etc. of the ESM. Example and non-limiting contamination scavengers include one or more of an organo-metallic compound, trimethyl (phenyl) tin, and/or or a bismuth organo-metallic. Example and non-limiting water scavengers include one or more of $CaCl$, $CaSO_4$, Copper (II) Sulfate, $LiAlH_4$, $MgSO_4$, an oxazolidine, a monomeric isocyanate, and an alkoxysilane. In certain embodiments, the water scavenger includes an oxazolidine provided at a low concentration (e.g., 0.1 ppm to 100 ppm), and/or provided at a location positioned away from the capacitive stack and/or in a position having a reduced, attenuated, and/or mitigated electric field present. In certain embodiments, an example and non-limiting water scavenger includes one or more of CaCl, CaSO$_4$, Copper (II) Sulfate, LiAlH$_4$, MgSO$_4$, phosphorous pentoxide, potassium carbonate, a silica gel, a monomeric isocyanate, and/or an alkoxysilane. An example additive includes barium titanate, which may be provided as a coated particle, and/or as a nano-particle. In certain embodiments, barium titanate, and/or other coated conductive particles, including particles sized as a nano-particle, favorably adjust the electric field, and boost a relative permittivity of the operating fluid. An example additive includes a coated metal oxide, which may be provided as a nanoparticle. An example water scavenger includes a molecular sieve, including a molecular sieve provided in fluid contact with the operating fluid.

An example ESM includes a rotor rotationally coupled to a shaft, one or more seals related to the shaft (e.g., at an entrance and/or egress location of the shaft to the housing), bearings (e.g., separation assembly bearings, such as between rotor and stator plates, and/or bearings coupling the stator to the shaft, etc.), an accumulator (e.g., reference FIGS. 100A, 100B), and/or one or more baffles (e.g., to configure fluid flow in the ESM during operations) and/or fins (e.g., supporting heat transfer, and/or providing structural support). The recited features, without limitation to any other aspect of the present disclosure, provide for an environment within the ESM that can trap residue and debris (e.g., manufacturing residue, casting residue, machining residue, polishing residue, residue deposited during storage, residue from coating and/or deposition operations, residue from removal of casting formed features, residue from additive manufacturing operations, etc.), and further can damage moving parts (e.g., bearings, accumulator, engagement points between the rotor plates and other components of the ESM) during operation if the residue is not removed, and/or re-located to a more neutral position (e.g., at the bottom of the housing). Additionally, some parts can jam (e.g., an accumulator, a bearing), fail to function properly (e.g., the accumulator, a bearing, and/or a seal), and/or suffer a catastrophic failure if debris is not removed, and if lubrication is not provided before operations of the ESM.

The example procedure 9600 further includes an operation 9604 to rinse the housing interior of the ESM with the electrode separation fluid. Rinsing operations may include filling to a selected level, and/or with a selected amount of the electrode separation fluid, agitating or otherwise moving the ESM through a selected trajectory (e.g., to ensure exposure of all selected parts within the ESM), and/or may further include leaving the rinsing fluid within the ESM for a selected residence time. The example procedure 9600 further includes an operation 9606 to remove the electrode separation fluid from the housing of the ESM.

Figure 97:
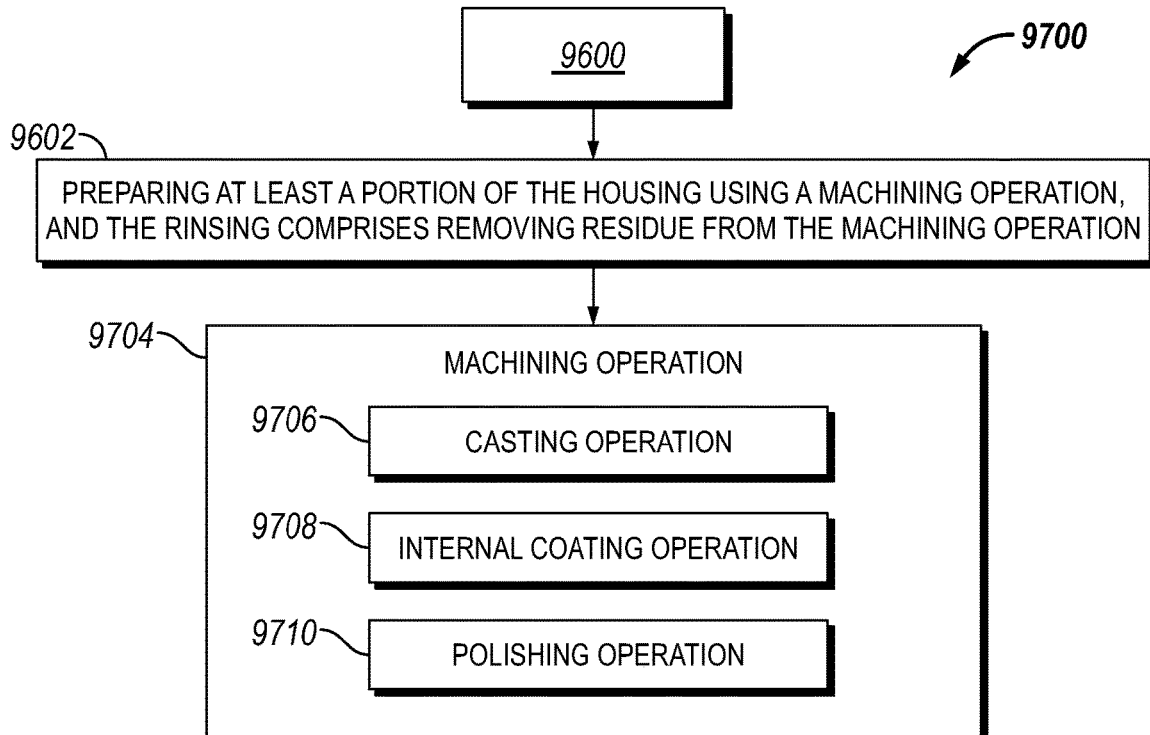
FIG. 97 is a schematic flow diagram of a procedure for rinsing a housing assembly for an electrostatic motor.

Referencing FIG. 97, an example procedure 9700 for preparing an ESM with a rinse is schematically depicted. The example procedure 9700 includes performing one or more operations on the ESM, such as a machining operation 9704, a casting operation 9706, an internal coating operation 9708, and/or a polishing operation 9710. The example procedure 9700 includes operation 9702 to prepare the housing using the machining or other assembly operations (not limited to the examples depicted in FIG. 97), and operation 9600 to perform a rinse of the ESM.

Figure 98:
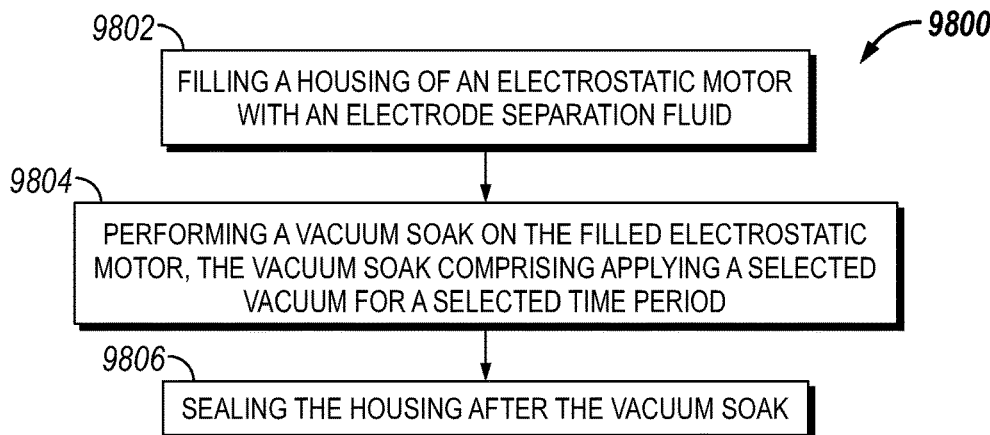
FIG. 98 is a schematic flow diagram of a procedure for sealing a housing for an electrostatic motor.

Referencing FIG. 98, an example procedure 9800 to fill an ESM with an operating fluid is schematically depicted. The example procedure 9800 includes an operation 9802 to fill a housing of an ESM with an electrode separation fluid. In certain embodiments, the electrode separation fluid may be a fully formed operating fluid, for example a dielectric fluid with selected additives. Any example base fluid and/or additives as set forth in the description referencing FIG. 96 are contemplated herein. The example procedure 9800 includes an operation 9804 to perform a vacuum soak on the filled ESM, and/or to perform the vacuum soak on the operating fluid before operation 9802 to fill the ESM. Example operations 9804 include one or more of: positioning the filled ESM into a vacuum chamber, applying a vacuum directly to the housing of the ESM (e.g., sealing against a fill opening of the ESM, and applying the vacuum to the housing), and/or positioning the operating fluid in a vacuum chamber (and/or otherwise in pressure coupling with a vacuum device). The example operation 9804 may be performed at a selected applied vacuum for a selected time. The time to execute the vacuum soak operation 9804 may depend upon one or more of: the volume of the operating fluid and/or the ESM; an opening area of the ESM (e.g., exposed area of the filled fluid to the vacuum chamber and/or housing applied vacuum); a temperature of the fluid (e.g., generally a higher temperature will drive gases and/or undesirable volatile constituents out of the fluid more quickly); the strength of vacuum applied; ancillary operations applied to enhance constituent removal (e.g., agitation, application of ultrasound, application of freeze-pump-thaw operations, etc.); and/or the applied atmosphere in contact with the operating fluid (e.g., maintaining an inert gas environment, removal of released constituents as they evolve, etc.). The example procedure 9800 includes an operation 9806 to seal the housing after the vacuum soak. In certain embodiments, the vacuum soak operation 9804 may be repeated, and/or the filling operation 9802 may be repeated (e.g., incrementally filling the ESM, replacing the operating fluid after the vacuum soak, etc.).

Figure 99:
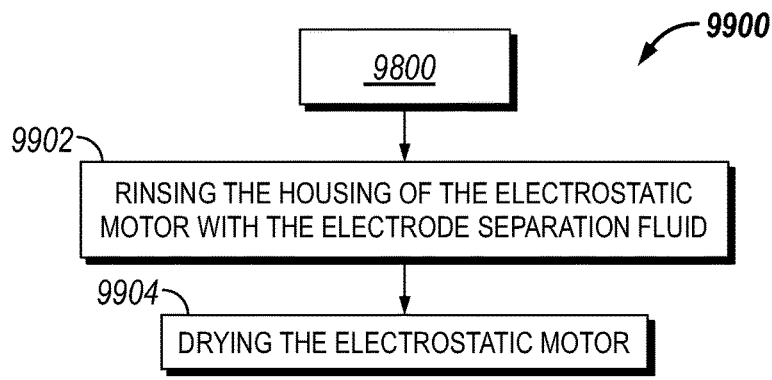
FIG. 99 is a schematic flow diagram of a procedure for drying an electrostatic motor.

Referencing FIG. 99, an example procedure 9900 for preparing an ESM for operation is schematically depicted. The example procedure 9900 may be performed additionally to procedure 9800 as depicted in FIG. 99. The example procedure 9900 includes an operation 9902 to rinse the housing of the ESM with an electrode separation fluid (e.g., reference FIG. 96 and the related description), and an operation 9904 to dry the ESM. The operation 9904 to dry the ESM may be omitted, and procedure 9800 to fill the ESM may be performed additionally or alternatively to drying operation 9904. In the example of FIG. 99, operation 9800 to fill the ESM may be performed previously (e.g., where operation 9900 is removing the operating fluid from an active ESM, for example as a service event), and/or may be performed after one or more operations 9902, 9904 (e.g., performing an initial fill of the ESM, completing a service event, etc.).

Without limitation to any other aspect of the present disclosure, operations to fill the ESM, and/or partially fill the ESM, include pre-filling the ESM to cover one or more features or components of the ESM (e.g., an accumulator, electrode, bearing, seal, etc.). In certain embodiments, a pre-filling operation includes filling the housing to an approximately full state (e.g., allowing room for gas release and/or agitation without causing a spill, etc.), and/or filling the housing to a nominally full state. In certain embodiments, a filling procedure includes performing a final filling operation of the housing prior to sealing the housing—for example topping off the operating fluid due to air release, a space left to accommodate gas release and/or agitation, etc. In certain embodiments, the final filling operation is performed with a treated operating fluid, for example fluid that resided in a vacuum chamber with the ESM during a vacuum soak operation, and/or fluid that is otherwise treated and ready for inclusion in the ESM. Example final filling operations provide make-up operating fluid due to de-gassing, and/or air pocket release during vacuum soak and/or rinse operations. Example operating fluids, dielectric fluids, and/or electrode separation fluids, as used herein, include any base fluid compositions and/or additives described throughout the present disclosure, including at least those set forth in the description referencing FIG. 96.

An example time period for a vacuum soak operation includes a time period encompassing a filling operation of the ESM (e.g., the vacuum is applied during filling of the ESM to avoid diffusion and/or entrainment of undesired gasses into the fluid). In the example, the vacuum may be relieved after the filling operation(s), and/or a preferential gas environment and/or inert gas environment may be provided after the filling and/or during the filling. Example and non-limiting time periods for a vacuum soak operation include any one or more of: a time sufficient to provide a selected de-gassing level for the operating fluid; between 2 and 24 hours (inclusive); a time between 12 hours and 1 week; and/or a time between 24 hours and 10 days. Example and non-limiting vacuum levels applied during vacuum soak operations include one or more of: a range of 1-10 psig (e.g., between 1 psi and 10 psi below an ambient and/or atmospheric pressure); a range of between 2 and 14.7 psig; and/or a range of between 7 and 14.7 psig. In certain embodiments, selected vacuum levels are considered based on one or more of: vacuum facilities available (e.g., a service location and a manufacturing facility may have different capabilities); the application of vacuum in a chamber or directly to the housing (e.g., directly applied vacuum may tend to operate more quickly); a system limitation to the vacuum level that can be applied (e.g., directly applied vacuum may be limited by seals of the ESM); and/or a size of the ESM, a filling hole of the ESM, and/or a volume of operating fluid in the ESM. In certain embodiments, a seal cap (not shown) is provided on one or more seals, allowing for a directly applied vacuum to be performed at a higher level of vacuum, including a vacuum level otherwise exceeding a pressure differential rating (and/or capability) of seals of the ESM.

Figure 100A:
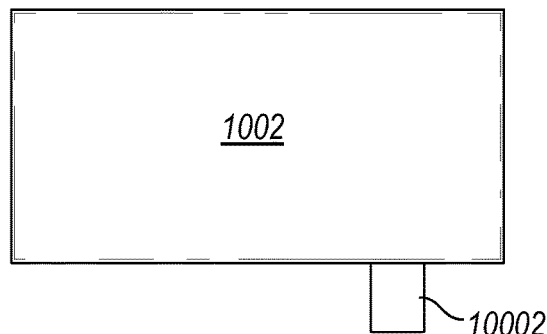
FIG. 100A is a schematic depiction of a system for an electrostatic motor.
Figure 100B:
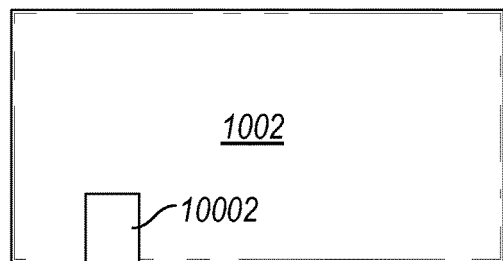
FIG. 100B is a schematic depiction of a system for an electrostatic motor.

Referencing FIG. 100A, an example ESM 1002 is depicted that is consistent with certain embodiments of the present disclosure. The example ESM 1002 may be utilized with any system described herein. The example ESM 1002 includes an accumulator 10002, for example to provide allowance for volume variations of a dielectric fluid of the ESM 10002. The example accumulator 10002 is positioned outside the housing of the ESM 10002, for example fluidly coupled to the housing area retaining the dielectric fluid. The accumulator may be of any time, including at least a diaphragm based accumulator and/or a piston based accumulator. The accumulator 10002 may be a passive device, for example maintaining a selected fluid pressure (which will generally equate to a given fluid level) in the housing of the ESM 10002. In certain embodiments, fluid volume variations due to volatile component losses, temperature variations, electric field variations (e.g., imposing an electrostriction density change to a dielectric fluid), an electro-mechanical volume change of the fluid (e.g., a piezoelectric volumetric change), phase changes, effective volumetric changes during operation (e.g., through fluid travel, adhesion, and/or movement within the ESM 1002), to accommodate imperfect filling levels during manufacture and/or service, and/or for any other reason that fluid volume may vary. The accumulator 10002 may be an active device, for example responsive to a controller 6200, for example to control a fluid level and/or adjust a fluid level during operations of the ESM 1002. Referencing FIG. 100B, another example accumulator 10002 is depicted, positioned within the housing in the example of FIG. 100B. The inclusion of the accumulator 10002 within the housing reduces the footprint of the ESM 1002, and reduces striking surfaces, for example during transport of the ESM 1002 and/or operations performed in the vicinity of the ESM 1002. The coupling of the accumulator 10002 to the outside of the housing, for example as depicted in FIG. 100A, allows for full utilization of the volume within the housing (e.g., providing room for the capacitive stack, the shaft, connecting electrical circuits, etc.). An accumulator 10002, where present, may be included in any manner.

Figure 101:
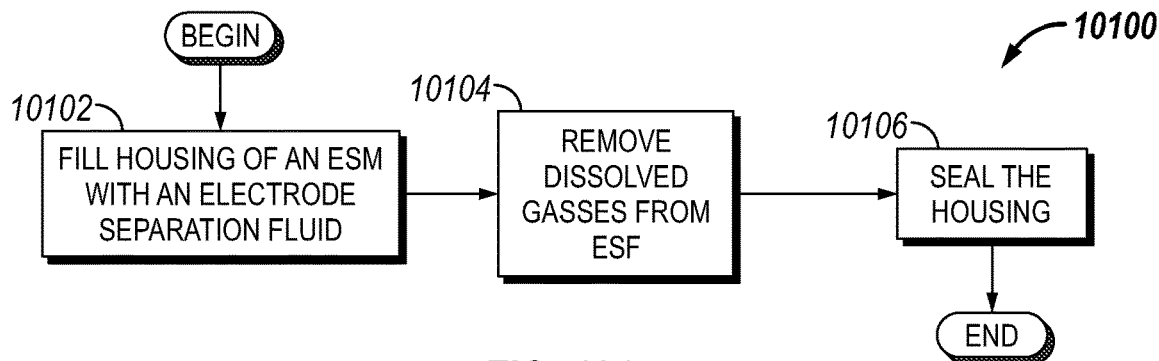
FIG. 101 is a schematic flow diagram of a procedure for sealing a housing for an electrostatic motor.

Referencing FIG. 101, an example procedure 10100 for removing dissolved gases from an ESM is schematically depicted. The example procedure 10100 may be performed at a time of initial manufacture, as a service event, responsive to a service event (e.g., when replacing fluid to the ESM after another service event), and/or as a diagnostic operation (e.g., to eliminate dissolved gases as a potential failure mode for an ESM). The example procedure 10100 includes an operation 10102 to fill a housing of an ESM with an electrode separation fluid. The example procedure further includes an operation 10104 to remove dissolved gases from the electrode separation fluid.

Figure 102:
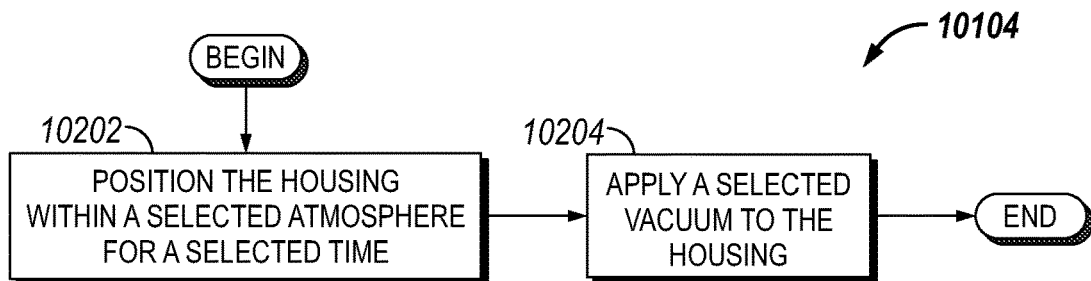
FIG. 102 is a schematic flow diagram of a procedure for applying a vacuum to a housing for an electrostatic motor.

Referencing FIG. 102, an example procedure 10104 to remove dissolved gases from the electrode separation fluid is schematically depicted. The example procedure 10104 includes an operation to position the housing within a selected atmosphere for a selected time. The selected atmosphere may include a vacuum atmosphere (e.g., reference operation 10204), and/or may include a selected gas, such as nitrogen, argon, $SF_6$, a halocarbon, a perfluorinated ketone, a fluoronitrile, $CO_2$, $H_2$, dodecafluoro-2-methylpentan-3-one (e.g., Novec™ produced by 3M™), a halomethane, and/or $CF_3I$. The example selected atmospheres are non-limiting and illustrative. In certain embodiments, the selected atmosphere includes an inert gas. In certain embodiments, the selected atmosphere includes any gas (e.g., air), with a selected humidity level (generally, very low humidity, dry air, or another dry gas). The example procedure 10104 further includes an operation 10204 to apply a selected vacuum to the housing. Operations 10202, 10204 may, additionally or alternatively, be performed on the electrode separation fluid separate from the ESM (e.g., with the electrode separation fluid removed, and/or not yet positioned within the ESM; and/or with a portion of the electrode separation fluid treated separately, for example as a final filling fluid. The selected time may be selected based on the amount of gas to be purged, the amount of gas that is to remain in the electrode separation fluid, the application of other degassing aspects of the procedure 10104 (e.g., applied heat, vacuum, application of ultrasonic energy to the electrode separation fluid, application of one or more freeze-pump-thaw cycles, etc.). The selected amount of time may be any value, including at least: 1-6 hours; 4-24 hours; 12 hours to 1 week; up to a month; and/or indefinitely (e.g., when storing the ESM, storing electrode separation fluid, and/or preparing a batch of electrode separation fluid to be utilized in future rinsing and/or filling operations).

Without limitation to any other aspect of the present disclosure, operation 10204 to apply a selected vacuum may be performed utilizing any aspects discussed throughout, including at least aspects described in relation to FIG. 99.

Figure 103:
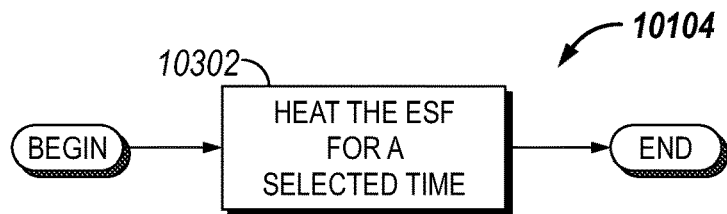
FIG. 103 is a schematic flow diagram of a procedure for heating an assembly in an electrostatic motor.

Referencing FIG. 103, another example procedure 10104 to remove dissolved gases from the electrode separation fluid is depicted. The example procedure 10104 includes an operation 10302 to heat the electrode separation fluid for a selected time. Operations to heat the fluid generally result in an increased rate of gas evolution from the electrode separation fluid. Heating operations may be performed at any selected temperature, where the temperature may be selected according to any one or more of: the volatility of the electrode separation fluid (including the base fluid composition(s) and/or additives); temperature constraints of any component of the ESM (e.g., seals, housing materials, bearing materials, etc.); the volatility and/or solubility of any gases to be removed from the electrode separation fluid; side reactions that may occur within the ESM and/or electrode separation fluid, including with any component of the ESM in contact with the electrode separation fluid; the vapor pressure and/or flammability of any component of the electrode separation fluid; and/or the vacuum applied to the ESM and/or electrode separation fluid, including effects of the applied vacuum to any of the foregoing. Example and non-limiting temperature values for heating include 50° C., 100° C., 150° C., and/or 200° C. In certain embodiments, temperatures higher than 200° C. may be utilized. Certain seal components and/or side reactions, such as coking of components of the electrode separation fluid, may limit the temperature to be utilized. Limiting parameters for the heating temperature will be understood to the person of skill in the art, having the benefit of the present disclosure, and information ordinarily available when contemplating a particular system.

In certain embodiments, other operations 10104 to remove dissolved gases may be perform, in addition to or alternatively to those set forth in relation to FIGS. 102, 103. An example operation 10104 to remove dissolved gasses includes performing a freeze-pump-thaw operation on the electrode separation fluid. The example freeze-pump-thaw operation may be performed under a vacuum for more rapid convergence to a degassed electrode separation fluid. Additionally or alternatively, depending upon the characteristics of the electrode separation fluid and the ESM, including for example the availability of a thermal fluid jacket on the ESM, the volumetric response of the electrode separation fluid to freezing and thawing, and the advisability of mixing the electrode separation fluid after thawing (including whether the ESM includes a circulating pump for the electrode separation fluid) the freeze-pump-thaw cycle may be performed in situ within the ESM, and/or in combination with a separate freeze-pump-thaw cycle performed on a portion of the electrode separation fluid apart from the ESM. An example operation 10104 to remove dissolved gases from the electrode separation fluid includes performing an ultrasonic degassing operation on the electrode separation fluid. The ultrasonic degassing operation may be performed on the electrode separation fluid separately, on the electrode separation fluid in-situ within the ESM, and/or a combination of these. The ultrasonic degassing operation may be combined with any other degassing operations, including at least positioning the electrode separation fluid and/or ESM in a select gaseous atmosphere, performing the ultrasonic degassing operation under a vacuum, and/or heating the electrode separation fluid and/or ESM. An example operation 10104 to remove dissolved gases from the electrode separation fluid includes subjecting the electrode separation fluid and/or ESM to a number of heating/cooling cycles—for example heating the electrode separation fluid and/or ESM to an elevated temperature (e.g., which may additionally include performing a vacuum operation), cooling the electrode separation fluid and/or ESM (to a room temperature, ambient temperature, and/or an actively cooled temperature, and/or which may further include providing a selected gaseous atmosphere and/or performing a vacuum operation), and repeating the heating/cooling cycle a selected number of times (e.g., a total of one time, two times, six times, etc.). Without limitation, any applied vacuum operations utilized as all or a part of operations 10104, and/or any other vacuum operations set forth herein, may be performed utilizing aspects set forth in relation to FIG. 94.

Figure 104:
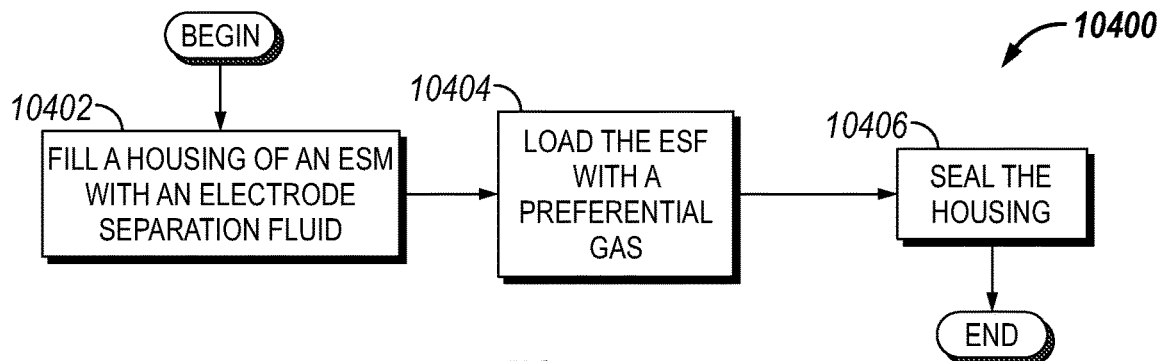
FIG. 104 is a schematic flow diagram of a procedure for sealing a housing for an electrostatic motor.

Referencing FIG. 104, an example procedure 10400 to fill a housing of an ESM is schematically depicted. The example procedure 10400 includes an operation 10402 to fill a housing of the ESM with an electrode separation fluid. In certain embodiments, procedure 10400 may be performed, in whole or part, on an electrode separation fluid apart from the ESM as set forth throughout the present disclosure. The example procedure 10400 further includes an operation 10404 to load the electrode separation fluid with a preferential gas. Without limitation to any other aspect of the present disclosure, a preferential gas includes any gas that is compatible with the electrode separation fluid, compatible with components and/or materials present in the ESM, and/or a gas that has a tendency to displace at least a portion of the gas solubility capacity of the electrode separation fluid, including at least under the operating conditions of the ESM (e.g., where the ESM is sealed during normal operations). Example and non-limiting preferential gasses include one or more of: nitrogen, argon, $SF_6$, a halocarbon, a perfluorinated ketone, a fluoronitrile, $CO_2$, $H_2$, dodecafluoro-2-methylpentan-3-one, a halomethane, and/or $CF_3I$. In certain embodiments, air having a selected humidity level can serve as a preferential gas. Example operations 10404 to load the electrode separation fluid with a preferential gas include one or more operations such as: maintaining an atmosphere of the preferential gas during degassing operations (e.g., heating, performing one or more freeze-pump-thaw cycles, applying a selected vacuum, applying one or more heating/cooling cycles, performing an ultrasonic degassing operation, etc.); bubbling the preferential gas through the electrode separation fluid; and/or maintaining an atmosphere of the preferential gas during a loading operation, for example with favorable solubility conditions such as increased pressure and/or reduced temperature applied to the electrode separation fluid. Operations 10404 to load the electrode separation fluid with a preferential gas may be performed in situ with a fluid positioned in the ESM, on a standalone electrode separation fluid, and/or a combination of these. The example procedure 10400 includes an operation 10406 to seal the housing—for example to prepare the ESM after initial manufacture, and/or to prepare the ESM to return to service after a service event, maintenance event, or the like.

Figure 105:
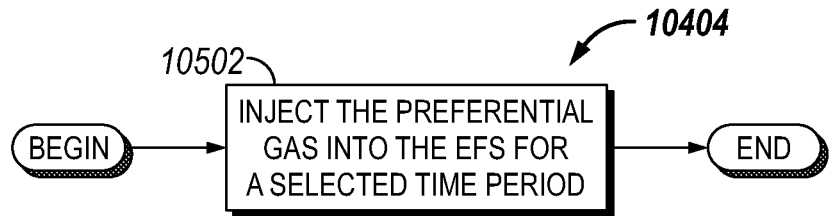
FIG. 105 is a schematic flow diagram of a injecting a gas into a housing for an electrostatic motor.

Referencing FIG. 105, an example operation 10404 to load the electrode separation fluid with a preferential gas includes injecting the preferential gas into the electrode separation fluid for a selected time period (e.g., 5 minutes, 10 minutes, 1 hour, 4 hours, etc.), and/or injecting the preferential gas at a selected rate. In certain embodiments, operation 10404 to inject the preferential gas is performed at selected conditions, for example to create a favorable solubility environment for the preferential gas in the electrode separation fluid (e.g., at an increased pressure and/or reduced temperature).

Figure 106:
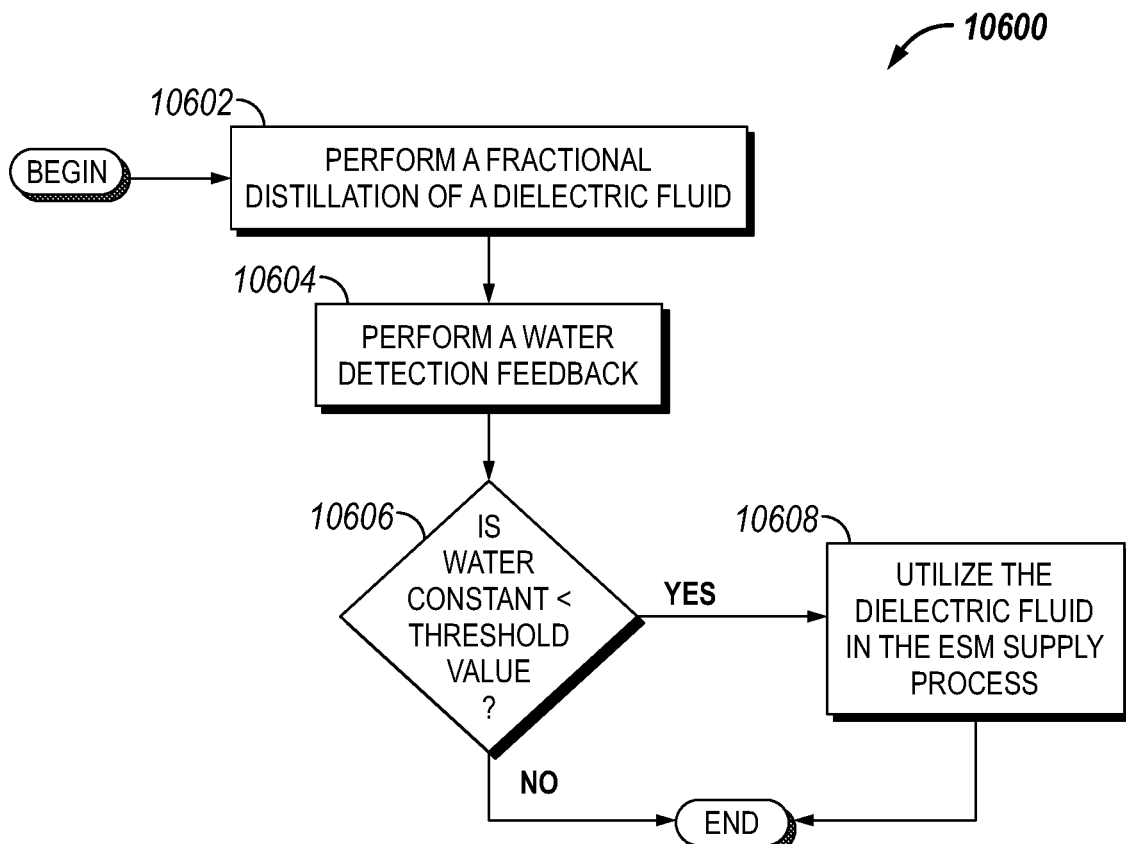
FIG. 106 is a schematic flow diagram of a procedure for performing a distillation operation for an electrostatic motor.

Referencing FIG. 106, an example procedure 10600 to dewater a dielectric fluid is schematically depicted. The example procedure 10600 includes an operation 10602 to perform a water removal operation on the dielectric fluid. The procedure 10600 may be performed on the dielectric fluid apart from the ESM, in situ within the ESM, and/or a combination of these. The example of FIG. 106 depicts performing a fractional distillation of the dielectric fluid as operation 10602. However, any type of water removal operation may be performed, including at least operations such as: treating the dielectric fluid with at least one of a water scavenger or a molecular sieve; treating the dielectric fluid with at least one of a water scavenger or a molecular sieve after the performing the fractional distillation; performing a second fractional distillation of the dielectric fluid; performing a vacuum distillation of the dielectric fluid; performing a pervaporation of the dielectric fluid; performing a molecular sieve water removal on the dielectric fluid; and/or performing a membrane water separation on the dielectric fluid.

The example procedure 10600 includes an operation 10604 to perform a water detection feedback operation on the dielectric fluid to confirm a water content of the dielectric fluid. In certain embodiments, operation 10604 may be performed before operation 10602 to perform the water removal operation. In certain embodiments, a history of the dielectric fluid may be utilized to determine whether to perform the water detection feedback operation 10604 before water removal operations 10602, and/or to select which water removal operation(s) 10602 and/or parameters for such operations (e.g., temperatures, pressures, residence time values, etc.). For example, the history of the dielectric fluid may include utilization parameters (e.g., whether it was used in an ESM, how long, and/or an operating duty cycle for such use), whether the dielectric fluid has been previously treated and/or had a water removal treatment, recent storage conditions for the dielectric fluid, and/or a source of the dielectric fluid. In certain embodiments, one or more water removal operations 10602 may be performed before performing the water detection feedback operation 10604. In certain embodiments, a water content determined in the water detection feedback operation 10604 may be used to determine which water removal feedback operation(s) 10602 to perform, parameters for such operations, and/or how many times a given water removal feedback operation 10602 will be performed before completion of the procedure 10600 and/or a repeat of the water detection feedback operation 10604. The example procedure 10600 includes an operation 10606 to determine whether the water content of the dielectric fluid is below a threshold value. The threshold value may be selected according to the dielectric fluid (e.g., sensitivity and/or affinity to water), the utilization of the dielectric fluid (e.g., storing for later use, going into an ESM for operations, and/or a power rating, electric field strength, gap size, and/or other relevant operational parameters of the target ESM). In response to operation 10606 indicating "YES", the procedure 10600 includes an operation 10608 to utilize the dielectric fluid in an ESM supply process (e.g., utilizing as a rinsing fluid, an operating fluid, storing for later use, which may include dry storage, protected storage, and/or vacuum storage, and/or transporting to a location such as a service location, manufacturing location, etc.). In response to operation 10606 indicating "NO", the procedure 10600 may include repeating a selected operation 10602 for water removal, including potentially adjusting the operation 10602 (e.g., type of removal, number of times for operations to be performed, and/or parameters for the removal operation), re-testing the water content (e.g., at operation 10604), and/or ending the procedure 10600. An example procedure 10600 includes performing an operation 10602 as a fractional distillation of the dielectric fluid before performing the water detection feedback 10604. An example procedure 10600 includes performing an operation 10602 as a fractional distillation of the dielectric fluid before another water removal operation 10602 (e.g., any operation disclosed herein, including at least a second fractional distillation of the dielectric fluid), and before performing the water removal operation 10604. An example dielectric fluid includes a supplied base fluid—for example, a general chemical delivery from a provider of a base fluid composition such as any base fluid composition set forth herein. An example dielectric fluid includes a recycled dielectric fluid—for example from an ESM in-use, from a part of an ESM supply process (e.g., a rinse fluid, a stored fluid, an expired fluid, etc.).

Example and non-limiting operations 10604 to perform a water detection feedback include any water content determination procedures understood in the art. Without limitation to any other aspect of the present disclosure, example operations 10604 include one or more operations such as: performing a nuclear magnetic resonance interrogation of the dielectric fluid; performing an electromagnetic spectrum analysis of the dielectric fluid (e.g., on a liquid sample or vapor sample of the dielectric fluid); performing an infrared spectrum analysis of the dielectric fluid (e.g., on a liquid sample or vapor sample of the dielectric fluid); performing a Karl Fischer titration operation on a sample of the dielectric fluid; performing a high-performance liquid chromatography operation on a sample of the dielectric fluid; performing an electrochemical water detection operation on a sample of the dielectric fluid; performing at least one of a potentiometric titration or a potentiometric detection on a sample of the dielectric fluid; performing a coulometric titration on a sample of the dielectric fluid; and/or performing a gas chromatography-mass spectrometry operation on a sample of the dielectric fluid.

Figure 107:
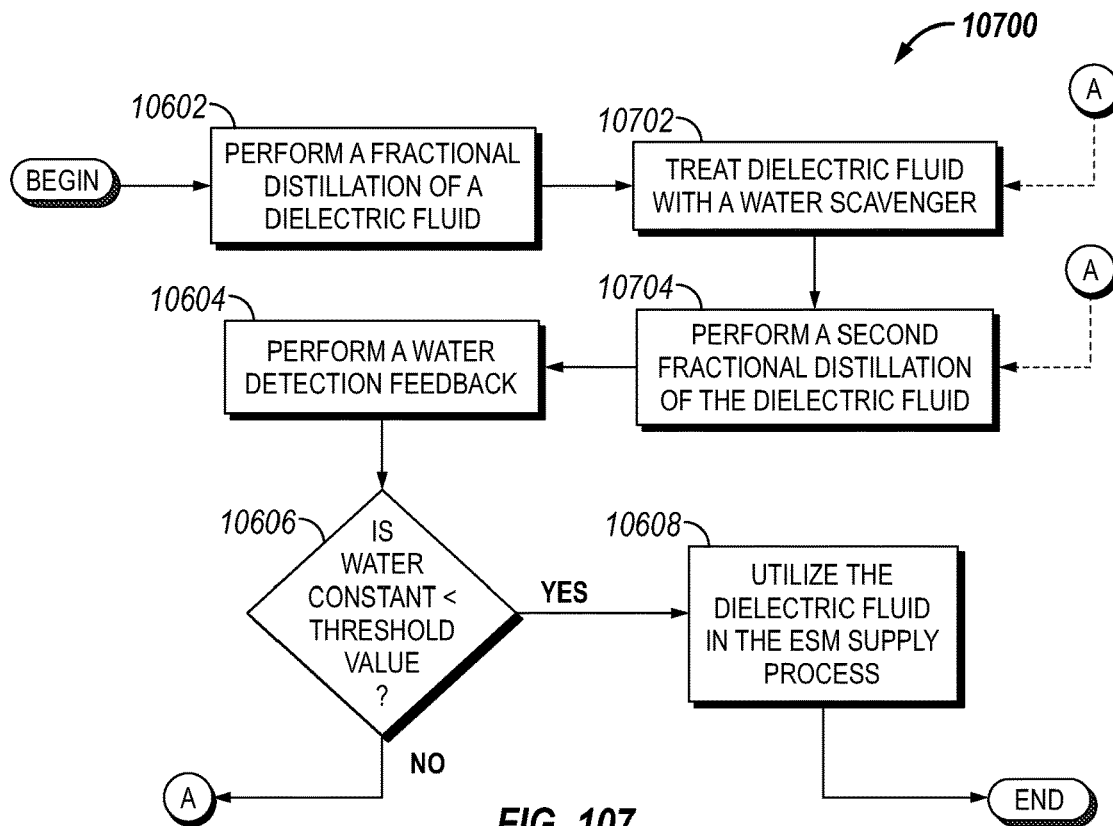
FIG. 107 is a schematic flow diagram of a procedure for performing a distillation operation for an electrostatic motor.

Referencing FIG. 107, an example procedure 10700 to utilize a dielectric fluid in an ESM supply process is schematically depicted. The example procedure 10700 includes an operation 10602 to perform a fractional distillation on a dielectric fluid, an operation 10604 to treat the dielectric fluid with a water scavenger and/or with a molecular sieve, and an operation 10704 to perform a second fractional distillation of the dielectric fluid. The example procedure 10700 includes an operation 10604 to perform a water feedback detection operation on the dielectric fluid, and an operation 10606 to determine whether a water content of the dielectric fluid is below a threshold value. The example procedure 10700 includes, in response to operation 10606 indicating "YES", an operation 10608 to utilize the dielectric fluid in an ESM supply process. The example procedure 10700 includes, in response to operation 10606 indicating "NO", an operation to perform additional water removal operations on the dielectric fluid. The example procedure 10700 includes selectively returning to operation 10702 and/or 10704 in response to operation 10606 indicating "NO". In certain embodiments, in response to operation 10606 indicating "NO", the example procedure 10700 includes returning to operation 10602, performing a different water removal operation (not shown), and/or ending the procedure 10700. In certain embodiments, a decision to return to a selected operation (e.g., 10602, 10702, 10704, and/or a different water removal operation) is performed in response to a water content of the dielectric fluid as determined at operation 10604.

Figure 109:
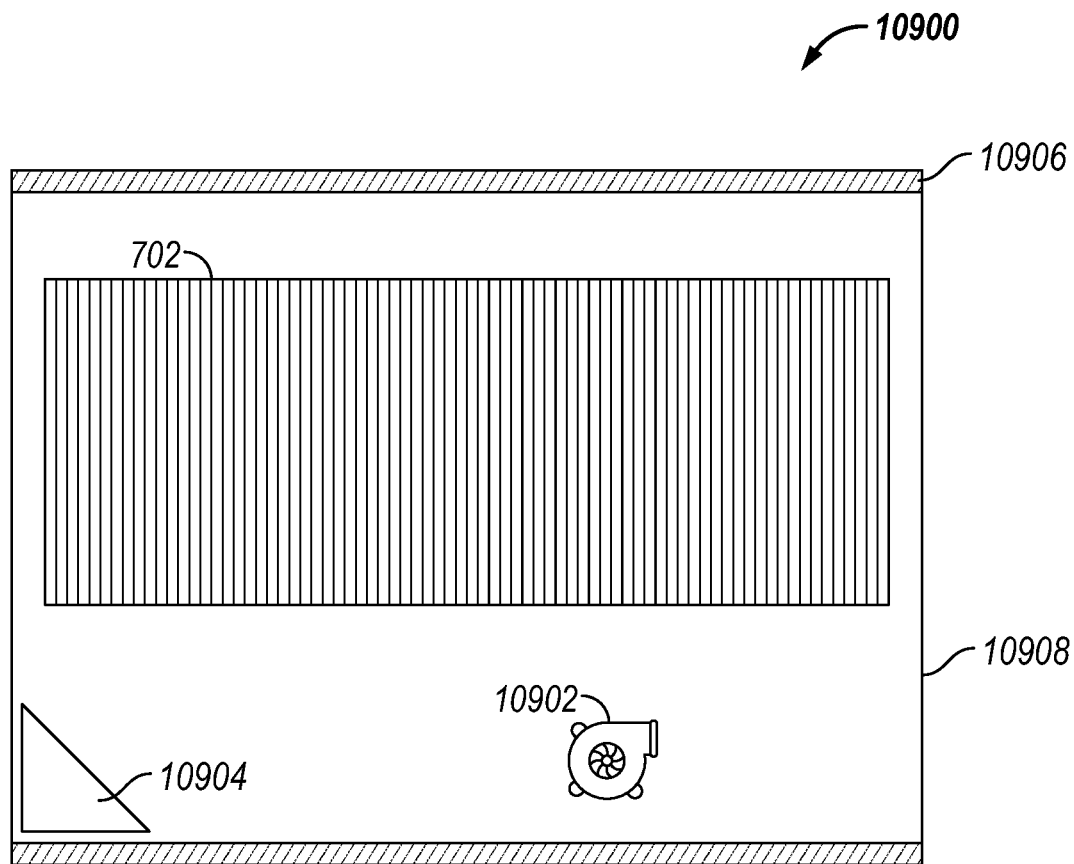
FIG. 109 is a schematic depiction of a system for an electrostatic motor.

Referencing FIG. 109, an example ESM 10900 includes a number of features consistent with aspects of the present disclosure. The ESM 10900 may be utilized with any systems or aspects of the present disclosure. The example ESM 10900 includes a housing 10908 having a coating 10906 thereon. An example coating 10906 includes a conductive coating, for example to provide an EMI reduction for emissions from the capacitive stack 702. Another example coating 10906 includes a thermally conductive coating, for example to promote heat transfer from the fluid to the external environment of the ESM 10900, and/or to promote heat transfer away from the capacitive stack 702, from electrical components positioned within the housing 10908, or the like. An example coating 10906 provides a hardened and/or polished (or otherwise smooth) surface for an interior of the housing—for example to reduce friction of circulating fluid, and/or to inhibit loss of housing material (e.g., including the introduction of ions, particles, and/or contaminants from the housing surface into the dielectric fluid). An example feature, positioned similarly to the coating 10906 in certain embodiments (but not shown), includes a conductive tube and/or a conductive mesh. In certain embodiments, the conductive tube and/or conductive mesh is provided inside the housing, outside the housing, and/or at least partially integrated with the housing 10908. For example, the conductive tube (and/or mesh) may be formed with an overmolded housing 10908 provided as a plastic housing (e.g., The example coating 10906 and/or conductive tube may be provided on the inside of the housing (e.g., to maintain a look of the ESM, to provide a selected outer surface of the ESM 10900, and/or to provide an ESM having a selected footprint). The example coating 10906 and/or conductive tube may be provided on an outside of the housing.

An example feature, positioned similarly in certain embodiments to the coating 10906 (but not shown) include a thermal fluid jacket. The thermal fluid jacket may be provided as a part of a conductive tube and/or mesh at least partially defining the capacitive stack 702 (e.g., with fluid passages, and/or geometric elements, configure to provide a conductive layer at least partially around the capacitive stack 702, and/or a heat transfer interface between an active thermal fluid (not shown) and the dielectric fluid. Example and non-limiting active thermal fluids include water, propylene glycol, and/or oil. In certain embodiments, the thermal fluid jacket, where present, includes an interface (e.g., connector, port, stem, etc.) for coupling the active thermal fluid. In certain embodiments the active thermal fluid couples to a cooling and/or temperature management system for the ESM 10900, for a system including the ESM 10900, and/or for a related application to the ESM 10900. For example, a hybrid vehicle utilizing the ESM 10900 may include a cooling system, where the cooling system of the hybrid vehicle can include the ESM 10900 in the coolant loop for active temperature control.

Again referencing FIG. 109, the ESM 10900 includes a housing support 10904, depicted schematically as a corner support fin, which may promote heat transfer, desired fluid flow of the dielectric fluid during certain operating conditions or regimes, and/or structural support and/or stiffness of the housing 10900. A housing support 10904 may be positioned inside the housing 10908 or outside the housing (or both, if the support forms a part of the housing wall and/or passes through the housing wall). The example ESM 10900 further includes a pump 10902, which may be a passive or automatic device (e.g., always operating during ESM 10900 operations, which may be at a constant speed and/or at a variable speed, such as a speed related to a speed of the ESM 10900), or may be a controlled device (e.g., responsive to commands from a controller 6200). Example operations of the pump 10902 include circulation of the dielectric fluid (e.g., to support fluid bearing operations—e.g., reference FIG. 6 and the related description, to support heat transfer into the dielectric fluid and/or to the housing and/or thermal fluid jacket, and/or to support fluid flow within the ESM 10900, for example to reduce a fluid dynamic force experienced by plate of the capacitive stack 702). In certain embodiments, the pump 10902 may be controlled responsive to one or more of these goals—for example responsive to a temperature of the dielectric fluid and/or a parameter representative of heat generation in the ESM 10900 (e.g., based on power throughput, back mmf loss values, etc.).

Figure 110:
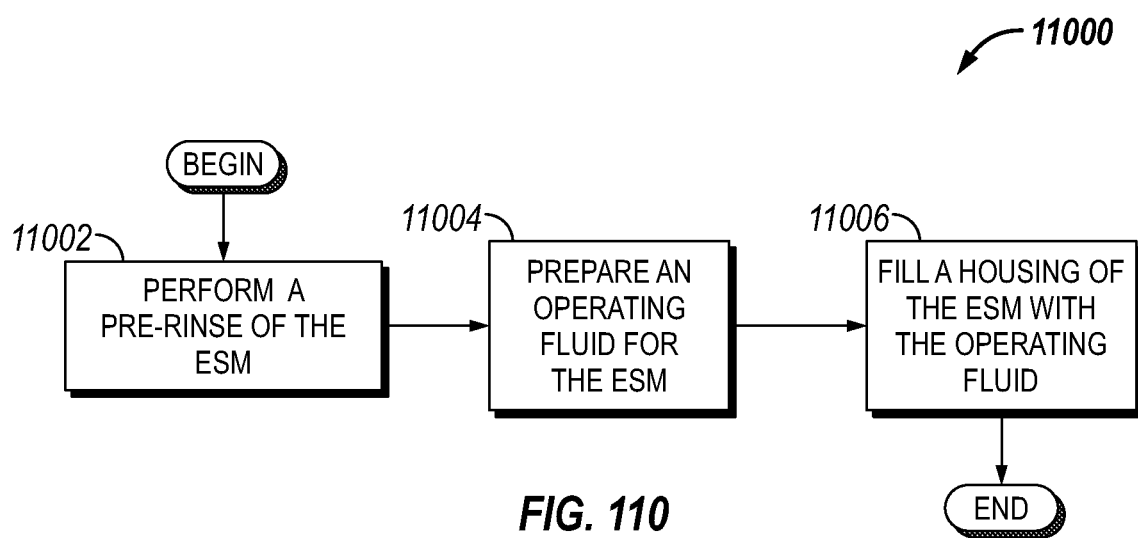
FIG. 110 is a schematic flow diagram of a procedure for filling a housing with operating fluid operation for an electrostatic motor.

Referencing FIG. 110, an example procedure 11000 for filling a housing of an ESM with an operating fluid is schematically depicted. The example procedure 11000 includes an operation 11002 to perform a pre-rinse of an ESM. Without limitation to any other aspect of the present disclosure, example operations 11002 include any operations described in reference to FIGS. 96 and 97. The example procedure 11000 further includes an operation 11004 to prepare an operating fluid for the ESM. Without limitation to any other aspect of the present disclosure, example operations 11004 include any operations described in reference to FIGS. 98, 99, and 101-107. The example procedure 11000 further includes an operation 11006 to fill a housing of the ESM with the operating fluid.

Without limitation to any other aspect of the present disclosure, an example operating fluid includes a combination of fluids (e.g., selected from various base fluid compositions and/or dielectric fluids) selected to provide a permittivity performance corresponding to a temperature range of interest. For example, two fluids having distinct permittivity curves with temperature may be combined to provide a selected permittivity value or range for the combination over a range of operating temperatures. An example operation 11992 includes performing a rinse of the ESM housing with a base fluid, which may be a base fluid compatible with the operating fluid, and/or a base fluid having a same composition, or a shared composition, with a base fluid composition of the operating fluid. In certain embodiments, operation 11002 includes removing the rinse fluid after performing the rinse operation. In certain embodiments, operation 11006 includes performing a final fill of the ESM housing by topping up the fluid with all or a portion of the rinse fluid remaining in the ESM.

Figure 111:
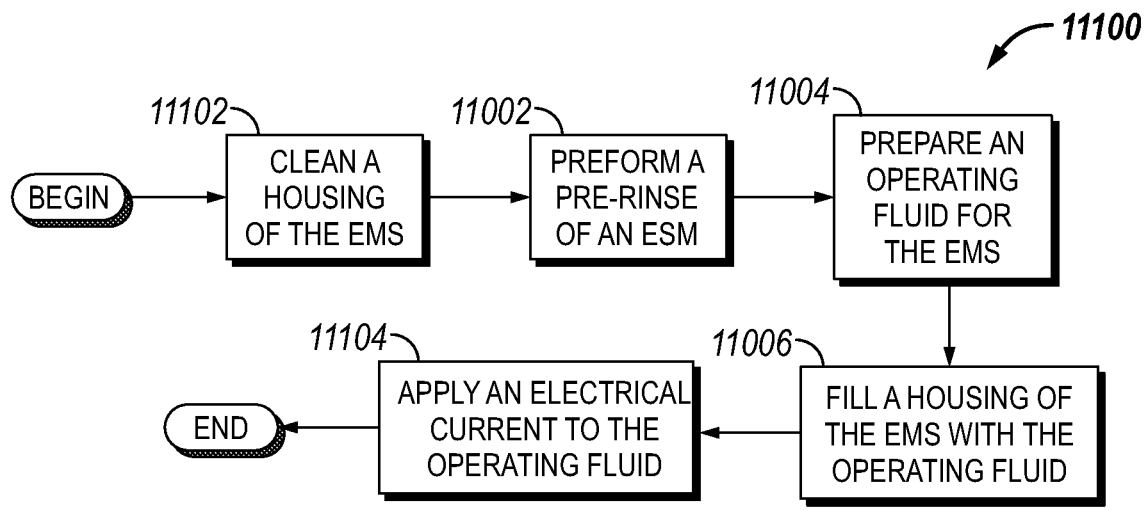
FIG. 111 is a schematic flow diagram of a procedure for filling a housing with operating fluid operation for an electrostatic motor.

Referencing FIG. 111, an example procedure 11100 for preparing a filled ESM for operational service is schematically depicted. The example procedure 11100 may be performed additionally to the procedure 11000 of FIG. 110. The example procedure 11100 includes an operation 11102 to clean a housing of the ESM, which may include physically removing debris, and/or polishing one or more surfaces within the ESM (e.g., electrodes, plate surfaces, and/or an inner housing surface). The example procedure 11100 includes an operation 11104 to apply an electrical current to the operating fluid. The example operation 11104 is described in relation to providing an electrical current to the operating fluid, which may be provided as a constant current, a constant voltage, a constant power, and/or any of these provided within a selected range. In certain embodiments, the operating fluid will exhibit a background or leakage current behavior, where if the applied electrical energy (e.g., current, voltage, and/or power) does not exceed the background or leakage current, the operating fluid will not be conditioned and accordingly the exhibited resistivity of the fluid will not progress. Accordingly, without limitation to any other aspect of the present disclosure, operation 11104 may include one or more operations such as: ensuring that an applied electrical energy exceeds a background or leakage current value; and/or ensuring that the applied electrical energy is sufficient to condition the operating fluid (e.g., observing the conditioning progress of the operating fluid, and increasing the applied electrical energy until a conditioning response is observed).

Example operations 11104 include operating in a constant voltage mode, where the starting current value exceeds the background or leakage current value. The current value will fall as the operating fluid is conditioned, and the operation 11104 is continued until the rated leakage current value is achieved at the rated voltage value. In certain embodiments, in the constant voltage mode, the applied voltage is started at a high voltage value (e.g., close to and/or above a rated voltage value), to ensure the leakage current value is exceeded, and the voltage thereafter modulated as the operating fluid conditions (e.g., increasing toward the rated voltage, and/or reduced below the rated voltage after an initial period, and increased again toward the rated voltage). In certain embodiments, in the constant voltage mode, the applied voltage is provided at a low level (e.g., 5%, 10%, 25% of the rated voltage, etc.) and stepped up in stages (and/or continuously) until the rated leakage current value is achieved at the rated voltage value. In certain embodiments, operations 11104 are responsive to the conditioning response of the operating fluid, and the applied voltage may be increased if the operating fluid does not exhibit a conditioning response (e.g., according to a change in the exhibited resistivity of the operating fluid), including, for example, where the background or leakage current value is unknown or variable.

Example operations 11104 include operating in a constant current mode, where the starting current is selected at a higher value than the rated leakage current value. In the constant current mode, the terminal voltage is observed, and the applied current is maintained until the terminal voltage reaches the full rated voltage. The applied starting current may be selected as a ratio of 1×+ (e.g., approaching the rated leakage current value), 5×, 10×, 50×, 100×, and/or 500× of the rated leakage current value. In certain embodiments, operations 11104 are responsive to the conditioning response of the operating fluid, and the applied current may be increased if the operating fluid does not exhibit a conditioning response (e.g., according to a change in the exhibited resistivity of the operating fluid), including, for example, where the background or leakage current value is unknown or variable.

An example operation 11104 includes applying the current by modulating an applied voltage value to maintain a selected current value through the operating fluid, wherein the selected current value exceeds a specified leakage current (e.g., a rated leakage current value) of the electrostatic machine corresponding to a rated voltage value (e.g., a rated voltage of the ESM, and/or a value at which the specified leakage current is determined). An example operation 11104 includes applying the selected current value until the applied voltage value (e.g., to maintain the selected current value) reaches the rated voltage value at which the specified leakage current of the machine is defined. An example operation 11104 includes applying the electrical current to the operating fluid by monitoring an apparent resistivity of the operating fluid, and applying the electrical current in response to the monitored apparent resistivity of the operating fluid. An example operation includes applying the electrical current until a predetermined monitored apparent resistivity value is present in the operating fluid, An example operation includes applying the electrical current until the monitored apparent resistivity exceeds $10^7$ Ω-m.

In certain embodiments, operation 11104 to apply an electrical current (and/or voltage) to the operating fluid is performed without operating the ESM, for example, an external current supply (and/or voltage supply) may be provided to the operating fluid by direct contact, which improves the initial operational performance of the ESM. Example operations 11104 to apply an electrical current to the operating fluid include operations to pass an electrical current through the operating fluid for a period of time. In certain embodiments, the current is passed through the operating fluid at a selected current value or range—for example 10 mA to 500 mA. The selected current value or range will vary widely according to the composition of the operating fluid (e.g., base fluid, and/or including additives), the size and/or arrangement of the ESM, and the desired time for completion of the operation 11104. A small ESM may utilize a small current—for example, a current in the range of μA (e.g., $Amps^{-6}$) or even pA (e.g., $Amps^{-12}$) may be sufficient. For large ESMs, for example due to the large conducting surface area through a high operating fluid volume, current values may approach and/or exceed an Amp, and may be several Amps for very large systems, especially upon initial application of current. The operating fluid will gain effective resistance over time as the current is applied. Accordingly, in certain embodiments, operation 11104 includes modulating a voltage of the applied current to maintain the applied current within a selected range and/or at a selected value. The example operation 11104 includes applying the current for a specified time period, and/or until the operating fluid exhibits a target effective resistance value (e.g., until the applied modulated voltage to achieve the selected current value or range reaches a specified threshold value). In certain embodiments, operation 11104 includes selecting a target current value based on an indicated and/or rated current value of the ESM. In certain embodiments, the indicated and/or rated current value of the ESM is not an actual current utilized by the ESM during operations, or at least not a current value ordinarily utilized by the ESM during operations. In certain embodiments, the indicated current value is determined from a power throughput and an effective voltage of the ESM—for example where the ESM has a rated power output of 1 kW, and the field voltage within the ESM has an amplitude of 500V, then an indicated and/or rated current value of the ESM may be determined to be about 2 A. The actual determination of the field voltage may be based upon a voltage provided by the field voltage supply (e.g., DC voltage supplied to rotor electrodes), a magnitude of the fundamental of the stator voltage (e.g., Vs, reference U.S. Pat. No. 9,960,719), or by any other description of the field strength of the ESM. The specific determination of the effective voltage is not crucial, as the operation 11104 provides an electrical stress on the operating fluid that is a fraction, although a potentially significant fraction, of the electrical stress on the operating fluid that will be experienced during powering operations of the ESM. Accordingly, an estimated effective voltage is robust to several different determination methods, a broad range of which will sufficiently achieve the operating fluid conditioning for operation 11104. An example operation 11104 targets a current value, without limitation, in a range such as: at least 1% of a rated current value of the ESM; between 0.1% and 5%, inclusive, of a rated current value of the ESM; at least 5% of a rated current value of the ESM; and/or at least 10% of a rated current value of the ESM. Additionally or alternatively, an example operation 11104 targets the modulated voltage to be applied in a range based on the effective voltage of the ESM, for example at least 1% of the effective voltage, at least 5% of the effective voltage, at least 10% of the effective voltage, at least 15% of the effective voltage, at least 35% of the effective voltage, and/or at least 50% of the effective voltage. In certain embodiments, the targeted modulated voltage is utilized as a limit to the applied voltage. In certain embodiments, the targeted modulated voltage is utilized to set a range for the modulated voltage (e.g., a range including the targeted modulated voltage, centered on the targeted modulated voltage, a range having an averaging description, such as a logarithmic mean and/or geometric mean based on the targeted modulated voltage). One of skill in the art, having the benefit of the present disclosure and information ordinarily available about a particular system, can readily determine parameters for the operation 11104 that will effectively condition the operating fluid. In certain embodiments, for example where consistently configured ESMs are provided over a period of time, sequential operations 11104 on a series of the ESMs can be tuned for appropriate parameters for operation 11104. In certain embodiments, a rated current value of the ESM is determined in response to a peak current value of a current source inverter supplying excitation power to at least one of a rotor stack or a stator stack (typically, the stator stack) of the ESM. In certain embodiments, a rated current value of the ESM is determined in response to one or more of a rated power value, a rated torque value, and/or a rated voltage value of the ESM. In certain embodiments, operation 11104 is applied until the applied voltage is equal to a selected voltage (e.g., a rated voltage) at a selected current (e.g., the background or leakage current). In certain embodiments, operation 11104 is applied until the applied current is equal to a selected current (e.g., the background or leakage current) at a selected voltage (e.g., a rated voltage).

Figure 112:
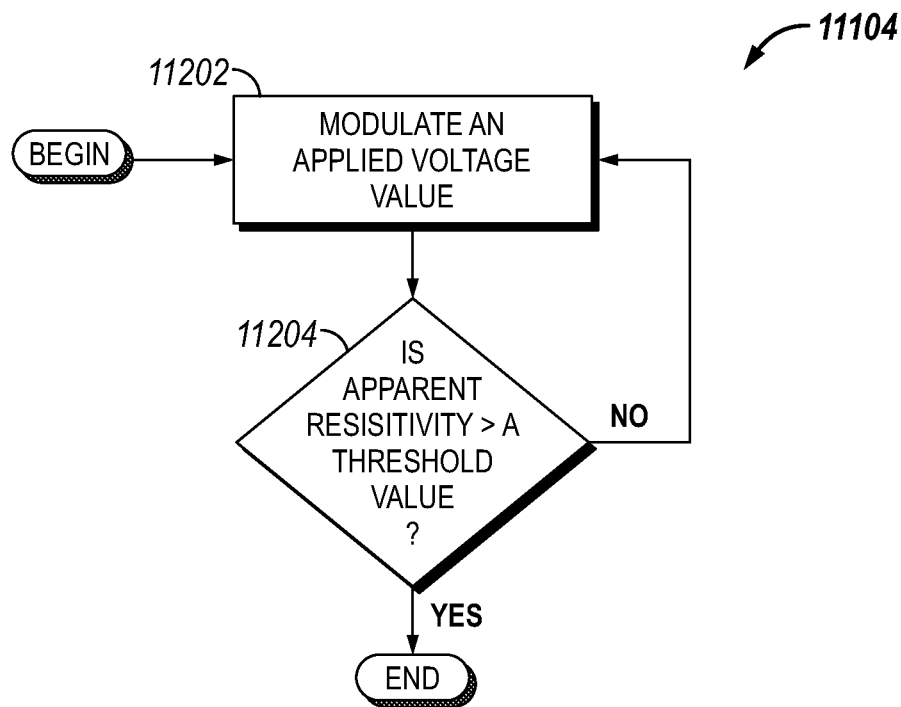
FIG. 112 is a schematic flow diagram of a procedure for modulating an applied voltage for an electrostatic motor.

Referencing FIG. 112, an example procedure 11104 to apply an electrical current to the operating fluid is schematically depicted. The example procedure 11104 includes an operation 11202 to modulate an applied voltage (and/or applied current or applied power), where the applied voltage is provided to an operating fluid positioned in an ESM. The example procedure 11104 includes an operation 11204 to determine whether an apparent resistivity (and/or permittivity) of the operating fluid is greater than a threshold value, where the threshold value is selected such that the operating fluid is conditioned when the threshold value is reached (or before—e.g., to provide some seasoning margin). In response to operation 11204 indicating NO, procedure 11104 continues with operation 11202 to modulate the applied voltage value. In response to operation 11204 indicating YES, procedure 11104 concludes.

In certain embodiments, operation 11004 to prepare an operating fluid for the ESM includes performing a water removal operation on the operating fluid, for example and without limitation, in accordance with any aspects as set forth in relation to FIGS. 106-107. Additionally or alternatively, operation 11004 includes one or more of an operation to remove dissolved gasses in the operating fluid (e.g., reference FIGS. 101-104 and the related description), an operation to load the operating fluid with a preferential gas (e.g., reference FIG. 104 and the related description), and/or an operation to perform a vacuum soak operation on the filled ESM and/or the operating fluid (e.g., reference FIGS. 98-99 and the related description).

In certain embodiments, operations of procedure 11104 may be performed as part of operations to perform a rinse operation (e.g., FIGS. 96-97 and the related description), which may be performed on the electrode separation fluid either before filling the housing (e.g., to condition the fluid) and/or after filling the housing (e.g., to condition exposed portions of the ESM, such as electrodes, plates, seals, bearing, etc., for example where any reacted contaminants are removed with the rinse fluid). In certain embodiments, operations of procedure 11104 may be performed as a service or maintenance event (e.g., to condition the fluid after replacement into the ESM, to refurbish, recover, and/or recycle the fluid), and/or as a part of a fluid upgrade and/or replacement (e.g., treating the new fluid, and/or rinsing with a conditioned fluid before replacing the fluid).

Figure 113:
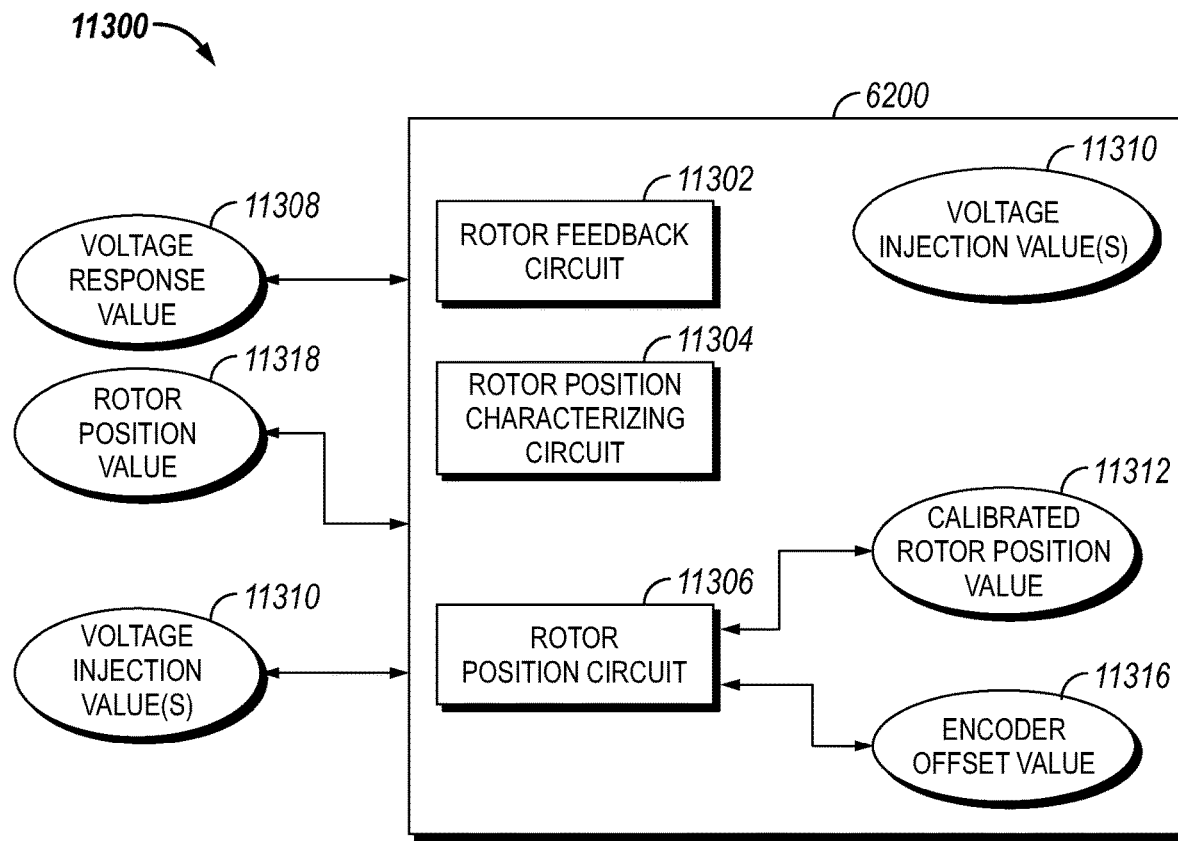
FIG. 113 is a schematic flow diagram of a procedure for rotor position for an electrostatic motor.

Referencing FIG. 113, an example apparatus 11300 includes a controller 6200 having a number of circuits structured to functionally execute operations of the controller 6200, including operations to determine a calibrated rotor position value 11312 and an encoder offset value 11316. An example ESM includes a rotor position sensor, for example an encoder that tracks the rotational position of the rotor stack. Position information of the rotor stack is utilized to provide appropriate voltage values on the stator electrodes and/or rotor electrodes during operations of the ESM. An encoder may provide a physical position value unrelated to the electrode alignments between stator electrodes and rotor electrodes, and/or may have slight position differences relative to an initial position indication due to manufacturing tolerance stack-ups, slight changes in rotation positions of electrodes over time, after service events, or the like. In certain embodiments, the capacitive stack may be assembled without regard to the correspondence of the electrical position relative to the physical position of the rotor stack, and accordingly an initial determination of the correspondence between the electrical position of the capacitive stack and rotor stack provides the relationship between these. Accordingly, the controller 6200 determines the actual rotor stack position (e.g., electrical arrangement position), which can be related to rotor encoder signals, providing for a feedback estimated determination, confirmation, and/or calibration of the electrical position of the capacitive stack corresponding to a given rotor encoder signal.

The controller 6200 may be included, in whole or part, with any systems or aspects herein, and/or may perform operations described herein. The example controller 6200 includes a rotor feedback circuit 11302 that interprets a voltage response value 11308 (and/or a current response value) corresponding to at least one of the plurality of rotor electrodes and/or stator electrodes. For example, a voltage modulation (and/or current modulation) on a stator electrode will generate a signal on various ones of the rotor electrodes, and vice versa. The voltage response value 11308 (and/or current response value) is determined from one or a number of electrodes, sequentially and/or in parallel. The example rotor feedback circuit 11302 additionally determines a rotor position value 11318, for example as indicated by a rotor encoder. An example rotor encoder determines a position of the rotor stack, generally between 0 and 2π radians, 0-360 degrees, and/or corresponding values (e.g., a number of indicated bits) that can be related to a rotational position of the rotor stack. The example rotor feedback circuit 11302 provides the voltage response values 11308 (and/or current response values) and corresponding rotor position value(s) 11318 for utilization by other components of the controller 6200.

The example controller 6200 further includes a rotor position characterizing circuit 11304 that determines a voltage injection value 11310 (and/or a current injection value) that includes a voltage injection trajectory (and/or current injection trajectory), for example an injected voltage (and/or current) to be provided to stator electrodes and/or rotor electrodes. The example controller 6200 determines voltage responses on corresponding electrodes resulting from the voltage injection value(s) 11310 to determine an electrical position (e.g., relative position and/or alignment of stator electrodes and rotor electrodes) of the capacitive stack. The example of FIG. 113 depicts voltage injection values 11310, but the rotor position characterizing circuit 11304 may additionally or alternatively determine current injection values that include a current injection trajectory to be provided to stator electrodes and/or rotor electrodes.

The example controller 6200 further includes a rotor position circuit that determines a calibrated rotor position value 11312 (e.g., an electrical position description of the capacitive stack) in response to the rotor position value 11318 (e.g., the physical position of the rotor stack indicated by the rotor encoder) and the corresponding voltage response values 11308 (and/or current response values). In certain embodiments, a voltage injection value 11310 (and/or current injection value) is provided to a number of stator electrodes (and/or selected related groups of the stator electrodes, and/or selected phases provided to the stator electrodes). The example rotor position circuit 11306 surveys the voltage response values 11308 (and/or current response values) and corresponding rotor position values 11318 to determine the actual electrical alignment (position) of the capacitive stack, and relates those positions to one or more encoder positions. In certain embodiments, the rotor position circuit 11306 determines a particular position, for example a position relating to a lowest torque position of the capacitive stack, and/or a zero torque position of the capacitive stack. It will be understood that, depending upon the arrangement of the capacitive stack, including the number and alignment of electrodes, and/or the number of independent circuits for the electrodes of the rotor stack and/or the stator stack, a given ESM may not have a zero torque position (e.g., a position whereby an applied electric field in the gap between stator electrodes and rotor electrodes does not result in an applied torque). Without limitation to any other aspect of the present disclosure, any other correspondence between the encoder position and the electrical position of the capacitive stack may be utilized as a reference point, for example a highest torque position, a specified torque position (e.g., 25% torque position), and/or an electrical position relating to a specified rotor position value 11318 (e.g., an electrical position relating to a 0 position, $\pi$ position, etc. of the rotor position value 11318). Accordingly, the calibrated rotor position value 11312 relates rotor position values 11318 to electrical position values. The encoder offset value 11316 provides a control offset parameter allowing the rotor position value 11318 to be utilized as a control parameter. For example, if the electrical cycle goes through three full electrical cycles during a single full rotation of the rotor stack, and a lowest torque position of the ESM is associated with a $-\pi/12$ rotor position value 11310, an example encoder offset value 13316 may be $-\pi/12$—for example allowing the controller 6200 to offset electrical position determinations by $-\pi/12$ (or possibly $+22/24\pi$), and/or the encoder offset value 11316 may be a formula such as $\{E=3R-\pi/12\}$, allowing for immediate conversion of any rotor position R to an electrical position E. In certain embodiments, the calibrated rotor position value 11312 is used directly as the encoder offset value 11316, and/or one of the calibrated rotor position value 11312 or the encoder offset value 11316 may be omitted. The described examples are illustrative and non-limiting. An example controller 6200 is associated with and/or included with a system having an excitation circuit that is responsive to the voltage injection values 11310 (and/or current injection values) to provide corresponding voltage (and/or current) injection to stator and/or rotor electrodes.

An example voltage injection value 11310 includes a voltage injection trajectory (or current injection trajectory) that includes a voltage progression (or current progression) to be injected onto one or more stator electrodes, and the voltage response value 11308 (and/or current response value) corresponds to one or more rotor electrodes, determining the exhibited response to the stator excitation on the rotors, allowing for the determination of the electrical position of the capacitive stack. In certain embodiments, multiple electrodes can be sampled, for example allowing the controller 6200 to determine the electrical position with very little or no movement (and/or torque generation) of the rotor stack. In certain embodiments, the voltage injection values 11301 and/or current injection values are provided such that a very low torque, or a zero torque (and/or zero effective torque—for example, a torque insufficient to overcome static rotating friction of the rotor stack and/or shaft) is provided, such that torque is not experienced by the mechanical load during operations to determine the encoder offset value 11316. In certain embodiments, some torque generation is acceptable during operations to determine the encoder offset value 11316, for example where the mechanical load is known to be in a condition to accept a small torque (e.g., an operating state or other parameter provided by a controller associated with the mechanical load and/or a system including the mechanical load and/or the ESM indicates that torque acceptance is allowed), and/or where a provided small torque value is insufficient to move the mechanical load (e.g., where a static friction of the mechanical load exceeds a small generated torque). In certain embodiments, a de-coupling device such as a brake or clutch is interposed between the ESM and the mechanical load, and a position of the clutch and/or brake may be consistent with the allowance of torque generation during operations to determine the encoder offset value 11316.

An example rotor position characterization circuit 11304 determines a second voltage injection value 11310 (and/or current injection value) including a second voltage progression value (and/or current progression value) to be injected onto the rotor electrodes. In certain embodiments, the voltage response value(s) 11308 (or current response value(s)) may be taken from the rotor electrodes and/or from the stator electrodes. An example second voltage progression (or current progression) is provided to be very low, for example allowing for the sensitive response of the rotor electrodes to the stator electrode injection to be detected. In certain embodiments, the second voltage progression (or current progression) is a zero voltage command value (e.g., voltage and/or current supplied to the rotor electrodes is zero during at least a portion of the operations of the controller 6200).

An example second voltage progression includes a distinct voltage characteristic (and/or current characteristic) relative to the voltage progression (or current progression) to allow for measurement of the voltage response value(s) 11308 (and/or current response values) on the rotor electrodes in the presence of the voltage progression (or current progression) injected onto the stator electrodes. For example, the distinct voltage/current characteristic may include a frequency characteristic, a transient characteristic, and/or a modulating characteristic. In certain embodiments, manipulation of the voltage/current progression on the stator electrodes and the rotor electrodes can enhance the signal-to-noise ratio of detecting the voltage response on the rotor electrodes. For example, the voltage/current progressions can be manipulated to enhance the ability of certain signal processing techniques, such as filtering (e.g., high pass, low pass, and/or band pass) and/or frequency component analysis to increase the signal portion of the voltage/current response value(s) 11308 and/or reduce a noise portion of the voltage/current response value(s) 11308. In certain embodiments, a voltage/current is injected onto the rotor electrodes, and the voltage/current response value(s) 11308 are taken from the stator electrodes. In certain embodiments, signal processing techniques are utilized to determine the voltage response value(s) 11308 and/or current response values, without distinct voltage/current characteristics of the first and second voltage/current progressions, and/or with only an applied voltage/current to one of the stator electrodes or the rotor electrodes.

An example rotor position circuit 11306 determines the calibrated rotor position value 11312 (and/or the encoder offset value 11316) in response to a startup operating condition of the ESM. For example, operations to determine the calibrated rotor position value 11312 may be performed during a startup operation, where minimal or no torque delivery from the ESM is requested. An example rotor position circuit 11306 determines the calibrated rotor position value 11312 (and/or the encoder offset value 11316) in response to a shutdown operating condition of the ESM. For example, operations to determine the calibrated rotor position value 11312 may be performed during a shutdown operation, where minimal or no torque deliver from the ESM is requested. In certain embodiments, the encoder offset value 11316 is determined from the calibrated rotor position value 11312, and is stored for utilization in other control operations related to the ESM.

Figure 114:
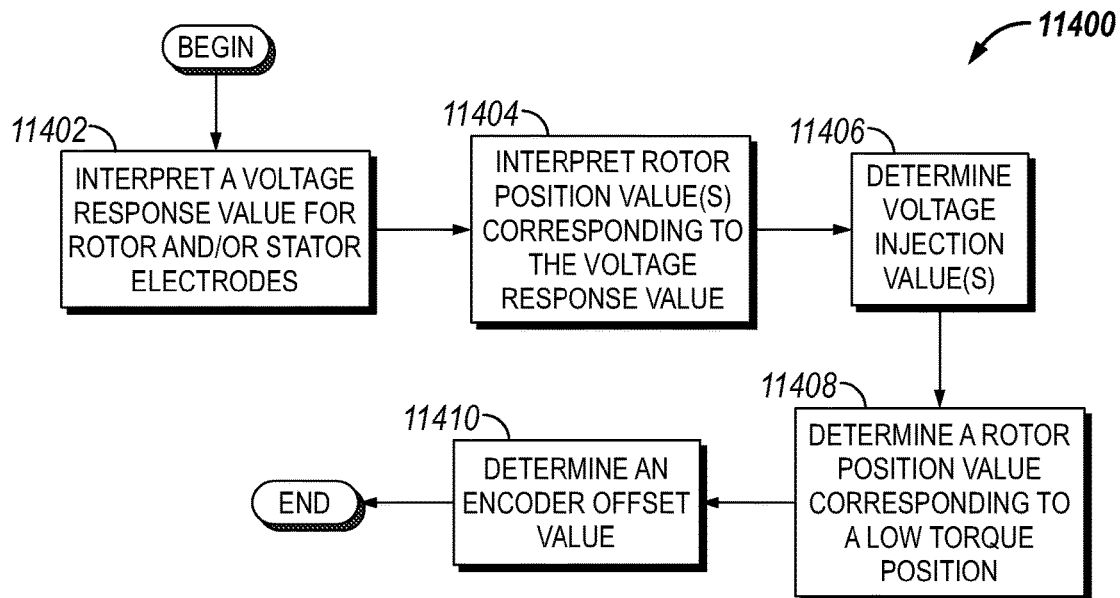
FIG. 114 is a schematic flow diagram of a procedure for rotor position for an electrostatic motor.

Referencing FIG. 114, an example procedure 11400 for determining an encoder offset value is schematically depicted. The example procedure 11400 includes an operation 11402 to interpret a voltage and/or current response value for rotor and/or stator electrodes, and an operation 11404 to interpret rotor position value(s) corresponding to the voltage and/or current response value(s). The example procedure 11400 further includes an operation 11406 to determine voltage and/or current injection values, for example to stator electrodes and/or rotor electrodes, and an operation 11408 to determine a rotor position value corresponding to a selected electrical position (e.g., a low torque position in the example of FIG. 114, but any aspects for a calibrated rotor position value, such as described in relation to FIG. 113, are contemplated herein). The example procedure 11400 includes an operation 11410 to determine an encoder offset value in response to the rotor position value corresponding to the selected electrical position of the capacitive stack. The example procedure 11400 may be performed, as with all procedures and/or operations of the present disclosure, in an alternative order, for example with operation 11406 preceding operation 11402.

Certain example operations 11400 are described following. An example operation includes determining a current injection signal (e.g., to be applied to a rotor electrode and/or a stator electrode, and which may include a voltage injection signal), interpreting a voltage and/or a current signal on the other one of the rotor electrode and/or the stator electrode, an operation to interpret a selected electrical position value based on the injected current and/or injected voltage (e.g., a minimum torque rotor position), and interpreting an encoder offset value in response to a physical rotor position value and the selected electrical position value. An example operation further includes performing signal processing (e.g., frequency component analysis, high pass filtering, low pass filtering, band pass filtering (filtering may be performed in response to known and/or determined frequency value determinations), and/or rationality checks), for example to be performed on the interpreted voltage and/or current signal on the other one of the rotor electrode and/or stator electrode. An example operation includes maintaining a zero or low field on the rotor electrode(s), thereby performing the operation 11400 with a very low or zero torque output of the ESM.

Figure 115:
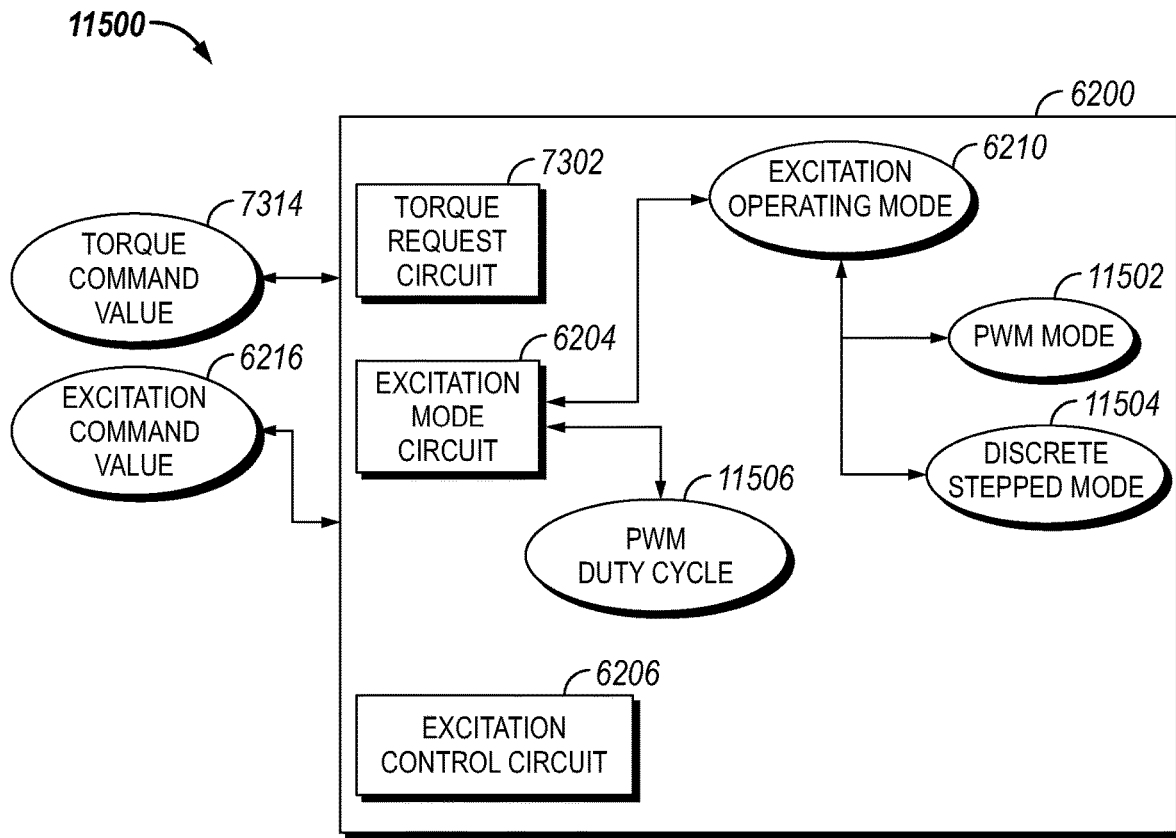
FIG. 115 is a schematic flow diagram of a procedure for operating mode control for an electrostatic motor.

Referencing FIG. 115, an example apparatus 11500 includes a controller 6200 having a number of circuits structured to functionally execute operations of the controller 6200, including operations to determine an excitation operating mode 6210 for controlling torque output for an ESM. The controller 6200 may be included, in whole or part, with any systems or aspects herein, and/or may perform operations described herein. An example system includes an excitation circuit responsive to the excitation command value to control excitation of the capacitive stack of an ESM using the selected excitation operating mode. An example controller 6200 a torque request circuit 7302 configured to interpret a torque command value 7314. The example of FIG. 115 depicts a torque request circuit using a torque command value, but the controller 6200 may additionally or alternatively utilize a rotor speed value, an ESM power output value, and/or a PWM duty cycle 11506 value to determine an excitation operating mode 6210.

The example controller 6200 includes an excitation mode circuit 6204 that determines an excitation operating mode 6210 in response to the torque command value 6314 (and/or in response to a rotor speed value, an ESM power output value, and/or the PWM duty cycle 11506). Example excitation operating modes 6210 include a PWM mode 11502 (e.g., where excitation values, such as the field supply voltage, an injected AC current, or the like, are provided by a PWM operating including a duty cycle with a selected on-time for each PWM period), and/or a discrete stepped mode 11504 (e.g., where excitation values are provided in an on/off mode for a selected period of time to provide the desired field strength in the ESM). In certain embodiments, the discrete stepped mode is performed in a selected number of steps, for example three steps, six steps, or the like. In certain embodiments, the discrete steps are divided between independently excitable groups and/or phases of the ESM, for example each independently excitable electrode group and/or phase of the ESM may be serviced by one or more discrete stepped channels. Accordingly, in certain embodiments, the number of discrete steps may be related to the number of independently excitable electrode groups and/or the number of phases provided for excitation of the capacitive stack of the ESM.

In certain embodiments, the excitation mode circuit 6204 determines the excitation operating mode 6210 as the discrete stepped mode 11504 in response to the torque command value 7314 exceeding a threshold value. Example and non-limiting threshold values include a value such as: a 50% duty cycle, an 80% duty cycle, and/or a 95% duty cycle. In certain embodiments, the discrete stepped mode is a simpler control mode to execute, and/or reduces operating cycles (e.g., for transistors executing excitation commands), where the controller 6200 implements the discrete stepped mode when the torque is sufficiently high that the discrete stepped mode provides acceptable and/or equivalent excitation control. In certain embodiments, the PWM operation may reserve a portion of the PWM duty cycle—for example, the last few % of the duty cycle below 100%—to allow for diagnostic operations, fault signaling, or the like, and it may be desirable to switch away from the PWM operation when the duty cycle to perform current excitation operations is sufficiently high.

An example excitation mode circuit determines the excitation operating mode 6210 in response to the rotor speed value. In certain embodiments, a high rotor speed value may indicate that the PWM mode 11502 should be utilized—for example due to the highly dynamic nature of excitation in a rapidly rotating capacitive stack. In certain embodiments, a high rotor speed value may indicate that the discrete stepped mode 11504 should be utilized—for example where the high rotor speed value may be indicative of a high power output of the ESM. In certain embodiments, the excitation mode circuit 6204 determines the excitation operating mode 6210 in response to the rotor speed value, and/or other values (e.g., the torque command value 7314 and/or ESM power output value, and/or PWM duty cycle 11506), which may be more complicated than a simple threshold check. For example, the PWM mode 11502 may be utilized at a low rotor speed, the discrete stepped mode 11504 may be utilized at an intermediate rotor speed, and the PWM mode 11502 may be utilized at a high rotor speed. The combination of rotor speed considerations with other excitation operating mode 6210 considerations may be more complex. The utilization of the PWM duty cycle 11506 in determining the excitation operating mode 6210 may be performed utilizing the PWM duty cycle 11506 (e.g., the observed and/or resulting PWM duty cycle 11506 to meet the current excitation operations) and/or a predicted PWM duty cycle 11506 (e.g., the PWM duty cycle 11506 that would be required to meet torque output, power output, and/or rotor speed conditions—as commanded and/or according to current operating conditions). An example excitation mode circuit 6204 is further structured to determine the excitation operating mode 6210 in response to at least one parameter such as: a period length of the PWM mode; a transient response description of the excitation circuit; a capacitance value of the electrostatic machine; a feedback value of a current of the current source inverter; and/or a feedback value of a voltage of the excitation circuit.

An example controller 6200 includes a switching frequency of the discrete stepped mode 11504 that is lower than a switching frequency of the PWM mode 11502. In certain embodiments, the switching frequency of the PWM mode 11502 may be between 3 and 100 times as fast as the switching frequency of the discrete stepped mode 11504. In certain embodiments, the switching frequency of the PWM mode 11502 may be much higher than the frequency of the discrete stepped mode 11504, including over 100 times as fast, and potentially at much higher ratios.

Figure 116:
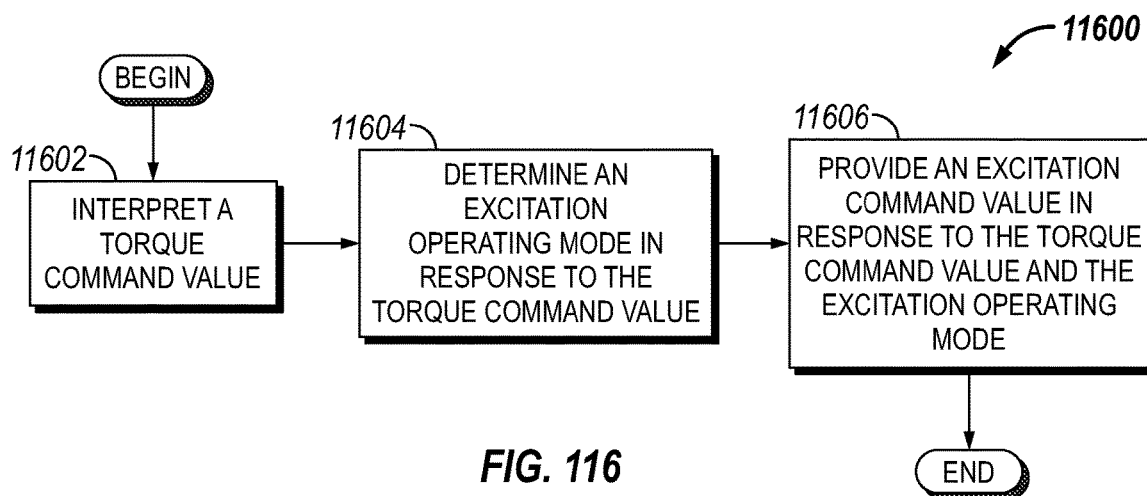
FIG. 116 is a schematic flow diagram of a procedure for operating mode control for an electrostatic motor.

Referencing FIG. 116, an example procedure 11600 for determining an excitation operating mode is schematically depicted. The example procedure 11600 includes an operation 11602 to interpret a torque command value (and/or an ESM power output value, a rotor speed value, and/or a PWM duty cycle value), and an operation 11604 to determine an excitation operating mode in response to the torque command value. The example procedure 11600 includes an operation 11606 to provide an excitation command value in response to the torque command value and the excitation operating mode.

Figure 117:
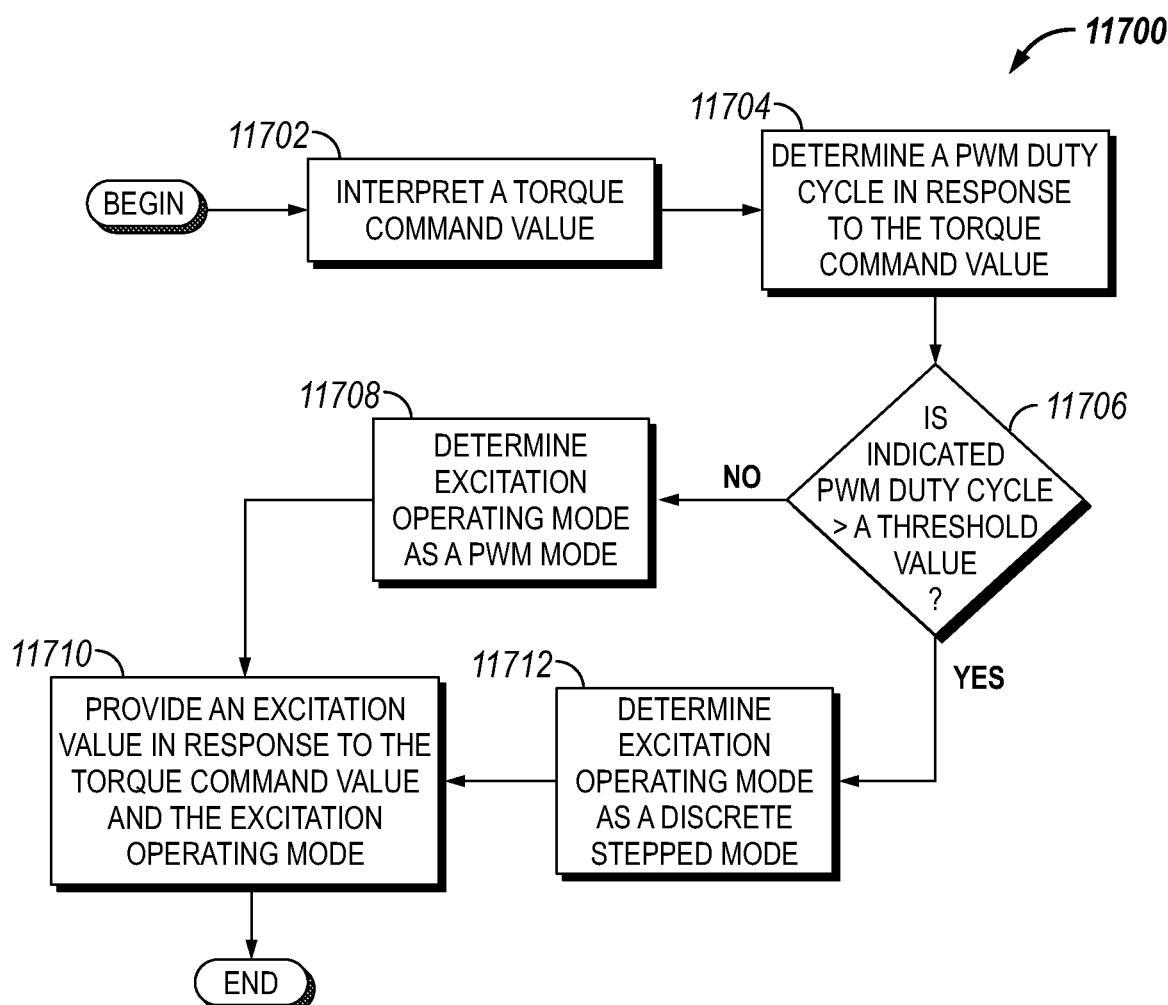
FIG. 117 is a schematic flow diagram of a procedure for operating mode control for an electrostatic motor.

Referencing FIG. 117, an example procedure 11700 for operating an ESM in a selected excitation operating mode is schematically depicted. The example procedure 11700 includes an operation 11702 to interpret a torque command value (and/or an ESM power output value, a rotor speed value, and/or a PWM duty cycle value), an operation 11704 to determine a PWM duty cycle in response to the torque command value, and an operation 11706 to determine whether an indicated PWM duty cycle is greater than a threshold value. The example procedure 11700 proceeds, in response to operation 11706 indicating NO, with an operation 11708 to determine an excitation operating mode as a PWM mode, and an operation 11710 to provide an excitation command value in response to the torque command value and the excitation operating mode. The example procedure 11700 proceeds, in response to operation 11706 indicating YES, with an operation 11712 to determine the excitation operating mode as a discrete stepped mode, and the operation 11710 to provide the excitation command value in response to the torque command value and the excitation operating mode.

Figure 118:
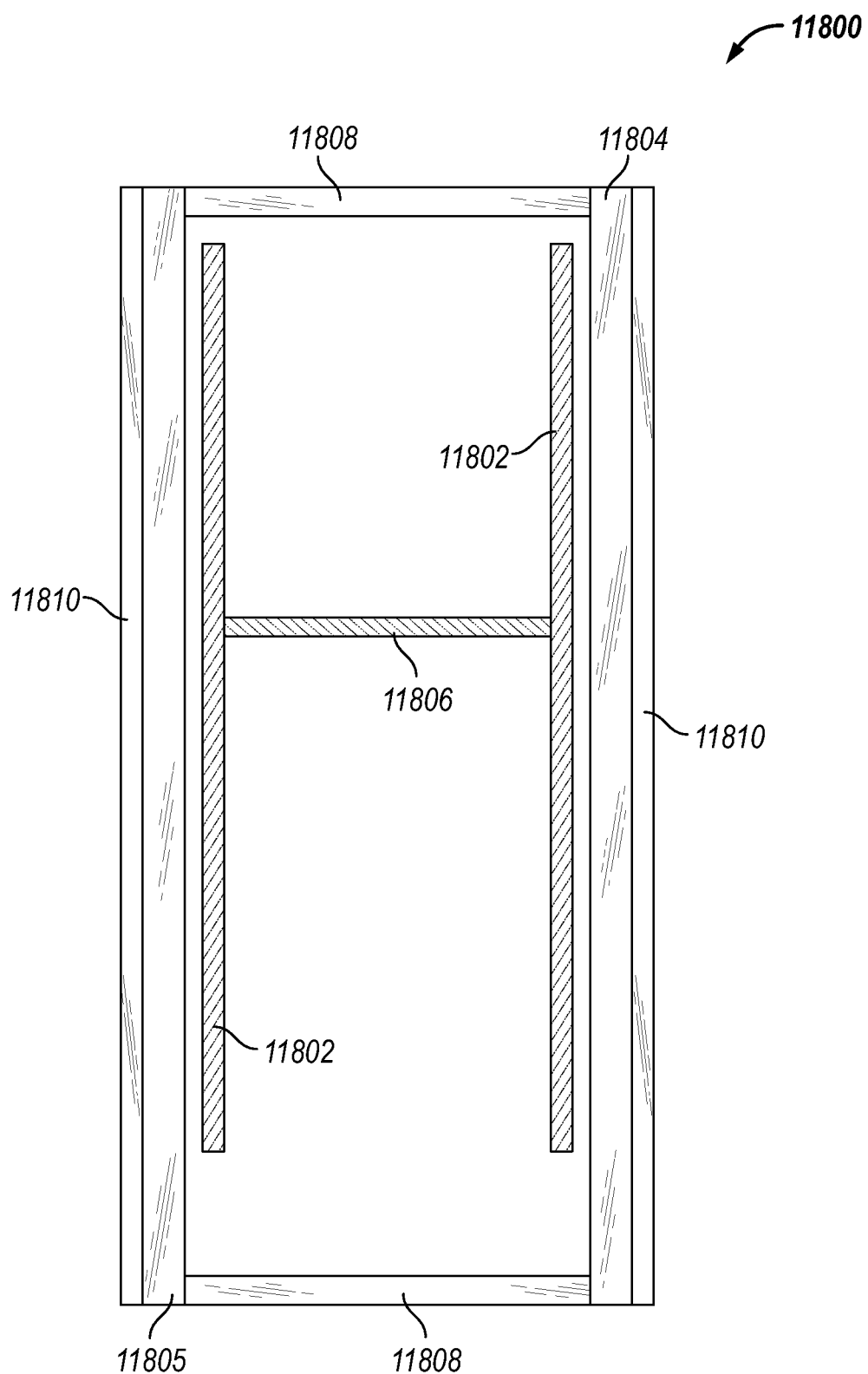

Referencing FIG. 118 an example plate 11800 configured for inclusion in a capacitive stack 702 of an ESM, including any embodiment of an ESM as set forth throughout the present disclosure, is schematically depicted. The example plate 11800 may be utilized as a rotor plate having rotor electrodes coupled thereto, or as a stator plate having stator electrodes coupled thereto. The example plate 11800 includes electrodes 11802, with two sets of electrodes 11802, for example the first set facing a first side of the plate 11800, and configured to form a capacitive gap with and adjacent plate (not shown) of a capacitive stack 702, for example where the plate 11800 is a rotor plate, an adjacent plate may be a stator plate, and where the plate 11800 is a stator plate, an adjacent plate may be a rotor plate. The example of FIG. 118 includes the electrodes 11802 on both sides, but an example plate 11802 may be configured with only a single set of electrodes (e.g., where the plate 11802 is a terminating plate, and/or where the capacitive stack 702 utilizes one or more, or all, of the plates having electrodes positioned only on a single side of each plate.

In certain embodiments, the plate 11800 includes a glass substrate 11804, 11805. The glass substrate includes any suitable material, for example including a tempered glass, a chemically strengthened glass (e.g., such as Gorilla® glass manufactured by Corning®, Dragontail™ manufactured by AGC, or Xensation® manufactured by SCHOTT AG), and/or a mechanically pre-stressed glass. Without limitation to any other aspect of the present disclosure, a plate 11800 may additionally or alternatively include any aspects set forth throughout the present disclosure, including at least electrical coupling features (e.g., with other plates of the capacitive stack, a power distribution board, and/or an excitation circuit), and/or a separation assembly or portion thereof (e.g., a rolling element, bearing, race, magnetic component, etc.). The example plate 11800 may be rotationally coupled to a shaft (e.g., at the shaft, and/or at an outrunner rotationally coupled to the shaft), or the housing (e.g., at a radial outward extent of the plate 11800, and/or at a shaft sleeve or other radially inward positioned component coupled to the housing and/or rotationally separated from the shaft). The example plate 11800 is simplified to clarify certain aspects of embodiments of the plate 11800.

The example plate 11800 may be formed as a disc, for example as depicted in FIG. 8 and elsewhere in the present disclosure. The arrangement of the plate 11800 in the schematic depiction of FIG. 118, including for example an inner radius defining a hole, is omitted, but is understood. The example plate 11800 includes a coupling circuit 11806 between the first stator/rotor electrode 11802 (e.g., left) and the second stator/rotor electrode 11802 (e.g., right), where the coupling circuit 11804 is provided, in certain embodiments, within the glass substrate 11804, 11805. In the example of FIG. 118, the plate 11800 is formed by two opposing glass faces 11804, 11805 coupled together, with the electrodes 11802 and coupling circuit 11806 positioned therebetween. In the example of FIG. 118, an illustrative support disc 11808 is depicted to space the two glass faces 11804, 11805, for convenience of illustration. It will be understood that the plate 11800 may be formed of multiple laminated layers, for example with the electrodes 11802 disposed on a layer, which may include the electrodes exposed to the dielectric fluid (e.g., the electrodes printed, adhered, or otherwise coupled onto an exposed face 11804, 11805) and/or sandwiched between layers, including for example the electrodes 11802 and/or coupling circuit 11806 provided on an intermediate glass layer (not shown), PCB substrate (not shown, and which may be sandwiched by glass layers). While the depiction of FIG. 118 is not depicted at scale, it will be noted that the disc 11808, where present, may be quite narrow (e.g., not more than a few widths of the faces 11804, 18805, and potentially smaller than a width of one of the faces 11804, 11805), and/or the disc 11808 may be omitted, with the plate 11800 formed of laminated layers, where some or all of the layers are glass.

In certain embodiments, the glass composition of layers may be varied, for example the exposed faces 11804, 11805 may be formed of a tougher glass (e.g., a tempered glass, a chemically treated glass, mechanically stressed glass, and/or having a laminate such as a polymer laminate), with inner layers (where present) formed of any desired material, such as a tougher glass (e.g., for consistency with the outer layers) and/or a glass having selected properties such as thermal conductivity, selected weight characteristics, or the like. In the example of FIG. 118, an outer layer 11810 is provided over the faces 11804, 11805. In certain embodiments, the outer layer 11810 may be omitted. In certain embodiments, the outer layer 11810 may be a surface treatment, a surface coating, and/or a laminated layer having properties, for example including properties such as those described in relation to a surface treatment and/or a surface coating as set forth herein. The utilization of a glass plate 11800, and/or a plate 11800 including a glass substrate and/or glass faces 11804, 11805 provides numerous advantages, including without limitation: providing an inherently smooth layer (which may additionally or alternatively be further polished and/or treated), providing a convenient surface to apply a laminated layer and/or coating having selected properties, providing a protective environment for the electrodes 11802, including preventing or greatly inhibiting injection of charge carriers from the electrodes 11802 into the dielectric fluid, a convenient substrate to provided interconnection circuitry 11802 therein (e.g., within a void of the plate 11800 as depicted in the example of FIG. 118, and/or provided as a PCB layer, traces on a laminated glass layer, etc.), and a strong protective material having a high stiffness (e.g., reducing axial deflection), and a homogenous surface allowing for a designed enforced minimum separation to be very low relative to other embodiments including a heterogenous surface.

[Boilerplate Begins Here]

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems herein. The terms computer, computing device, processor, circuit, and/or server, ("computing device") as utilized herein, should be understood broadly.

An example computing device includes a computer of any type, capable to access instructions stored in communication thereto such as upon a non-transient computer readable medium, whereupon the computer performs operations of the computing device upon executing the instructions. In certain embodiments, such instructions themselves comprise a computing device. Additionally or alternatively, a computing device may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware and/or computing devices include, without limitation, a general purpose computer, a server, an embedded computer, a mobile device, a virtual machine, and/or an emulated computing device. A computing device may be a distributed resource included as an aspect of several devices, included as an interoperable set of resources to perform described functions of the computing device, such that the distributed resources function together to perform the operations of the computing device. In certain embodiments, each computing device may be on separate hardware, and/or one or more hardware devices may include aspects of more than one computing device, for example as separately executable instructions stored on the device, and/or as logically partitioned aspects of a set of executable instructions, with some aspects comprising a part of one of a first computing device, and some aspects comprising a part of another of the computing devices.

A computing device may be part of a server, client, network infrastructure, mobile computing platform, stationary computing platform, or other computing platform. A processor may be any kind of computational or processing device capable of executing program instructions, codes, binary instructions, and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions, and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server, and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client, and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM, and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer to peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information ("receiving data"). Operations to receive data include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first receiving operation may be performed, and when communications are restored an updated receiving operation may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The methods and/or processes described above, and steps thereof, may be realized in hardware, program code, instructions, and/or programs or any combination of hardware and methods, program code, instructions, and/or programs suitable for a particular application. The hardware may include a dedicated computing device or specific computing device, a particular aspect or component of a specific computing device, and/or an arrangement of hardware components and/or logical circuits to perform one or more of the operations of a method and/or system. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are intended to fall within the scope of the present disclosure.

While the disclosure has been disclosed in connection with certain embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

What is claimed is:

1. A system, comprising:
   an electrostatic machine, comprising:
      a rotor plate comprising a plurality of rotor electrodes, and rotatably fixed to a shaft configured to rotate about an axis;
      a stator plate comprising a plurality of stator electrodes, and rotatably fixed to a housing defining the rotor plate, the stator plate, and at least a portion of the shaft;
      wherein the shaft is mechanically coupled to exchange torque with a load;
      an excitation circuit electrically coupled to at least one of the rotor plate or the stator plate at a first end, and electrically couplable to exchange power at a second end with a selected one of an electrical power source or an electrical load;

wherein the excitation circuit is configured to:
in a motoring mode, provide excitation power to at least one of the rotor plate or the stator plate, wherein the shaft provides positive torque to the load; and
in a generating mode, wherein the shaft receives negative torque from the load, operably couple at least one of the rotor plate or the stator plate to the electrical power source; and a controller, comprising:
a powering mode circuit structured to interpret an operating mode of the electrostatic machine as one of the motoring mode or the generating mode;
an excitation mode circuit structured to determine an excitation operating mode in response to the operating mode of the electrostatic machine; and
an excitation control circuit structured to provide an excitation command value in response to the excitation operating mode;
wherein the excitation circuit is responsive to the excitation operating mode to operate in the motoring mode or the generating mode.

2. The system of claim 1, wherein the electrical power source and the electrical load comprise a same electrical storage device.

3. The system of claim 1, wherein the electrical power source and the electrical load comprise direct current electrical devices.

4. The system of claim 1, wherein the electrical power source comprises a direct current device, and wherein the electrical load comprises an alternating current device.

5. The system of claim 4, wherein the electrical load comprises a power grid.

6. The system of claim 4, wherein the electrical load comprises a 3-phase alternating current device.

7. The system of claim 1, wherein the excitation circuit comprises at least one switch, and wherein the excitation circuit is responsive to the excitation command value to operate the at least one switch, thereby implementing the motoring mode or the generating mode.

8. The system of claim 7, wherein the at least one switch comprises at least one mechanical switch.

9. The system of claim 7, wherein the at least one switch comprises a solid state switch.

10. The system of claim 7, wherein the excitation circuit is configured to translate between a first voltage of the electrostatic machine and a second voltage of the selected one of an electrical power source or an electrical load.

11. A method, comprising:
providing excitation power to at least one of a rotor plate or a stator plate in a motoring mode, wherein a shaft provides positive torque to an electrical load;
in a generating mode, responsive to receiving a negative torque signal from an electrical load, operably coupling at least one of a rotor plate or a stator plate to an electrical power source;
interpreting an operating mode of an electrostatic machine as one of the motoring mode or the generating mode;
determining an excitation operating mode in response to the operating mode;
providing an excitation command value in response to the excitation operating mode; and
responsive to the excitation operating mode, selectively operating in the motoring mode or the generating mode.

12. The method of claim 11, wherein the electrical power source comprises a direct current device, and wherein the electrical load comprises an alternating current device.

13. The method of claim 12, wherein the electrical load comprises a power grid.

14. The method of claim 12, wherein the electrical load comprises a 3-phase alternating current device.

15. The method of claim 11, further comprising, responsive to the excitation command value, operating at least one switch, thereby selectively operating in the motoring mode or the generating mode.

16. The method of claim 15, further comprising, translating between a first voltage of the electrostatic machine and a second voltage of the selected one of an electrical power source or an electrical load.

* * * * *

UNITED STATES PATENT AND TRADEMARK OFFICE
CERTIFICATE OF CORRECTION

| | |
|---|---|
| PATENT NO. | : 11,811,334 B2 |
| APPLICATION NO. | : 17/234560 |
| DATED | : November 7, 2023 |
| INVENTOR(S) | : Reed et al. |

It is certified that error appears in the above-identified patent and that said Letters Patent is hereby corrected as shown below:

In the Drawings

Sheet 43 of 53, Fig. 97, reference numeral 9602, Line 1, delete "9602" and insert --9702-- therefor In the Specification In Column 18, Line 21, delete "$1.5 \leq\leq R/(P*G) \leq 5$," and insert --$1.5 \leq R/(P*G) \leq 5$,-- therefor In Column 18, Line 33, delete "102" and insert --202-- therefor In Column 60, Line 12, delete "6204" and insert --6210-- therefor In Column 63, Line 23, delete "6914" and insert --6916-- therefor In Column 71, Line 59, delete "8526." and insert --8532.-- therefor In Column 79, Line 49, delete "10002." and insert --1002.-- therefor In Column 79, Line 50, delete "10002," and insert --1002,-- therefor In Column 79, Line 57, delete "10002." and insert --1002.-- therefor In Column 85, Line 61, delete "10900." and insert --10908.-- therefor In Column 86, Line 39, delete "11992" and insert --11002-- therefor In Column 88, Line 50, delete "2 A." and insert --2A.-- therefor In Column 91, Line 60, delete "11310," and insert --11312,-- therefor Signed and Sealed this
Tenth Day of September, 2024

Katherine Kelly Vidal
*Director of the United States Patent and Trademark Office*

CERTIFICATE OF CORRECTION (continued)
U.S. Pat. No. 11,811,334 B2

In Column 91, Line 61, delete "13316" and insert --11316-- therefor

In Column 92, Line 23, delete "11301" and insert --11310-- therefor

In Column 94, Line 36, delete "6314" and insert --7314-- therefor

In Column 96, Line 37, delete "11802" and insert --11800-- therefor

In Column 96, Line 38, delete "11802" and insert --11800-- therefor